US012112009B2

(12) United States Patent
Dessero et al.

(10) Patent No.: US 12,112,009 B2
(45) Date of Patent: Oct. 8, 2024

(54) METHODS FOR PROVIDING AN IMMERSIVE EXPERIENCE IN AN ENVIRONMENT

(71) Applicant: Apple Inc., Cupertino, CA (US)

(72) Inventors: James M. Dessero, Morgan Hill, CA (US); Benjamin Hylak, San Francisco, CA (US); William A. Sorrentino, III, Mill Valley, CA (US); Stephen O. Lemay, Palo Alto, CA (US); Ieyuki Kawashima, Pleasanton, CA (US); Katherine W. Kolombatovich, San Francisco, CA (US); Jeffrey S. Allen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/659,147

(22) Filed: Apr. 13, 2022

(65) Prior Publication Data

US 2022/0326837 A1    Oct. 13, 2022

Related U.S. Application Data

(60) Provisional application No. 63/362,799, filed on Apr. 11, 2022, provisional application No. 63/264,831, (Continued)

(51) Int. Cl.
  *G06F 3/048* (2013.01)
  *G06F 3/04815* (2022.01)
  (Continued)

(52) U.S. Cl.
  CPC ........ *G06F 3/04815* (2013.01); *G06T 15/005* (2013.01); *G06T 15/50* (2013.01); *G06T 19/003* (2013.01)

(58) Field of Classification Search
  CPC ... G06F 3/04815; G06T 15/005; G06T 15/50; G06T 19/003
  See application file for complete search history.

(56) References Cited

U.S. PATENT DOCUMENTS 5,515,488 A * 5/1996 Hoppe ............... G06F 16/26
                                                715/968
5,524,195 A * 6/1996 Clanton, III ....... H04L 12/2834
                                                348/E5.103

(Continued)

FOREIGN PATENT DOCUMENTS

CA     3033344 A1    2/2018
CN     105264461 A   1/2016

(Continued)

OTHER PUBLICATIONS

International Search Report received for PCT Patent Application No. PCT/US2021/071596, dated Apr. 8, 2022, 7 pages.

(Continued)

*Primary Examiner* — Nicholas Augustine
(74) *Attorney, Agent, or Firm* — Kubota & Basol LLP

(57) ABSTRACT

In some embodiments, an electronic device changes the immersion level of a virtual environment and/or spatial effect in a three-dimensional environment based on the geometry of the physical environment around the device. In some embodiments, an electronic device modifies the virtual environment and/or spatial effect in response to detecting a movement of the device. In some embodiments, an electronic device moves a user interface of an application into and/or out of a virtual environment. In some embodiments, an electronic device selectively changes the display of a simulated environment and/or atmospheric effect in a three-dimensional environment based on movement of an object associated with a viewpoint of a user. In some embodiments, (Continued)

an electronic device provides feedback to a user in response to a user moving a virtual object to and/or into a simulated environment.

57 Claims, 81 Drawing Sheets

Related U.S. Application Data filed on Dec. 2, 2021, provisional application No. 63/261,554, filed on Sep. 23, 2021, provisional application No. 63/174,272, filed on Apr. 13, 2021.

(51) Int. Cl.
  *G06T 15/00* (2011.01)
  *G06T 15/50* (2011.01)
  *G06T 19/00* (2011.01)

(56) References Cited

U.S. PATENT DOCUMENTS

| | | | |
|---|---|---|---|
| 5,610,828 A * | 3/1997 | Kodosky | G06F 11/3664 |
| | | | 716/139 |
| 5,737,553 A * | 4/1998 | Bartok | G06F 3/04842 |
| | | | 715/764 |
| 5,740,440 A * | 4/1998 | West | G06F 8/24 |
| | | | 715/764 |
| 5,751,287 A * | 5/1998 | Hahn | G06F 3/0481 |
| | | | 715/775 |
| 5,758,122 A * | 5/1998 | Corda | G06F 8/34 |
| | | | 717/125 |
| 5,794,178 A * | 8/1998 | Caid | G06F 16/3347 |
| | | | 707/999.005 |
| 5,877,766 A * | 3/1999 | Bates | G06F 3/04855 |
| | | | 715/854 |
| 5,900,849 A | 5/1999 | Gallery | |
| 5,933,143 A * | 8/1999 | Kobayashi | G06T 11/206 |
| | | | 715/805 |
| 5,990,886 A * | 11/1999 | Serdy | G06Q 10/107 |
| | | | 715/752 |
| 6,061,060 A * | 5/2000 | Berry | G06F 3/0481 |
| | | | 715/835 |
| 6,108,004 A * | 8/2000 | Medl | G06F 3/0482 |
| | | | 707/999.102 |
| 6,112,015 A * | 8/2000 | Planas | H04L 41/22 |
| | | | 715/764 |
| 6,323,846 B1 | 11/2001 | Westerman et al. | |
| 6,456,296 B1 * | 9/2002 | Cataudella | G06F 8/38 |
| | | | 345/589 |
| 6,570,557 B1 | 5/2003 | Westerman et al. | |
| 6,584,465 B1 * | 6/2003 | Zhu | G06F 16/5854 |
| 6,677,932 B1 | 1/2004 | Westerman | |
| 6,756,997 B1 * | 6/2004 | Ward, III | H04N 21/4345 |
| | | | 348/E7.071 |
| 7,035,903 B1 * | 4/2006 | Baldonado | H04L 67/535 |
| | | | 709/206 |
| 7,137,074 B1 * | 11/2006 | Newton | G06F 11/0769 |
| | | | 715/810 |
| 7,230,629 B2 * | 6/2007 | Reynolds | G06F 3/0482 |
| | | | 345/589 |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,803,873 B2 | 8/2014 | Yoo et al. | |
| 8,970,478 B2 | 3/2015 | Johansson | |
| 8,970,629 B2 | 3/2015 | Kim et al. | |
| 9,185,062 B1 | 11/2015 | Yang et al. | |
| 9,348,458 B2 | 5/2016 | Hotelling et al. | |
| 9,400,559 B2 | 7/2016 | Latta et al. | |
| 9,448,635 B2 | 9/2016 | MacDougall et al. | |
| 9,465,479 B2 | 10/2016 | Cho et al. | |
| 9,563,331 B2 | 2/2017 | Poulos et al. | |
| 9,681,112 B2 | 6/2017 | Son | |
| 9,684,372 B2 | 6/2017 | Xun et al. | |
| 9,778,814 B2 | 10/2017 | Ambrus et al. | |
| 9,851,866 B2 | 12/2017 | Goossens et al. | |
| 9,886,087 B1 | 2/2018 | Wald et al. | |
| 9,933,833 B2 | 4/2018 | Tu et al. | |
| 9,933,937 B2 | 4/2018 | Lemay et al. | |
| 9,934,614 B2 | 4/2018 | Ramsby et al. | |
| 10,049,460 B2 | 8/2018 | Romano et al. | |
| 10,203,764 B2 | 2/2019 | Katz et al. | |
| 10,307,671 B2 | 6/2019 | Barney et al. | |
| 10,534,439 B2 | 1/2020 | Raffa et al. | |
| 10,664,048 B2 | 5/2020 | Cieplinski et al. | |
| 10,699,488 B1 * | 6/2020 | Terrano | G06N 20/00 |
| 10,732,721 B1 | 8/2020 | Clements | |
| 10,754,434 B2 | 8/2020 | Hall et al. | |
| 10,768,693 B2 | 9/2020 | Powderly et al. | |
| 10,956,724 B1 | 3/2021 | Terrano | |
| 10,983,663 B2 | 4/2021 | Iglesias | |
| 11,055,920 B1 | 7/2021 | Bramwell et al. | |
| 11,200,742 B1 | 12/2021 | Post et al. | |
| 11,294,475 B1 | 4/2022 | Pinchon et al. | |
| 2001/0047250 A1 * | 11/2001 | Schuller | G06T 15/04 |
| | | | 703/1 |
| 2002/0015024 A1 | 2/2002 | Westerman et al. | |
| 2002/0044152 A1 | 4/2002 | Abbott et al. | |
| 2003/0151611 A1 * | 8/2003 | Turpin | G06F 3/04845 |
| | | | 345/589 |
| 2003/0222924 A1 | 12/2003 | Baron | |
| 2004/0059784 A1 * | 3/2004 | Caughey | H04L 51/48 |
| | | | 709/206 |
| 2004/0243926 A1 * | 12/2004 | Trenbeath | G06F 40/154 |
| | | | 715/239 |
| 2005/0100210 A1 * | 5/2005 | Rice | G06Q 30/02 |
| | | | 382/162 |
| 2005/0138572 A1 | 6/2005 | Good et al. | |
| 2005/0144570 A1 * | 6/2005 | Loverin | G06F 3/0481 |
| | | | 715/776 |
| 2005/0144571 A1 * | 6/2005 | Loverin | G06F 3/0481 |
| | | | 715/776 |
| 2005/0190059 A1 | 9/2005 | Wehrenberg | |
| 2005/0198143 A1 * | 9/2005 | Moody | H04L 51/216 |
| | | | 709/206 |
| 2006/0017692 A1 | 1/2006 | Wehrenberg et al. | |
| 2006/0033724 A1 | 2/2006 | Chaudhri et al. | |
| 2006/0080702 A1 | 4/2006 | Diez et al. | |
| 2006/0197753 A1 | 9/2006 | Hotelling | |
| 2006/0283214 A1 | 12/2006 | Donadon et al. | |
| 2008/0211771 A1 | 9/2008 | Richardson | |
| 2009/0064035 A1 | 3/2009 | Shibata et al. | |
| 2009/0231356 A1 * | 9/2009 | Barnes | G09G 5/06 |
| | | | 715/781 |
| 2010/0097375 A1 | 4/2010 | Tadaishi et al. | |
| 2011/0018895 A1 * | 1/2011 | Buzyn | G06F 3/04845 |
| | | | 345/473 |
| 2011/0018896 A1 * | 1/2011 | Buzyn | G06T 11/001 |
| | | | 715/810 |
| 2011/0254865 A1 | 10/2011 | Yee et al. | |
| 2011/0310001 A1 | 12/2011 | Madau et al. | |
| 2012/0113223 A1 | 5/2012 | Hilliges et al. | |
| 2012/0170840 A1 * | 7/2012 | Caruso | G06F 3/048 |
| | | | 382/165 |
| 2012/0218395 A1 | 8/2012 | Andersen et al. | |
| 2012/0257035 A1 | 10/2012 | Larsen | |
| 2013/0127850 A1 | 5/2013 | Bindon | |
| 2013/0211843 A1 | 8/2013 | Clarkson | |
| 2013/0229345 A1 | 9/2013 | Day et al. | |
| 2013/0271397 A1 | 10/2013 | Hildreth et al. | |
| 2013/0278501 A1 | 10/2013 | Bulzacki | |

(56) References Cited

U.S. PATENT DOCUMENTS

| | | | |
|---|---|---|---|
| 2013/0286004 A1 | 10/2013 | McCulloch et al. |
| 2013/0326364 A1 | 12/2013 | Latta et al. |
| 2013/0342564 A1* | 12/2013 | Kinnebrew | G09G 3/003 |
| | | | 345/619 |
| 2014/0002338 A1 | 1/2014 | Raffa et al. |
| 2014/0028548 A1 | 1/2014 | Bychkov et al. |
| 2014/0075361 A1* | 3/2014 | Reynolds | G06F 3/0485 |
| | | | 715/771 |
| 2014/0108942 A1* | 4/2014 | Freeman | G06F 16/00 |
| | | | 715/738 |
| 2014/0125584 A1 | 5/2014 | Xun et al. |
| 2014/0198017 A1 | 7/2014 | Lamb et al. |
| 2014/0282272 A1 | 9/2014 | Kies et al. |
| 2014/0347391 A1 | 11/2014 | Keane et al. |
| 2015/0035822 A1 | 2/2015 | Arsan et al. |
| 2015/0035832 A1 | 2/2015 | Sugden et al. |
| 2015/0123890 A1 | 5/2015 | Kapur et al. |
| 2015/0177937 A1 | 6/2015 | Poletto et al. |
| 2015/0187093 A1 | 7/2015 | Chu et al. |
| 2015/0242095 A1* | 8/2015 | Sonnenberg | G06F 3/04842 |
| | | | 715/810 |
| 2015/0317832 A1 | 11/2015 | Ebstyne et al. |
| 2015/0332091 A1 | 11/2015 | Kim et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0171304 A1* | 6/2016 | Golding | G01J 3/528 |
| | | | 345/632 |
| 2016/0253063 A1 | 9/2016 | Critchlow |
| 2016/0253821 A1 | 9/2016 | Romano et al. |
| 2016/0275702 A1* | 9/2016 | Reynolds | G06F 3/04842 |
| 2016/0306434 A1 | 10/2016 | Ferrin |
| 2017/0038829 A1* | 2/2017 | Lanier | G06T 19/006 |
| 2017/0038837 A1* | 2/2017 | Faaborg | G06F 3/017 |
| 2017/0038849 A1 | 2/2017 | Hwang |
| 2017/0123487 A1 | 5/2017 | Hazra et al. |
| 2017/0132694 A1* | 5/2017 | Damy | G06F 3/0488 |
| 2017/0132822 A1* | 5/2017 | Marschke | G06Q 30/0631 |
| 2017/0206691 A1 | 7/2017 | Harrises et al. |
| 2017/0315715 A1 | 11/2017 | Fujita et al. |
| 2017/0344223 A1 | 11/2017 | Holzer et al. |
| 2017/0358141 A1 | 12/2017 | Stafford et al. |
| 2018/0045963 A1* | 2/2018 | Hoover | G02B 27/017 |
| 2018/0075658 A1* | 3/2018 | Lanier | G06T 11/001 |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1 | 4/2018 | McPhee et al. |
| 2018/0158222 A1 | 6/2018 | Hayashi |
| 2018/0181199 A1* | 6/2018 | Harvey | G06F 3/014 |
| 2018/0188802 A1 | 7/2018 | Okumura |
| 2018/0239144 A1 | 8/2018 | Woods et al. |
| 2018/0300023 A1* | 10/2018 | Hein | G06Q 30/0621 |
| 2018/0348861 A1* | 12/2018 | Uscinski | G06F 1/163 |
| 2019/0050062 A1 | 2/2019 | Chen et al. |
| 2019/0080572 A1 | 3/2019 | Kim et al. |
| 2019/0088149 A1 | 3/2019 | Fink et al. |
| 2019/0094979 A1 | 3/2019 | Hall et al. |
| 2019/0101991 A1 | 4/2019 | Brennan |
| 2019/0146128 A1 | 5/2019 | Cao et al. |
| 2019/0204906 A1 | 7/2019 | Ross et al. |
| 2019/0227763 A1 | 7/2019 | Kaufthal |
| 2019/0258365 A1 | 8/2019 | Zurmoehle et al. |
| 2019/0310757 A1 | 10/2019 | Lee et al. |
| 2019/0324529 A1 | 10/2019 | Stellmach et al. |
| 2019/0371072 A1 | 12/2019 | Lindberg et al. |
| 2019/0377487 A1 | 12/2019 | Bailey et al. |
| 2020/0004401 A1 | 1/2020 | Hwang et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | McCall |
| 2020/0159017 A1 | 5/2020 | Lin et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0356221 A1 | 11/2020 | Behzadi et al. |
| 2020/0357374 A1 | 11/2020 | Verweij et al. |
| 2020/0387228 A1 | 12/2020 | Ravasz et al. |
| 2021/0074062 A1* | 3/2021 | Madonna | G06T 15/503 |
| 2021/0090337 A1 | 3/2021 | Ravasz et al. |
| 2021/0096726 A1 | 4/2021 | Faulkner et al. |
| 2021/0295602 A1 | 9/2021 | Scapel et al. |
| 2021/0303074 A1 | 9/2021 | Vanblon et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0375022 A1 | 12/2021 | Lee et al. |
| 2022/0011855 A1 | 1/2022 | Hazra et al. |
| 2022/0030197 A1 | 1/2022 | Ishimoto |
| 2022/0083197 A1 | 3/2022 | Rockel et al. |
| 2022/0101593 A1 | 3/2022 | Rockel et al. |
| 2022/0101612 A1 | 3/2022 | Palangie et al. |
| 2022/0121344 A1 | 4/2022 | Pastrana Vicente et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0191570 A1 | 6/2022 | Reid et al. |
| 2022/0229524 A1 | 7/2022 | McKenzie et al. |
| 2022/0245888 A1 | 8/2022 | Singh et al. |
| 2023/0008537 A1 | 1/2023 | Henderson et al. |
| 2023/0068660 A1 | 3/2023 | Brent et al. |
| 2023/0074080 A1 | 3/2023 | Miller et al. |
| 2023/0093979 A1 | 3/2023 | Stauber et al. |
| 2023/0152935 A1 | 5/2023 | McKenzie et al. |
| 2023/0154122 A1 | 5/2023 | Dascola et al. |
| 2023/0163987 A1 | 5/2023 | Young et al. |
| 2023/0244857 A1 | 8/2023 | Weiss et al. |
| 2023/0273706 A1 | 8/2023 | Smith et al. |
| 2023/0274504 A1 | 8/2023 | Ren et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0350539 A1 | 11/2023 | Owen et al. |
| 2023/0384907 A1 | 11/2023 | Boesel et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0095984 A1 | 3/2024 | Ren et al. |
| 2024/0103684 A1 | 3/2024 | Yu et al. |
| 2024/0103707 A1 | 3/2024 | Henderson et al. |
| 2024/0104836 A1 | 3/2024 | Dessero et al. |
| 2024/0104877 A1 | 3/2024 | Henderson et al. |
| 2024/0111479 A1 | 4/2024 | Paul |

FOREIGN PATENT DOCUMENTS

| | | |
|---|---|---|
| CN | 105264478 A | 1/2016 |
| CN | 108633307 A | 10/2018 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2012-234550 A | 11/2012 |
| JP | 2013196158 A | 9/2013 |
| JP | 2013-257716 A | 12/2013 |
| JP | 2014514652 A | 6/2014 |
| JP | 2015515040 A | 5/2015 |
| JP | 2015-118332 A | 6/2015 |
| JP | 2016194744 A | 11/2016 |
| JP | 2017027206 A | 2/2017 |

(56) References Cited

FOREIGN PATENT DOCUMENTS

| | | |
|---|---|---|
| JP | 2018005516 A | 1/2018 |
| JP | 2019169154 A | 10/2019 |
| JP | 2022053334 A | 4/2022 |
| KR | 20160012139 A | 2/2016 |
| KR | 10-2019-0100957 A | 8/2019 |
| WO | 2013/169849 A2 | 11/2013 |
| WO | 2014/105276 A1 | 7/2014 |
| WO | 2019142560 A1 | 7/2019 |
| WO | 2020066682 A1 | 4/2020 |
| WO | 2021202783 A1 | 10/2021 |
| WO | 2022066399 A1 | 3/2022 |
| WO | 2023141535 A1 | 7/2023 |

OTHER PUBLICATIONS

International Search Report received for PCT Patent Application No. PCT/US2022/071704, dated Aug. 26, 2022, 6 pages.
Non-Final Office Action received for U.S. Appl. No. 17/932,655, dated Apr. 20, 2023, 10 pages.
Notice of Allowance received for U.S. Appl. No. 17/448,876, dated Apr. 7, 2022, 9 pages.
Notice of Allowance received for U.S. Appl. No. 17/448,876, dated Jul. 20, 2022, 8 pages.
Corrected Notice of Allowability received for U.S. Appl. No. 17/932,655, dated Oct. 12, 2023, 2 pages.
Notice of Allowance received for U.S. Appl. No. 17/932,655, dated Sep. 29, 2023, 7 pages.
"AquaSnap Window Manager: dock, snap, tile, organize [online]", Nurgo Software, Available online at: < https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/448,875, mailed on Mar. 16, 2023, 24 pages.
Final Office Action received for U.S. Appl. No. 18/182,300, mailed on Feb. 16, 2024, 32 pages.
"Home | Virtual Desktop [online]", Virtual Desktop, Available online at: < https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Dec. 11, 2023, 27 pages.
Non-Final Office Action received for U.S. Appl. No. 17/932,999, mailed on Feb. 23, 2024, 22 pages.
Non-Final Office Action received for U.S. Appl. No. 18/182,300, mailed on Oct. 26, 2023, 29 pages.
Notice of Allowance received for U.S. Appl. No. 17/448,875, mailed on Apr. 17, 2024, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/932,655, mailed on Jan. 24, 2024, 7 pages.
Notice of Allowance received for U.S. Appl. No. 18/154,757, mailed on Jan. 23, 2024, 10 pages.
Notice of Allowance received for U.S. Appl. No. 18/421,675, mailed on Apr. 11, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Oct. 30, 2023, 11 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt, et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan, Dominic , "4 Virtual Reality Desktops for Vive, Rift, and Windows VR Compared", [online]. Road to VR, Available online at: < https://www.roadtovr.com/virtual-reality-desktop-compared-oculus-rift-htc-vive/>, [retrieved on Jun. 29, 2023], Jan. 3, 2018, 4 pages.
Camalich, Sergio , "CSS Buttons with Pseudo-elements", Available online at: < https://tympanus.net/codrops/2012/01/11/css-buttons-with-pseudo-elements/>, [retrieved on Jul. 12, 2017], Jan. 11, 2012, 8 pages.
Chatterjee , et al., "Gaze+Gesture: Expressive, Precise and Targeted Free-Space Interactions", ICMI '15, Nov. 9-13, 2015, 8 pages.
Lin , et al., "Towards Naturally Grabbing and Moving Objects in VR", Is&T International Symposium on Electronic Imaging and The Engineering Reality of Virtual Reality, 2016, 6 pages.
McGill , et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer , et al., "Gaze + Pinch Interaction in Virtual Reality", In Proceedings of SUI '17, Brighton, United Kingdom, Oct. 16-17, 2017, pp. 99-108.

* cited by examiner

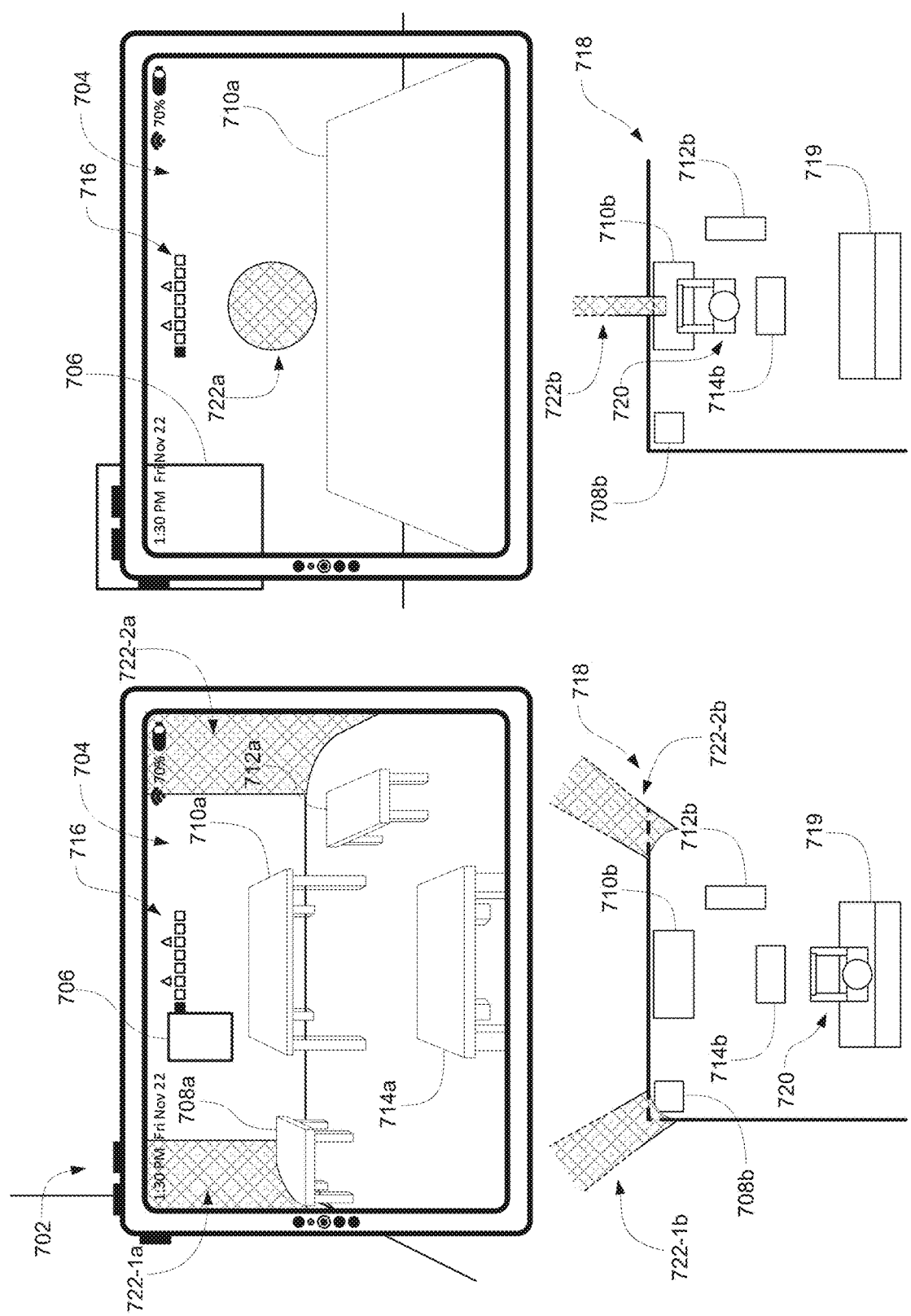

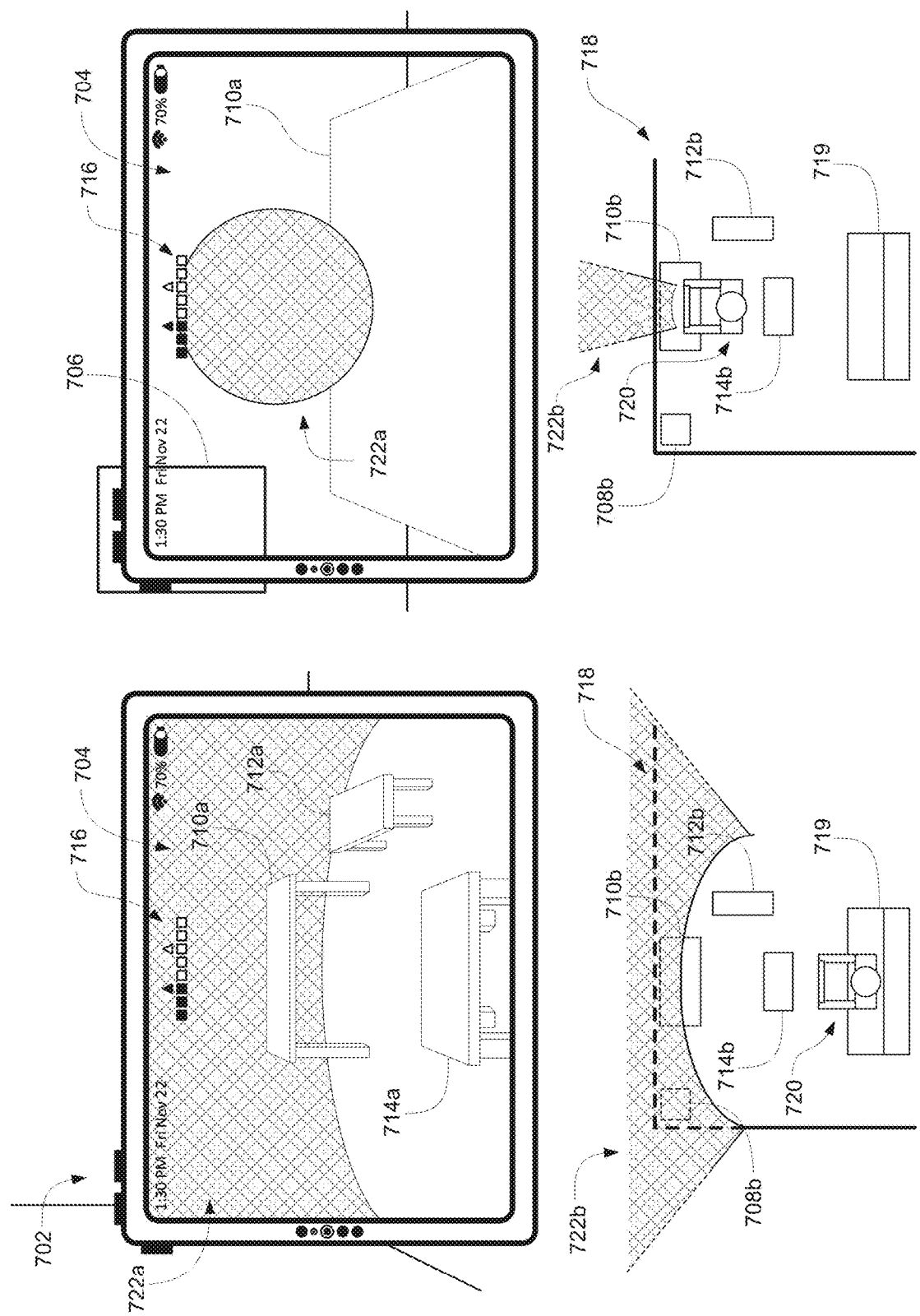

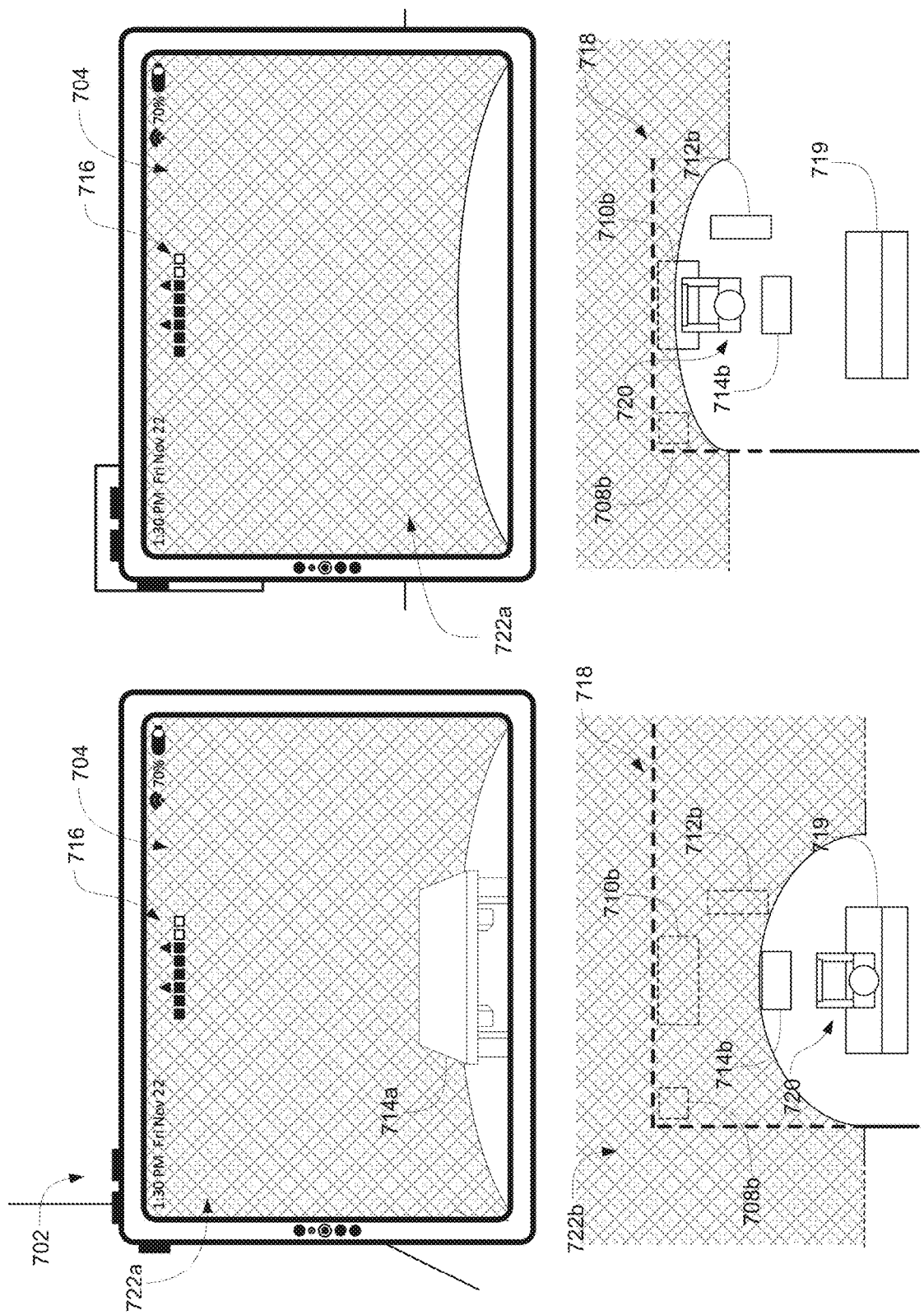

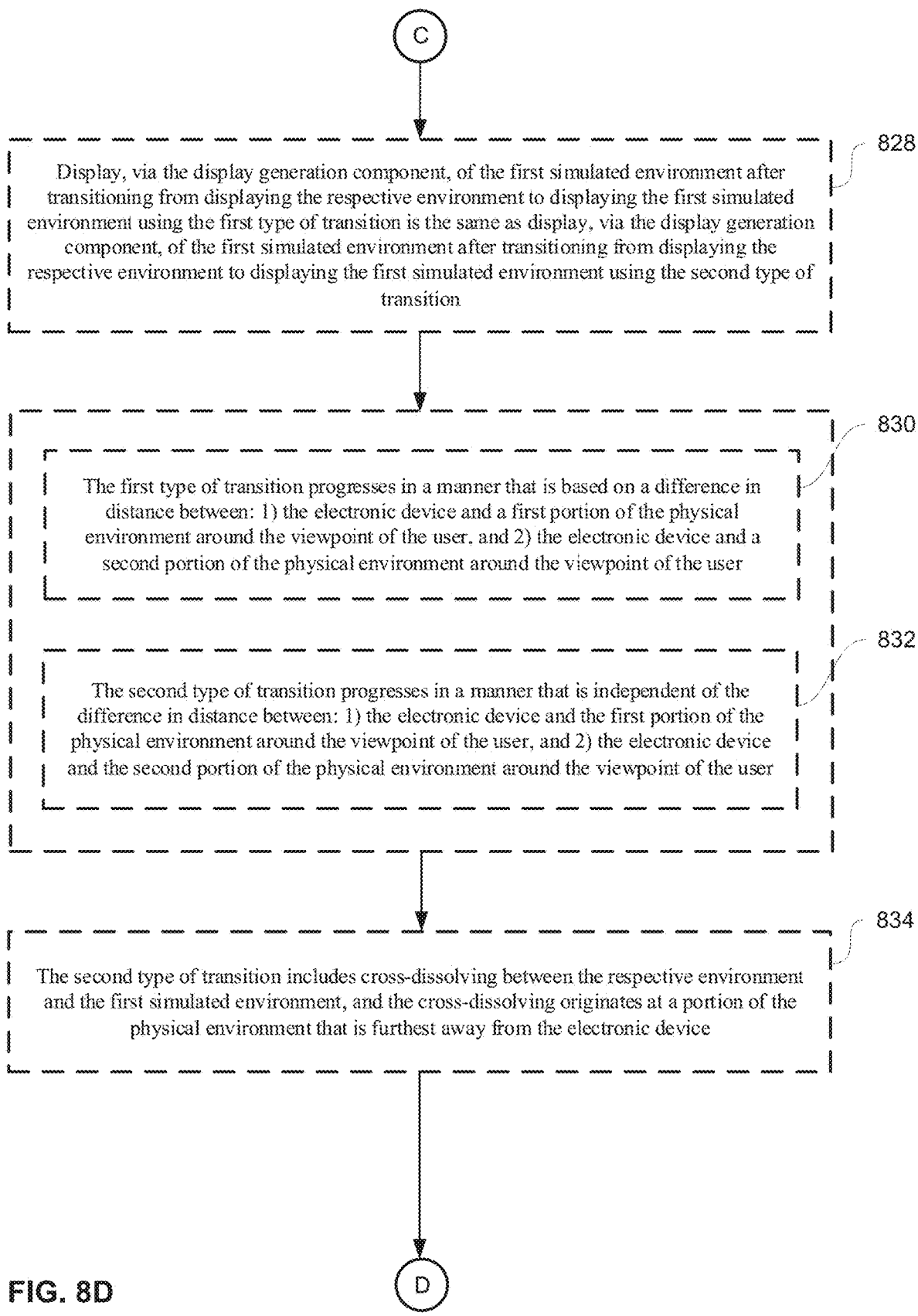

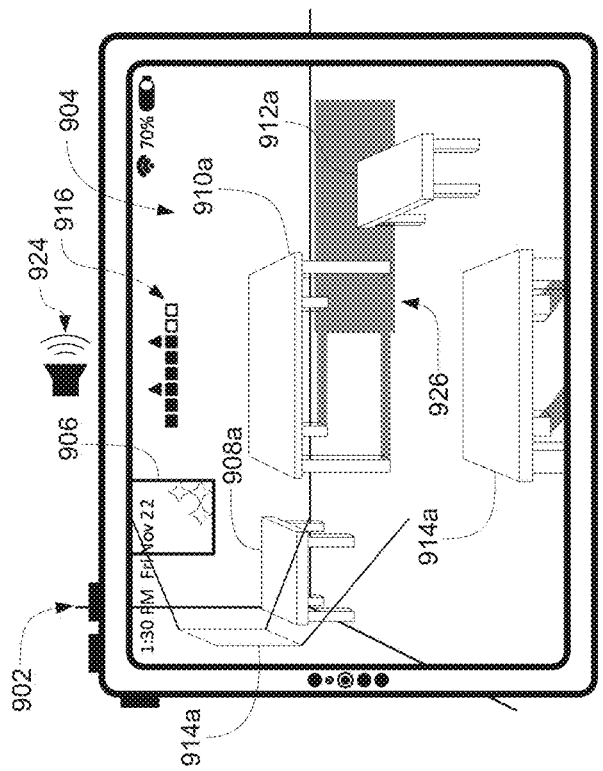
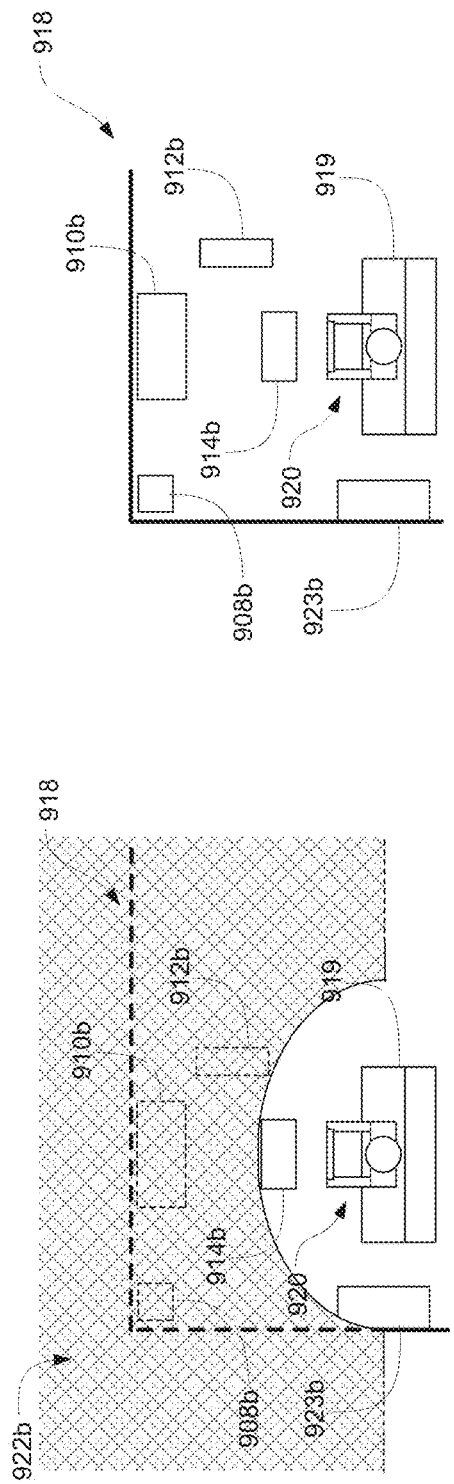
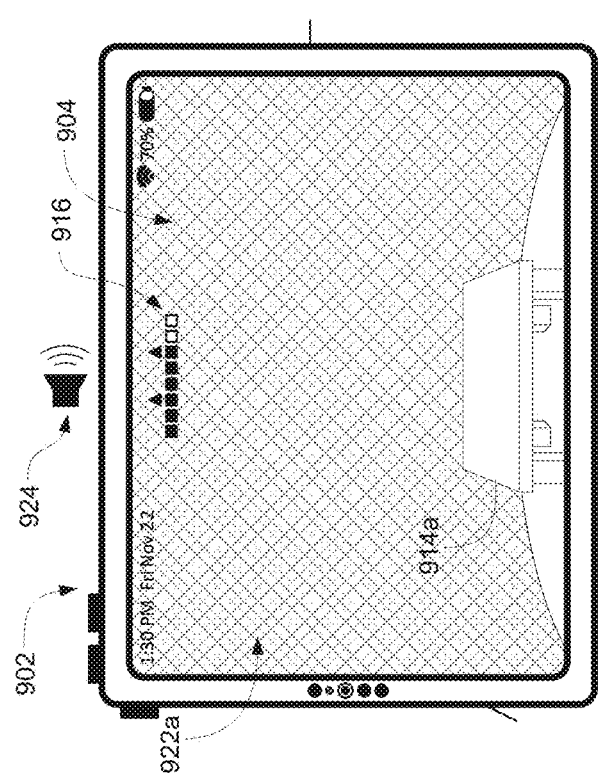
FIG. 9C
FIG. 9D

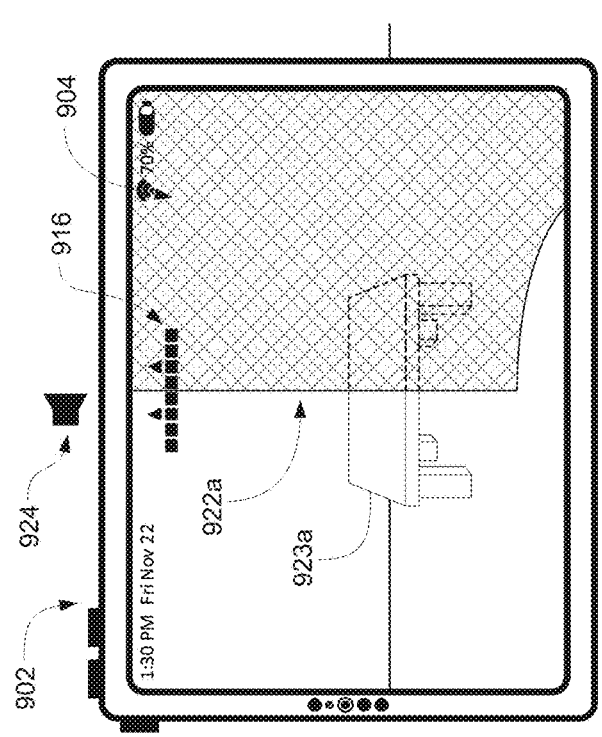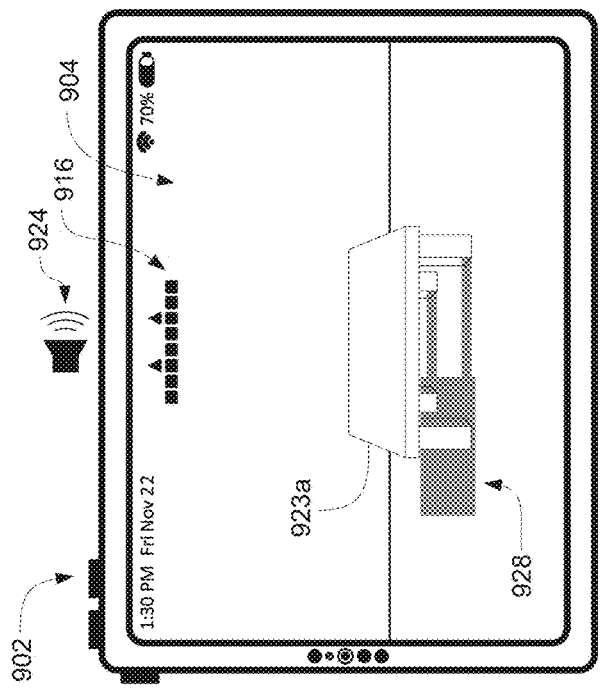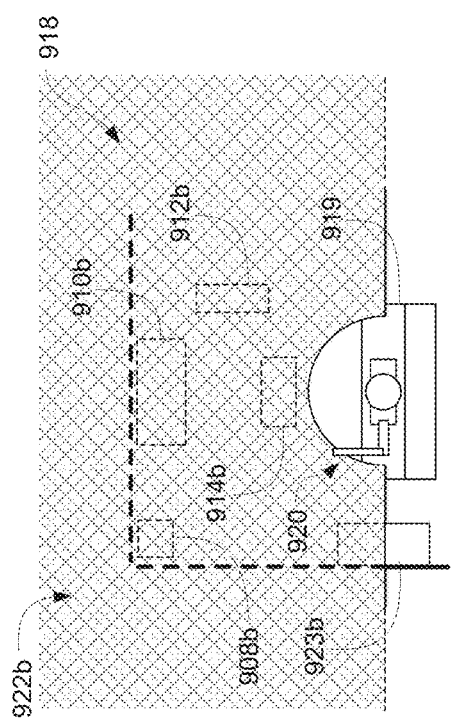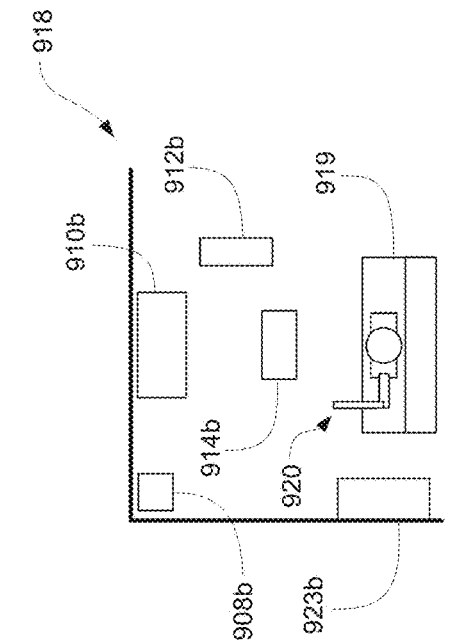
FIG. 9E
FIG. 9F

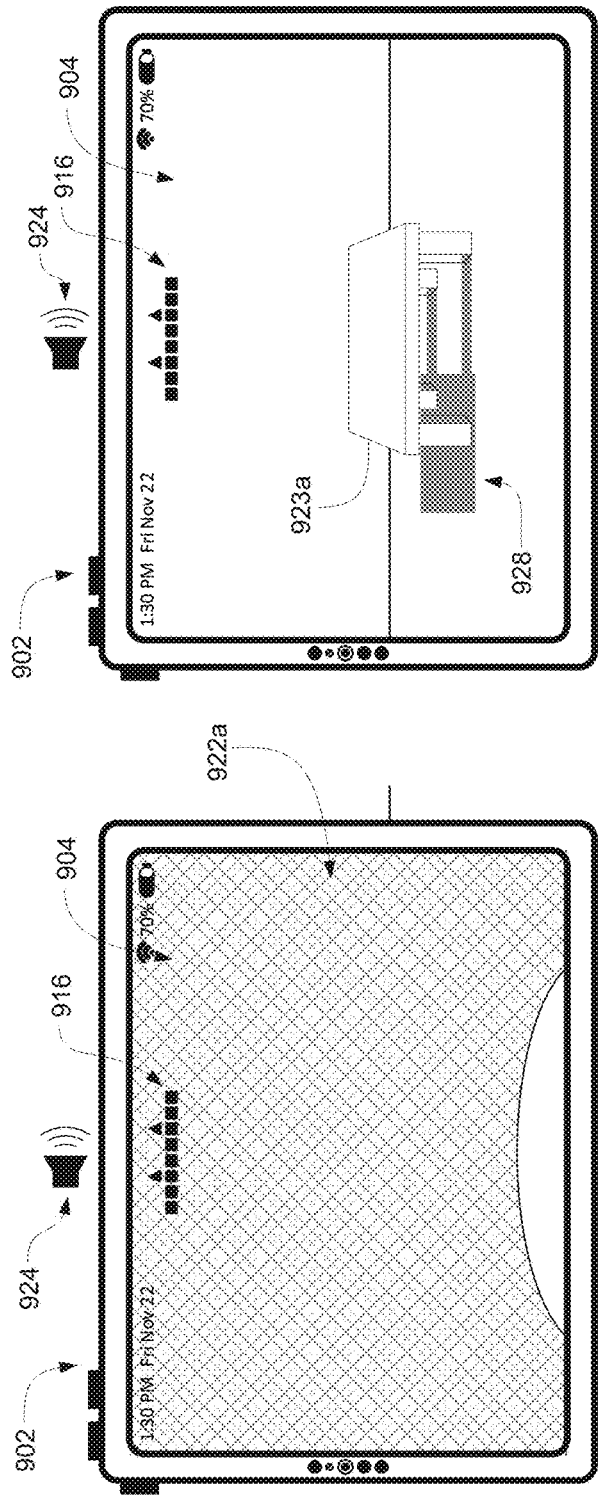
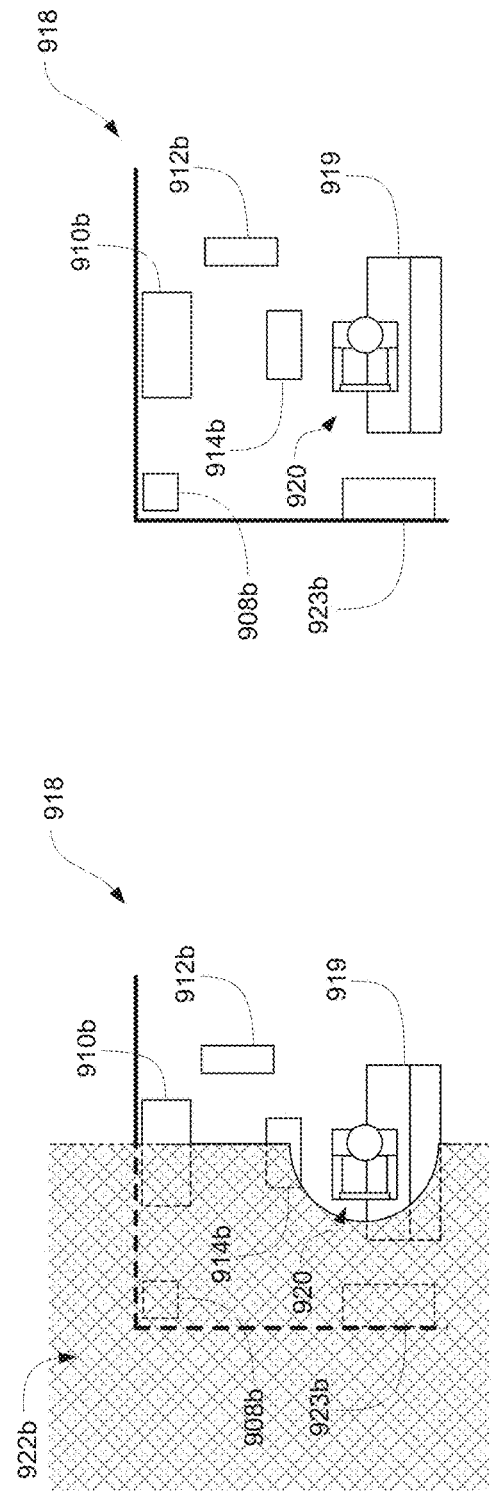
FIG. 9H
FIG. 9G

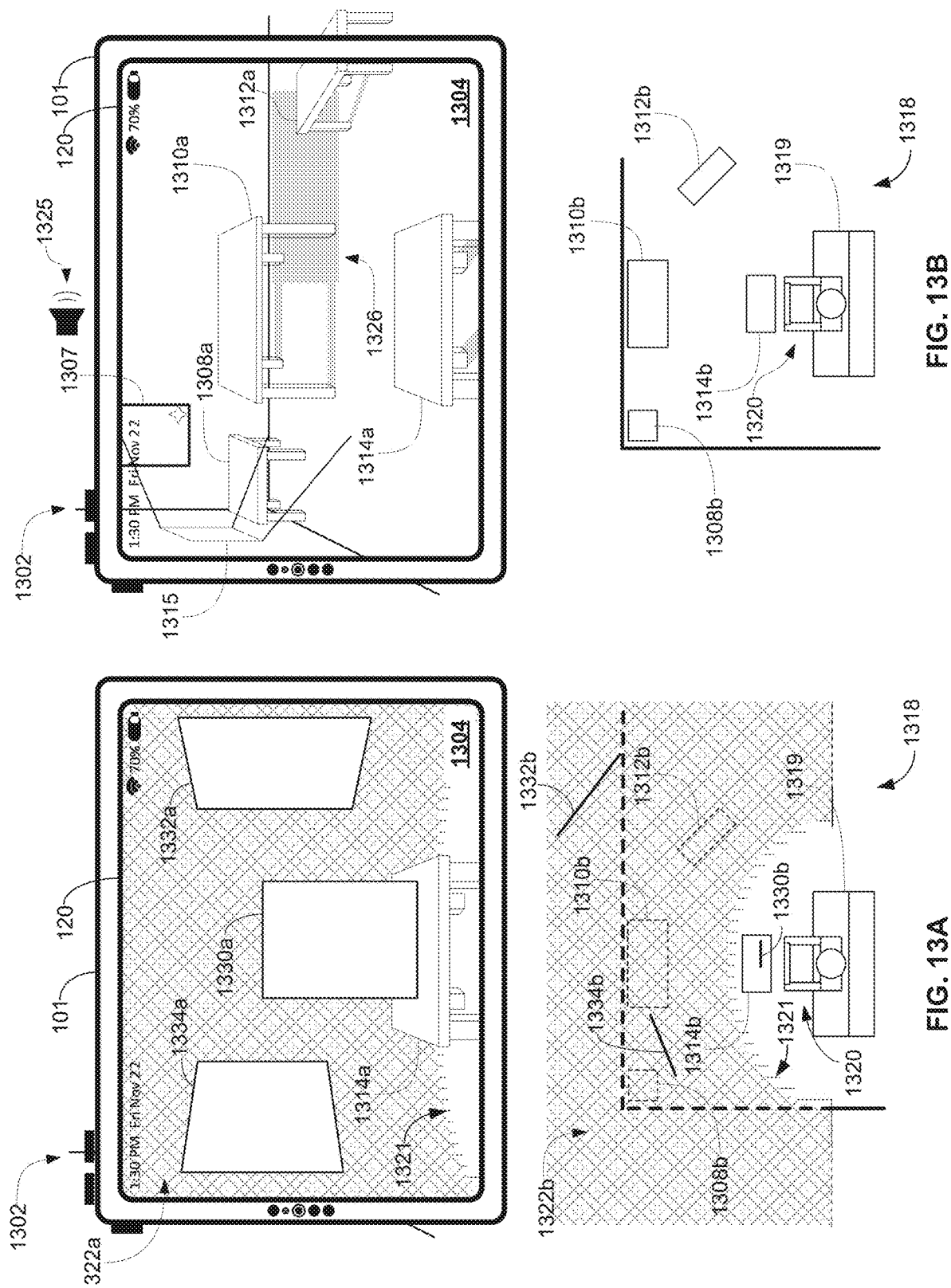

METHODS FOR PROVIDING AN IMMERSIVE EXPERIENCE IN AN ENVIRONMENT

CROSS-REFERENCE TO RELATED APPLICATIONS

This application claims the benefit of U.S. Provisional Application No. 63/174,272, filed Apr. 13, 2021, U.S. Provisional Application No. 63/261,554, filed Sep. 23, 2021, U.S. Provisional Application No. 63/264,831 filed Dec. 2, 2021, and U.S. Provisional Application No. 63/362,799, filed Apr. 11, 2022, the contents of which are incorporated herein by reference in their entireties for all purposes.

TECHNICAL FIELD

This relates generally to computer systems with a display generation component and one or more input devices that present graphical user interfaces, including but not limited to electronic devices that provide immersive experiences in three-dimensional environments.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with objects in a three-dimensional environment. Such methods and interfaces may complement or replace conventional methods for interacting with objects in a three-dimensional environment. Such methods and interfaces reduce the number, extent, and/or the nature of the inputs from a user and produce a more efficient human-machine interface.

In some embodiments, an electronic device changes the immersion level of a virtual environment and/or spatial effect in a three-dimensional environment based on the geometry of the physical environment around the device. In some embodiments, an electronic device modifies the virtual environment and/or spatial effect in response to detecting a movement of the device. In some embodiments, an electronic device moves a user interface of an application into and out of a virtual environment. In some embodiments, an electronic device selectively changes the display of a simulated environment and/or atmospheric effect in a three-dimensional environment based on movement of an object associated with a viewpoint of a user. In some embodiments, an electronic device provides feedback to a user in response to a user moving a virtual object to and/or into a simulated environment in accordance with some embodiments.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7H illustrate examples of displaying a virtual environment in accordance with some embodiments.

FIGS. 8A-8H is a flowchart illustrating a method of displaying a virtual environment in accordance with some embodiments.

FIGS. 9A-9H illustrate examples of changing the immersion level for a three-dimensional environment in accordance with some embodiments.

FIGS. 13A-13H illustrate examples of selectively changing the display of a simulated environment and/or atmospheric effect in a three-dimensional environment based on movement of an object associated with a viewpoint of a user in accordance with some embodiments.

DESCRIPTION OF EMBODIMENTS

Figure 1:
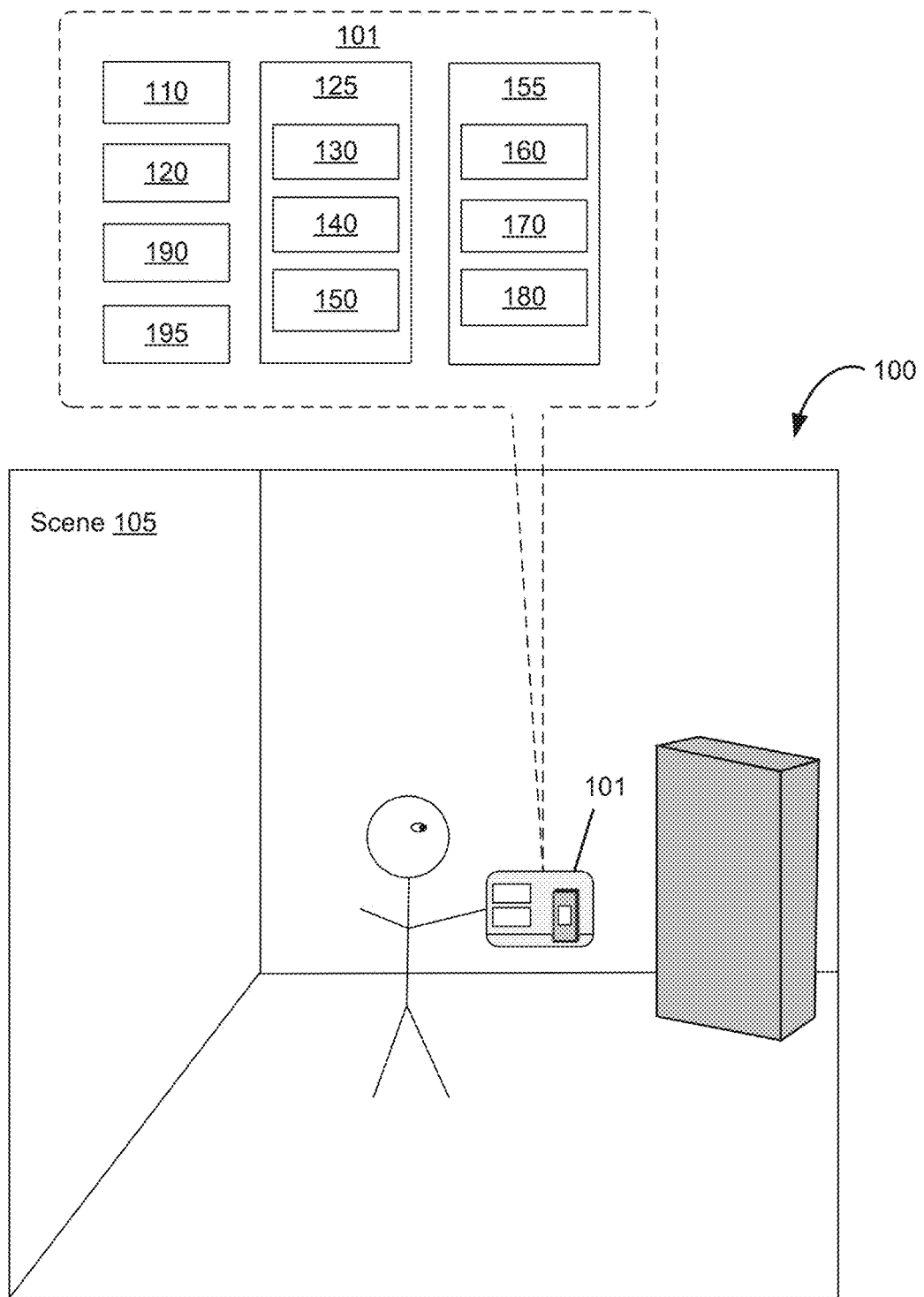
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to interact with and manipulate objects in a three-dimensional environment.

In some embodiments, a computer system displays a virtual environment in a three-dimensional environment. In some embodiments, the virtual environment is displayed via a far-field process or a near-field process based on the geometry (e.g., size and/or shape) of the three-dimensional environment (e.g., which, optionally, mimics the real world environment around the device). In some embodiments, the far-field process includes introducing the virtual environment from a location farthest from the viewpoint of the user and gradually expanding the virtual environment towards the viewpoint of the user (e.g., using information about the location, position, distance, etc. of objects in the environment). In some embodiments, the near-field process includes introducing the virtual environment from a location farthest from the viewpoint of the user and expanding from the initial location outwards, without considering the distance and/or position of objects in the environment (e.g., expanding the size of the virtual environment with respect to the display generation component).

In some embodiments, a computer system displays a virtual environment and/or an atmospheric effect in a three-dimensional environment. In some embodiments, displaying an atmospheric effect includes displaying one or more lighting and/or particle effects in the three-dimensional environment. In some embodiments, in response to detecting the movement of the device, portions of the virtual environment are de-emphasized, but optionally atmospheric effects are not reduced. In some embodiments, in response to detecting the rotation of the body of the user (e.g., concurrently with the rotation of the device), the virtual environment is moved to a new location in the three-dimensional environment, optionally aligned with the body of the user.

In some embodiments, a computer system displays a virtual environment concurrently with a user interface of an application. In some embodiments, the user interface of the application is able to be moved into the virtual environment and treated as a virtual object that exists in the virtual environment. In some embodiments, the user interface is automatically resized when moved into the virtual environment based the distance of the user interface when moved into the virtual environment. In some embodiments, while displaying both the virtual environment and the user interface, a user is able to request the user interface be displayed as an immersive environment. In some embodiments, in response to the request to display the user interface as an immersive environment, the previously displayed virtual environment is replaced with the immersive environment of the user interface.

In some embodiments, a computer system displays a simulated environment and/or an atmospheric effect in a three-dimensional environment. In some embodiments, in response to detecting movement of the user, a part of the user (e.g., head, eyes, face, and/or body), the computer system and/or other component of the computer system, the simulated environment is retracted in the three-dimensional environment to reveal portions of the physical environment. In some embodiments, atmospheric effects are not reduced. In some embodiments, further movement of the user, the part of the user (e.g., head, eyes, face, and/or body), the computer system and/or other component of the computer system results in the simulated environment no longer being displayed.

In some embodiments, an electronic device displays a virtual object in a three-dimensional environment, where the three-dimensional environment includes a simulated environment that has a first visual appearance, and the virtual object is located outside of the simulated environment in the three-dimensional environment. In some embodiments, in response to receiving an input moving the virtual object into or to the simulated environment, the electronic device displays the simulated environment with a second visual appearance, different from the first visual appearance. In some embodiments, changing the visual appearance of the simulated environment includes changing a location of the simulated environment, changing a level of immersion associated with the simulated environment, changing an opacity of the simulated environment and/or changing a color of the simulated environment.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

FIGS. 1-6 provide a description of example computer systems for providing CGR experiences to users (such as described below with respect to methods 800, 1000, 1200, 1400 and 1600). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality (or extended reality (XR)): In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

Hardware: There are many different types of electronic systems that enable a person to sense and/or interact with various CGR environments. Examples include head mounted systems, projection-based systems, heads-up displays (HUDs), vehicle windshields having integrated displays, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
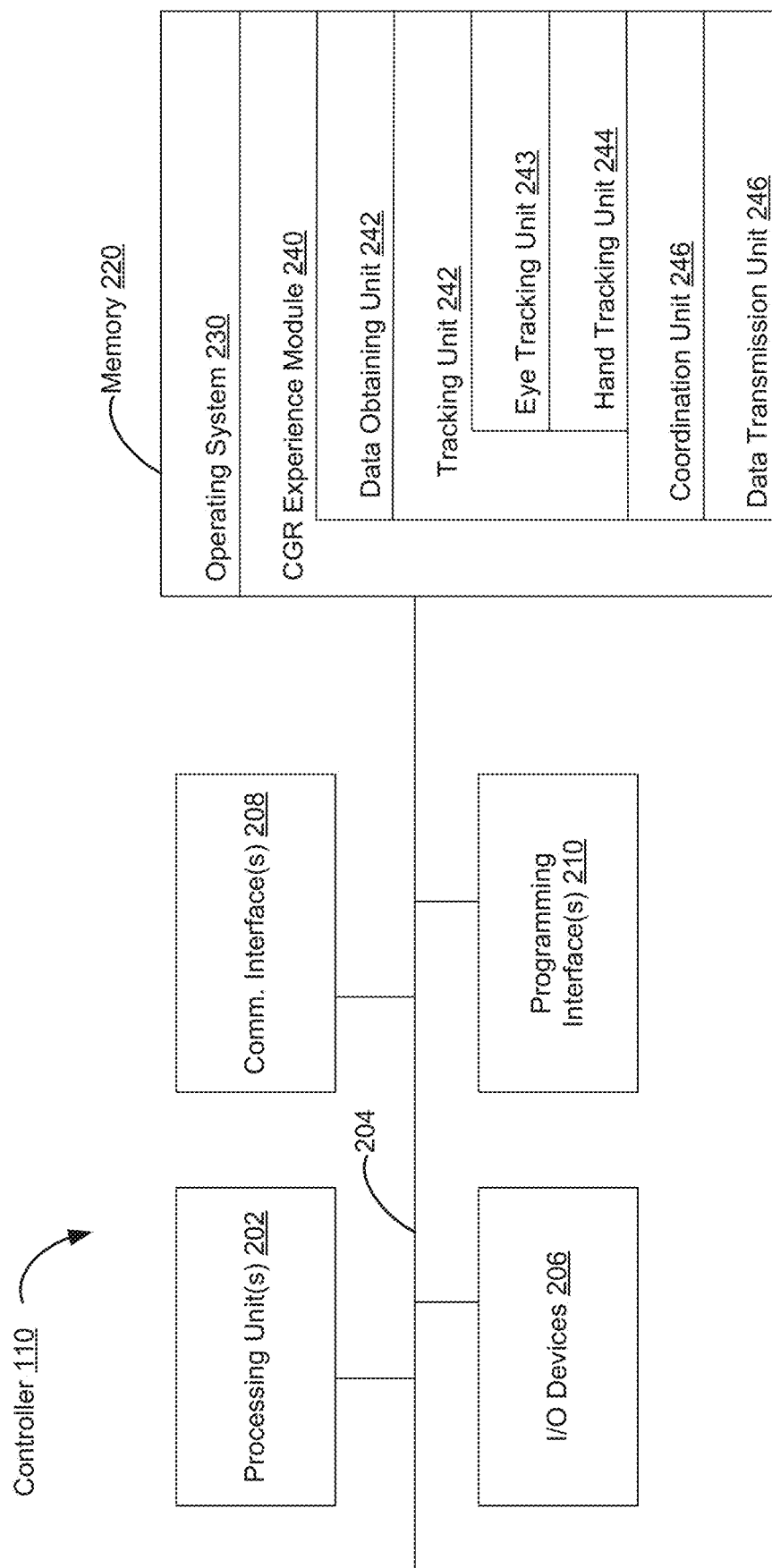
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
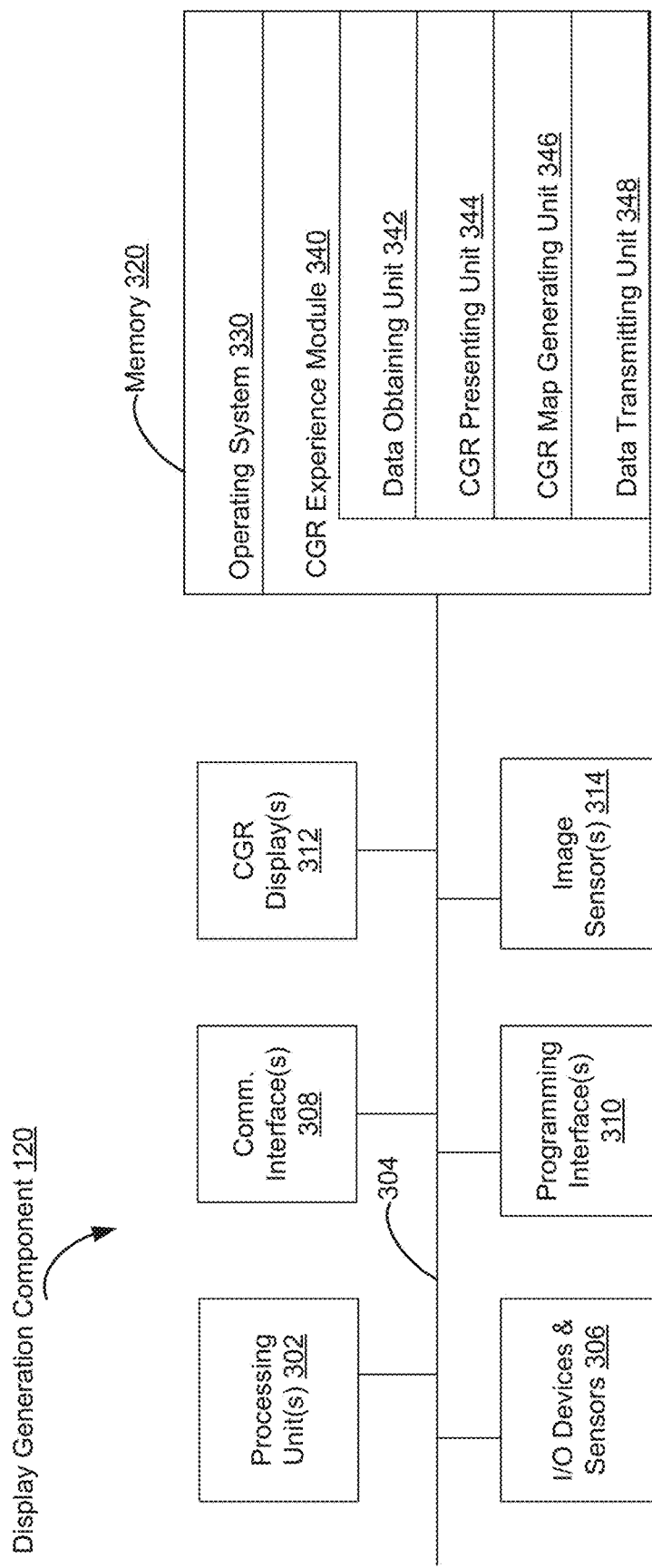
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
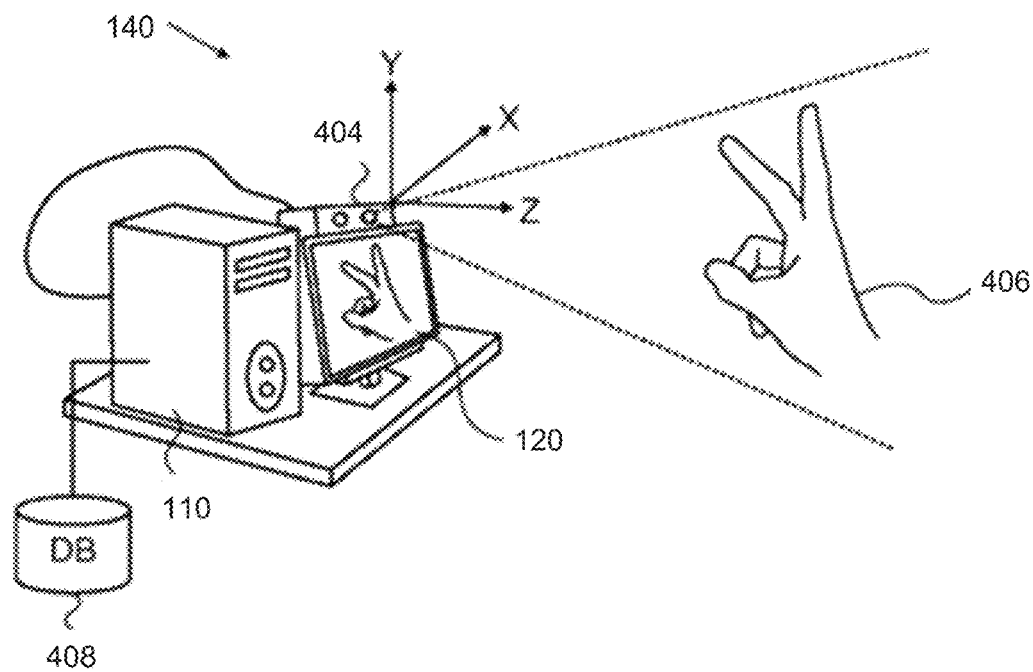
FIG. 4 is a block diagram illustrating a hand tracking unit of a computer system that is configured to capture gesture inputs of the user in accordance with some embodiments.
Figure 4:
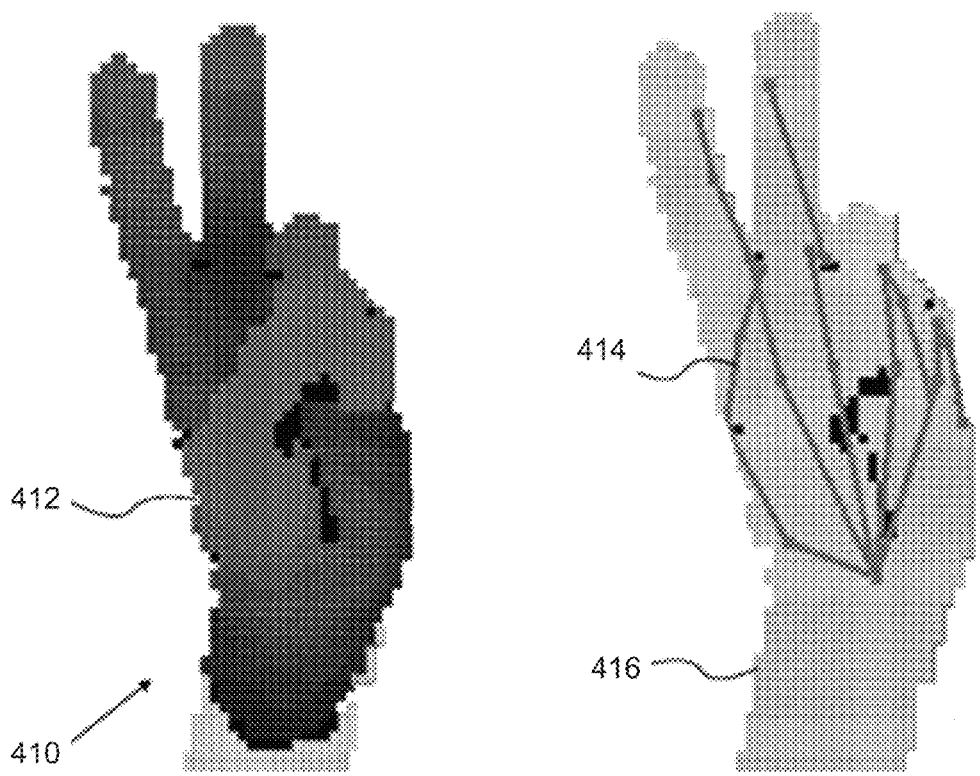

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand for interacting with a CGR or XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
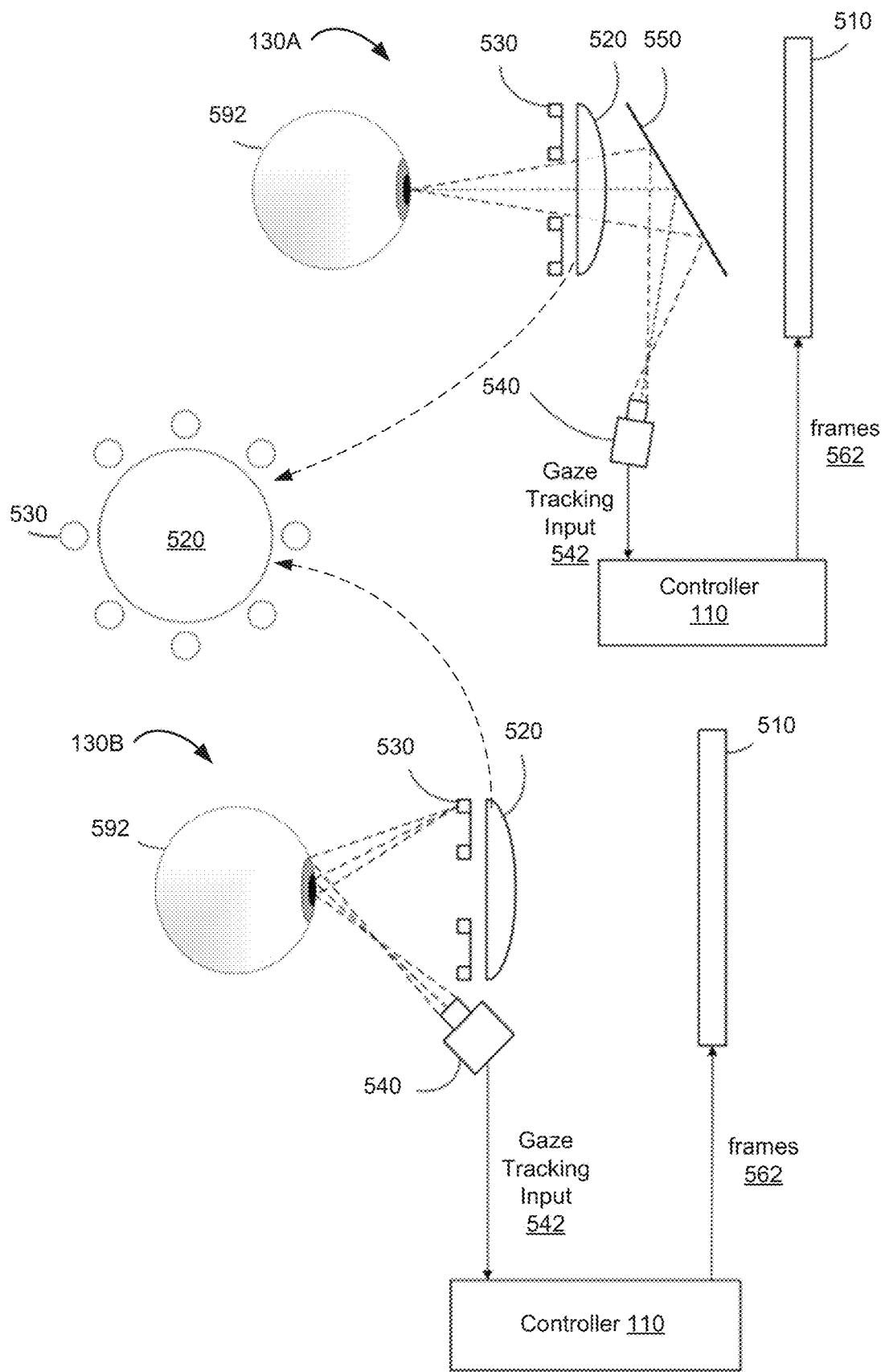
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
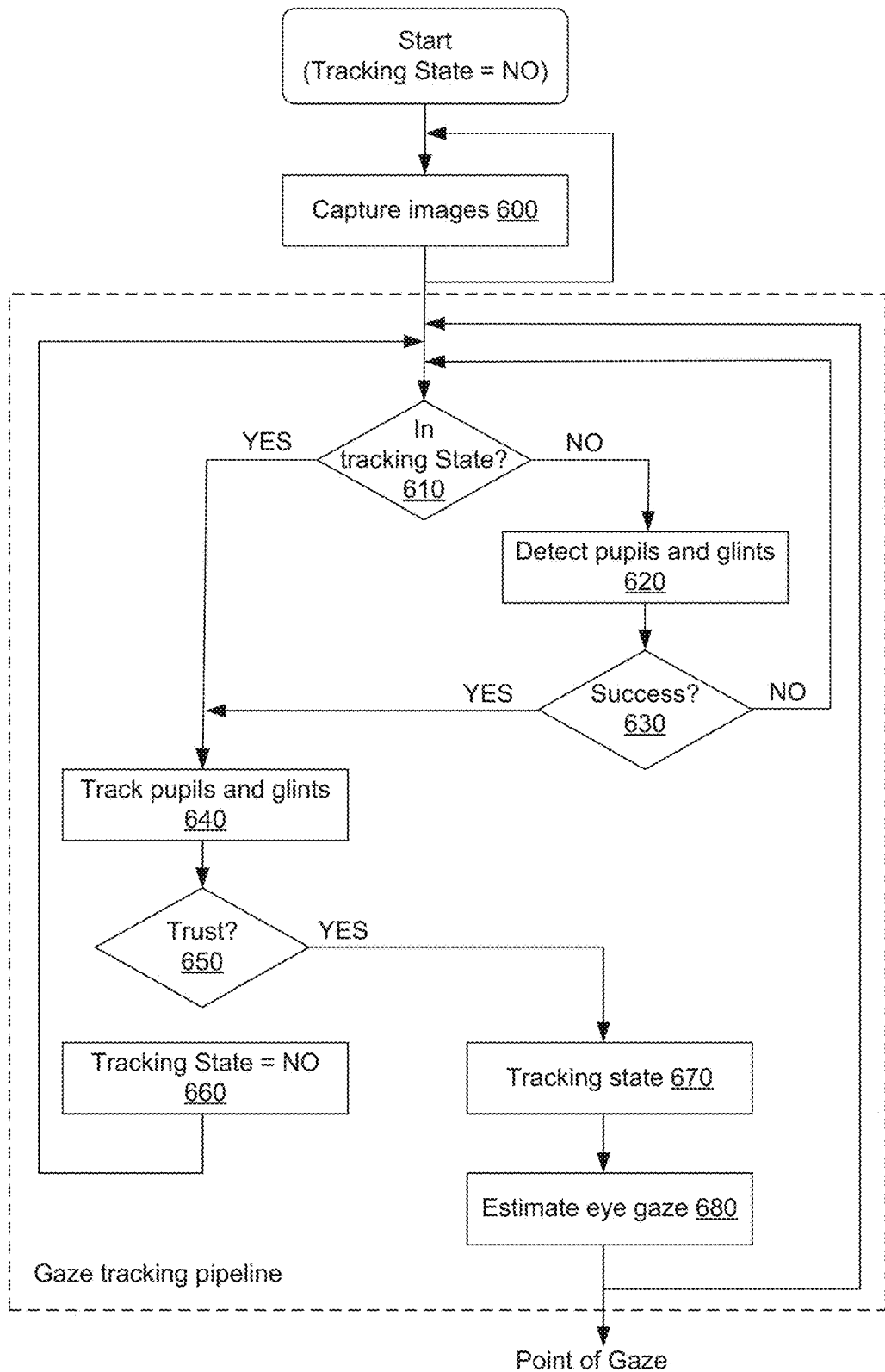
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Figure 6B:
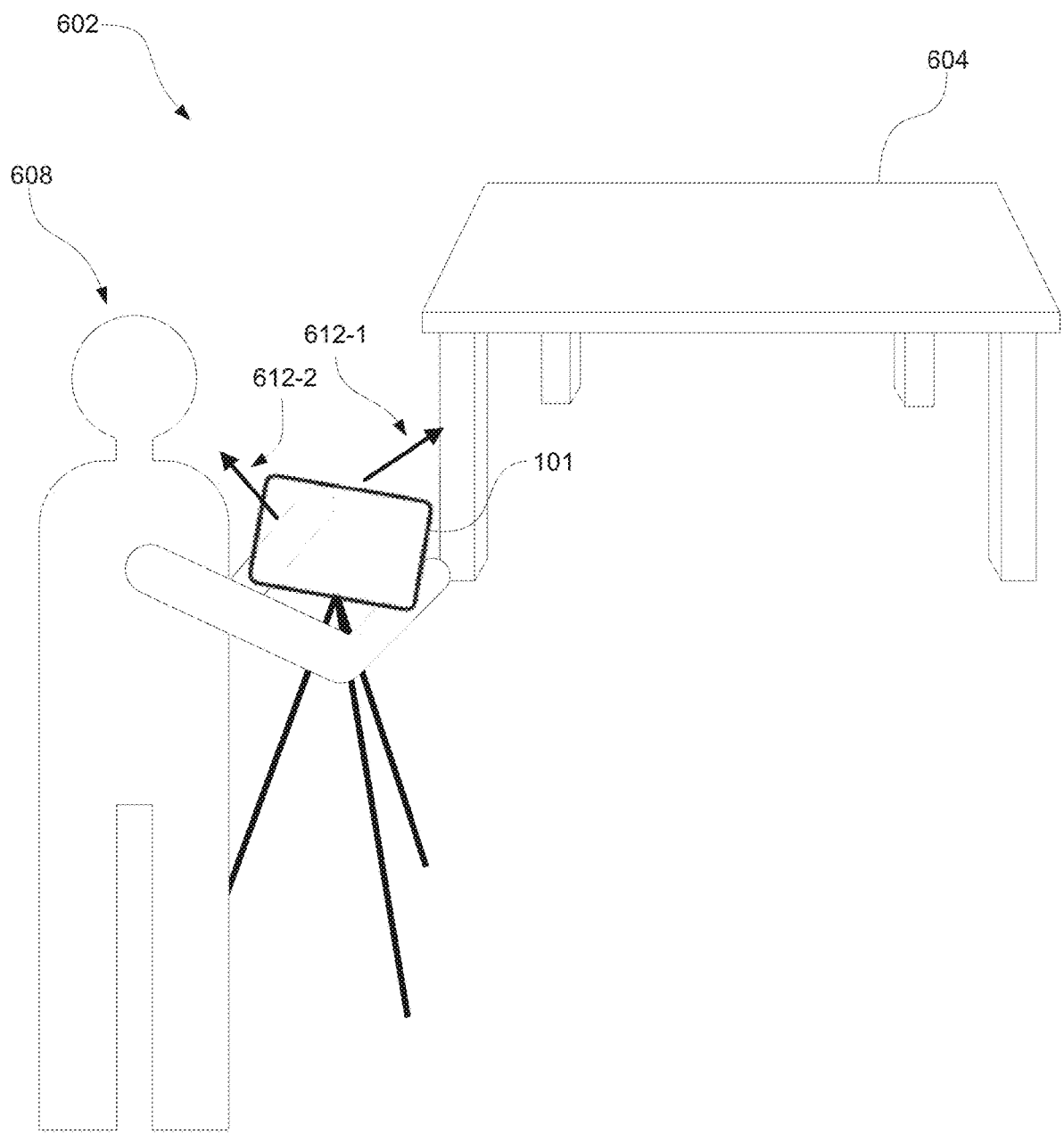
FIG. 6B illustrates an exemplary environment of an electronic device providing a CGR experience in accordance with some embodiments.

FIG. 6B illustrates an exemplary environment of an electronic device 101 providing a CGR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a CGR experience to the user, for example, a mixed reality environment in which one or more virtual objects are superimposed over representations of real world environment 602.

Thus, the description herein describes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of displaying a virtual environment in accordance with some embodiments.

Figure 7A:
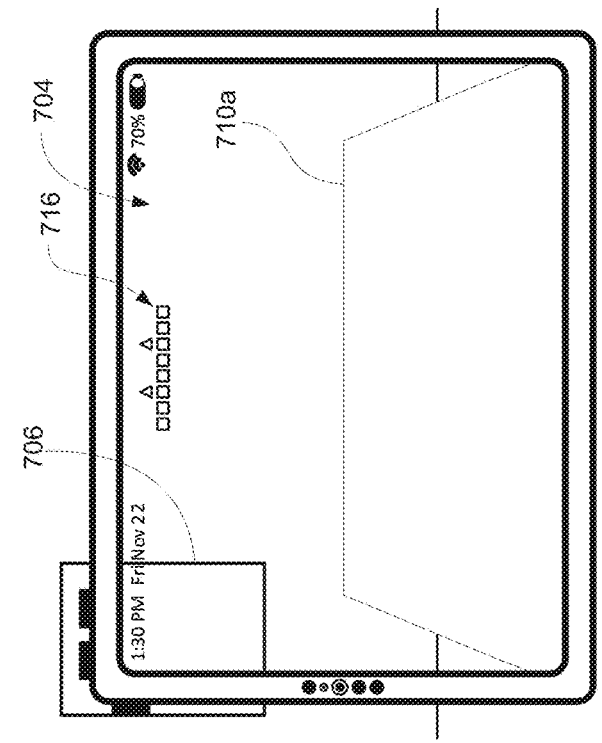
Figure 7A:
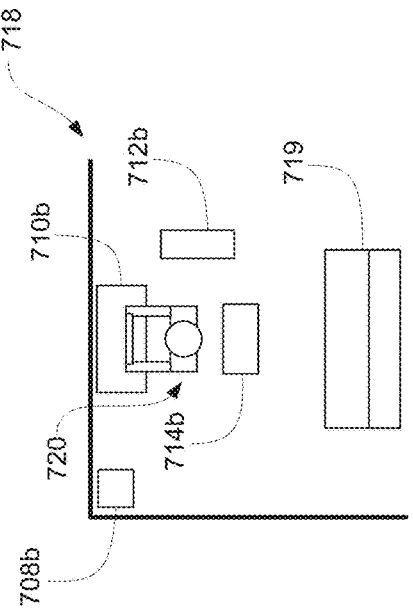

FIG. 7A illustrates an electronic device 101 displaying, via a display generation component (e.g., display generation component 120 of FIG. 1), a three-dimensional environment 704 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user). The figures herein illustrate a three-dimensional environment that is presented to the user by device 101 (e.g., and displayed by the display generation component of device 101) and an overhead view of the physical and/or three-dimensional environment associated with device 101 (e.g., such as overhead view 718 in FIG. 7A) to illustrate the relative location of objects in the real world environment and the location of virtual objects in the three-dimensional environment.

As shown in FIG. 7A, device 101 captures one or more images of the real world environment 702 around device 101 (e.g., operating environment 100), including one or more objects in the real world environment 702 around device 101. In some embodiments, device 101 displays representations of the real world environment in three-dimensional environment 704. For example, three-dimensional environment 704 includes a back corner of a room, a representation of corner table 708a, a representation of desk 710a, a representation of picture frame 706 on the back wall of the room, a representation of coffee table 714a, and a representation of side table 712a. Thus, three-dimensional environment 704 optionally recreates portions of real world environment 702 such that three-dimensional environment 704 appears to the user as if the user is physically located in real world environment 702 (e.g., optionally from the perspective of the user's current location in real world environment 702 and facing the direction that the user is currently facing).

As shown in overhead view 718 of real world environment 702 in FIG. 7A, corner table 708a, desk 710b, side table 712b and coffee table 714b are real objects in real world environment 702 which have been captured by the one or more sensors of device 101, representations of which are included in three-dimensional environment 704 (e.g., photorealistic representation, simplified representation, cartoon, caricature, etc.). In some embodiments, real world environment 702 also includes a picture frame (e.g., represented in three-dimensional environment 704 by representation 706) and couch 719.

As shown in FIG. 7A, user 720 of device 101 is seated on couch 719 and is holding device 101 (e.g., or wearing device 101 if, for example, device 101 were a head-mounted device) in such a way that it is facing towards the other end of the room (e.g., that one or more sensors are facing towards the other end of the room), thus capturing corner table 708a, desk 710b, side table 712b and coffee table 714b, and displaying representations of the objects in three-dimensional environment 704. In some embodiments, device 101 is able to determine the geometry of at least a portion of real world environment 702 (e.g., the portion of real world environment 702 that device 101 is facing, all portions of real world environment 702, etc.). In some embodiments, device 101 determines the geometry of real world environment 702 using one or more sensors, such as visible light sensors (e.g., cameras), depth sensors (e.g., time of flight sensor), or a combination of sensors (e.g., multiple of the same type of sensor, different types of sensors, etc.). In FIG. 7A, device 101 determines that because user 720 is seated on couch 719, there is a threshold amount of physical space in front of device 101. For example, the distance from user 720 (e.g., and thus the distance from device 101) to the far wall (e.g., against which desk 710b is placed) is more than a threshold distance (e.g., more than 3 feet, 6 feet, 10 feet, 30 feet, etc.). Thus, because three-dimensional environment 704 is at least a partial re-creation of real world environment 702 as discussed above, three-dimensional environment 704 optionally reflects the available space between user 720 and the far wall of real world environment 702 (e.g., the distance from the viewpoint of three-dimensional environment 704 (e.g., the "camera" position from where the user views three-dimensional environment 704) to the far wall in three-dimensional environment 704 is the same or a similar as the distance from user 720 to the far wall of real world environment 702), and three-dimensional environment 704 has at least the threshold amount of space (e.g., because real world environment 702 has at least the threshold amount of space in front of user 720). In some embodiments, because there is at least a threshold amount of depth in three-dimensional environment 704 in front of the perspective of the user, three-dimensional environment 704 qualifies for a far-field virtual environment transition animation, as will be described in further detail below with respect to FIGS. 7C-7H.

In FIG. 7A, device 101 is displaying immersion level indicator 716. In some embodiments, immersion level indicator 716 indicates the current level of immersion (e.g., out of a maximum number of levels of immersion) with which device 101 is displayed three-dimensional environment 704. In some embodiments, a level of immersion includes the amount that the view of the physical environment (e.g., the view of objects in real world environment 702) is obscured by a virtual environment (e.g., a simulated environment that is optionally different than real world environment 702 around the user) or the amount that the objects of the physical environment are modified to achieve a certain spatial effect (e.g., as will be described in further detail below with respect to method 1000). For example, a maximum level of immersion (e.g., full immersion) optionally refers to a state in which none of the physical environment is viewable in three-dimensional environment 704 via display generation component 120, and the entirety of the three-dimensional environment 704 is encompassed by a virtual environment. In some embodiments, an intermediate level of immersion (e.g., an immersion level less than maximum and more than no immersion) refers to a state in which some of real world environment 702 is viewable in three-dimensional environment 704 via display generation component 120, and the portions of real world environment 702 that otherwise would have been viewable (e.g., if not for the immersion) have been replaced with the virtual environment. In some embodiments, immersion level indicator 716 optionally includes a plurality of elements associated with the plurality of immersion levels. In some embodiments, the plurality of immersion levels are categorized into minor immersion levels and major immersion levels, and immersion level indicator 716 optionally includes minor tick marks (e.g., indicated by the squares) and major tick marks (e.g., indicated by the squares displayed with triangles). In some embodiments, as the immersion level increases, device 101 presents more elements of the virtual environment. In some embodiments, minor tick marks refer to immersive states in which minor elements are introduced or previously introduced elements increased in magnitude (e.g., increasing volume of sound, increasing size of the virtual environment, etc.), and major tick marks refer to immersive states in which major elements are introduced (e.g., new visual elements, new audio elements, etc.), optionally in addition to increasing the magnitude of previously introduced elements.

In FIG. 7A, immersion level indicator 716 indicates that the current level of immersion is no immersion (indicated by the fact that none of the squares and/or triangles are filled) and thus, no virtual environment is displayed in three-dimensional environment 704. In some embodiments, immersion level indicator 716 is displayed when the current level of immersion is more than no level of immersion and/or for a threshold amount of time after the immersion level changes (e.g., for 5 seconds, 10 seconds, 30 seconds, 1 minute, etc.) and/or for a threshold amount of time after the immersion level is decreased to zero (e.g., for 5 seconds, 10 seconds, 30 seconds, 1 minute, etc.).

Figure 7B:
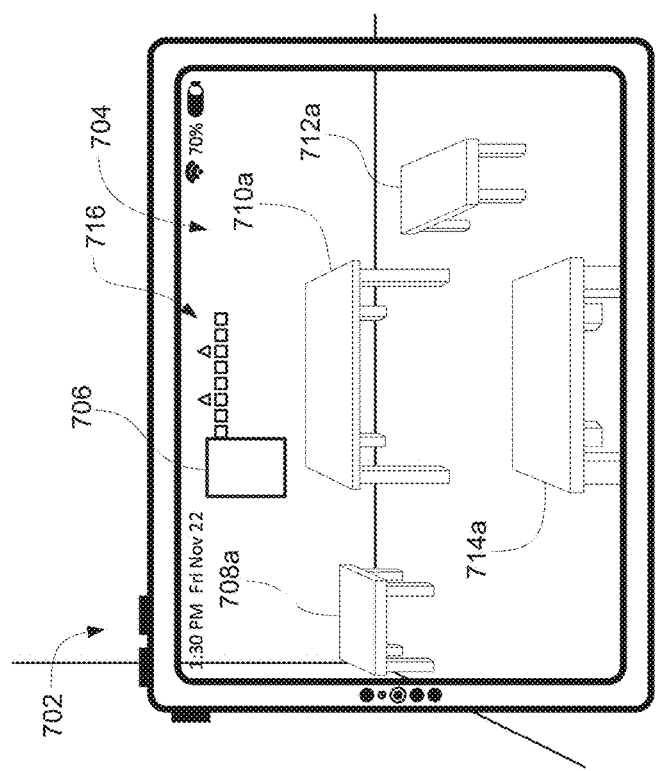
Figure 7B:
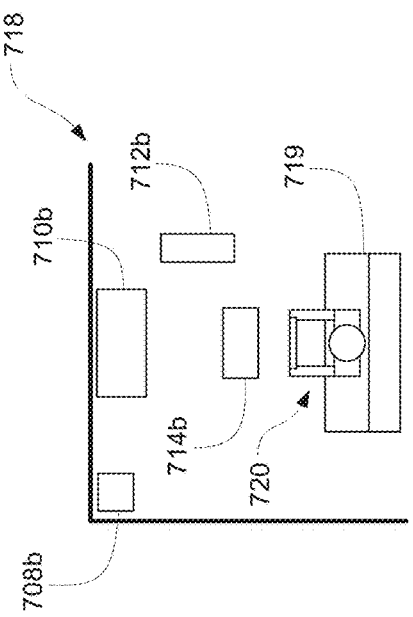
Figure 8A:
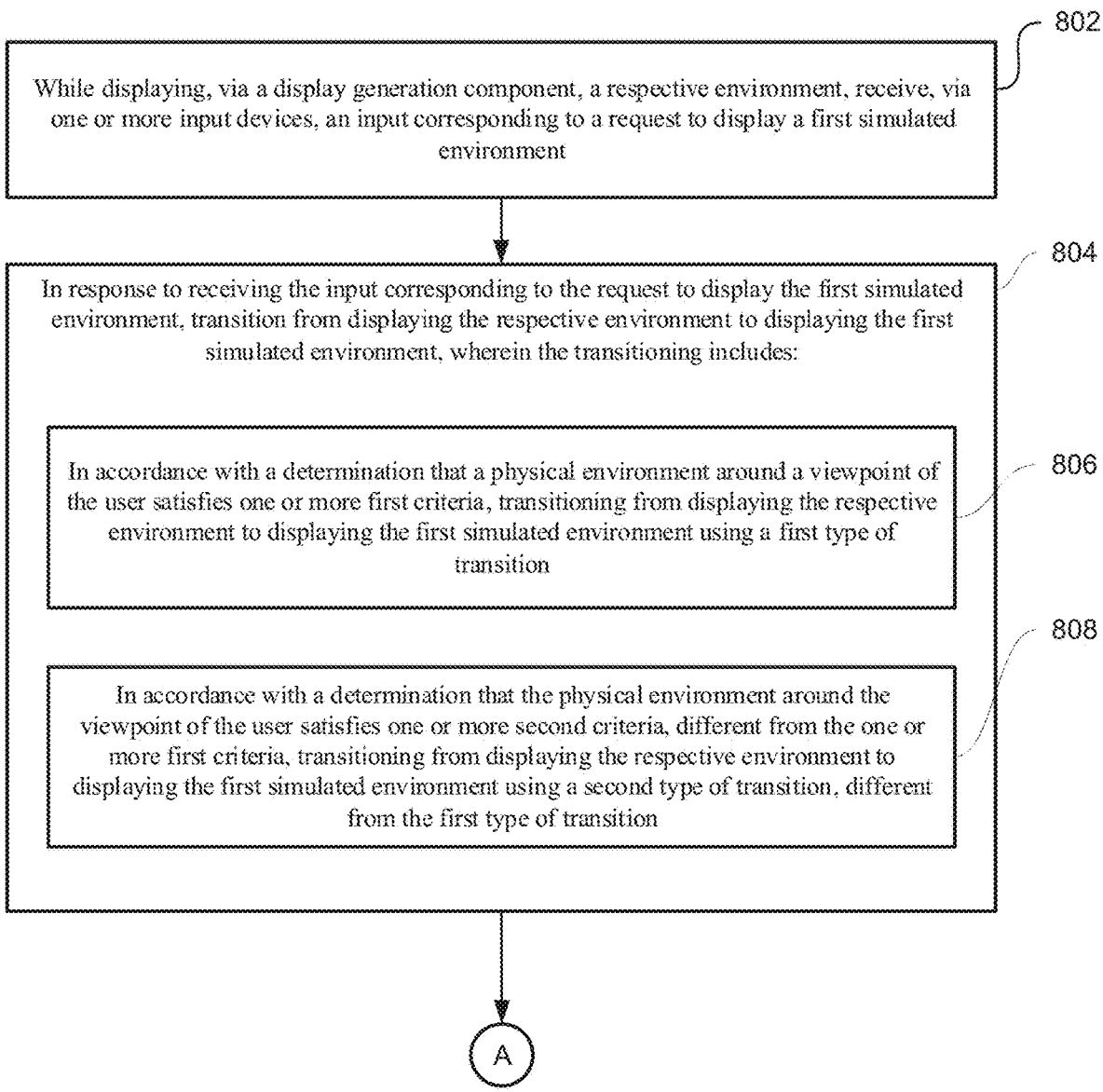
Figure 8B:
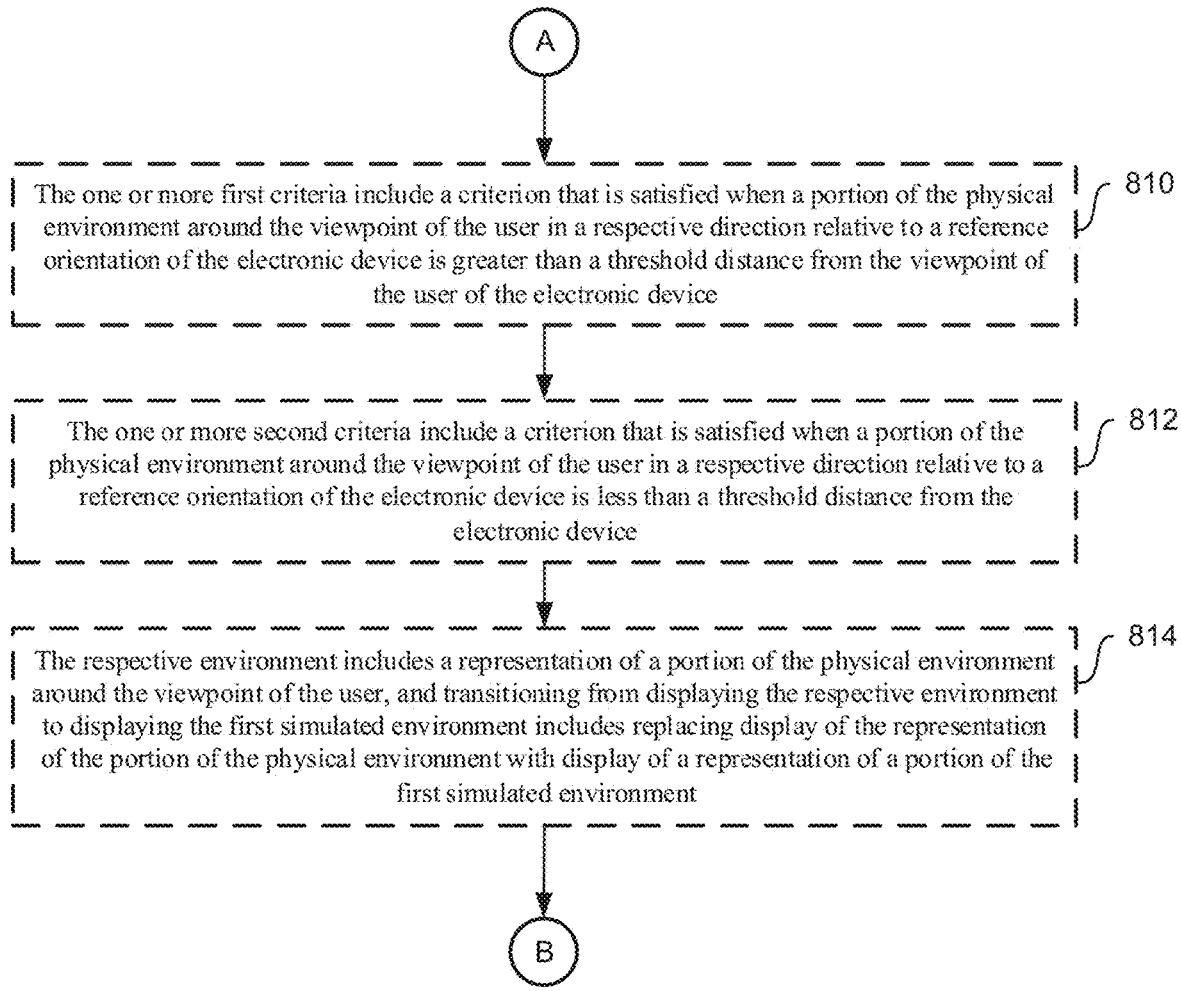
Figure 8C:
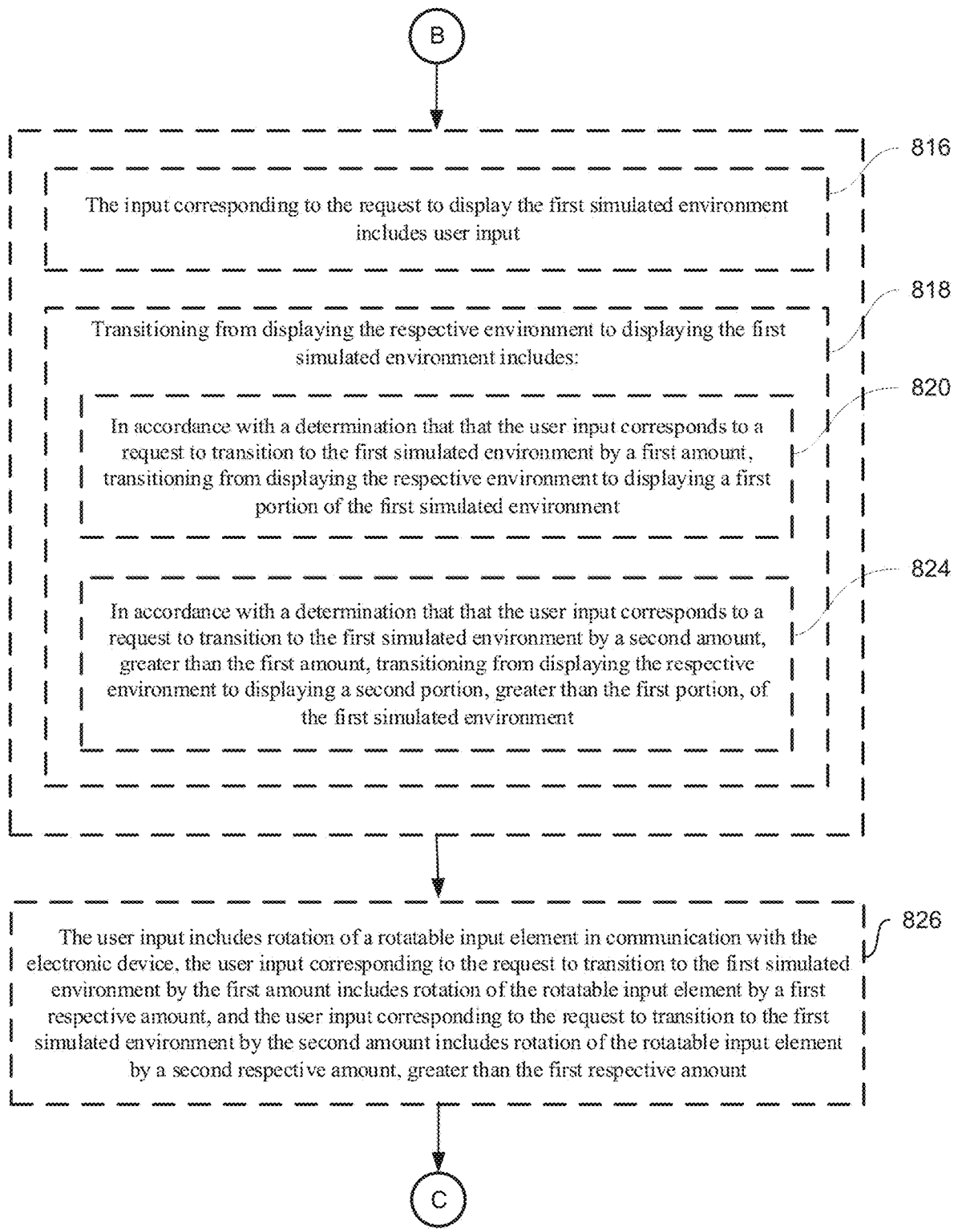
Figure 8E:
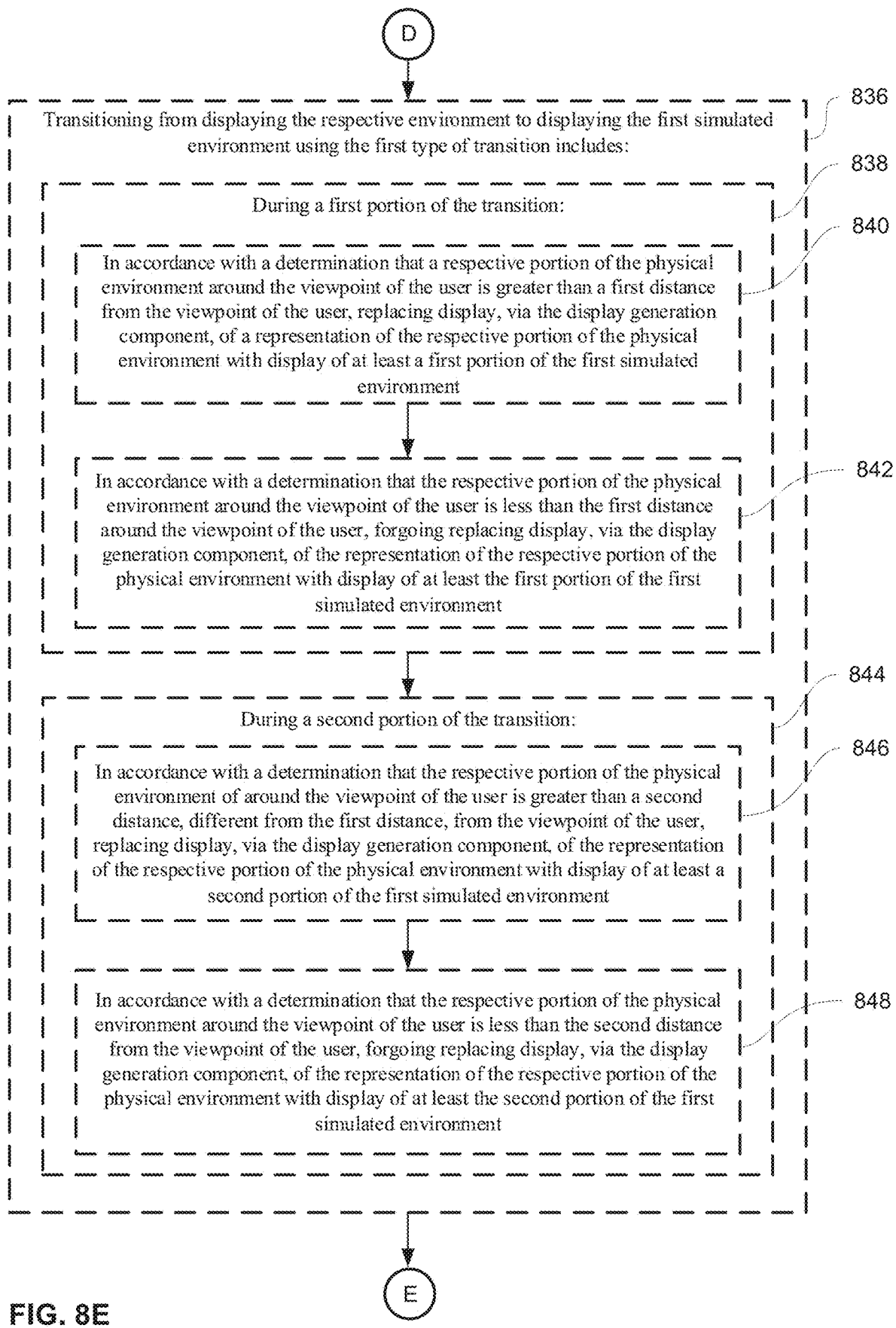
Figure 8F:
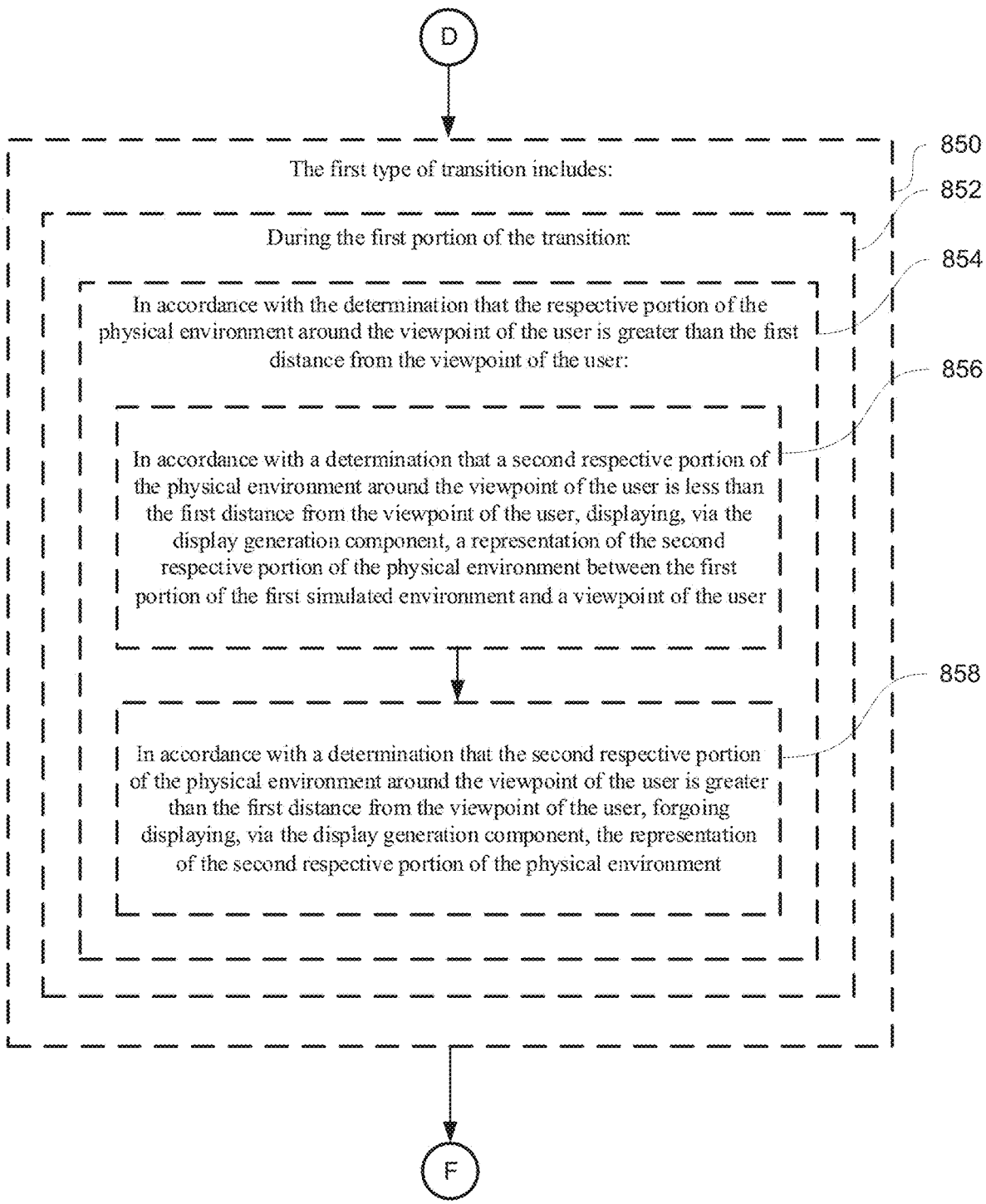
Figure 8G:
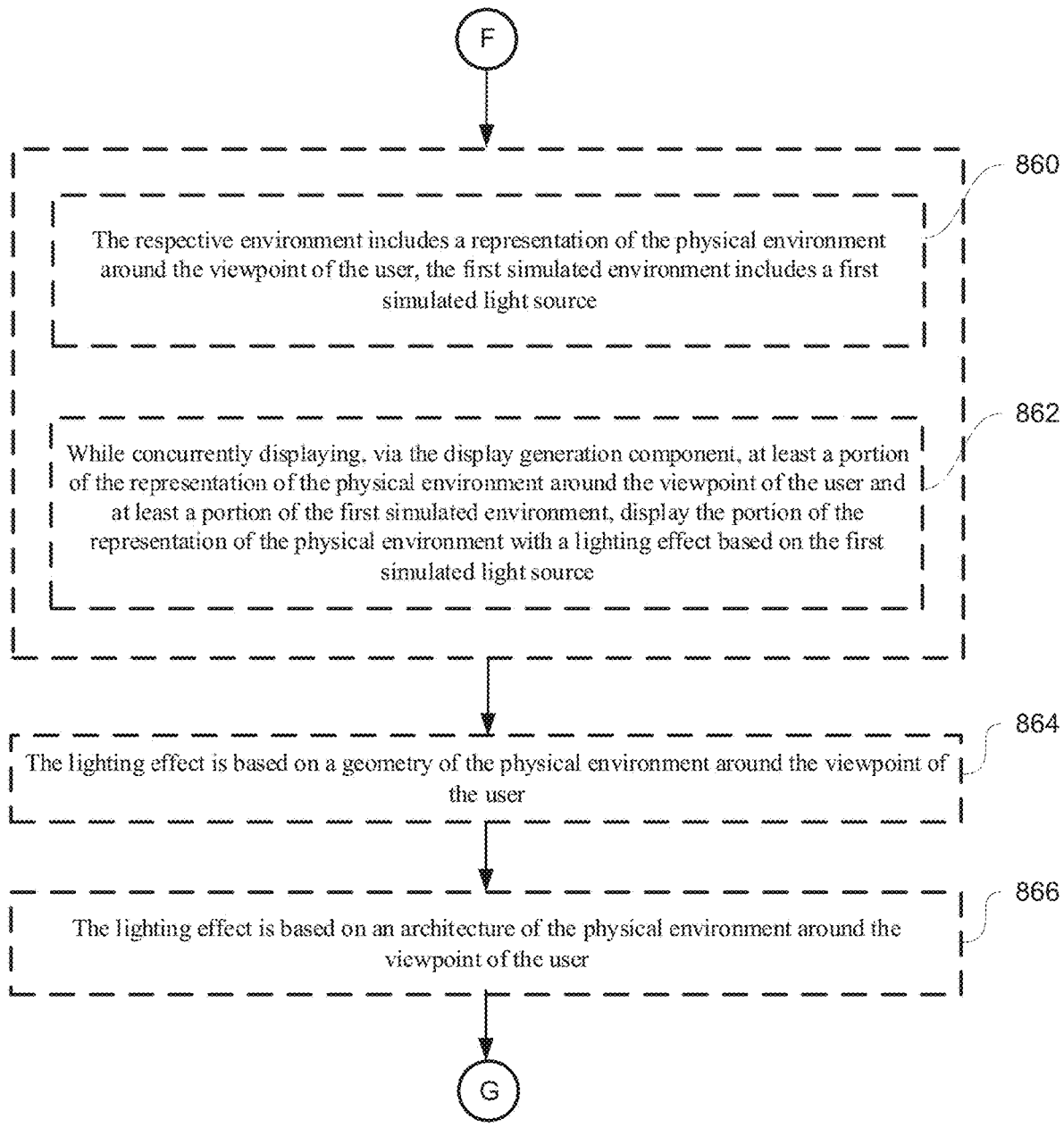
Figure 8H:
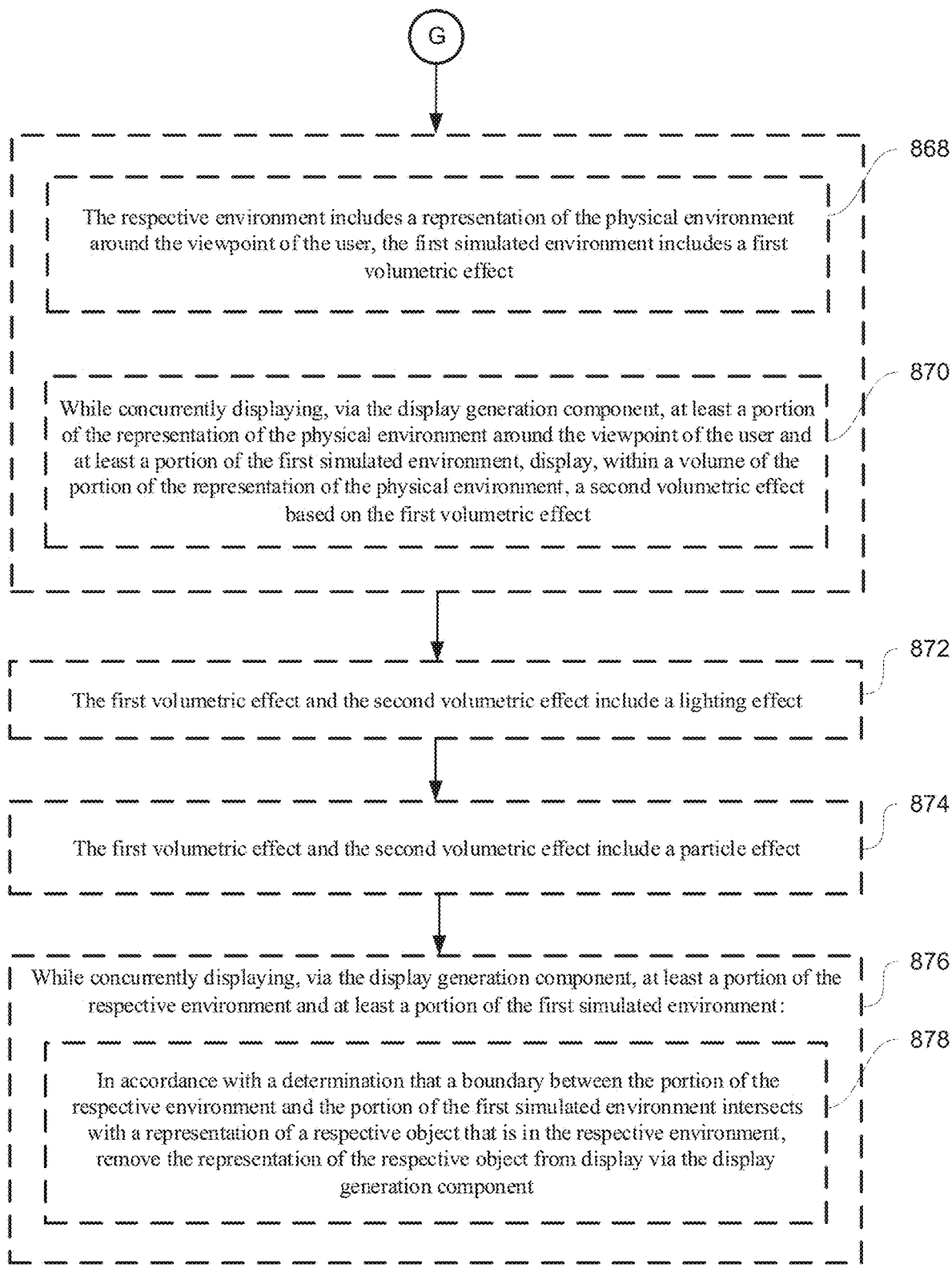

FIG. 7B illustrates an embodiment similar to FIG. 7A except that user 720 is seated at desk 710b, as shown in overhead view 718 of real world environment 702. In some embodiments, because device 101 is located at desk 710b and capturing a view of real world environment 702 from desk 710b to the back wall, three-dimensional environment 704 is a view of the limited space from user 720 to the back wall, which includes a representation of the far wall close to the user, representation 706 of the picture frame on the back wall, and a portion of representation 710a of desk 710b. In FIG. 7B, device 101 determines that because user 720 is seated close to the back wall of the room, there is not a threshold amount of physical space in front of device 101 in the room. In some embodiments, this determination by device 101 is based on one or more of a distance from device 101 to the back wall of the room, an area between device 101 and the back wall of the room, or a volume between device 101 and the back wall of the room. In some embodiments, this determination by device 101 is additionally or alternatively based on an average of a distance/area/volume, or the distance/area/volume of the closest point, or the distance/area/volume of the furthest point within a predefined region relative to a point of view of the user in the three-dimensional environment 704.

For example, the distance from user 720 (e.g., and thus the distance of device 101) to the back wall is less than the previously-described threshold distance. Thus, because three-dimensional environment 704 is at least a partial re-creation of real world environment 702 as discussed above, three-dimensional environment 704 optionally reflects the available space between user 720 and the far wall of real world environment 702 (e.g., the distance from the viewpoint of three-dimensional environment 704 to the far wall in three-dimensional environment 704 is the same or a similar as the distance from user 720 to the far wall of real world environment 702), and three-dimensional environment 704 does not have at least the threshold amount of space (e.g., because real world environment 702 does not have at least the threshold amount of space in front of user 720). In some embodiments, because there is not at least a threshold amount of depth in three-dimensional environment 704 in front of the perspective of the user, three-dimensional environment 704 does not qualify for a far-field virtual environment transition animation and, instead, will perform a near-field virtual environment transition animation, as will be described in further detail below with respect to FIGS. 7C-7H.

In some embodiments, performing a far-field transition animation when the real word environment 702 has at least a threshold amount of space, but performing a near-field transition animation when real-world environment 702 does not have at least the threshold amount of space provides an optimized experience that reduces the risk of motion sickness or vertigo. For example, if the user is sitting at a location with a lot of space in front of the user, converting the space into a virtual environment, which potentially has an infinite horizon, has a low risk of visual dissonance and motion sickness, but if the user is sitting at a location with very little space in front of the user, converting that space into a virtual environment with a potentially infinite horizon has a higher risk of visual dissonance and motion sickness. Thus, by performing a far-field animation when the risk of motion sickness is low provides the user with a pleasing experience, but performing a near-field animation when the risk of motion sickness is high allows the user to view the virtual environment, but slowly introduces the environment to the user to reduce the chance of motion sickness.

FIGS. 7C and 7D illustrate a snapshot of the far-field transition animation and near-field transition animation, respectively, for displaying a virtual environment in three-dimensional environment 704. In some embodiments, a virtual environment is a simulated three-dimensional environment that can be displayed in three-dimensional environment 704, optionally instead of the representations of the physical environment (e.g., full immersion) or optionally concurrently with the representation of the physical environment (e.g., partial immersion). Some examples of a virtual environment include a lake environment, a mountain environment, a sunset scene, a sunrise scene, a nighttime environment, a grassland environment, a concert scene, etc. In some embodiments, a virtual environment is based on a real physical location, such as a museum, an aquarium, etc. In some embodiments, a virtual environment is an artist designed location. Thus, displaying a virtual environment in three-dimensional environment 704 provides the user with a virtual experience as if the user is physically located in the virtual environment.

In some embodiments, a virtual environment is displayed in three-dimensional environment 704 in response to a user input selecting an affordance associated with a respective virtual environment. For example, three-dimensional environment 704 includes one or more affordances of one or more virtual environments, from which the user is able to select a respective environment to display in three-dimensional environment 704. In some embodiments, as will be described in further detail below with respect to method 1000, in response to selecting an affordance for a respective environment, the respective environment is displayed at a predetermined immersion level by device 101, such as a partial immersion level or a full immersion level. In some embodiments, the virtual environment is displayed in three-dimensional environment 704 in response to a user input increasing the immersion level of three-dimensional environment 704. For example, device 101 optionally includes a mechanical dial that is able to be rotated in a respective direction to increase the immersion level, and in another direction to decrease the immersion level. The embodiments herein describe the process for displaying a virtual environment from a state in which the virtual environment is not displayed to an intermediate immersion level or a full immersion level and/or the process for changing the immersion level of the virtual environment from a no or partial immersion level (e.g., a level that is lower than full immersion) to a higher partial immersion level or to a full immersion level.

FIGS. 7C-7D illustrate a first snapshot of the process for displaying virtual environment 722 at a high partial immersion level (e.g., in which a large amount of three-dimensional environment 704 is replaced with virtual environment 722, such as in FIGS. 7G-7H), although it is understood that FIGS. 7C-7D optionally illustrate a snapshot of the process for displaying virtual environment 722 at a low partial immersion level (e.g., in which a small amount of three-dimensional environment 704 is replaced with virtual environment 722) and/or a full immersion level (e.g., in which all of three-dimensional environment 704 is replaced with virtual environment 722). In some embodiments, as described above, the process for displaying virtual environment 722 is triggered (e.g., initiated) in response to a user input causing virtual environment 722 to be displayed (e.g., virtual environment 722 was not displayed when the user input was received) or in response to a user input changing an immersion level of virtual environment 722 (e.g., virtual environment 722 was displayed when the user input was received).

FIG. 7C illustrates the first snapshot of the far-field process for displaying virtual environment 722 when the immersion level is at one (e.g., the level just above no immersion) as indicated by immersion level indicator 716 having the left-most square filled in and the other squares (and triangles) not filled. As discussed above, in FIG. 7C, the process for displaying virtual environment 722 includes a far-field transition, which includes replacing portions of the physical and/or three-dimensional environment 704 with portions of the virtual environment based on the distance of those portions of the physical and/or three-dimensional environment 704 from the viewpoint of the user. For example, the farthest position of three-dimensional environment 704 (e.g., the farthest position of real world environment 702 that is visible in three-dimensional environment 704) is replaced with the virtual environment, and expands toward the viewpoint of the user from that farthest position (e.g., as will be illustrated in FIG. 7E and FIG. 7G). In FIG. 7C, the left corner and right corner of three-dimensional environment 704 correspond to the farthest location from the viewpoint of user 720 and thus, the left corner of three-dimensional environment 704 is replaced with virtual environment 722-1a and the right corner of three-dimensional environment 704 is replaced with virtual environment 722-2a (e.g., as also illustrated by virtual environment 722-1b and virtual environment 722-2b in overhead view 718). In some embodiments, virtual environment 722-1a and virtual environment 722-2a are part of the same virtual environment, but correspond to the respective left and right sides of virtual environment 722 (e.g., different portions of virtual environment 722). For example, virtual environment 722 is at least partially superimposed on the three-dimensional environment 704 (e.g., optionally virtual environment 722 is able to cover all of three-dimensional environment 704), but when the immersion level is at zero (e.g., no immersion), the entirety of virtual environment 722 is hidden from view, but as the immersion level is increased, portions of virtual environment 722 are revealed (e.g., and replacing and/or obscuring view of respective portions of the physical environment). Thus, in FIG. 7C, the far-left portion of virtual environment 722 is revealed such that the user is able to see the far-left portion where the back-left corner was previously displayed and the far-right portion of virtual environment 722 is revealed such that the user is able to see the far-right portion of virtual environment 722 where the back-right corner was previously displayed.

In some embodiments, virtual environment 722 optionally has a dimension that is larger than the dimension of real world environment 702 (e.g., potentially an infinite depth, for example, if virtual environment 722 is a landscape that extends to the horizon) and thus replacing portions of three-dimensional environment 704 with virtual environment 722 causes the replaced portions to be displayed as if they have become visual portals into virtual environment 722. For example, overhead view 718 indicates that the back-left corner and the back-right corner of real world environment 702 no longer exists (e.g., are no longer displayed) in three-dimensional environment 704 (e.g., as indicated by the dotted lines), and in their place is a view into virtual environment 722, which optionally extends into the distance in accordance with the size, dimensions, and/or depth of virtual environment 722 (e.g., extending outwards from the back-left and back-right corners at a normal angle from the viewpoint of user 720). Thus, in FIG. 7C, three-dimensional environment 704 appears to the user as an environment that is partially the real world environment 702 and partially the virtual environment 722, as if parts of the user's real world environment 702 have been transformed into virtual environment 722 such that the user is able to walk into virtual environment 722 through the back-left and back-right corners of real world environment 702.

FIG. 7D illustrates the first snapshot of the near-field process for displaying virtual environment 722 when the immersion level is at one (e.g., the level just above no immersion) as indicated by immersion level indicator 716 having the left-most square filled in and the other squares (and triangles) not filled. As discussed above, in FIG. 7D, the process for displaying virtual environment 722 includes a near-field transition, which includes selecting a center (or other fixed) location that optionally corresponds to a surface in three-dimensional environment 704 that is the farthest from the user (e.g., in a direction of the orientation of the viewpoint of the user into the three-dimensional environment 704) and expanding radially outwards from the center location (e.g., increasing the radius of the portal into the virtual environment, optionally without regard to the location and/or distance of the objects in three-dimensional environment 704 relative to user 720, as will be described in more detail below with respect to FIG. 7F and FIG. 7H). It is understood that although FIG. 7D illustrates virtual environment 722a having a circular shape, other shapes are possible (e.g., oval shaped, cylindrical, square, rectangle, etc.). In FIG. 7D, the back wall of real world environment 702 is the farthest surface in three-dimensional environment 704 in the direction of the orientation of the viewpoint of the user into the three-dimensional environment 704, and thus, starting from a location in the middle of the back wall, device 101 replaces a circular area in the middle of the back wall with virtual environment 722a (e.g., as also illustrated by virtual environment 722b in overhead view 718). In some embodiments, the z-position (e.g., depth) of virtual environment 722a (e.g., the boundary between virtual environment 722a and the real world environment portion of three-dimensional environment 704) is not necessarily the back wall and optionally is a location closer to user 720 than the back wall. For example, in FIG. 7D, overhead view 718 illustrates that virtual environment 722b begins (e.g., the boundary between real world environment 702 and virtual environment 722b is) at a depth location in the center of table 710b. In FIG. 7D, because the height of virtual environment 722 is coincident with the middle of the surface of the back wall (e.g., the boundary of virtual environment 722 is directly in front of the back wall), virtual environment 722 may appear as if it begins at the surface of the back wall. In FIG. 7D, overhead view 718 indicates that the center of the back wall of real world environment 702 no longer exists (e.g., is no longer displayed) in three-dimensional environment 704 (e.g., as indicated by the dotted lines), and in its place is a view into virtual environment 722, which optionally extends into the distance in accordance with the size, dimensions, and/or depth of virtual environment 722 (e.g., extending outwards from the back wall at a normal angle from the viewpoint of user 720).

As discussed above with respect to FIG. 7C, virtual environment 722 is optionally superimposed over three-dimensional environment 704, but is hidden until the immersion level causes portions of virtual environment 722 to be revealed to the user (e.g., and thus replacing or obscuring respective portions of three-dimensional environment 704). Thus, in FIG. 7D, device 101 revealed the portion of virtual environment 722 that is superimposed over the center of the back wall (e.g., from a depth location in the center of table 710b and outwards based on the dimensions of virtual environment 722). Thus, in FIG. 7D, three-dimensional environment 704 appears to the user as an environment that is partially the real world environment 702 and partially the virtual environment 722, as if parts of the user's real world environment 702 have been transformed into virtual environment 722. Thus, the portion of virtual environment 722 that is visible in FIG. 7D during the first snapshot of the near-field transition is different than the portion of virtual environment 722 that is visible in FIG. 7C during the first snapshot of the far-field transition, even though both FIG. 7C and FIG. 7D illustrate the same immersion level in the transition to display the same virtual environment (e.g., virtual environment 722).

FIGS. 7E-7F illustrate a second snapshot of the process for displaying virtual environment 722 at a high level of immersion (e.g., a continuation of the process described in FIGS. 7C-7D, respectively, and that concludes at an immersion level such as described in FIGS. 7G-7H, respectively). As illustrated by immersion level indicator 716, the second snapshot corresponds to an immersion level of three, thus further increasing the amount of three-dimensional environment 704 that has been replaced by virtual environment 722a, thus increasing the size of virtual environment 722a (e.g., increasing the size of the visual "portal" into virtual environment 722a).

For example, in FIG. 7E (e.g., which is a snapshot of a far-field transition animation), virtual environment 722a has expanded (e.g., replaced more of the real world environment portion of three-dimensional environment 704) towards the user in response to the increase in immersion level (e.g., based on the distance of those portions of the physical and/or three-dimensional environment 704 from the viewpoint of the user). In some embodiments, expanding virtual environment 722a includes expanding and/or moving the boundary between virtual environment 722a and the real world environment portion of three-dimensional environment 704 towards the user (e.g., also as shown in overhead view 718). In some embodiments, the boundary of virtual environment 722a remains equidistant from user 720 and thus appears to move towards the user in a circular and/or spherical fashion (e.g., when considered in three-dimensions). In some embodiments, other shapes for the expansion of the boundary of virtual environment 722a are possible. For example, virtual environment 722a expands as a plane towards the user (e.g., a planar boundary that is parallel to the user that moves towards the user as virtual environment 722a expands). In some embodiments, as virtual environment 722a expands, portions of the real world environment portion of three-dimensional environment 704 are no longer displayed and are replaced by portions of virtual environment 722a that were previously not displayed. For example, in FIG. 7E, the far wall, corner table 708a, and a portion of desk 710a (e.g., the farther portion) are no longer visible due to being farther than the boundary of virtual environment 722a from user 720. In some embodiments, objects in the real world environment portion of three-dimensional environment that are farther than the boundary of virtual environment 722a (e.g., farther from the viewpoint of the user) are no longer displayed and objects in the real world environment portion of three-dimensional environment that are closer than the boundary of virtual environment 722a (e.g., closer to the viewpoint of the user) continue to be displayed. In some embodiments, if an object is closer than the boundary of virtual environment 722a but have a height such that it would otherwise obscure portions of virtual environment 722a (e.g., such as desk 710a in FIG. 7E), then the object is optionally removed from three-dimensional environment 704. For example, the back-right corner of side table 712a obscures a portion of virtual environment 722a in FIG. 7E and optionally is removed from three-dimensional environment 704 (e.g., no longer displayed). In some embodiments, an object that is closer than the boundary of virtual environment 722a, but otherwise obscures portions of virtual environment 722a continue to be displayed (e.g., such as side table 712a in FIG. 7E). In some embodiments, if an object straddles the boundary of virtual environment 722a (e.g., portions of the object are closer than the boundary and portions are farther than the boundary, such as desk 710a in FIG. 7E), then the object optionally is removed from display (e.g., removed from three-dimensional environment 704 such that it is no longer visible). In some embodiments, if an object straddles the boundary, then the portion of the object that is closer than the boundary continues to be displayed while the portion of the object that is farther from the boundary is no longer displayed (e.g., such as desk 710a in FIG. 7E). In some embodiments, if an object straddles the boundary, then the entirety of the object continues to be displayed such that a portion of the object exists in the real world portion of three-dimensional environment 704 and a portion of the object exists in the simulated environment portion of three-dimensional environment 704 (e.g., as if that part of the object is a part of the simulated environment, optionally visually de-emphasized, such as greyed out, darkened, made partially transparent, displayed as an outline, etc.). Thus, in some embodiments, the entirety of desk 710a is no longer displayed (e.g., removed from display) because at least a portion of desk 710a is farther than the boundary of virtual environment 722a. Alternatively, in some embodiments, the entirety of desk 710a continues to be displayed even though a portion of desk 710a is farther than the boundary of virtual environment 722a (e.g., such that desk 710a would appear to be partially in virtual environment 722a and partially in the real world environment portion of three-dimensional environment 704).

In some embodiments, expanding virtual environment 722a includes causing more of virtual environment 722a to be visible. For example, if the boundary of virtual environment 722a is ten feet away from the user, the user is able to see the portion of virtual environment 722a that is ten feet away and onwards, but if the boundary of virtual environment 722a expands to be five feet away from the user, the user is able to see the portion of virtual environment 722a that is five feet away and onwards, which includes the portion of virtual environment 722a that is ten feet away and onwards (e.g., the portion that was shown when the boundary was ten feet away) and an additional five feet of space that was previously not visible. Thus, as virtual environment 722a expands, more and more of the virtual environment is made visible to the user. For example, in FIG. 7E, the area between the two corners of the room (e.g., the area between 722-1a and 722-2a in FIG. 7C that previously included representations of the physical environment) is now occupied by virtual environment 722a. In some embodiments, expanding virtual environment 722a does not include moving virtual environment 722a closer to the user. For example, an object in virtual environment 722a that was previously 20 feet away from the user is optionally not moved closer to the user as the boundary of virtual environment 722a moves towards the user, but rather remains 20 feet away. Instead, for example, an object in virtual environment 722a that is 10 feet away and was not previously revealed to the user (e.g., due to the boundary being farther than 10 feet away) is now optionally revealed to the user (e.g., due to the boundary moving closer than 10 feet away). Thus, expanding virtual environment 722a appears as if the visual portal into virtual environment 722a expands and/or moves closer to the user, without features of (e.g., objects in) virtual environment 722a moving closer to the user.

In FIG. 7F (e.g., which is a snapshot of a near-field transition animation), virtual environment 722a has expanded (e.g., replaced more of the real world environment portion of three-dimensional environment 704) radially outwards from the center position (e.g., the position illustrated above in FIG. 7D), optionally without regard to the location and/or distance of the objects in three-dimensional environment 704 relative to user 720. In some embodiments, expanding virtual environment 722a radially outwards includes widening the size/portal of virtual environment 722a, optionally without moving the boundary of virtual environment 722a closer to the user. For example, in FIG. 7F, virtual environment 722b has a radial size of 30 degrees (e.g., the angle formed by the left and right boundaries of virtual environment 722b is 30 degrees and optionally the angle formed by the bottom and top boundaries of virtual environment 722b is 30 degrees), which is an increase in radial size as compared to FIG. 7D. In some embodiments, the boundary of virtual environment 722a expands in a circular manner (or spherical manner, when considered in three-dimensions) and curves around user 720, as illustrated by virtual environment 722b in overhead view 718. In some embodiments, the boundary of virtual environment 722a expands outwards and optionally remains equidistant from user 720 along the expanded boundary (e.g., as if the boundary of virtual environment 722a expands along the surface of a circle/sphere with user 720 at its center point). Thus, as shown in FIG. 7F, virtual environment 722a is a circular visual portal that not only increases in radius (e.g., expanding in the left-right, and the up-down directions, parallel to the plane of the back wall), but also curves around the user (e.g., changing depth, away from the plane of the back wall). As discussed above, expanding virtual environment 722a causes more of virtual environment 722a to be visible and replaces portions of the real world environment. In FIG. 7F, a larger area of the back wall is no longer visible and a portion of desk 710a is no longer visible, having been replaced with portions of virtual environment 722a that were not previously displayed (e.g., as compared to FIG. 7D). In some embodiments, the curvature of virtual environment 722a around the user (e.g., in the z dimension) for the near-field transition animation (e.g., FIGS. 7D, 7F, and 7H) is the same or similar to the curvature of virtual environment 722a (e.g., in the z dimension) for the far-field transition animation (e.g., FIGS. 7C, 7E, and 7G) (e.g., same radius, same shape, etc.).

FIGS. 7G-7H illustrate a third snapshot of the process for displaying virtual environment 722 at a high level of immersion (e.g., optionally the final state, the steady state, the state of three-dimensional environment 704 at the conclusion of the process for displaying virtual environment 722 that includes the first and second snapshot described above with respect to FIGS. 7C-7D, respectively, and FIGS. 7E-7F, respectively). As illustrated by immersion level indicator 716, the third snapshot corresponds to an immersion level of six, thus further increasing the amount of three-dimensional environment 704 that has been replaced by virtual environment 722 a, and thus increasing the size of virtual environment 722 a (e.g., increasing the size of the visual "portal" into virtual environment 722 a).

As shown in FIG. 7G, which illustrates the far-field transition animation, virtual environment 722a further expanded such that the boundary of virtual environment 722a has moved closer to user 720 (e.g., while optionally remaining equidistant to user 720 along the boundary of virtual environment 722a). For example, the portion of three-dimensional environment between representation 714a of coffee table 714b and representation 710a of the desk that was previously not occupied by virtual environment 722a is now occupied by virtual environment 722a. As discussed above, expanding the boundary of virtual environment 722a towards the user does not involve moving the objects in virtual environment 722a, but rather revealing portions of virtual environment 722a that are located closer to the viewpoint of the user but were previously hidden (e.g., unmasking portions of virtual environment 722a). In some embodiments, because virtual environment 722a encompasses more of three-dimensional environment 704, more representations of physical objects fall beyond the boundary of virtual environment 722a and are ceased to be displayed. For example, in FIG. 7G, representation 710a of desk 710b and representation 712a of side table 712b are no longer displayed, while representation 714a of coffee table 714b is still displayed because it is not located farther than the boundary of virtual environment 722a. Thus, the physical environment is no longer visible beyond the boundary of virtual environment 722a (e.g., where only virtual environment 722a exists), but the physical environment that is closer to the user than the boundary of virtual environment 722a remains visible.

In FIG. 7H, which illustrates the near-field transition animation, virtual environment 722a further expanded radially outwards as compared to virtual environment 722a in FIG. 7F. For example, in FIG. 7H, virtual environment 722b has a radial size of 180 degrees (e.g., the left and right boundaries of virtual environment 722a extend directly to the left and directly to the right of user 720 and optionally the top and bottom boundaries of virtual environment 722a extend directly above and below user 720), which is an increase in radial size as compared to FIG. 7F, thus causing more of desk 710a that was previously not occupied by virtual environment 722a is now occupied by virtual environment 722a. As discussed above, virtual environment 722a optionally expands radially as if along the surface of a sphere that surrounds user 720. Thus, as virtual environment 722a expands, virtual environment 722a appears as an expanding circle (e.g., in the x-y dimensions), but also wraps around the user (e.g., in the z dimension), as illustrated in overhead view 718. In some embodiments, virtual environment 722a does not expand closer to user 720 and thus, a portion of desk 710b is still viewable at the bottom of three-dimensional environment 704. As discussed above, the shape of the boundary of virtual environment 722a is optionally the same in FIG. 7H (e.g., the near-field transition animation) as FIG. 7G (e.g., the far-field transition animation).

In some embodiments, FIG. 7G and FIG. 7H illustrate the final state of the animation to display virtual environment 722a and/or the display of virtual environment 722a at a relatively high level of immersion (e.g., maximum immersion, or immersion greater than a middle level of immersion), and the amount of three-dimensional environment 704 that is consumed by virtual environment 722a is the same, regardless of whether the animation was a far-field or near-field transition animation. The size and shape of virtual environment 722a in FIG. 7G (e.g., the far-field transition animation) is optionally the same as the size and shape virtual environment 722a in FIG. 7H (e.g., the near-field transition animation). For example, the boundary of virtual environment 722a is the same shape between FIG. 7G and FIG. 7H and is optionally the same distance from the viewpoint of the user between FIG. 7G and FIG. 7H. In some embodiments, the user's view of virtual environment 722a in FIG. 7G and FIG. 7H is the same (e.g., a respective object in virtual environment 722a is the same distance and at the same location relative to the user in FIG. 7G and FIG. 7H).

Thus, in some embodiments, at some immersion level(s) (e.g., maximum immersion, a high immersion level, etc.), the virtual environment appears the same to the user (e.g., same size, same shape, same amount of the three-dimensional environment is occupied by the virtual environment, same portions of the virtual environment, etc.), regardless of the amount of space in front of the user in the physical environment of the user. In some embodiments, at certain immersion levels (e.g., intermediate immersion levels, low immersion levels, etc.), the virtual environment will appear different based on whether there is enough space in front of the user or not enough space in front of the user to utilize the far-field transition animation. For example, in the embodiment illustrated in FIGS. 7G-7H, at immersion levels higher than six, the size and/or shape of the portals into virtual environment 722a is the same or similar between far-field and near-field transitions, but at immersion levels lower than six (e.g., as described with reference to FIGS. 7C-7F), the size and/or shape of the portals into virtual environment 722a is different between far-field and near-field transitions.

FIGS. 8A-8H is a flowchart illustrating a method 800 of displaying a virtual environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In the method 800, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) while displaying, via the display generation component, a respective environment (e.g., a representation of a physical environment, a simulated environment, a computer-generated reality, an extended reality, etc.), receives (802), via the one or more input devices, an input corresponding to a request to display a first simulated environment, such as a selection of an affordance or representation of a simulated environment while displaying three-dimensional environment 704 such as in either FIGS. 7A-7B (e.g., detecting, via a hand tracking device, an eye tracking device, or any other input device, a movement of one or more hands of the user, a movement of one or more eyes of the user, and/or any other input corresponding to a request to display a first simulated environment).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the respective environment is an augmented reality environment or a mixed reality environment that optionally includes virtual objects and/or optionally includes representations of real world objects in the physical world around the electronic device. In some embodiments, the respective environment is based at least on the physical environment around the electronic device. For example, the electronic device is able to capture visual information about the environment around the user (e.g., the objects in the environment, the size and shape of the environment, etc.) and display at least a portion of the physical environment around the user to the user, optionally such that it appears as if the user is still located in the physical environment. In some embodiments, the respective environment (e.g., a physical environment around the electronic device, a portion of the physical environment around the electronic device, etc.) is actively displayed to the user via the display generation component. In some embodiments, the respective environment (e.g., a physical environment around the electronic device, a portion of the physical environment around the electronic device, etc.) is passively presented to the user via a partially transparent or translucent display through which the user is able to see at least a portion of the physical environment.

In some embodiments, the request to display a first simulated environment includes a manipulation of a rotational element, such as a mechanical dial or a virtual dial, of or in communication with the electronic device. In some embodiments, the request includes a selection of a displayed affordance and/or a manipulation of a displayed control element to increase the immersion level of the device and/or respective environment. In some embodiments, the request includes a predetermined gesture recognized as a request to increase the immersion level of the device and/or respective environment. In some embodiments, the request includes a voice input requesting an increase in the immersion level of the device and/or respective environment and/or requesting the display of the first simulated environment. In some embodiments, the first simulated environment includes a scene that at least partially veils at least a part of the respective environment such that it appears as if the user were located in the scene (e.g., and optionally no longer located in the first simulated environment). In some embodiments, the first simulated environment is an atmospheric transformation that modifies one or more visual characteristics of the respective environment such that it appears as if the respective environment is located at a different time, place, and/or condition (e.g., morning lighting instead of afternoon lighting, sunny instead of overcast, etc.). In some embodiments, a level of immersion includes an associated degree to which the content displayed by the electronic device (e.g., the virtual environment) obscures background content (e.g., content other than the virtual environment) around/behind the virtual environment, optionally including the number of items of background content displayed and the visual characteristics (e.g., colors, contrast, opacity) with which the background content is displayed, and/or the angular range of the content displayed via the display generation component (e.g., 60 degrees of content displayed at low immersion, 120 degrees of content displayed at medium immersion, 180 degrees of content displayed at high immersion), and/or the proportion of the field of view displayed via the display generation consumed by the virtual environment (e.g., 33% of the field of view consumed by the virtual environment at low immersion, 66% of the field of view consumed by the virtual environment at medium immersion, 100% of the field of view consumed by the virtual environment at high immersion). In some embodiments, the background content is included in a background over which the virtual environment is displayed. In some embodiments, the background content includes user interfaces (e.g., user interfaces generated by the device corresponding to applications), virtual objects (e.g., files, representations of other users, etc. generated by the device) not associated with or included in the virtual environment, and/or real objects (e.g., pass-through objects representing real objects in the physical environment around a viewpoint of a user that are displayed by the device such that they are visible via the display generation component and/or a visible via a transparent or translucent display generation component because the electronic device does not obscure/prevent visibility of them through the display generation component). In some embodiments, at a first (e.g., low) level of immersion, the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a second (e.g., higher) level of immersion, the background, virtual and/or real objects are displayed in an obscured manner (e.g., dimmed, blurred, removed from display, etc.). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, displayed with increased transparency) more than one or more second background objects, and one or more third background objects cease to be displayed.

In some embodiments, in response to receiving the input corresponding to the request to display the first simulated environment, the electronic device transitions (804) from displaying the respective environment to displaying the first simulated environment, such as transitioning from displaying three-dimensional environment 704 without a virtual environment in FIGS. 7A-7B to displaying virtual environment 722 in FIGS. 7G-7H, respectively (e.g., causing display of the first simulated environment in a portion of the display area (e.g., a subset of the display area, all of the display area, etc.)). In some embodiments, a portion of the respective environment is no longer displayed and/or no longer viewable to the user and a portion of the first simulated environment is displayed and/or viewable in its place. In some embodiments, the portion of the respective environment is overlaid by the first simulated environment. In some embodiments, the portion of the respective environment is replaced by the first simulated environment.

In some embodiments, the transitioning includes, in accordance with a determination that a physical environment around a viewpoint of the user satisfies one or more first criteria, transitioning from displaying the respective environment to displaying the first simulated environment using a first type of transition (806), such as the far-field transition illustrated in FIGS. 7C, 7E, and 7G (e.g., if the physical environment has more than a threshold size, area, depth (e.g., in front of the electronic device), the shape of the physical environment fits a certain pattern, and/or if a portion of the physical environment relative to the device has more than a threshold size, area, depth (e.g., space in front of the device, space to the left of the device, space to the right of the device, etc.), then the transition from displaying the respective environment to display the first simulated environment is a first type of transition) and in accordance with a determination that the physical environment around the viewpoint of the user satisfies one or more second criteria, different from the one or more first criteria, transitioning from displaying the respective environment to displaying the first simulated environment using a second type of transition, different from the first type of transition (808), such as the near-field transition illustrated in FIGS. 7D, 7F, and 7H (e.g., if the physical environment around the viewpoint of the user has less than a threshold size, area, depth (e.g., in front of the electronic device), the shape of the physical environment fits a different pattern and/or if a portion of the physical environment relative to the device has less than a threshold size, area, depth (e.g., space in front of the device, space to the left of the device, space to the right of the device, etc.), then the transition from displaying the respective environment to display the first simulated environment is a second type of transition).

Thus, the one or more first criteria includes a criterion that is satisfied if the physical environment has more than a threshold size (e.g., 20 square feet, 50 square feet, 100 square feet, 300 square feet, etc.), area, and/or depth (e.g., the depth of the physical environment in front of the user and/or device has a depth that is more than 2 feet, 5 feet, 8 feet, 10 feet, etc.). In some embodiments, the depth of the physical environment is determined based on distance from the user and/or device to the nearest physical object (e.g., optionally the nearest physical object that is in front of the user and/or device or to the left, right, behind the user and/or device, other than the floor, such as a coffee table or desk). In some embodiments, the depth of the physical environment is determined based on distance from a perpendicular planar surface such as a wall (e.g., optionally the nearest perpendicular planar surface or optionally the nearest perpendicular planar surface in front of the user or device). In some embodiments, the depth of the physical environment is determined based on the distance from the nearest boundary of the physical environment (or the boundary of the physical environment that is directly in front of the user or device). As described above, the respective environment can be at least partially based on the physical environment. Thus, in some embodiments, the characteristics of the physical environment inform the transition between the respective environment and the first simulated environment, for example, to reduce the shock of the transition, motion sickness and/or cognitive dissonance. For example, if the physical environment around the user/electronic device and/or in front of the user/electronic device has a maximum depth of more than 4 feet (e.g., the user is sitting at least 4 feet away from the wall across from the user), then the transition to the first simulated environment includes gradually transitioning portions of the respective environment based on distance from the electronic device and/or user. For example, the area of the respective environment that is farthest from the user transitions first, then the next closest area transitions second, and so on and so forth, optionally until reaching the user and/or electronic device or a predetermined distance in front of the user and/or electronic device (e.g., 6 inches in front of the user, 1 foot in front of the user, 3 feet in front of the user, etc.). In some embodiments, different portions of the respective environment transition at different times (e.g., the closer portions transition after the farther portions). In some embodiments, non-adjacent areas of the respective environment transition at the same time (e.g., the different portions of the respective environment are not adjacent, but are the same distance away from the user and/or electronic device). In some embodiments, the first type of transition appears to start from the farthest location and expand towards the user (e.g., as a plane that moves towards the user or in a circular manner towards the user, for example, such that the boundary of the simulated environment optionally is equidistant from the user and/or device throughout the transition). Thus, in some embodiments, the first type of transition depends on the differences in depth of the objects in the respective environment (e.g., the order of what transitions first, second, third, last, etc. is based on depth information). In some embodiments, transitioning includes dissolving the respective portion of the respective environment into the respective portion of the first simulated environment. In some embodiments, other transition animations are possible. In some embodiments, the portions of the respective environment that transition to portions of the first simulated environment are additive to previously transitioned portions of the first simulated environment. For example, the first portion of the respective environment transitions into a first portion of the first simulated environment and then a second portion of the respective environment transitions into a second portion of the first simulated environment and the first and second portions of the first simulated environment together form a contiguous simulated environment.

In some embodiments, the viewpoint of the user is a location in the physical environment (e.g., and/or its corresponding location in the three-dimensional environment, depending on the context of its usage) that has a perspective (e.g., view) of the physical environment that is the same (or similar) as the perspective of the three-dimensional environment. For example, the three-dimensional environment is constructed such that it appears to the user as if the user is physically located at a respective location in the real world environment (e.g., representations of real world objects in three-dimensional environment appear to be the same distance away as if the user were actually looking at the real world objects in the real world environment, at the same relative location from the user, etc.). Thus, the one or more second criteria includes a criterion that is satisfied if the physical environment has less than a threshold size (e.g., 20 square feet, 50 square feet, 100 square feet, 300 square feet, etc.), area, and/or depth (e.g., the space in front of the user and/or device has a depth that is less than 2 feet, 5 feet, 8 feet, 10 feet, etc.). In some embodiments, the second type of transition includes starting the transition from a respective location in the respective environment and expanding outwards from the respective location. For example, if the physical environment around the user and/or in front of the user has a maximum depth of less than 4 feet, then starting from the portion of the respective environment that is farthest from the user (e.g., the farthest point in the physical environment), the respective environment transitions into the first simulated environment and the transition expands outwards (e.g., radially) from the starting position (e.g., more of the respective environment transitions into the first simulated environment, with the starting position as the center of the transition). In some embodiments, the second type of transition appears to start from a particular location in the respective environment and expand outwards from that location (e.g., to the left and right, up and down) and optionally expanding around the user (e.g., a growing circle, as opposed to a plane expanding towards the user). In some embodiments, the second type of transition is performed without regard to the differences in depth in the respective environment. For example, the transition expands outwards from the starting position, optionally equally in all directions, without regard to whether portions of the respective environment are closer or farther away (e.g., the order of when objects are "engulfed" by the simulated environment does not depend on the depth of the objects in the environment). In some embodiments, the second type of transition includes starting the transition from a location on a surface (e.g., the surface of a table, the surface of a wall, etc.) and moving along the surface (e.g., towards the user). In some embodiments, the second type of transition includes starting the transition from a respective location (e.g., such as the center of the field of view), and expanding radially outwards along the user's field of view (e.g., expand in all directions from the respective location in the same manner). In some embodiments, transitioning outwards from a center reference location provides an initial point of reference for the first simulated environment, which reduces the motion sickness and/or cognitive dissonance due to potentially transitioning from an environment with a short depth (e.g., the user's physical environment) to an environment with a far depth (e.g., the first simulated environment). In some embodiments, the first and second manners of transition have different transition speeds, different crossfade animations, and/or the order of transitioning portions of the environment are different. In some embodiments, the result of the first and second manners of transitions are the same. For example, the initial condition and the final condition are the same, but the transition from the initial condition to the final condition are different.

The above-described manner of transitioning from one environment to another environment (e.g., by transitioning from the first environment to the second environment in manners based on the characteristics of the physical environment around the device) provides for quick and efficient method of transitioning to a different environment in a way that accounts for the characteristics of the physical environment and/or the starting environment, which optionally reduces the abruptness of the transition, which simplifies the interaction between the user and the electronic device, enhances the operability of the electronic device and makes the user-device interface more efficient (e.g., by enabling the user to interact with the new environment faster, and reducing the time required to adjust to the change), and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the one or more first criteria include a criterion that is satisfied when a portion of the physical environment around the viewpoint of the user in a respective direction relative to a reference orientation of the electronic device is greater than a threshold distance from the viewpoint of the user of the electronic device (810), such as physical environment 702 having more than the threshold distance from user 720 to the far wall in FIG. 7A, thus qualifying three-dimensional environment 704 for the far-field transition (e.g., if the portion of the physical environment of the electronic device in front of the electronic device (e.g., in the "forward" direction and/or in the direction of the center of the field of view of the viewpoint of the three-dimensional environment displayed by the device) has more than a threshold amount of space (e.g., more than 1 foot, 5 feet, 10 feet, 50 feet, 100 feet, etc.), then the first criteria are satisfied).

For example, if the device is located in the center of the room and the wall in front of the device (e.g., the boundary of the physical environment in front of the device) is more than 10 feet away, then the one or more first criteria are satisfied (e.g., and if the wall in front of the device is less than 10 feet away, then the one or more first criteria are optionally not satisfied). In some embodiments, the boundaries of the physical environment is defined by the walls of the physical environment (e.g., a vertical barrier that is more than a threshold height, such as 5 feet, 8 feet, 12 feet, etc., or a vertical barrier that spans the vertical distance from the floor to the ceiling, etc.). In some embodiments, objects in the physical environment that are not recognized as vertical walls or are less than a threshold height are not considered when determining whether the physical environment has greater than the threshold distance from the electronic device. For example, couches, tables, desks, counters, etc. that are in front of the electronic device are optionally not considered when determining whether the physical environment is greater than the threshold distance from the electronic device. In some embodiments, couches, tables, desks, counters, etc. are considered. In some embodiments, the size and/or shape of the physical environment (e.g., including the size, shape, and/or location of objects in the physical environment) are determined via one or more sensors of the electronic device (e.g., individually or in combination), such as visible light sensors (e.g., cameras), depth sensors (e.g., time-of-flight sensors), etc.

The above-described manner of displaying an environment via either a first type of transition or a second type of transition (e.g., based on whether the physical environment around the device satisfies certain criteria) takes into account the user's environment to ensure a smooth transition that reduces potential disorientation that can potentially lead to vertigo or motion sickness symptoms, which simplifies the interaction between the user and the electronic device, enhances the operability of the electronic device and makes the user-device interface more efficient (e.g., automatically, without requiring the user to perform additional inputs to select between different types of transitions), which additionally reduces power usage and improves battery life of the electronic device by enabling the user to use the electronic device more quickly and efficiently, while reducing errors in usage.

In some embodiments, the one or more second criteria include a criterion that is satisfied when a portion of the physical environment around the viewpoint of the user in a respective direction relative to a reference orientation of the electronic device is less than a threshold distance from the electronic device (812), such as physical environment 702 having less than the threshold distance from user 720 to the far wall in FIG. 7B, thus qualifying three-dimensional environment 704 for the near-field transition and optionally not qualifying for the far-field transition (e.g., if the portion of the physical environment of the electronic device in front of the electronic device (e.g., in the "forward" direction and/or in the direction of the center of the field of view of the viewpoint of the three-dimensional environment displayed by the device) has less than a threshold amount of space (e.g., more than 1 foot, 5 feet, 10 feet, 50 feet, 100 feet, etc.), then the second criteria are satisfied).

For example, if a wall in front of the electronic device is less than the threshold distance from the electronic device, then the electronic device performs the second type of transition when displaying the respective environment. In some embodiments, the second type of transition is a different type of transition than when there is more than the threshold amount of space to reduce the risk that the transition is jarring to the user and/or to reduce the risk of causing motion sickness symptoms. For example, if the user is presented with an environment with a small amount of depth (e.g., the user's physical environment) and harshly transitions to an environment with a lot of space (e.g., the simulated environment), the effect can cause visual dissonance. In some embodiments, the one or more second criteria includes a criterion that is satisfied when the electronic device is not able to determine depth information of the physical environment around the electronic device (e.g., optionally up to a threshold accuracy level). For example, if environment conditions prevent the device's sensors from determining the size and shape of the user's room (e.g., atmospheric interference, electromagnetic interference, etc.), then the one or more second criteria are satisfied.

The above-described manner of displaying an environment via either a first type of transition or a second type of transition (e.g., based on whether the physical environment around the device satisfies certain criteria) takes into account the user's environment to ensure a smooth transition that reduces potential disorientation that can potentially lead to vertigo or motion sickness symptoms, which simplifies the interaction between the user and the electronic device, enhances the operability of the electronic device and makes the user-device interface more efficient (e.g., automatically, without requiring the user to perform additional inputs to select between different types of transitions), which additionally reduces power usage and improves battery life of the electronic device by enabling the user to use the electronic device more quickly and efficiently, while reducing errors in usage.

In some embodiments, the respective environment includes a representation of a portion of the physical environment around the viewpoint of the user (e.g., at least a part of the environment that is displayed and/or presented to the user is based on (e.g., is a photorealistic representation of) the physical environment around the device and/or user, such as via actual passthrough via the display generation component (e.g., a transparent or semi-transparent display generation component) or digital passthrough via the display generation component), and transitioning from displaying the respective environment to displaying the first simulated environment includes replacing display of the representation of the portion of the physical environment with display of a representation of a portion of the first simulated environment (814), such as replacing representations of the corner of physical environment 702 of three-dimensional environment 704 with respective portions of virtual environment 722 (e.g., 722-1a and 722-1b, respectively), in FIG. 7C (e.g., replacing portions of the representation of the physical environment with the simulated environment such that the environment that is presented to the user is partially the real world physical environment and partially a virtual simulated environment).

In some embodiments, the amount of simulated environment that is displayed (e.g., the amount of physical environment that is not displayed) is based on the immersion level of the device and/or of the simulated environment. For example, increasing the immersion level causes more of the simulated environment to be displayed, replacing and/or obscuring more of the representation of the physical environment and reducing the immersion level causes less of the simulated environment to be displayed, revealing portions of the physical environment that were previously not displayed and/or obscured.

The above-described manner of displaying a simulated environment (e.g., by replacing portions of representations of the physical environment with portions of the simulated environment) provides for quick and efficient method of transitioning from displaying only the physical environment to also displaying the simulated environment, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the input corresponding to the request to display the first simulated environment includes user input (816), such as the selection of an affordance or representation of a simulated environment while currently displaying a virtual environment, such as any of FIGS. 7C-7H (e.g., detecting and/or receiving a manipulation of a mechanical input element in communication with the electronic device such as a dial or button by the user or the manipulation of a control element such as a virtual button or virtual dial displayed in the respective environment). In some embodiments, the user input is performed by one or more hands of the user and is detected by one or more sensors of the device, such as a camera, a motion sensor, a hand tracking sensor, etc.

In some embodiments, transitioning from displaying the respective environment to displaying the first simulated environment includes (818) in accordance with a determination that that the user input corresponds to a request to transition to the first simulated environment by a first amount (e.g., the user input selects a respective immersion level that is more or less than the current immersion level), transitioning from displaying the respective environment to displaying a first portion of the first simulated environment (820), such as transitioning from the simulated environment having a first immersion level to the simulated environment having a second immersion level (e.g., such as transitioning from any of FIGS. 7C-7H to any other of FIGS. 7C-7H) (e.g., displaying a respective amount of the first simulated environment based on the user input) and in accordance with a determination that that the user input corresponds to a request to transition to the first simulated environment by a second amount, greater than the first amount, transitioning from displaying the respective environment to displaying a second portion, greater than the first portion, of the first simulated environment (824), such as transitioning from the simulated environment having a first immersion level to the simulated environment having a second immersion level (e.g., such as transitioning from any of FIGS. 7C-7H to any other of FIGS. 7C-7H) (e.g., if the user input is a request to increase (or decrease) the immersion level by two steps, then the amount of the first simulated environment that is displayed increases (or decreases) by an amount corresponding to two steps of increased (or decreased) immersion).

In some embodiments, the user input is a relative input increasing or decreasing the immersion level by a certain amount (e.g., a request to increase the immersion level by 1 step, by 2 steps, etc.) In some embodiments, the user input is a selection of a specific immersion level (e.g., a request to increase the immersion level to 50%, 75%, etc. For example, if the user input is a request to increase the immersion level by one step, then the amount of the first simulated environment that is displayed increases by an amount corresponding to one step of increased immersion. In some embodiments, if the user input is a request to increase the immersion level by two steps, then the amount of the first simulated environment that is displayed increases by an amount corresponding to two steps of increased immersion. In some embodiments, increasing or decreasing the amount of immersion includes gradually increasing or decreasing, respectively, the amount that the first simulated environment is displayed (e.g., as opposed to abruptly displaying more or less of the first simulated environment).

The above-described manner of increasing or decreasing the amount of simulated environment that is displayed (e.g., by gradually increasing or decreasing, based on the amount requested by the user input) provides for quick and efficient method of displaying more or less of a simulated environment, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the user input includes rotation of a rotatable input element in communication with the electronic device (e.g., a mechanical dial on the electronic device or on another device that is in communication with the electronic device (e.g., a remote control device, another electronic device, etc.)), the user input corresponding to the request to transition to the first simulated environment by the first amount includes rotation of the rotatable input element by a first respective amount (e.g., rotating the mechanical dial by one increment (and/or a first amount of rotation), two increments (and/or a second, greater, amount of rotation), etc. (e.g., one detent, two detents, etc.)), and the user input corresponding to the request to transition to the first simulated environment by the second amount includes rotation of the rotatable input element by a second respective amount, greater than the first respective amount (826), such as the rotation of a mechanical dial that is attached to or in communication with electronic device 101 (e.g., rotating the mechanical dial by a greater amount). In some embodiments, rotating in a first direction corresponds to a request to increase the immersion level and rotating in a second, opposite direction corresponds to a request to decrease the immersion level.

The above-described manner of increasing or decreasing the amount of simulated environment that is displayed (e.g., by rotating a rotatable element by a certain amount) provides for quick and efficient method of displaying more or less of a simulated environment (e.g., by providing the user with a process to increase or decrease the current level of immersion, without requiring the user to select a specific amount of immersion), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, display, via the display generation component, of the first simulated environment after transitioning from displaying the respective environment to displaying the first simulated environment using the first type of transition is the same as display, via the display generation component, of the first simulated environment after transitioning from displaying the respective environment to displaying the first simulated environment using the second type of transition (828), such as virtual environment 722a in FIG. 7H looking the same or similar as in FIG. 7H after completing their respective transitions (e.g., the beginning state and end state of the first and second types of transitions are the same or similar).

For example, when transitioning from a first level of immersion to a second level of immersion, the system determines whether to perform the first type of transition or second type of transition. In some embodiments, the first and second types of transitions include different types of animations and different parts of the display and/or environment transition at different times, but the end result after the transition is completed is the same, regardless of what type of transition is used. In some embodiments, transitioning from a first immersion level to a second immersion level includes transitioning through each intermediate immersion level between the first immersion level and the second immersion level. In some embodiments, the highest immersion level (e.g., the maximum level of immersion) looks the same or similar, regardless of whether the physical environment satisfies the first criteria or the second criteria (e.g., regardless of whether the first or second type of transition is used). In some embodiments, the intermediate levels of immersion (e.g., the immersion levels that are less than the maximum level of immersion and more than no immersion) are different based on whether the physical environment satisfies the first criteria or the second criteria. For example, the size and/or shape of the first simulated environment in the three-dimensional environment is optionally different depending on whether the physical environment satisfies the first criteria or the second criteria, but the size and shape of the first simulated environment when at the maximum level of immersion is the same regardless of whether the physical environment satisfies the first criteria or the second criteria.

The above-described manner of displaying a simulated environment (e.g., by performing different types of transitions based on the situation, but arriving at the same final state after the transition is completed) provides for quick and efficient method of displaying a simulated environment (e.g., by providing a consistent experience, without regard to what type of transition that is used to display the simulated environment), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the first type of transition progresses in a manner that is based on a difference in distance between: 1) the electronic device and a first portion of the physical environment around the viewpoint of the user, and 2) the electronic device and a second portion of the physical environment around the viewpoint of the user (830), such as the far-field transitioning involving virtual environment 722 moving closer in distance to user 720 using position and distance information of the objects in physical environment 702 in FIGS. 7C, 7E, and 7G (e.g., the first type of transition takes into account the position of the objects in the user's physical environment when determining the which portions of the respective environment transition first, second, etc. (e.g., the order of the transition)).

For example, the first type of transition optionally first replaces the portion of the representation of the physical environment that is farthest from the user (or device) with a portion of the simulated environment, then replaces the portion of the representation of the physical environment that is the next farthest from the user (or device), and so on and so forth.

In some embodiments, the second type of transition progresses in a manner that is independent of (e.g., not based on) the difference in distance between: 1) the electronic device and the first portion of the physical environment around the viewpoint of the user, and 2) the electronic device and the second portion of the physical environment around the viewpoint of the user (832), such as virtual environment 722 expanding radially from the center location, without regard to the distance and/or position of objects in the physical environment in FIGS. 7D, 7F, and 7H (e.g., the second type of transition does not take into account the position of the objects in the room or the distance of the objects in the room).

In some embodiments, the second type of transition selects a respective location to begin the transition and replaces the representation of the physical environment at the starting position with a portion of the simulated environment and then expands the replacement process outwards from the initial point, without regard to whether objects are in front or behind other objects (e.g., the expansion is optionally based on display area, rather than what is being displayed). In some embodiments, the starting position is a location in the representation of the physical environment that is the farthest point from the viewpoint of the user. For example, if the device is facing a planar wall, the second type of transition optionally starts from the center of the planar wall. In some embodiments, as the second type of transition progresses, the simulated environment expands from the starting position. In some embodiments, the simulated environment expands in a circular manner outwards. In some embodiments, the expansion of the simulated environment has a shape similar to the surface of a sphere (or semi-sphere) that surrounds the user (e.g., the device and/or user is at the center point of the sphere (or semi-sphere), such that the simulated environment expands as if it is expanding along the surface of the sphere (e.g., an imaginary sphere that is not displayed). In some embodiments, as the simulated environment expands, the boundary of the simulated environment expands outwards (e.g., in the x-y directions), but also forwards (e.g., in the z direction), but optionally remains the same distance from the user (e.g., due to the radius of the sphere being constant throughout the sphere).

The above-described manner of displaying a simulated environment (e.g., by transitioning in a manner that takes into account the position and depth information of the environment around the device or in a manner that doesn't take into account the position and depth information of the environment around the device) provides a tailored transition style based on the type of environment in which the device is located, which enhances the operability of the electronic device and makes the user-device interface more efficient and reduces potential disorientation that can potentially lead to vertigo or motion sickness symptoms (e.g., without requiring the user to determine the ideal type of transition and perform additional inputs to select the respective type of transition), which additionally reduces power usage and improves battery life of the electronic device by enabling the user to use the electronic device more quickly and efficiently, while reducing errors in usage.

In some embodiments, the second type of transition includes cross-dissolving between the respective environment and the first simulated environment, and the cross-dissolving originates at a portion of the physical environment that is furthest away from the electronic device (834), such as in FIG. 7D (e.g., the second type of transition starts at a location corresponding to the farthest location in the physical environment).

In some embodiments, from the starting location, the second type of transition expands the simulated environment outwards with respect to the display area (e.g., the display screen). For example, from the starting location, the simulated environment expands radially by 1 cm of the display area each second. In some embodiments, cross-dissolving between the respective environment and the first simulated environment includes fading away the respective environment while simultaneously fading in the first simulated environment. In some embodiments, the respective environment and the first simulated environment are concurrently displayed during portions of the transition (e.g., as the respective environment is fading out and as the first simulated environment is fading in). In some embodiments, cross-dissolving between the respective environment and the first simulated environment includes continuously replacing respective portions of the respective environment with respective portions of the first simulated environment until all respective portions of the respective environment has been fully replaced with first simulated environment.

The above-described manner of displaying a simulated environment (e.g., by cross-fading from the respective environment to the first simulated environment from a starting location outwards) provides a smooth and efficient transition, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, transitioning from displaying the respective environment to displaying the first simulated environment using the first type of transition (836) includes during a first portion of the transition (838), in accordance with a determination that a respective portion of the physical environment around the viewpoint of the user is greater than a first distance from the viewpoint of the user, replacing display, via the display generation component, of a representation of the respective portion of the physical environment with display of at least a first portion of the first simulated environment (840), such as determining that a portion of three-dimensional environment 704 corresponds to a portion of the physical environment 702 that is farther than a respective distance that is associated with the immersion level of three in FIG. 7E and thus replacing the determined portion with virtual environment 722*a* (e.g., if a first portion of the representation of the physical environment corresponds to a location that is farther from the user (or device) than a second portion, then the first portion of the representation of the physical environment is replaced (e.g., transitioned) with a portion of the first simulated environment before the second portion is replaced (e.g., transitioned)) and in accordance with a determination that the respective portion of the physical environment around the viewpoint of the user is less than the first distance from the viewpoint of the user, forgoing replacing display, via the display generation component, of the representation of the respective portion of the physical environment with display of at least the first portion of the first simulated environment (842), such as determining that a portion of three-dimensional environment 704 corresponds to a portion of the physical environment 702 that is closer than a respective distance that is associated with the immersion level of three in FIG. 7E and thus maintaining those portions as representations of the physical environment (e.g., if the first portion of the representation of the physical environment is not farther from a second portion, do not replace (e.g., transition) the first portion with a portion of the first simulated environment during the first portion of the transition (e.g., until after the second portion has transitioned).

In some embodiments, during a second portion of the transition (e.g., after the first portion of the transition) (844), in accordance with a determination that the respective portion of the physical environment around the viewpoint of the user is greater than a second distance, different from the first distance, from the viewpoint of the user, replacing display, via the display generation component, of the representation of the respective portion of the physical environment with display of at least a second portion of the first simulated environment (846), such as determining that a portion of three-dimensional environment 704 corresponds to a portion of the physical environment 702 that is farther than a respective distance that is associated with the immersion level of six in FIG. 7G and thus replacing the determined portion with virtual environment 722*a* (e.g., during a second portion of the transition, a second portion of the representation of the physical environment that is closer than the first portion (e.g., the next farthest portion after the first portion) is replaced (e.g., transitioned) with a portion of the first simulated environment before the second portion is replaced (e.g., transitioned)) and in accordance with a determination that the respective portion of the physical environment around the viewpoint of the user is less than the second distance from the viewpoint of the user, forgoing replacing display, via the display generation component, of the representation of the respective portion of the physical environment with display of at least the second portion of the first simulated environment (848), such as determining that a portion of three-dimensional environment 704 corresponds to a portion of the physical environment 702 that is closer than a respective distance that is associated with the immersion level of six in FIG. 7H and thus maintaining those portions as representations of the physical environment (e.g., if the second portion of the representation of the physical environment is not the next farthest portion after the first portion, then do not replace the second portion of the representation (e.g., until the second portion is the next farthest portion that has not yet transitioned).

In some embodiments, the boundary between the physical environment and the first simulated environment has a shape defined by the surface of a sphere around the viewpoint of the user (e.g., with the device and/or user as the center point). In some embodiments, as the transition progresses, the sphere moves closer to the electronic device and/or user and/or the sphere reduces in size. In some embodiment, the portions of the surface of the sphere that intersects with the physical environment define the boundary between the physical environment and the simulated environment (e.g., beyond the intersection is the simulated environment, and before the intersection is the physical environment). In some embodiments, as the sphere moves closer to the electronic device and/or user and/or the sphere reduces in size, more of the surface of the sphere intersects with the physical environment, thus causing the simulated environment to encompass more of the three-dimensional environment and appear to move closer to the viewpoint of the user (e.g., starting from the farthest location in the physical environment).

The above-described manner of transitioning from displaying a respective environment to displaying a simulated environment (e.g., by transitioning a portion of the respective environment that is farther away before transitioning portions of the respective environment that is closer) provides a smooth and efficient transition, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the first type of transition includes (850), during the first portion of the transition (852), in accordance with the determination that the respective portion of the physical environment around the viewpoint of the user is greater than the first distance from the viewpoint of the user (854), in accordance with a determination that a second respective portion of the physical environment around the viewpoint of the user is less than the first distance from the viewpoint of the user, displaying, via the display generation component, a representation of the second respective portion of the physical environment between the first portion of the first simulated environment and a viewpoint of the user (856), such as determining that a portion of three-dimensional environment 704 corresponds to a portion of the physical environment 702 that is closer than a respective distance that is associated with the immersion level of three in FIG. 7E and maintaining those portions as representations of the physical environment (e.g., during the first portion of the transition, if an object in the physical environment of the device (for which a representation exists in the respective environment) is at a closer distance than the simulated environment, then the representation of the object is displayed in front of the simulated environment (e.g., architectural objects, furniture, etc.)) and in accordance with a determination that the second respective portion of the physical environment around the viewpoint of the user is greater than the first distance from the viewpoint of the user, forgoing displaying, via the display generation component, the representation of the second respective portion of the physical environment (858), such as determining that a portion of three-dimensional environment 704 corresponds to a portion of the physical environment 702 that is farther than a respective distance that is associated with the immersion level of three in FIG. 7E and replacing those portions with respective portions of virtual environment 722 (e.g., objects that are farther than the simulated environment are no longer displayed). For example, the objects are overlaid, obscured, and/or replaced by the simulated environment.

In some embodiments, if the representation of the object is located along the line of sight of a portion of the simulated environment, then the representation of the object is displayed overlaying the portion of the simulated environment. Thus, objects of the physical environment are optionally displayed overlaid over (and/or occluding) portions of the simulated environment and/or obscure portions of the simulated environment if the respective objects are closer to the user/device than the simulated environment.

The above-described manner of displaying a respective environment concurrently with a representation of a physical environment (e.g., by displaying representations of objects, optionally obscuring portions of the respective environment, if the respective object is located between the user/device and the simulated environment) provides a smooth and efficient transition, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the respective environment includes a representation of the physical environment around the viewpoint of the user, the first simulated environment includes a first simulated light source (860) (e.g., the respective environment concurrently includes representations of the physical environment and the simulated environment and the simulated environment includes at least one light source). For example, the simulated environment is an outdoor environment with the sun as a light source or the simulated environment is a room with a lamp as a light source or an application user interface (e.g., a movie screen) that emits simulated light.

In some embodiments, while concurrently displaying, via the display generation component, at least a portion of the representation of the physical environment around the viewpoint of the user and at least a portion of the first simulated environment (e.g., that includes the first simulated light source), the electronic device displays (862) the portion of the representation of the physical environment with a lighting effect based on the first simulated light source, such as if virtual environment 722a casts a lighting effect on the real world environment portions of three-dimensional environment 704 in FIG. 7E (e.g., the light source in the simulated environment casts a lighting effect on the representation of the physical environment). For example, light from a sun in the simulated environment is optionally displayed as if it exits the simulated environment, enters the physical environment, and lights up a portion of the representation of the physical environment. In some embodiments, the simulated light source optionally causes simulated shadows to be displayed in the representation of the physical environment.

The above-described manner of displaying lighting effects from a simulated environment in a representation of the physical environment (e.g., by displaying lighting effects on portions of the physical environment that are due to light sources in the simulated environment) increases the immersive effect of the simulated environment (e.g., by blending aspects of the simulated environment with the physical environment), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the lighting effect is based on a geometry of the physical environment around the viewpoint of the user (864), such as the shape and position of the room and objects in physical environment 702 in FIG. 7E (e.g., the lighting effect from the simulated lighting source in the simulated environment is displayed as if it interacts with objects in the physical environment according to physics). For example, objects that are in the line of sight of the lighting source experience the lighting effect, but objects that are obscured (e.g., by virtual or physical objects) optionally do not experience the lighting effect (e.g., and optionally have a shadow cast onto it by the objects that are in the line of sight of the lighting source). In some embodiments, some objects receive scattered, reflected, or refracted lighting effects.

The above-described manner of displaying lighting effects from a simulated environment in a representation of the physical environment (e.g., by displaying lighting effects on portions of the physical environment based on the physics of light from the lighting sources) increases the immersive effect of the simulated environment (e.g., by realistically casting light from the lighting sources onto the physical environment) and provides information and/or indications of what the device knows about the physical environment, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the lighting effect is based on an architecture of the physical environment around the viewpoint of the user (866), such as the shape and position of the room and objects in physical environment 702 in FIG. 7E (e.g., the lighting effect from the simulated lighting source in the simulated environment is displayed as if it interacts with the boundaries of the physical environment according to physics). For example, the lighting source optionally casts light onto the walls and through windows, etc.

The above-described manner of displaying lighting effects from a simulated environment in a representation of the physical environment (e.g., by displaying lighting effects on portions of the physical environment based on the physics of light from the lighting sources) increases the immersive effect of the simulated environment (e.g., by realistically casting light from the lighting sources onto the physical environment) and provides information and/or indications of what the device knows about the physical environment, which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

Figure 9B:
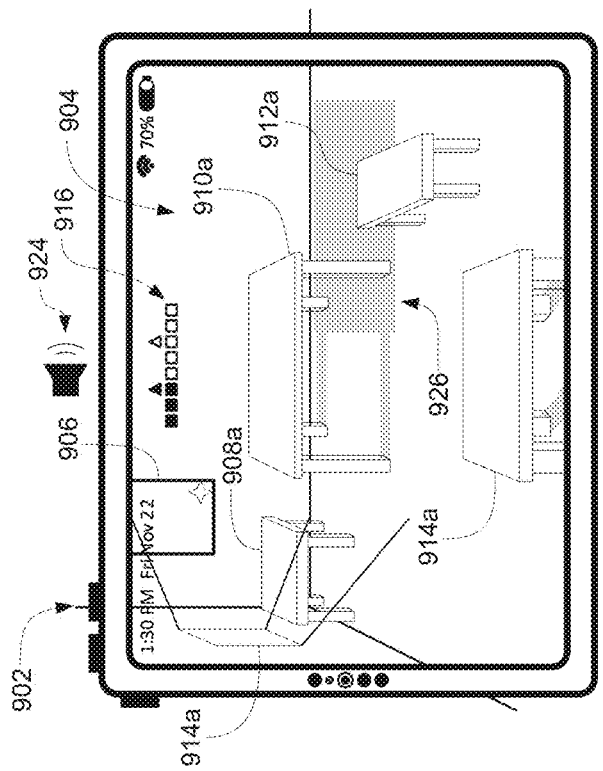
Figure 9B:
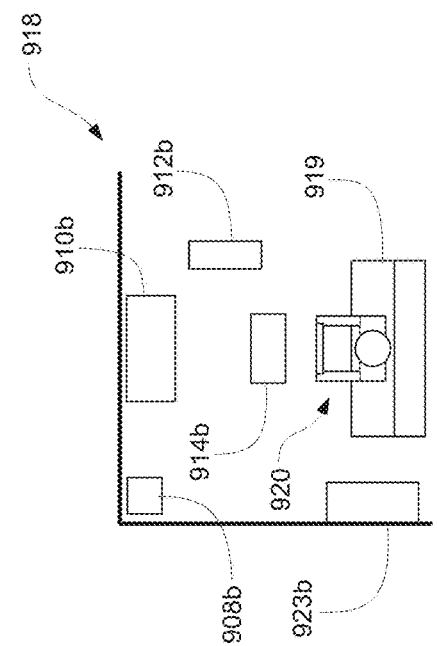

In some embodiments, the respective environment includes a representation of the physical environment around the viewpoint of the user, the first simulated environment includes a first volumetric effect (868), such as the spatial effect in FIG. 9B (e.g., an effect that changes the visual characteristics of the space in the environment that is not occupied by objects). For example, effects that changes the look and feel of the air in the environment. In some embodiments, a volumetric effect includes a lighting effect, a foggy effect, a smoky effect, etc.

In some embodiments, while concurrently displaying, via the display generation component, at least a portion of the representation of the physical environment around the viewpoint of the user and at least a portion of the first simulated environment (e.g., that includes the first volumetric effect), the electronic device displays (870), within a volume of the portion of the representation of the physical environment, a second volumetric effect based on the first volumetric effect, such as displaying a spatial effect on the real world portion of three-dimensional environment 704 that is based on virtual environment 722 in FIG. 7E (e.g., displaying a volumetric effect in the representation of the physical environment that is based on the volumetric effect in the simulated environment). For example, if the simulated environment includes a fog effect, then a fog effect is optionally displayed in the representation of the physical environment such that the fog from the simulated environment appears to drift into the physical environment.

The above-described manner of displaying volumetric effects from a simulated environment in a representation of the physical environment (e.g., by displaying volumetric effects on portions of the physical environment based on the volumetric effects exhibited in the simulated environment) increases the immersive effect of the simulated environment (e.g., by realistically causing effects from the simulated environment to spill into the physical environment), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the first volumetric effect and the second volumetric effect include a lighting effect (874) (e.g., the volumetric effect includes changing the lighting and/or introducing a lighting effect). For example, a fog volumetric effect includes changing the lighting of virtual particles displayed in the physical environment to simulate the scattering/diffracting effect of fog.

The above-described manner of displaying lighting effects from a simulated environment in a representation of the physical environment (e.g., by displaying lighting effects on portions of the physical environment based on the lighting effects in the simulated environment) increases the immersive effect of the simulated environment (e.g., by realistically casting light from the lighting sources onto the physical environment), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the first volumetric effect and the second volumetric effect include a particle effect (874) (e.g., displaying a visual effect (e.g., an abstract visual effect) in the physical environment, such as fire, smoke, dust, etc.). In some embodiments, a particle effect includes simulated one or more particles in the atmosphere of the physical environment that emit one or more visual effects.

The above-described manner of displaying particle effects from a simulated environment in a representation of the physical environment (e.g., by displaying particle effects on portions of the physical environment based on the particle effects in the simulated environment) increases the immersive effect of the simulated environment (e.g., by realistically displaying particle effects in the physical environment that are optionally extensions of the particle effects displayed in the simulated environment), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while concurrently displaying, via the display generation component, at least a portion of the respective environment and at least a portion of the first simulated environment (876), in accordance with a determination that a boundary between the portion of the respective environment and the portion of the first simulated environment intersects with a representation of a respective object that is in the respective environment, the electronic device removes (878) the representation of the respective object from display via the display generation component, such as if representation 710*a* of the table is removed from display in FIG. 7E (e.g., if the boundary of the simulated environment intersects a representation of a physical object in the representation of the physical environment (e.g., as opposed to the object being fully in front of the simulated environment or fully behind the simulated environment), then remove the display of the object altogether). In some embodiments, instead of removing display of the object, display the portion of the object that is not behind the boundary of the simulated environment (e.g., display only part of the object, and hide the part of the object that is behind the simulated environment).

The above-described manner of simultaneously displaying a simulated environment and a representation of the physical environment (e.g., by removing objects in the physical environment that otherwise would be partially in the physical environment and partially in the simulated environment) increases the immersive effect of the simulated environment (e.g., by avoiding scenarios in which the blending between the simulated environment and physical environment would be unnatural), which enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

FIGS. 9A-9H illustrate examples of changing (or not changing) the immersion level for a three-dimensional environment in accordance with some embodiments.

Figure 9A:
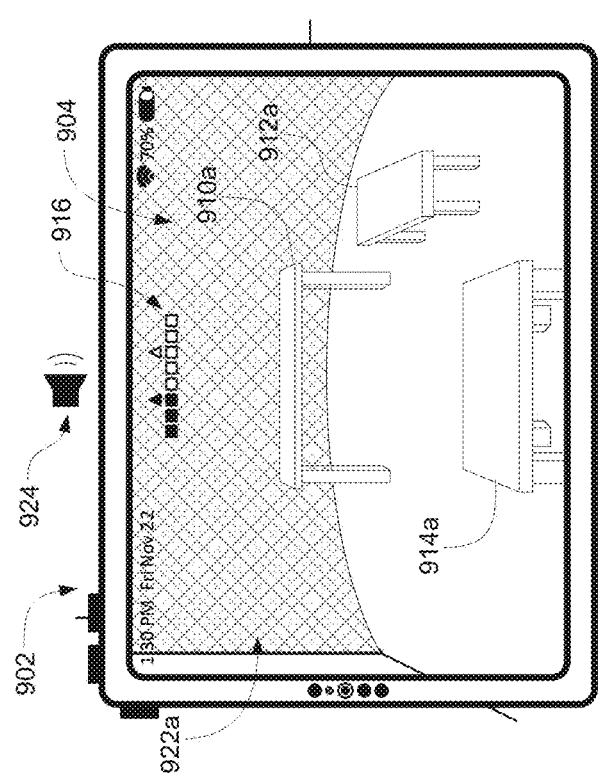
Figure 9A:
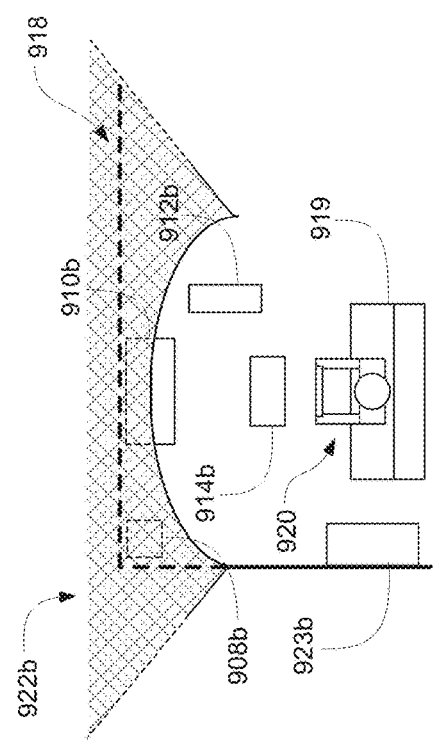

FIG. 9A illustrates an electronic device 101 displaying, via a display generation component (e.g., display generation component 120 of FIG. 1), a three-dimensional environment 904 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 9A, device 101 captures one or more images of the real world environment 902 around device 101 (e.g., operating environment 100), including one or more objects in the real world environment 902 around device 101. In some embodiments, device 101 displays representations of the real world environment in three-dimensional environment 904. For example, three-dimensional environment 904 includes a portion of a representation of desk 910a, a representation of coffee table 914a, and a representation of side table 912a. As shown in overhead view 918 of real world environment 902 in FIG. 9A, corner table 908b, desk 910b, side table 912b and coffee table 914b are real objects in real world environment 902 which have been captured by the one or more sensors of device 101. In FIG. 9A, three-dimensional environment 904 is currently at an immersion level of three (e.g., as indicated by immersion level indicator 916) and as a result, virtual environment 922a encompasses a portion of three-dimensional environment 904 and obscures the view of corner table 908b and the back portion of desk 910b (e.g., in a manner similar to three-dimensional environment 704 described above with reference to FIGS. 7A-7H, such as in FIG. 7E).

In some embodiments, when three-dimensional environment 904 is at a respective immersion level (e.g., at a level above no immersion), device 101 generates one or more audio effects associated with virtual environment 922a (e.g., as indicated by speaker 924). In some embodiments, the audio effects include ambient sound effects that would be heard in virtual environment 922a. For example, a virtual environment of a peaceful meadow may include croaking frogs sounds, chirping bird birds, running water sounds, etc., that optionally do not exist in physical environment 902 (e.g., the ambient physical environment does not include these sounds), but are generated by device 101 as if they are audible while the user is in physical environment 902. In some embodiments, providing audio effects increases the immersive effect of virtual environment 922a, thus giving the user the experience of being in the virtual environment 922a.

In some embodiments, three-dimensional environment 904 is displayed at an intermediate immersion level, as in FIG. 9A, in response to a user input requesting display of a virtual environment (e.g., such as virtual environment 922a). For example, device 101 displays one or more selectable representations of virtual environments (e.g., a buffet of virtual environments) which are selectable to display the selected virtual environment in an immersive experience as if the user were physically located in the selected virtual environment. In some embodiments, in response to the user input selecting a respective virtual environment, device 101 displays the selected virtual environment with a default immersive level that is below the maximum immersive level (e.g., the highest allowable level of immersion, which is optionally limited by a system setting or a user-defined setting) and above the minimum immersive level (e.g., an immersive level just above no immersion). In some embodiments, displaying the selected virtual environment at a default intermediate immersive level gently introduces the user to the immersive virtual environment and allows the user to increase or decrease the immersion level as desired. In some embodiments, a user is able to increase or decrease the immersion level by rotating a mechanical dial in one direction or the other or selecting an affordance to increase or decrease the immersion level. In some embodiments, a user is able to select a respective immersion level by interacting with immersion level indicator 916. For example, in response to the user performing a selection input on the element of immersion level indicator 916 for the highest immersion level (e.g., the right-most square), three-dimensional environment 904 displays virtual environment 922a at the highest immersion level, but in response to a selection input directed to the lowest immersion level element of immersion level indicator 916 (e.g., the left-most square), virtual environment 922a is displayed at the lowest immersion level. In some embodiments, transitioning from one immersion level to another immersion level is described above with reference to method 800.

FIG. 9B illustrates an embodiment in which an immersive spatial effect (e.g., as opposed to an immersive virtual environment) is displayed at an immersion level of three. In some embodiments, a spatial effect refers to an artificial (e.g., virtual) modification of the visual characteristics of the physical atmosphere or one or more objects in three-dimensional environment 904, optionally without replacing or removing the one or more objects in three-dimensional environment 904. For example, a spatial effect can include displaying three-dimensional environment 904 as if it were illuminated by a sunset, displaying three-dimensional environment 904 as if it were foggy, displaying three-dimensional environment 904 as if it were dimly lit, etc. As shown in overhead view 918, displaying a spatial effect optionally does not include displaying a virtual environment in place of portions of the real world environment portion of three-dimensional environment (e.g., although it is understood that it is possible to display both an immersive spatial effect and an immersive virtual environment at the same time, at the same immersion level or different immersion levels). In FIG. 9B, the spatial effect includes displaying virtual light entering into the physical environment from window 915. In some embodiments, the virtual light entering in from window 915 is a lighting effect that is different from the amount of real world light entering in from window 915 in real world environment 902 (e.g., the virtual light is virtual and exists only in three-dimensional environment 904). In some embodiments, the virtual light causes lighting effects to be displayed in three-dimensional environment 904 according to particle physics. For example, the virtual lighting optionally causes a glare on picture frame 906 on the back wall of the room, causes table desk 910a to cast shadow 926, and causes coffee table 914a to cast a shadow, as shown in FIG. 9B (e.g., one or more of which are optionally non-existent in physical environment 902, or exist with different characteristics in physical environment 902, such as less or more brightness, smaller or larger size, etc.). In some embodiments, the virtual light optionally increases or decreases the ambient light in three-dimensional environment 904 as compared with the actual amount of light that exists in physical environment 902.

FIG. 9C illustrates three-dimensional environment 904 in response to an input increasing an immersion level of virtual environment 922 from three (e.g., as in FIG. 9A) to an immersion level of six (e.g., as indicated by immersion level indicator 916). In some embodiments, increasing the immersion level causes virtual environment 922a to expand and encompass more of three-dimensional environment 904, thus replacing representations of real world environment 902, as shown in FIG. 9C (e.g., in a manner similar to described above with respect to method 800). In some embodiments, increasing the immersion level optionally includes increasing the one or more audio effects generated by device 101 (e.g., as indicated by speaker 924 providing more volume than in FIG. 9A). In some embodiments, increasing the one or more audio effects includes increasing the volume of the audio effects provided at a lower immersion level, providing one or more new audio effects, and/or increasing the complexity and/or depth of the audio effects, etc. For example, at a lower immersion level, device 101 provides a babbling brook sound effect (e.g., that is associated with virtual environment 922a), at a higher immersion level, device 101 adds to the babbling brook sound effect a bird chirping sound effect (e.g., that is associated with virtual environment 922a), and at an even higher immersion level, device 101 adds to the babbling brook sound effect and the bird chirping sound effect a croaking frog sound effect (e.g., that is associated with virtual environment 922a), etc. In some embodiments, device 101 increases or does not increase (e.g., maintains or decreases) the volume of its generated sound effects as it adds the above-described sound effects to the audio that it generates.

FIG. 9D illustrates three-dimensional environment 904 in response to an input increasing an immersion level of an immersive spatial effect from three (e.g., as in FIG. 9B) to an immersion level of six (e.g., as indicated by immersion level indicator 916). In some embodiments, increasing the immersion level causes the spatial effect to increase in magnitude. In some embodiments, increasing the magnitude of the spatial effect includes increasing the amount of modification and/or transformation performed real world environment 902 and/or on three-dimensional environment 904. For example, in FIG. 9D, the virtual light entering in from window 915 (e.g., which is a virtual modification of real world environment 902, as described above) is increased in magnitude (e.g., increasing luminance). In some embodiments, increasing the virtual light entering in from window 915 causes more ambient light in three-dimensional environment 904 and increased lighting effects. For example, in FIG. 9D, the glare on picture frame 906 is increased as a result of increasing the virtual light from window 915, and shadow 926 has become a darker shadow (e.g., due to the increased contrast between the ambient lighting of three-dimensional environment 904 and the shadow cast by desk 910a). In some embodiments, increasing the immersion level of the immersive spatial effect includes increasing the one or more audio effects associated with the spatial effect, in one or more manners similar to increasing audio effects described in FIG. 9C with respect to virtual environment 922a.

FIGS. 9E-9F illustrate embodiments in which the viewpoint and/or perspective of device 101 has changed, for example, as a result of device 101 being pointed in a different direction without a change in the orientation of the body (e.g., torso) of user 920. For example, in FIGS. 9E-9F, the user moved his or her hand to cause device 101 to face leftwards (e.g., instead of forwards as in FIGS. 9A-9D), but did not turn his or her shoulders and/or torso to face leftwards. As another example in the case of a head-mounted device 101, the user has turned their head leftwards without rotating their shoulders and/or torso leftwards in conjunction with the rotation of their head. As discussed above, turning device 101 causes device 101 to be facing a different direction and capture different parts of real world environment 902 with the one or more sensors of device 101. In some embodiments, in response to detecting that device 101 has turned to face a different portion of real world environment 902, device 101 updates three-dimensional environment to rotate in accordance with the rotation of device 101. For example, in FIGS. 9E-9F, because device 101 is now facing to the left, three-dimensional environment 904 displays a representation of real world environment 902 that is to the left of user 920, and optionally does not display portions of real world environment 902 that is ahead of user 920 (e.g., the amount that is no longer displayed is optionally based on the field of view of three-dimensional environment 904 and the amount of rotation experienced by device 101) as if the user turned his or her head leftwards to look at the portion of real world environment 902 to the left of the user.

In FIGS. 9E-9F, the immersion level has increased to the maximum immersion level. In FIG. 9E, increasing the immersion level to maximum optionally causes the amount of three-dimensional environment 904 that is occupied by virtual environment 922a to increase to the maximum amount, which optionally includes replacing all of three-dimensional environment 904 with virtual environment 922a optionally except for a predetermined radius around user 920 (e.g., a radius of 6 inches, 1 foot, 2 feet, 5 feet, etc., for example, for safety purposes), such as reflected in overhead view 918 in FIG. 9E, and optionally increasing the one or more audio effects to the maximum amount in one or more of the manners described with reference to FIG. 9C.

In FIG. 9E, because device 101 has been oriented to face a different direction, the view of three-dimensional environment 904 displayed by device 101 is rotated to display a new perspective of three-dimensional environment 904 as a result of the new direction. For example, because device 101 is now facing leftwards, the view of three-dimensional environment 904 displayed by device 101 includes a view of the left side of real world environment 902, including a representation of side table 923a. In some embodiments, because the body (e.g., torso) of user 920 did not rotate to face leftwards, virtual environment 922a does not rotate in response to the change in orientation of device 101, and remains oriented (e.g., centered) with the direction that the body of user 920 is facing (e.g., forwards) as illustrated by overhead view 918 (e.g., virtual environment 922a remains at the same location in three-dimensional environment 904 at which it was displayed prior to the change in orientation of device 101). In some embodiments, rotating device 101 to face leftwards optionally reveals on device 101 the boundary between virtual environment 922a and real world environment 902, as shown in FIG. 9E. In some embodiments, in response to detecting that device 101 has rotated by a threshold amount (e.g., rotated by 30 degrees, 45 degrees, 60 degrees, 90 degrees, 120 degrees, etc.), the one or more audio effects are decreased (or eliminated), as indicated by speaker indicator 924 in FIG. 9E. In some embodiments, the one or more audio effects are decreased in proportion to the magnitude of the change in orientation of device 101 as it rotates in real world environment 902, and are eliminated entirely once device 101 has rotated by the threshold amount. In some embodiments, decreasing the one or more audio effects includes reducing the volume of the one or more audio effects, reducing the complexity of the one or more audio effects, ceasing one or more audio tracks, or ceasing all audio effects associated with virtual environment 922a altogether (e.g., in one or more manners opposite to those described with reference to FIG. 9C). In some embodiments, not rotating or moving virtual environment 922a in three-dimensional environment 904 to become oriented (e.g., centered) with the view of three-dimensional environment 904 displayed by device 101 and/or decreasing the one or more audio effects decreases the amount of immersion experienced by the user, thus allowing the user to interact with his or her physical environment. For example, a user may turn his or her head (e.g., thus causing device 101, if it is a head-mounted device, to rotate to face a new direction) to interact with objects or people in his or her environment, and by not rotating virtual environment 922a to become oriented with the view of three-dimensional environment 904 displayed by device 101 and/or by decreasing the one or more audio effects, the user is able to interact with objects or people in his or her environment without performing an explicit input to reduce the immersion level of virtual environment 922a. In some embodiments, subsequently turning device 101 to an amount of rotation that is less than the threshold amount of rotation optionally causes the one or more audio effects to be (e.g., gradually, as a function of the difference between the current orientation of device 101 and the location of virtual environment 922a in three-dimensional environment 904) returned to their previous level (e.g., the level associated with maximum immersion level).

In FIG. 9F, device 101 has been reoriented just as described with reference to FIG. 9E. In FIG. 9F, because device 101 has been oriented to face a different direction, the view of three-dimensional environment 904 displayed by device 101 is rotated to display a new perspective as a result of the new direction. In FIG. 9F (e.g., as described with reference to FIGS. 9B and 9D), device 101 is displaying an immersive spatial effect and because device 101 is displaying an immersive spatial effect, the user is not able to see a boundary between the representation of the real world environment and the virtual environment. As shown in FIG. 9F, side table 923a casts virtual shadow 928 as a result of the virtual light entering from window 915 (e.g., as described above in FIGS. 9B and 9D). Additionally or alternatively, device 101 optionally does not decrease the one or more audio effects. In some embodiments, an immersive spatial effect is applied throughout the user's physical environment, and thus turning device 101 to be oriented towards different portions of real world environment does not reduce the amount and/or magnitude of the spatial effect provided by device 101; turning device 101 thus allows the user to see the effects of the spatial effect on different areas of his or her physical environment. In some embodiments, because providing an immersive spatial effect does not cause the real world environment to not be visible (e.g., as is the case with the display of virtual environments), maintaining the spatial effect does not cause the user to not be able to interact with objects or people in his or her environment. For example, objects or people in his or her environment are not removed from display as a result of displaying an immersive spatial effect.

FIGS. 9G-9H illustrate embodiments in which the viewpoint and/or perspective of device 101 has changed as compared with FIGS. 9C and 9D, for example, as a result of the body of user 920 turning (e.g., both device 101 and the shoulders and/or torso of user 920 have rotated in real world environment 902). For example, in FIGS. 9G-9H, user 920 turned his or her body to face leftwards while continuing to hold device 101 outwards, thus causing device 101 to also face leftwards, as illustrated in overhead view 918. In some embodiments, device 101 is able to determine the orientation of the body (e.g., torso and/or shoulders) of user 920 via one or more sensors, such as a visible light sensor (e.g., camera) and/or depth sensor that are facing toward the user.

In FIG. 9G, in response to detecting that device 101 and the body of user 920 have turned to face leftwards, device 101 does move (e.g., rotate) virtual environment 922a in three-dimensional environment 904 to become oriented (e.g., centered) with the orientation of device 101 and/or the body of user 920. In some embodiments, because device 101 has been oriented to face the same direction as the body of the user, virtual environment 922a is centered in view of three-dimensional environment 904 displayed by device 101 such that the entirety of the view of three-dimensional environment 904 remains occupied by virtual environment 922a (e.g., except for a "cutout" area around user 920, as described above). In some embodiments, device 101 additionally or alternatively maintains the one or more audio effects associated with virtual environment 922a. Thus, as described above, if device 101 is rotated without the body of the user rotating while a virtual environment is displayed at a respective immersion level, the virtual environment is maintained at its absolute location in three-dimensional environment 904, even if device 101 is no longer facing a direction that is oriented towards (e.g., centered on) the virtual environment (e.g., even if the user is no longer able to see the virtual environment and/or device 101 is no longer displaying the virtual environment due to displaying a different portion of three-dimensional environment 904), but if device 101 is rotated along with the body of the user rotating in the same or similar manner (e.g., by the same or similar amount, in the same or similar direction, etc.), the virtual environment is displayed at a new location in three-dimensional environment 904 and rotates in such a way such that the virtual environment is oriented (e.g., centered) with the device 101 and/or body of the user and facing toward the user (e.g., the virtual environment maintains the same position relative to the orientation of the body of the user, optionally rotating with acceleration/deceleration mechanisms to avoid jerky animations). It is understood that if the body of the user rotates without device 101 rotating, the virtual environment is optionally moved in three-dimensional environment 904 in accordance with the rotation of the body of the user, even if the orientation of the view of three-dimensional environment 904 doesn't change (e.g., due to device 101 not facing a new direction), which optionally could cause the virtual environment to rotate out of view (e.g., based on how much the body of the user rotated and the field of view of three-dimensional environment 904). In some embodiments, if the body of the user rotates without device 101 rotating, the virtual environment does not rotate in accordance with the rotation of the body of the user (e.g., the virtual environment optionally only rotates if both the body of the user and the device have rotated, though it is understood that they need not rotate at the same time).

In FIG. 9H, in response to detecting that device 101 and the body of user 920 has turned to face leftwards (e.g., in a manner similar to FIG. 9G), the view of three-dimensional environment 904 displayed by device 101 is rotated to display a new perspective as a result of the new direction of device 101, and device 101 continues displaying the immersive spatial effect in a manner similar to FIG. 9F. As shown in FIG. 9H, side table 923a casts virtual shadow 928 as a result of the virtual light entering from window 915 (e.g., as described above in FIGS. 9B, 9D, and 9F). Additionally or alternatively, device 101 optionally does not decrease the one or more audio effects. Thus, as described above with reference to FIGS. 9F and 9H, if device 101 is providing an immersive spatial effect at a respective immersion level, in response to the rotation of device 101 to face a new direction, regardless of whether the body of the user rotates with device 101, the immersive spatial effect continues to be provided, without increasing or decreasing the amount of immersion (e.g., without increasing or decreasing the audio effects, without increasing or decreasing the visual effects, etc.). For example, three-dimensional environment 904 in FIG. 9H is the same and/or is similar to three-dimensional environment 904 in FIG. 9F and/or the audio effects provided in FIG. 9H are the same and/or similar to the audio effects provided in FIG. 9F.

Thus, as discussed above, device 101 is able to provide an immersive environment (e.g., as discussed with respect to FIGS. 9A, 9C, 9E, and 9G) and/or immersive atmospheric effects (e.g., as discussed above with respect to FIGS. 9B, 9D, 9F, and 9H). In some embodiments, device 101 is able to concurrently provide both an immersive environment and immersive atmospheric effects (e.g., which optionally affect the visual characteristics of only the real world environment portion of three-dimensional environment 904 or optionally affects the visual characteristics of both the real world environment portion and the simulated environment portion of three-dimensional environment 904). In such embodiments, the immersive environment exhibits the behaviors described above with respect to FIGS. 9A, 9C, 9E, and 9G and the atmospheric effects exhibits the behaviors described above with respect to FIGS. 9B, 9D, 9F, and 9H.

Figure 10A:
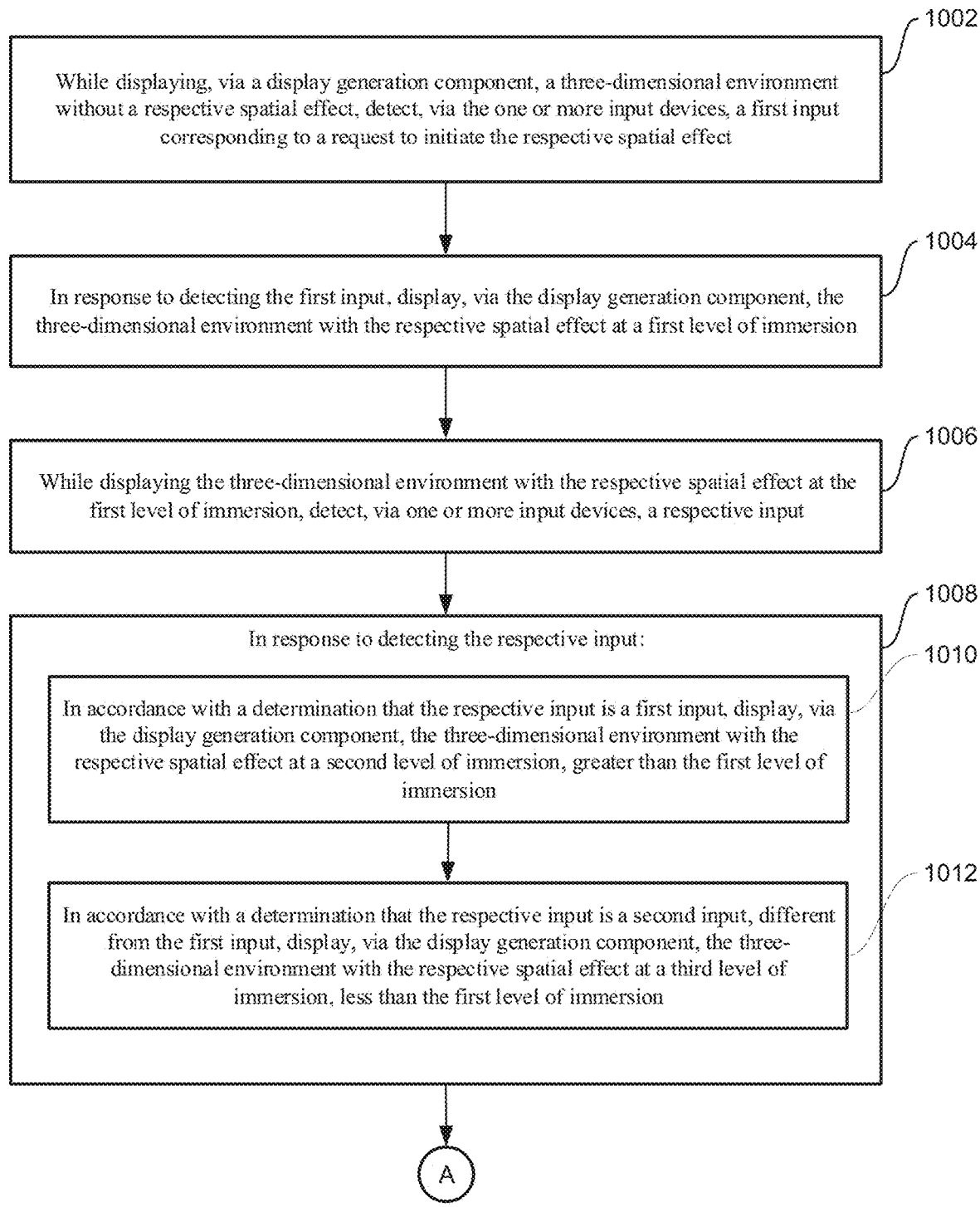
FIGS. 10A-10P is a flowchart illustrating a method of changing the immersion level for a three-dimensional environment in accordance with some embodiments.
Figure 10B:
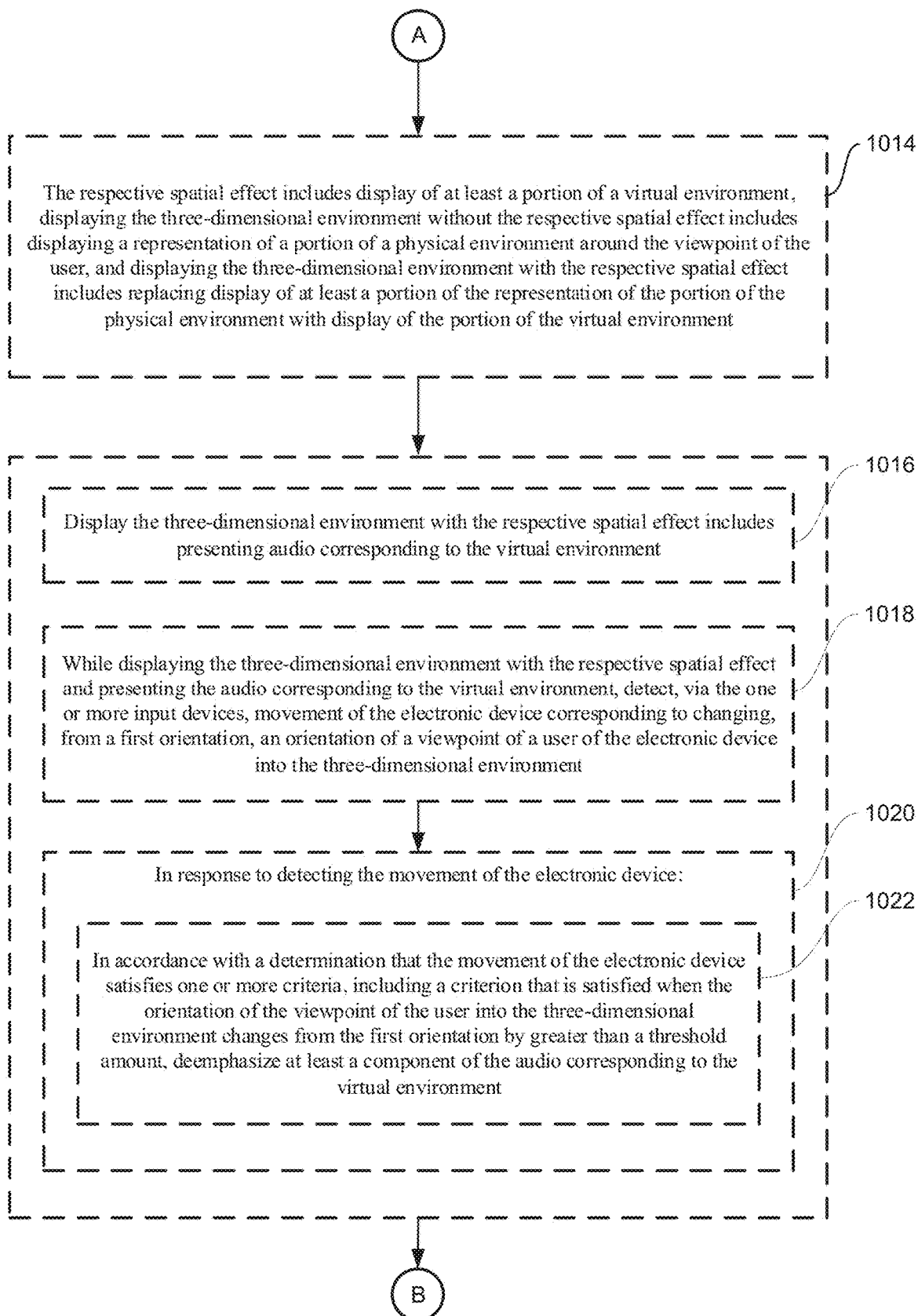
Figure 10C:
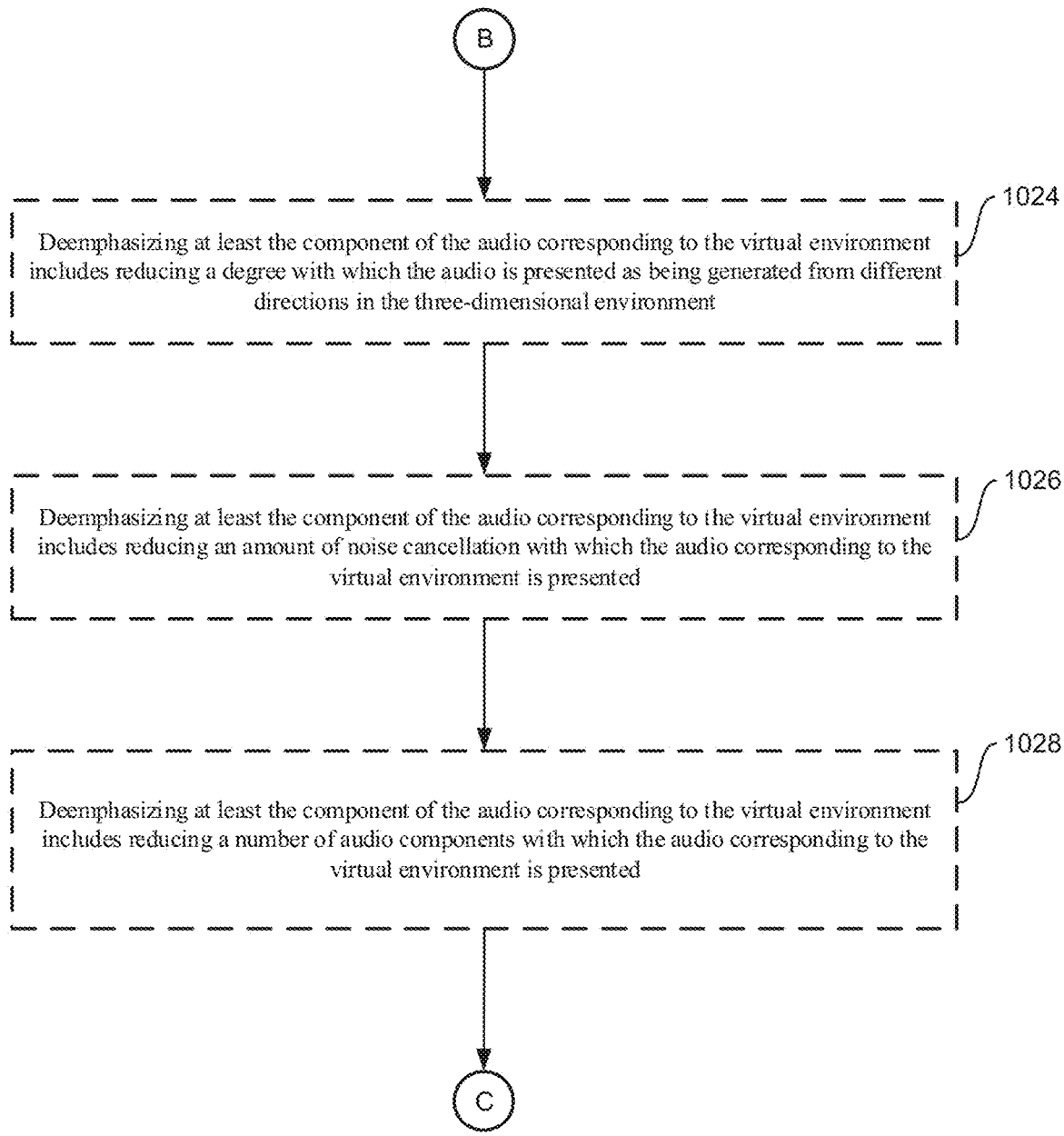
Figure 10D:
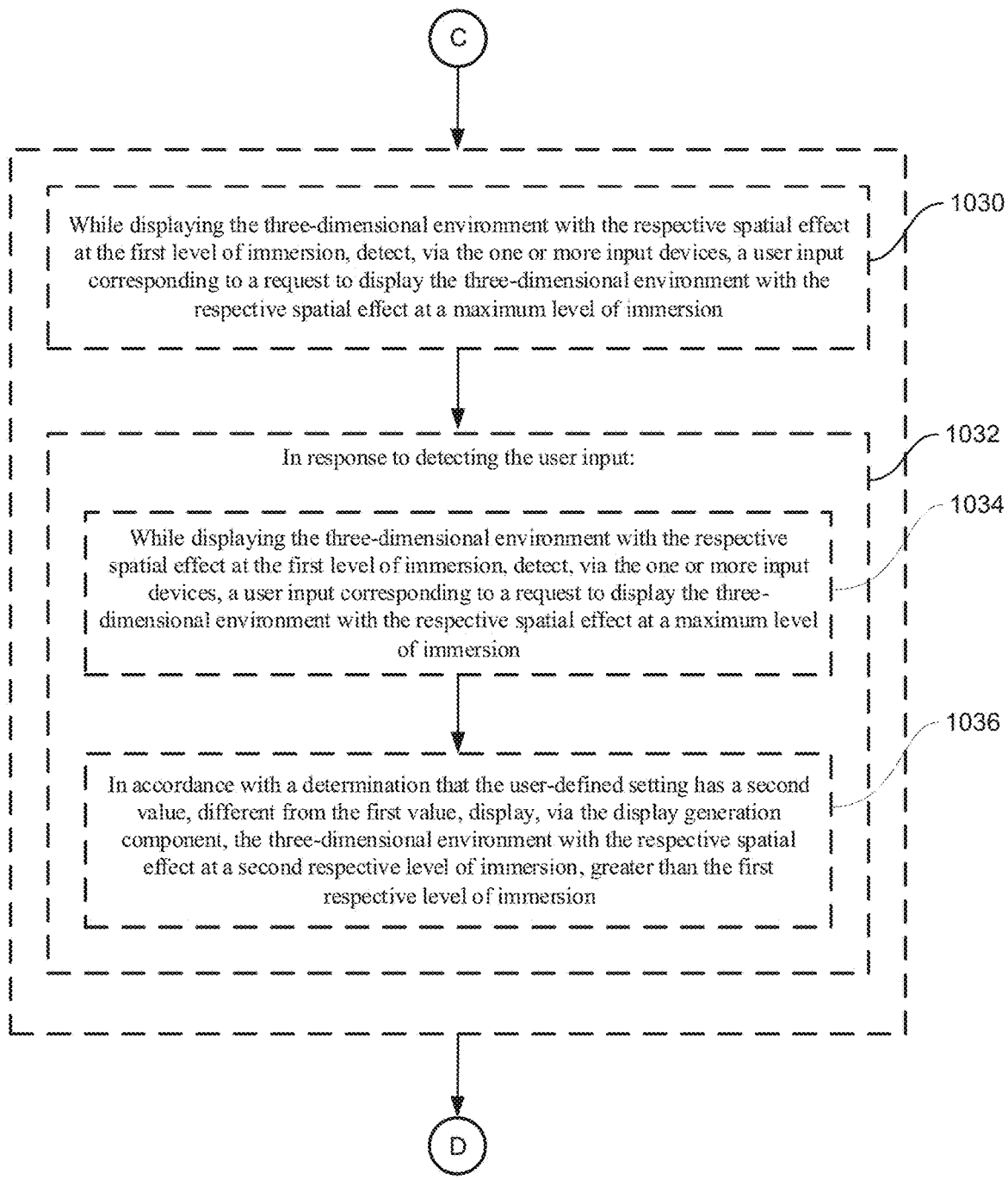
Figure 10E:
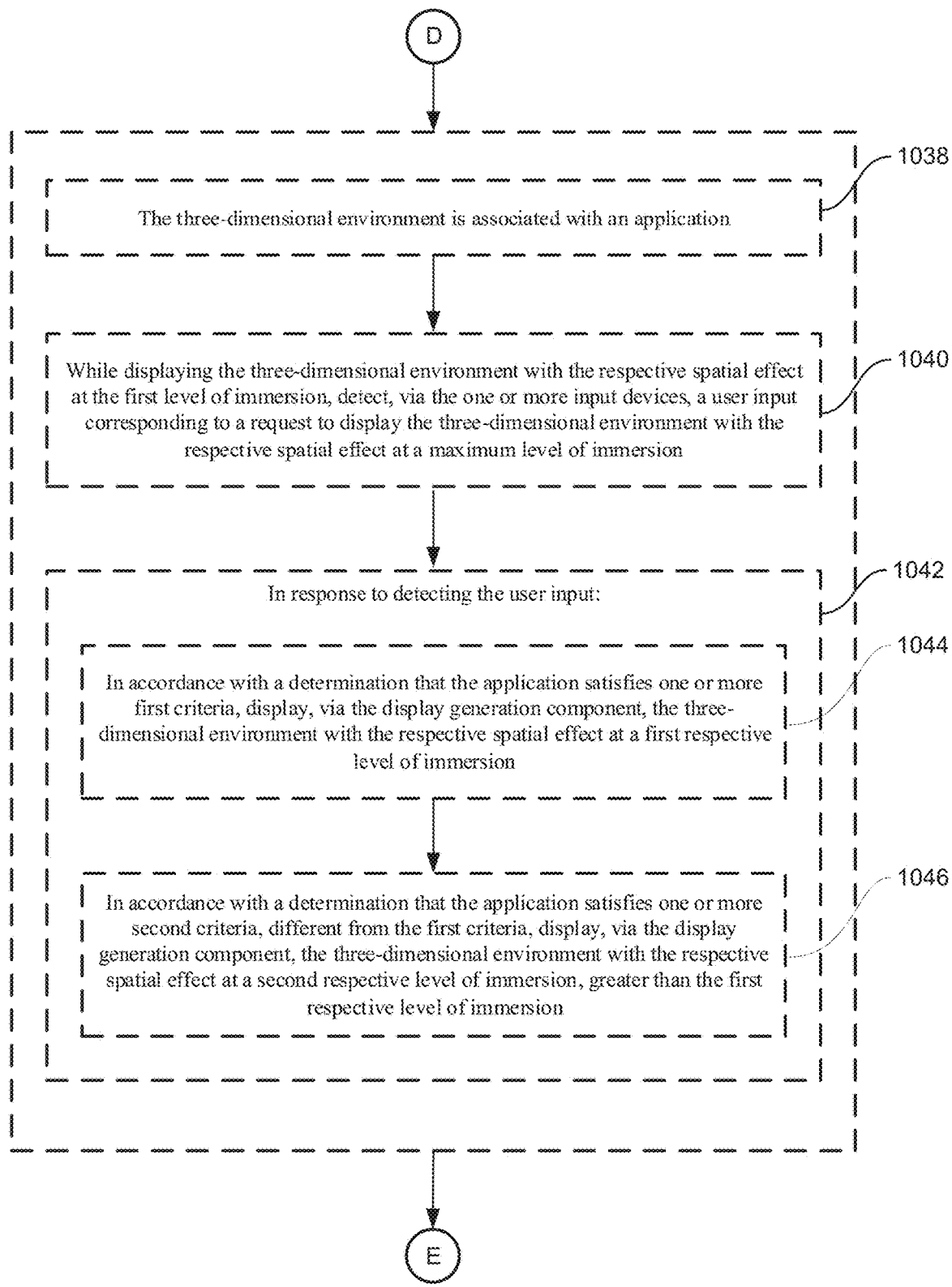
Figure 10F:
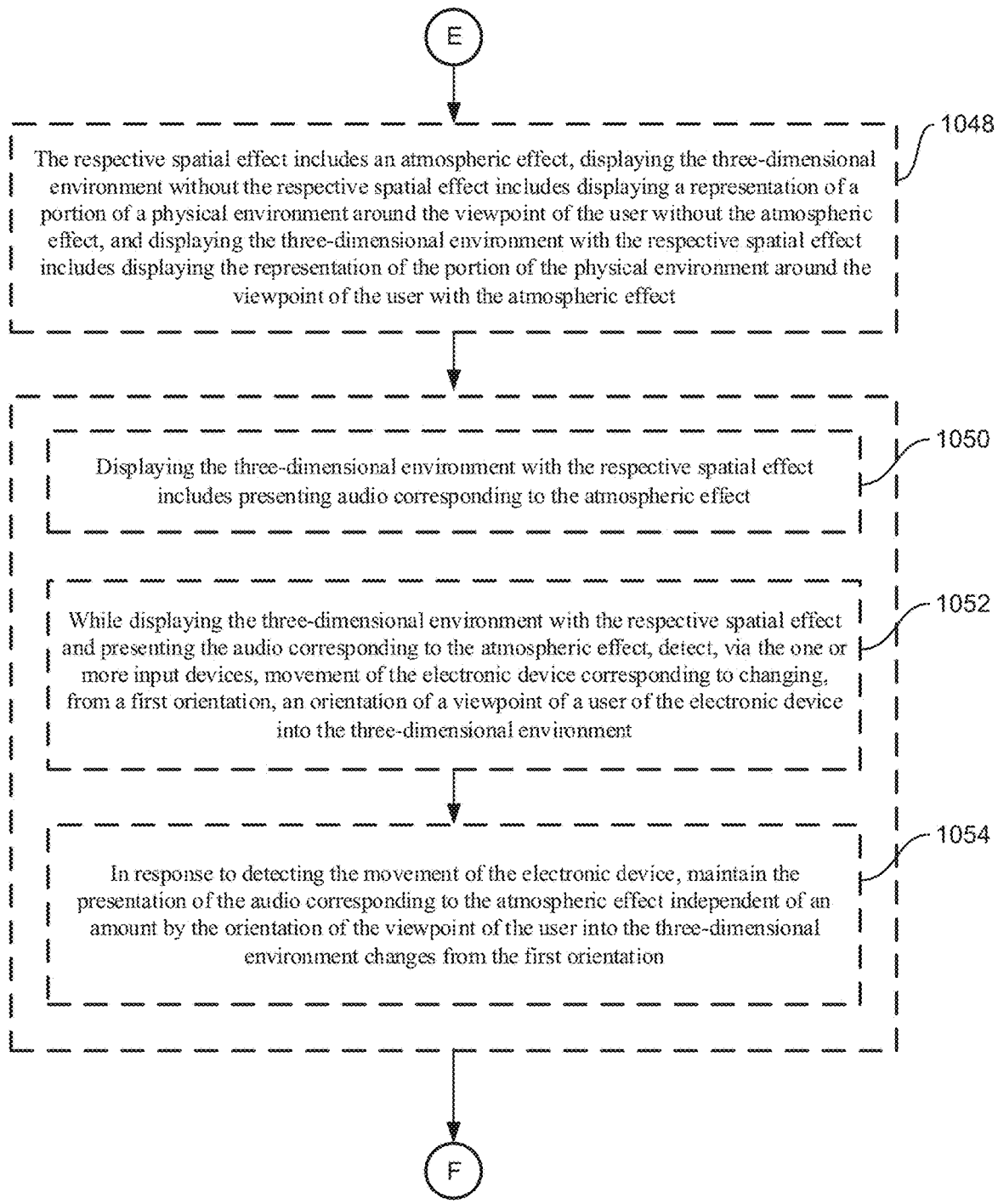
Figure 10G:
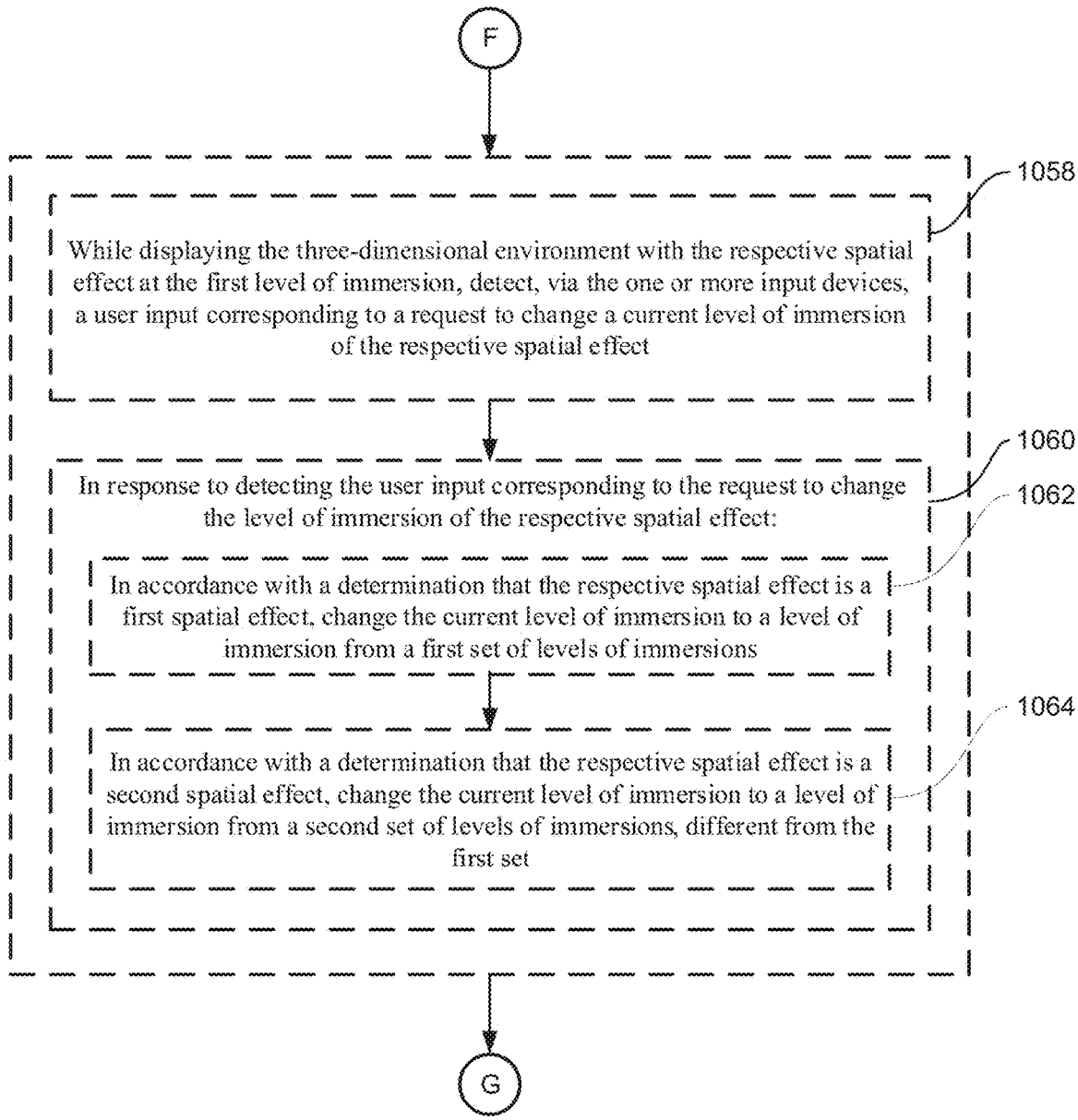
Figure 10H:
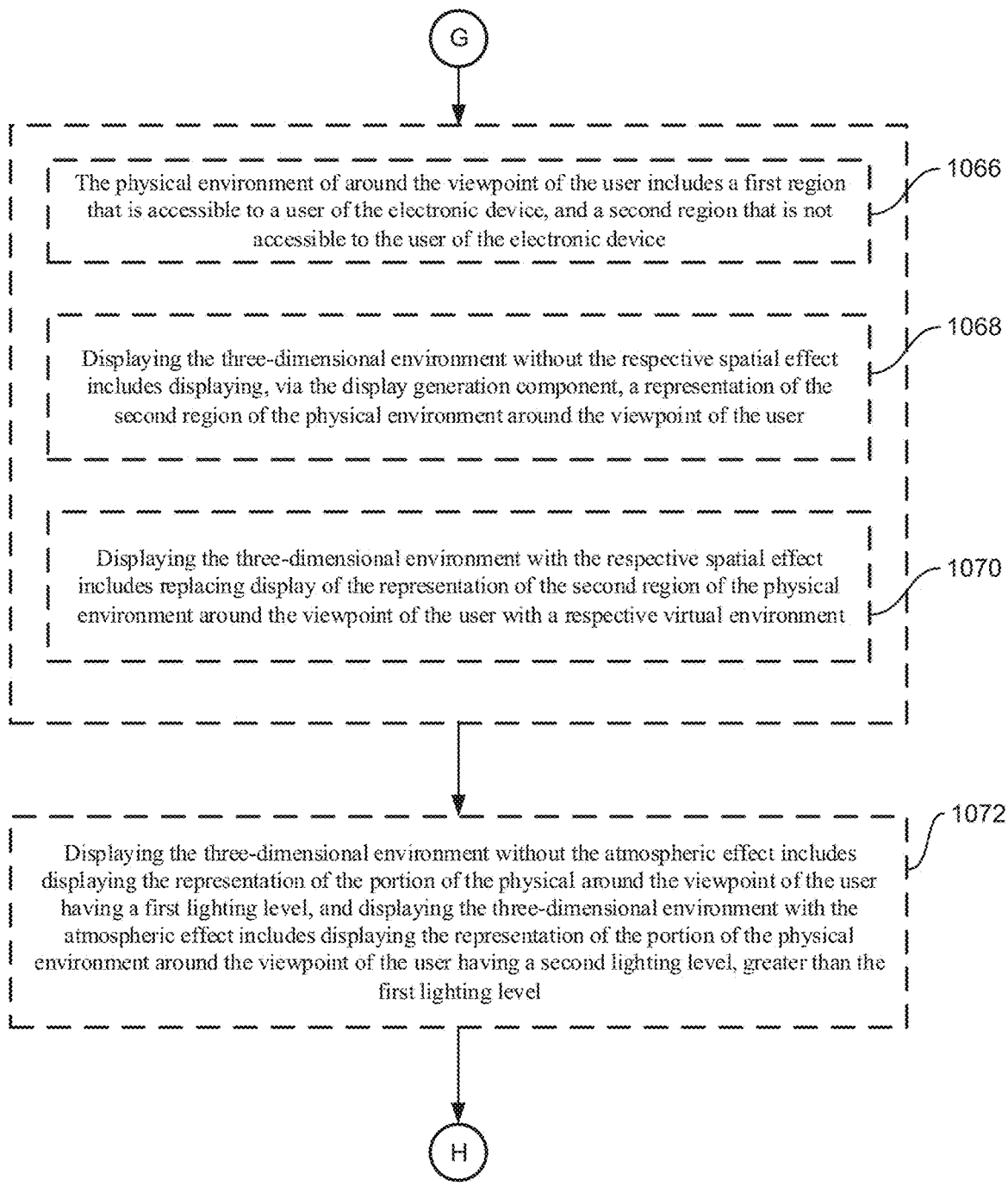
Figure 10I:
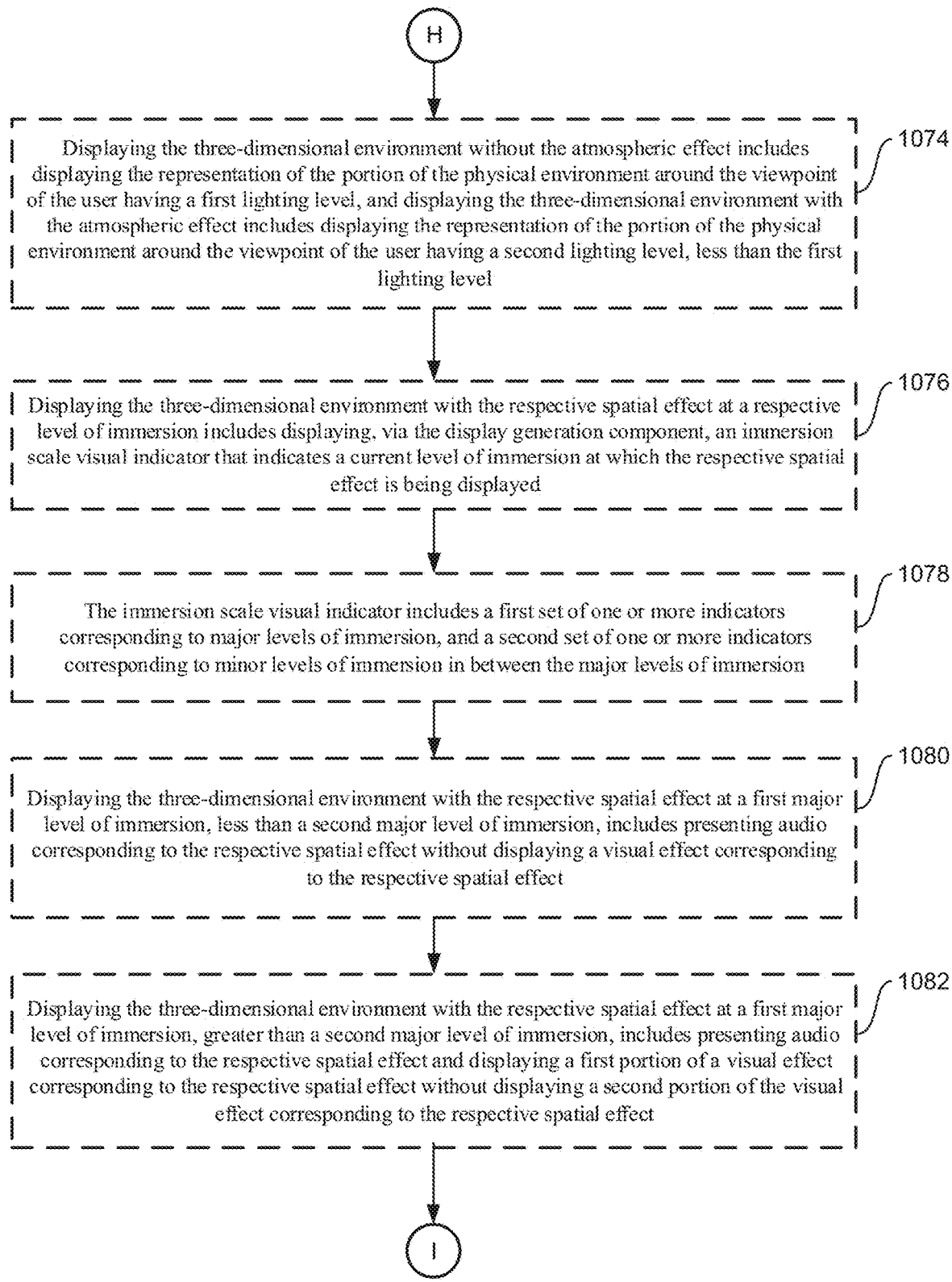
Figure 10J:
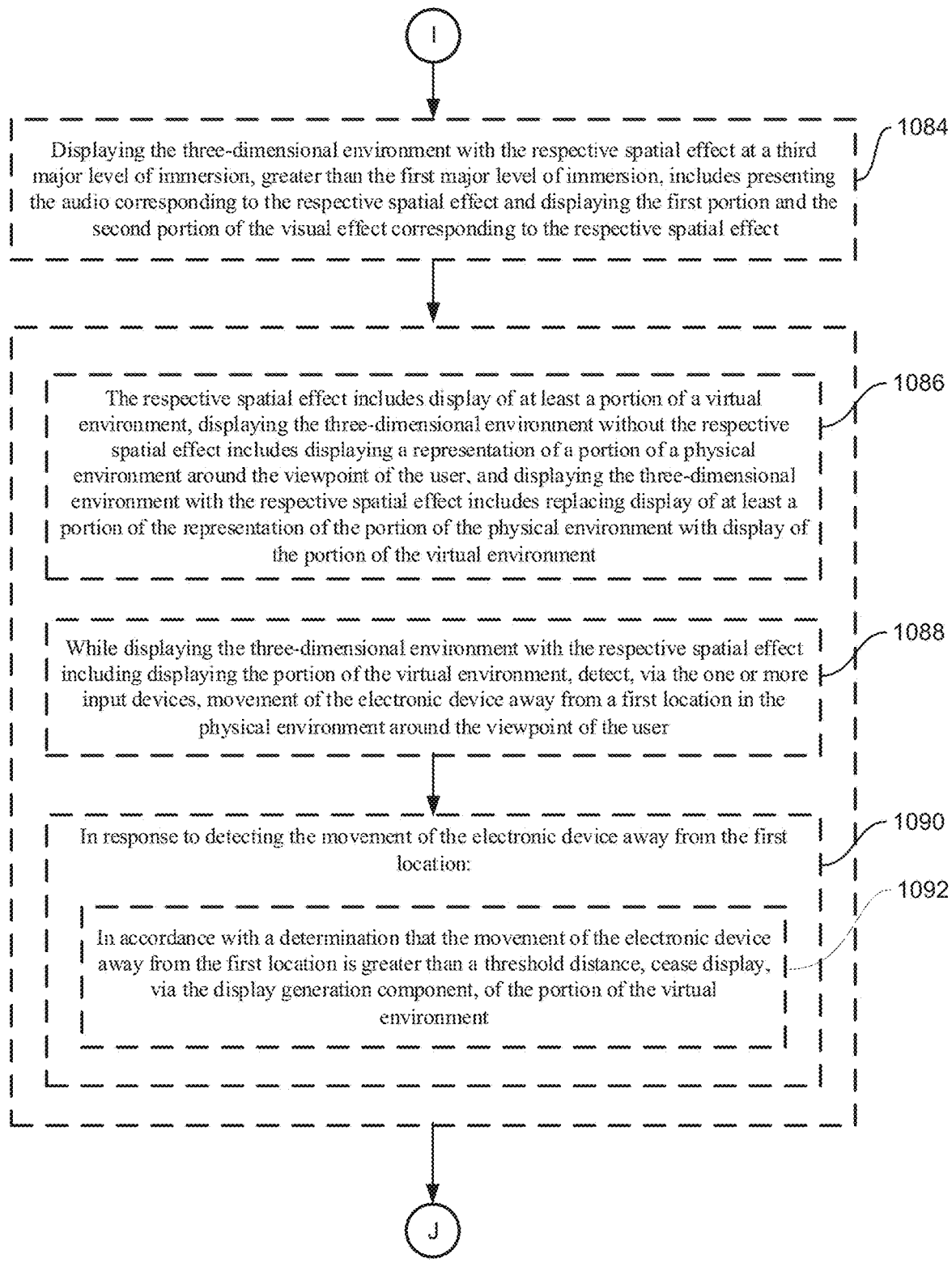
Figure 10K:
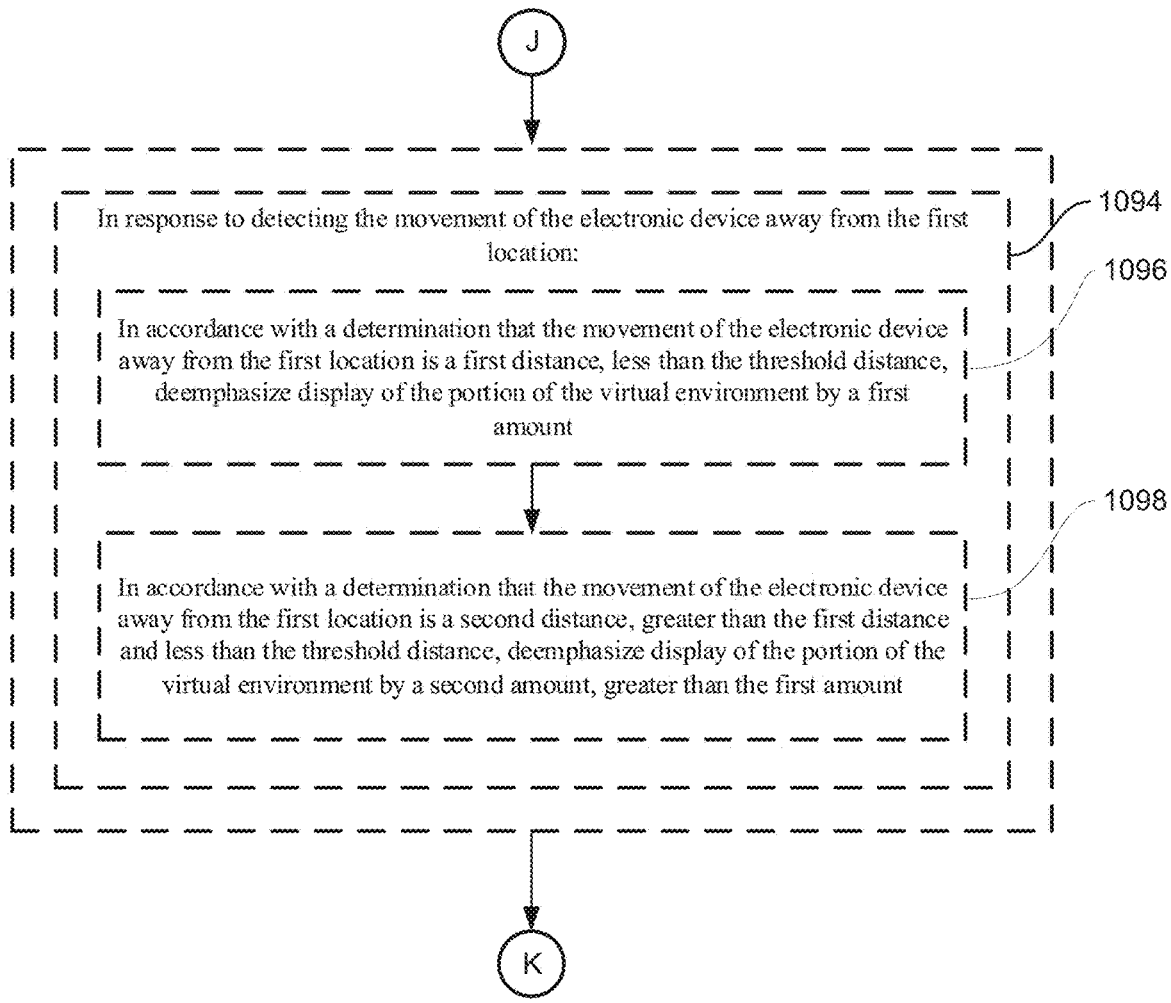
Figure 10L:
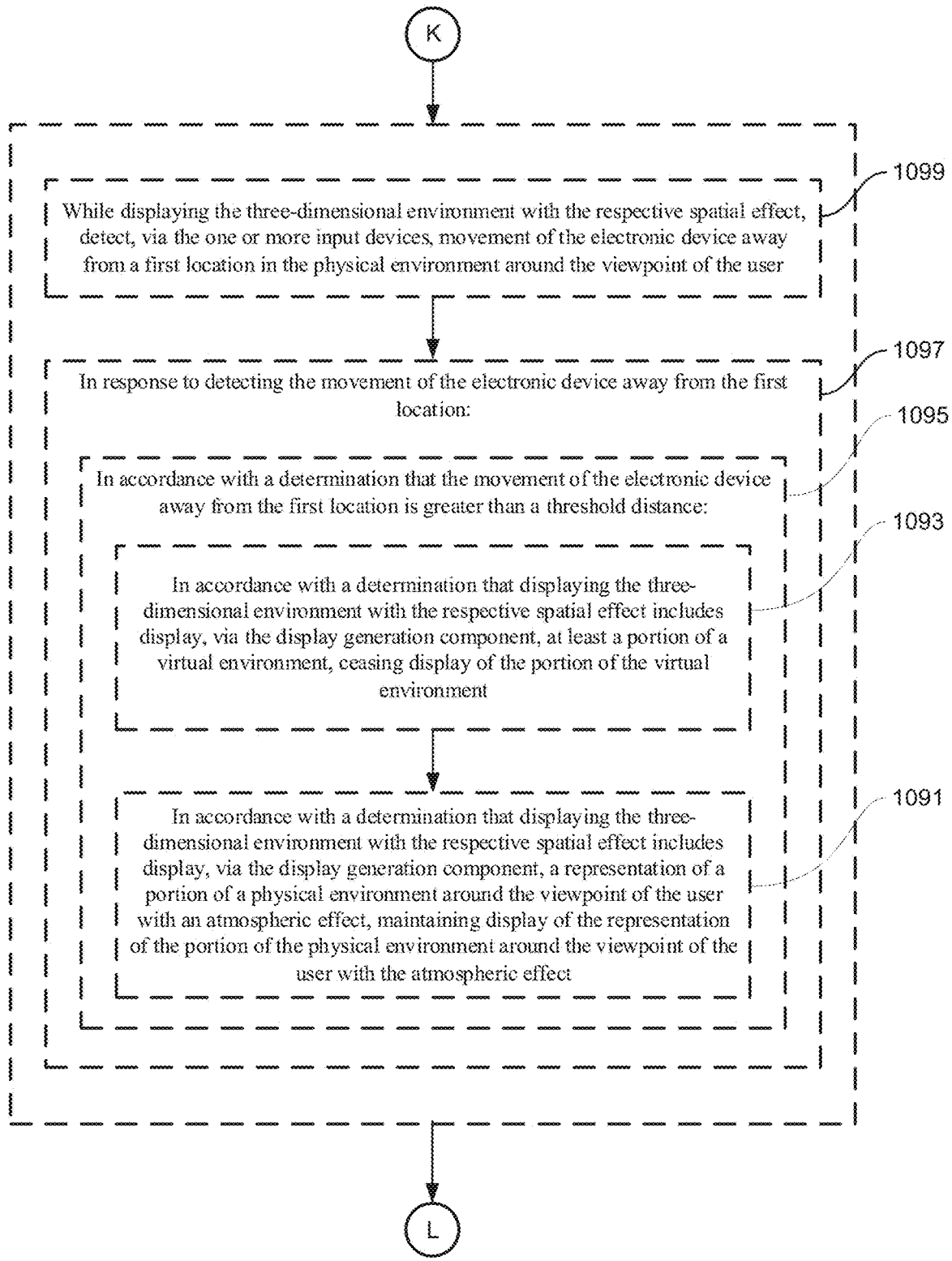
Figure 10M:
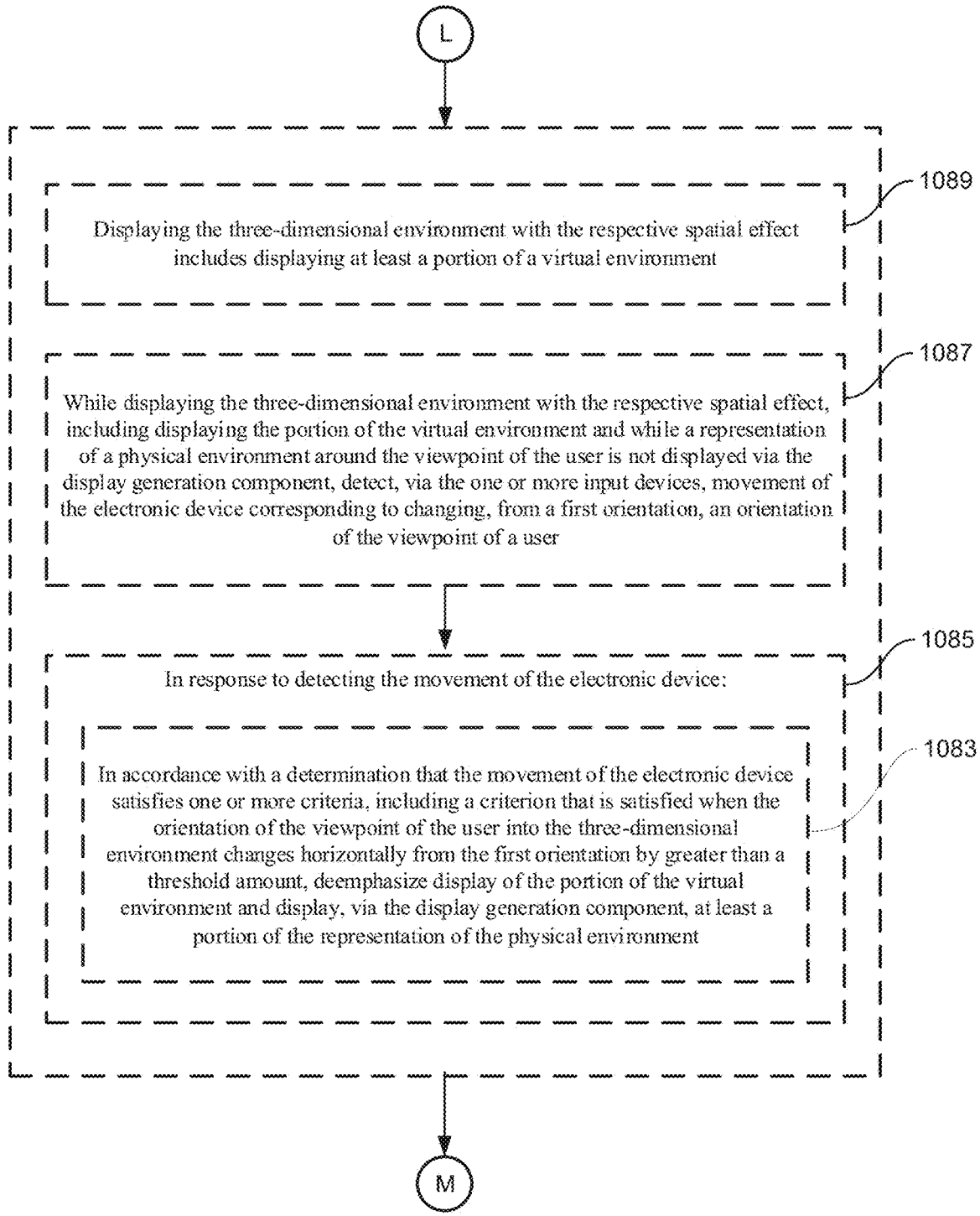
Figure 10N:
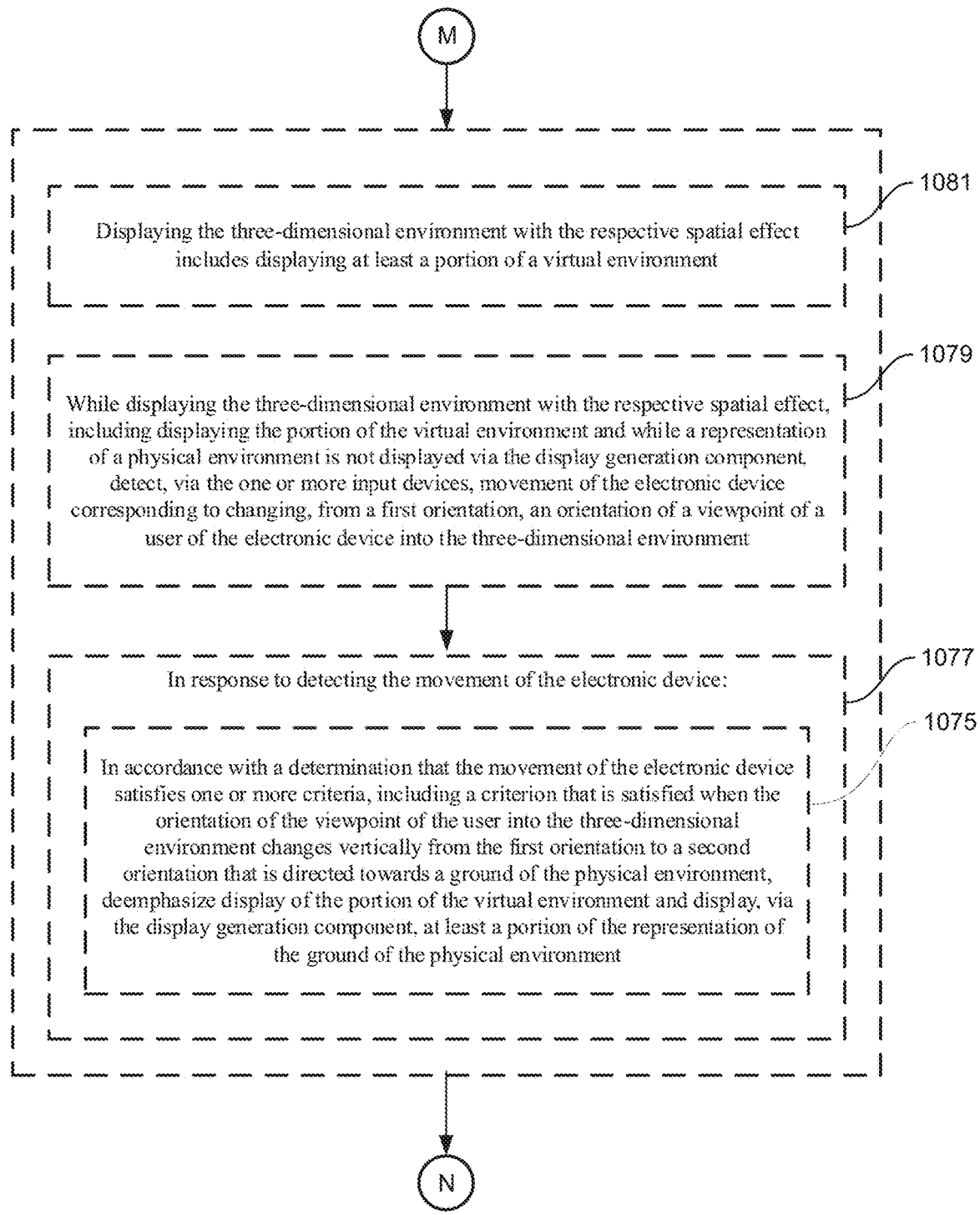
Figure 10O:
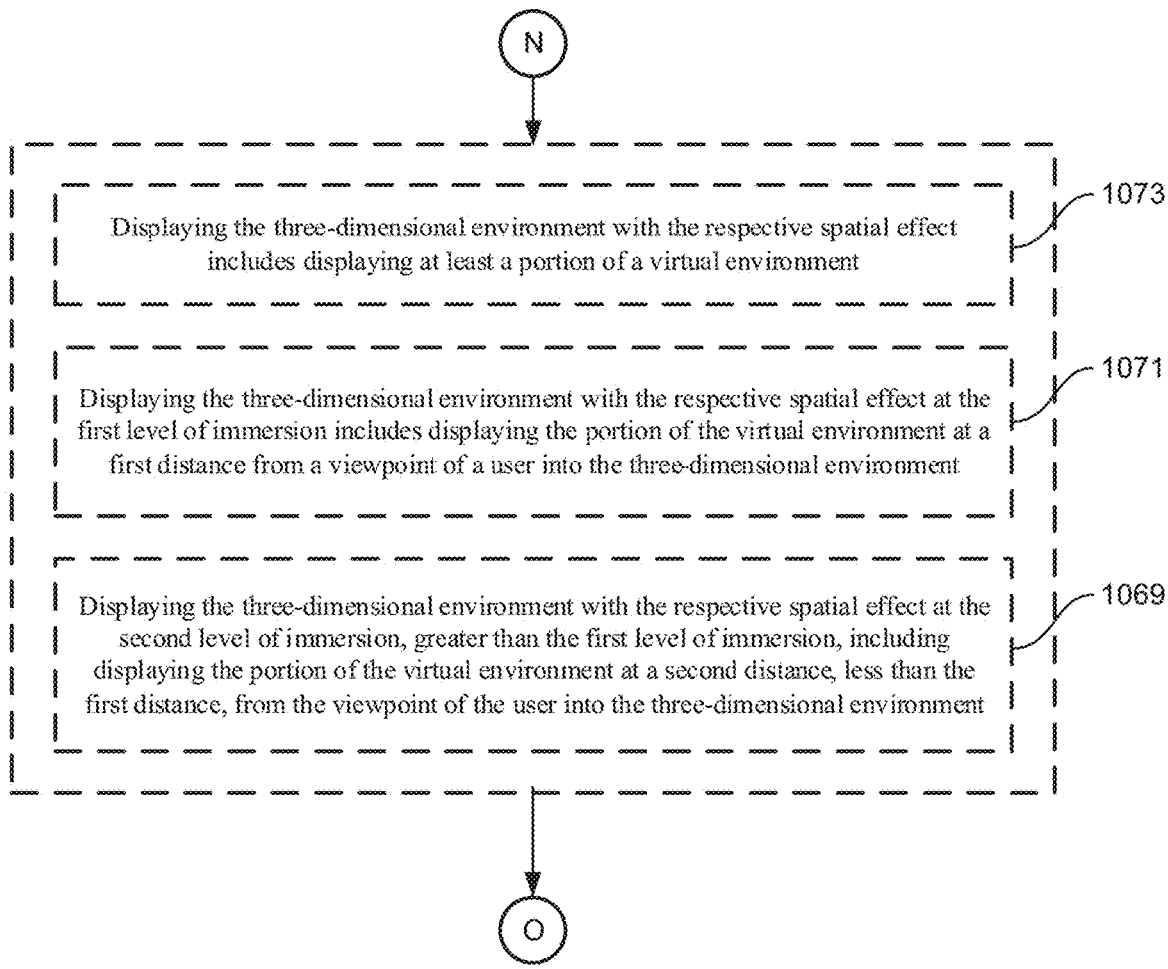
Figure 10P:
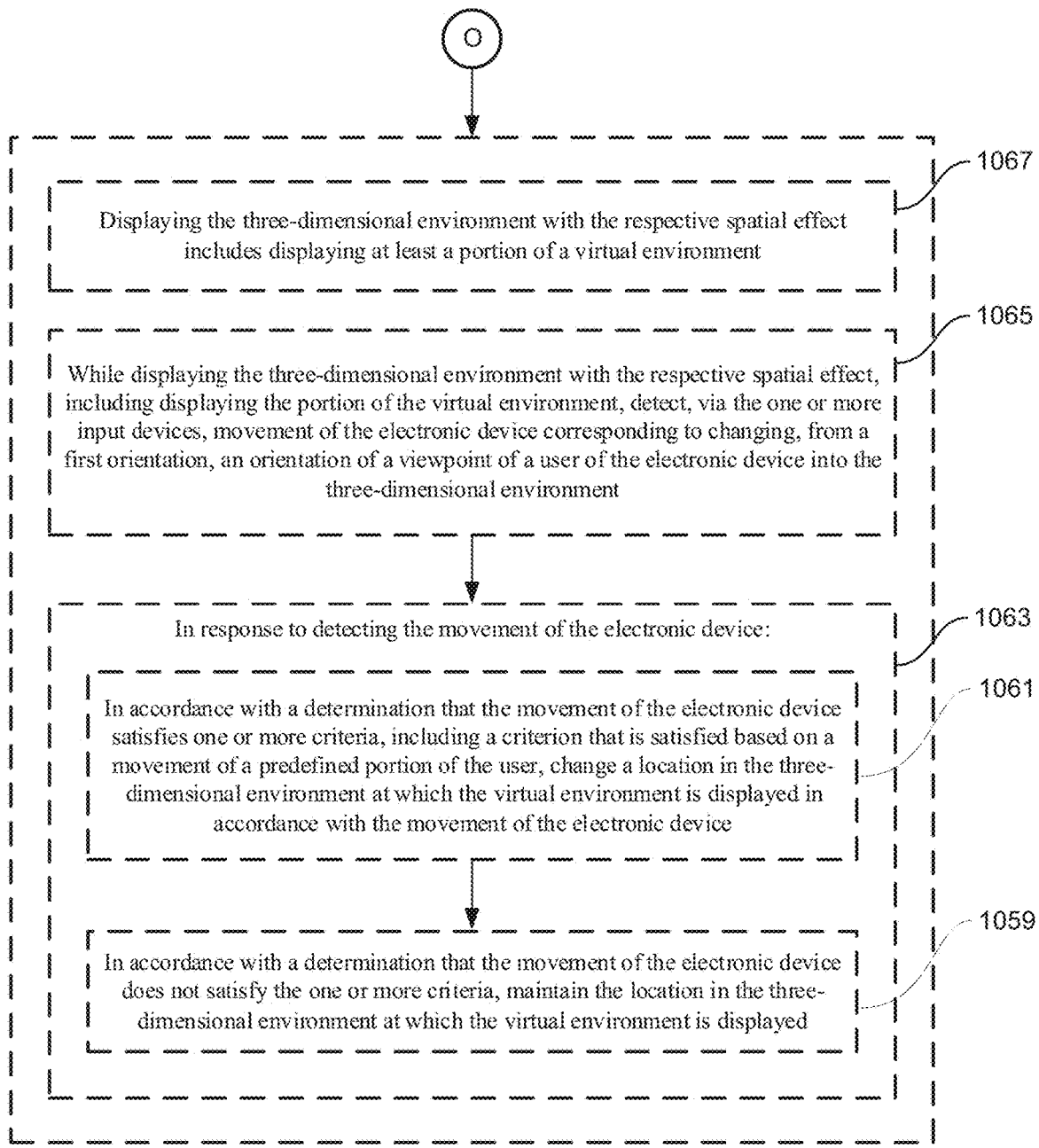

FIGS. 10A-10P is a flowchart illustrating a method 1000 of changing the immersion level for a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In the method 1000, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) while displaying, via the display generation component, a three-dimensional environment without a respective spatial effect (e.g., a representation of a physical environment, a simulated environment, a computer-generated reality, an extended reality, etc.), detects (1002), via the one or more input devices, a first input corresponding to a request to initiate the respective spatial effect, such as a selection of an affordance of representation of the respective spatial effect while three-dimensional environment 904 is not displaying a spatial effect, such as in FIG. 7A or 7B (e.g., detecting, via a hand tracking device, an eye tracking device, or any other input device, a movement of one or more hands of the user, a movement of and/or change in gaze of one or more eyes of the user, and/or any other input corresponding to a request to initiate a spatial effect).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the three-dimensional environment is an augmented reality environment or a mixed reality environment that optionally includes virtual objects and/or optionally includes representations of real world objects in the physical world around the electronic device. In some embodiments, the respective environment is based at least on the physical environment around the electronic device. For example, the electronic device is able to capture visual information about the environment around the user (e.g., the objects in the environment, the size and shape of the environment, etc.) and display at least a portion of the physical environment around the user to the user, optionally such that it appears as if the user is still located in the physical environment. In some embodiments, the three-dimensional environment is actively displayed to the user via the display generation component. In some embodiments, the three-dimensional environment is passively presented to the user via a partially transparent or translucent display through which the user is able to see at least a portion of the physical environment. In some embodiments, a spatial effect is an atmospheric transformation that modifies one or more visual characteristics of the three-dimensional environment such that it appears as if the three-dimensional environment is located at a different time, place, and/or condition (e.g., morning lighting instead of afternoon lighting, sunny instead of overcast, foggy, etc.). For example, a spatial effect includes a change in the warmth of the environment (e.g., warmth of the lighting sources), a change in the lighting of the environment (e.g., location, type, and/or brightness), a change in the shadows in the environment (e.g., simulating the addition of lighting sources, removal of lighting sources, or the change in position of the lighting sources), etc. In some embodiments, a spatial effect optionally does not add or remove objects to or from the three-dimensional environment. In some embodiments, the electronic device is able to contextually recognize windows and modify what is viewable through the windows in accordance with the spatial effect. For example, if the spatial effect includes displaying the three-dimensional environment as if it's in a rain forest, then the atmosphere of the three-dimensional environment is modified to appear dimly lit, humid, etc., and the windows are modified such that a rainforest scene is viewable through the windows. In some embodiments, a spatial effect includes displaying a simulated environment in or concurrently with the three-dimensional environment (e.g., in a manner similar to described above with respect to method 800).

In some embodiments, the request includes a selection of an affordance and/or a manipulation of a (e.g., mechanical) control element (e.g., similar to as described with reference to method 800) to increase the immersion level of the device and/or respective environment and/or a selection of an option associated with the respective spatial effect (e.g., from a plurality of available spatial effects). In some embodiments, the request includes a predetermined gesture recognized as a request to initiate a spatial effect. In some embodiments, the request includes a voice input requesting the display of a respective spatial effect.

In some embodiments, in response to detecting the first input, the electronic device displays (1004), via the display generation component, the three-dimensional environment with the respective spatial effect at a first level of immersion, such as in FIG. 9B (e.g., display the spatial effect in the three-dimensional environment at an initial immersion level).

In some embodiments, displaying the spatial effect includes modifying one or more visual characteristics of one or more elements in the three-dimensional environment. As described above, modifying the one or more visual characteristics can include changing the lighting temperature, direction, etc., of one or more lighting sources, which optionally causes the three-dimensional environment and/or objects in the three-dimensional environment to have a particular atmospheric effect and/or be located at a particular time and/or place, etc. In some embodiments, when the spatial effect is initially displayed, it is displayed at an initial immersion level. In some embodiments, the initial immersion level is an intermediate immersion level (e.g., not the maximum and not the minimum immersion level), which can be increased and/or decreased. In some embodiments, the initial immersion level is the lowest immersion level. In some embodiments, the initial immersion level is the highest immersion level. In some embodiments, a higher immersion level corresponds to an increased spatial effect and a lower immersion level corresponds to a decreased spatial effect. For example, a high immersion level for a sunset spatial effect optionally includes modifying the three-dimensional environment to have a strong orange glow (e.g., sunset lighting), and a low immersion level optionally includes modifying the three-dimensional environment to have a mild orange glow. In some embodiments, displaying the spatial effect includes displaying a simulated environment in the three-dimensional environment. In some embodiments, displaying the simulated environment includes transitioning a portion of the three-dimensional environment into the simulated environment in a manner similar to described above with respect to method 800. In some embodiments, displaying the simulated environment at a first level of immersion includes displaying a subset of the simulated environment (e.g., displaying a first portion of the simulated environment, but not a second portion of the simulated environment that is optionally closer to the user).

In some embodiments, while displaying the three-dimensional environment with the respective spatial effect at the first level of immersion, the electronic device detects (1006), via the one or more input devices, a respective input (e.g., detecting, via a hand tracking device, an eye tracking device, or any other input device, a movement of one or more hands of the user, a movement of and/or change in gaze of one or more eyes of the user, and/or any other input corresponding to a request to change the immersive level of the respective spatial effect).

In some embodiments, the user input includes a manipulation of a rotational element, such as a mechanical dial or a virtual dial to increase or decrease the level of immersion (e.g., a clockwise rotation to increase, a counter-clockwise rotation to decrease, or vice versa). In some embodiments, the user input includes a manipulation of a displayed control element (e.g., a slider, an immersion indicator, etc.) to increase or decrease the level of immersion. In some embodiments, the user input includes a voice input requesting an increase or decrease in the level of immersion.

In some embodiments, in response to detecting the respective input (1008), in accordance with a determination that the respective input is a first input, the electronic device displays (1010), via the display generation component, the three-dimensional environment with the respective spatial effect at a second level of immersion, greater than the first level of immersion, such as in FIG. 9D (e.g., increasing the immersion level from the initial immersion level to a second, higher immersion level in accordance with the respective input) and in accordance with a determination that the respective input is a second input, different from the first input, the electronic device displays (1012), via the display generation component, the three-dimensional environment with the respective spatial effect at a third level of immersion, less than the first level of immersion, such as if the immersion level of three-dimensional environment 904 in FIG. 9D was at two or one (e.g., decreasing the immersion level from the initial immersion level to a third, lower immersion level in accordance with the respective input).

For example, if the respective input is a rotation of a rotational element in a direction associated with increasing the immersion level, then the immersion level for the spatial effect is increased from its initial position to a higher level. In some embodiments, increasing the level of immersion includes amplifying or increasing the effects of the spatial effect on the three-dimensional environment. For example, if one of the spatial effects on the three-dimensional environment (e.g., of the one or more spatial effects associated with the respective spatial effect) includes increasing the brightness of the three-dimensional environment, then increasing from the initial immersion level to a higher immersion level includes further increasing the brightness of the three-dimensional environment. In some embodiments, increasing the immersion level to a higher level includes any one of increasing the brightness or intensity of one or more visual effects, decreasing the brightness or intensity of one or more visual effects, displaying visual effects that were not previously displayed, displaying fewer visual effects, changing the visual effects, increasing or decreasing one or more audio effects, playing more audio effects that were not previously played, playing fewer audio effects, changing the audio effect, etc. In some embodiments, displaying the simulated environment at a second level of immersion includes increasing the size of the simulated environment and/or displaying more of the simulated environment (e.g., displaying the first portion of the simulated environment and the second portion of the simulated environment that is optionally closer to the user).

For example, if the respective input is a rotation of a rotational element in a direction associated with decreasing the immersion level, then the immersion level for the spatial effect is decreased from its initial position to a lower level. In some embodiments, decreasing the level of immersion includes decreasing the effects of the spatial effect on the three-dimensional environment. For example, if one of the spatial effects on the three-dimensional environment (e.g., of the one or more spatial effects associated with the respective spatial effect) includes increasing the brightness of the three-dimensional environment, then decreasing from the initial immersion level to a lower immersion level includes reducing the brightness of the three-dimensional environment (e.g., optionally to a level that is lower than the ambient brightness of the three-dimensional environment without the respective spatial effect or optionally to a level that is the same or higher than the ambient brightness of the three-dimensional environment without the respective spatial effect). In some embodiments, decreasing the immersion level to a higher level includes any one of increasing the brightness or intensity of one or more visual effects, decreasing the brightness or intensity of one or more visual effects, displaying visual effects that were not previously displayed, displaying fewer visual effects, changing the visual effects, increasing or decreasing one or more audio effects, playing more audio effects that were not previously played, playing fewer audio effects, changing the audio effect, etc. In some embodiments, displaying the simulated environment at a third level of immersion includes decreasing the size of the simulated environment and/or displaying less of the simulated environment (e.g., displaying less than the first portion of the simulated environment).

The above-described manner of initiating a respective spatial effect (e.g., by applying the respective spatial effect to the three-dimensional environment at an intermediate immersion level which can be increased or decreased) introduces the spatial effect at a level less than a fully immersive level (e.g., which maintains display of at least a portion of the three-dimensional environment and reduces the potentially jarring effect of displaying the spatial effect), which simplifies the interaction between the user and the electronic device and enhances the operability of the electronic device and makes the user-device interface more efficient (e.g., by displaying the spatial effect at an initial immersion level and enabling the user to increase or decrease the magnitude of the spatial effect as desired), which additionally reduces power usage and improves battery life of the electronic device by enabling the user to use the electronic device more quickly and efficiently, while reducing errors in usage.

In some embodiments, the respective spatial effect includes display of at least a portion of a virtual environment, displaying the three-dimensional environment without the respective spatial effect includes displaying a representation of a portion of a physical environment around the viewpoint of the user, and displaying the three-dimensional environment with the respective spatial effect includes replacing display of at least a portion of the representation of the portion of the physical environment with display of the portion of the virtual environment (1014), such as in FIG. 9A (e.g., the spatial effect includes displaying a simulated environment such as those described above with respect to method 800).

In some embodiments, the simulated environment is displayed at (e.g., encompasses) a first portion of the three-dimensional environment. In some embodiments, a second portion of the three-dimensional environment includes a representation of a portion of the physical environment (e.g., the real world environment around the user and/or device).

The above-described manner of initiating display of a simulated environment (e.g., by initially displaying a simulated environment at an intermediate immersion level which can be increased or decreased) introduces the simulated environment at a level less than a fully immersive level (e.g., which maintains display of at least a portion of the three-dimensional environment and reduces the potentially jarring effect of displaying the spatial effect), which simplifies the interaction between the user and the electronic device and enhances the operability of the electronic device and makes the user-device interface more efficient (e.g., by displaying the simulated environment at an initial immersion level and enabling the user to increase or decrease the amount of the simulated environment as desired), which additionally reduces power usage and improves battery life of the electronic device by enabling the user to use the electronic device more quickly and efficiently, while reducing errors in usage.

In some embodiments, displaying the three-dimensional environment with the respective spatial effect includes presenting audio corresponding to the virtual environment (1016), such in FIG. 9A, as indicated by speaker 924 (e.g., the respective spatial effect includes playing audible effects (e.g., via speakers, via earbuds, via headphones, etc.) associated with the displayed virtual environment and/or spatial effect). In some embodiments, the audible effect includes environment noises or sounds, such as running water, whistling wind, chirping birds, etc. that correspond to the visual content of the virtual environment.

In some embodiments, while displaying the three-dimensional environment with the respective spatial effect and presenting the audio corresponding to the virtual environment, the electronic device detects (1018), via the one or more input devices, movement of the electronic device corresponding to changing, from a first orientation, an orientation of a viewpoint of a user of the electronic device into the three-dimensional environment, such as in FIGS. 9E-9H (e.g., detecting that the user and/or device has changed orientations within its physical environment, which optionally causes the representation of the physical environment to change orientation in accordance with the change in orientation of the user and/or device).

For example, if the user turns the device 45 degrees to the left, the device shifts the display of the three-dimensional environment 45 degrees to the left to reveal portions of the three-dimensional environment to the left of what was previously displayed and ceases display of the portion of the three-dimensional environment on the right side of what was previously displayed. In this way, the environment adjusts in such a way such that it appears as if the user is looking around the three-dimensional environment in the same way the user would look around his or her physical environment. In some embodiments, as the user and/or device change orientations, the user is able to see the boundary between the physical environment and virtual environment. In some embodiments, the virtual environment expands in the direction of the rotation of the device (e.g., follows the rotation of the user, optionally with a delay). In some embodiments, the virtual environment does not expand in the direction of the rotation of the device.

In some embodiments, in response to detecting the movement of the electronic device (1020), in accordance with a determination that the movement of the electronic device satisfies one or more criteria, including a criterion that is satisfied when the orientation of the viewpoint of the user into the three-dimensional environment changes from the first orientation by greater than a threshold amount, the electronic device deemphasizes (1022) at least a component of the audio corresponding to the virtual environment, such as in FIG. 9E (e.g., if the user and/or device has changed orientation by more than a threshold amount (e.g., more than 30 degrees, 45 degrees, 90 degrees, etc.) or by a predetermined amount (e.g., more than 45 degrees but less than 90 degrees, more than 60 degrees but less than 120 degrees, etc.), then reduce the audible effects that are provided to the user).

In some embodiments, reducing the audible effects includes disabling all audible effects associated with the spatial effect. In some embodiments, reducing the audible effects includes reducing the volume of the audible effects associated with the spatial effect. In some embodiments, reducing the audible effects removing discrete components and/or tracks from the audible effects (e.g., removing the chirping birds component, but maintaining the running waters component, optionally at the same volume as before).

The above-described manner of reducing the effect of the audio component (e.g., by detecting that the viewpoint has changed by a threshold amount and deemphasizing the audio) provides a quick and efficient way of allowing the user to re-engage with his or her physical environment (e.g., by automatically reducing the audio effects when the user turns his or her head, for example, in the direction of a sound source and/or away from the virtual environment, thus allowing a user to hear sounds from his or her physical environment, without requiring the user to perform additional inputs to deemphasize the audio effects), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, deemphasizing at least the component of the audio corresponding to the virtual environment includes reducing a degree with which the audio is presented as being generated from different directions in the three-dimensional environment (1024), such as in FIG. 9E (e.g., reducing the volume of at least one component of the audio associated with the spatial effect). In some embodiments, reducing the degree includes reducing the volume of all components of the audio associated with the spatial effect. In some embodiments, reducing the degree includes reducing the volume of a subset of the components of the audio while maintaining the volume of other components of the audio. In some embodiments, deemphasizing at least the component of the audio includes reducing the number of audio channels, for example, from 5 audio channels (e.g., surround sound) to stereo (e.g., 2 audio channels) and/or from stereo to mono (e.g., one audio channel).

The above-described manner of reducing the effect of the audio component (e.g., by detecting that the viewpoint has changed by a threshold amount and deemphasizing the audio) provides a quick and efficient way of allowing the user to re-engage with his or her physical environment (e.g., by automatically reducing the audio effects when the user turns his or her head, for example, in the direction of a sound source and/or away from the virtual environment, thus allowing a user to hear sounds from his or her physical environment, without requiring the user to perform additional inputs to deemphasize the audio effects), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, deemphasizing at least the component of the audio corresponding to the virtual environment includes reducing an amount of noise cancellation with which the audio corresponding to the virtual environment is presented (1026) (e.g., reducing the noise cancelling effect of the electronic device and/or headphones/speakers/earbuds via which the audio is being presented).

In some embodiments, the electronic device is in communication with one or more speakers (or any other noise or audio generating component). In some embodiments, the one or more speakers have one or more noise cancelling features which at least partially reduce (e.g., cancel) the sounds from the user's physical environment (e.g., ambient sounds). In some embodiments, reducing the noise cancelling effect includes reducing the magnitude of the noise cancelling (e.g., cancelling 10% less ambient noise, cancelling 20% less ambient noise, cancelling 50% less ambient noise, etc.). In some embodiments, reducing the noise cancelling effect includes passively allowing ambient noise to reach the user (e.g., disabling noise cancelling). In some embodiments, reducing the noise cancelling effect includes enabling an active transparency listening mode (e.g., actively providing ambient sounds to the user, for example, to overcome the passive sound dampening effects of headphones and/or earbuds).

The above-described manner of reducing the immersive effect of the virtual environment (e.g., by reducing the noise cancelling features of the device) provides a quick and efficient way of allowing the user to re-engage with his or her physical environment (e.g., by automatically reducing the audio effects and allowing ambient noise to pass through when the user turns his or her head, for example, in the direction of a sound source and/or away from the virtual environment, thus allowing a user to hear sounds from his or her physical environment, without requiring the user to perform additional inputs to deemphasize the audio effects), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, deemphasizing at least the component of the audio corresponding to the virtual environment includes reducing a number of audio components with which the audio corresponding to the virtual environment is presented (1028), such as in FIG. 9E (e.g., reducing or ceasing at least some of the audio components of the audio associated with the virtual environment). For example, reducing (e.g., to zero) the volume of one or more tracks of the audio but maintaining the volume of other tracks of the audio.

The above-described manner of reducing the immersive effect of the virtual environment (e.g., by reducing the number of audio components that are provided) provides a quick and efficient way of allowing the user to re-engage with his or her physical environment (e.g., by automatically reducing the amount of audio effects and allowing ambient noise to pass through when the user turns his or her head, for example, in the direction of a sound source and/or away from the virtual environment, without requiring the user to perform additional inputs to deemphasize the audio effects), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the three-dimensional environment with the respective spatial effect at the first level of immersion, the electronic device detects (1030), via the one or more input devices, a user input corresponding to a request to display the three-dimensional environment with the respective spatial effect at a maximum level of immersion, such as detecting an input to increase the immersion level to nine, such as in FIG. 9E-9F (e.g., receiving a user input interacting with a displayed immersion affordance or interacting with a mechanical dial). In some embodiments, the user input includes a request to increase the immersion to the maximum level of immersion. For example, selecting the affordance associated with the highest level of immersion and/or performing a rotation input on the mechanical dial associated with requesting the highest level of immersion.

In some embodiments, in response to detecting the user input (1032), in accordance with a determination that a user-defined setting, independent of the user input, has a first value (e.g., a system setting that sets the maximum level of immersion is able to be adjusted by the user), the electronic device displays (1034), via the display generation component, the three-dimensional environment with the respective spatial effect at a first respective level of immersion (e.g., if the user-defined setting for the maximum level of immersion is a first value (e.g., 180 degrees), then increase the level of immersion to the first value based on the user-defined setting), and in accordance with a determination that the user-defined setting has a second value, different from the first value, the electronic device displays (1036), via the display generation component, the three-dimensional environment with the respective spatial effect at a second respective level of immersion, greater than the first respective level of immersion, such as if the maximum immersion level is capped by a user defined setting in FIGS. 9E-9F (e.g., if the user-defined setting for the maximum level of immersion is a second value (e.g., 360 degrees), then increase the level of immersion to the second value based on the user-defined setting).

For example, the maximum level of immersion can be 45 degrees of immersion (e.g., 45 degrees of the three-dimensional environment relative to the user will be occupied by virtual objects/environments, and the remainder will be occupied by the physical environment), 90 degrees of immersion, 180 degrees of immersion, 360 degrees of immersion, etc. In some embodiments, the maximum level of immersion can be set to be equal to the field of view (e.g., the maximum angle of immersion is equal to the angle of the field of view of the three-dimensional environment, such as 180 degrees or approximately 180 degrees).

The above-described manner of providing a user-defined setting for the maximum level of immersion provides a quick and efficient way of allowing the user to limit the maximum level of immersion (e.g., by limiting the immersion to the user-defined maximum level of immersion, without requiring the user to perform additional user inputs to reduce or increase the immersion level every time the immersion level is increased to maximum), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

Figure 11A:
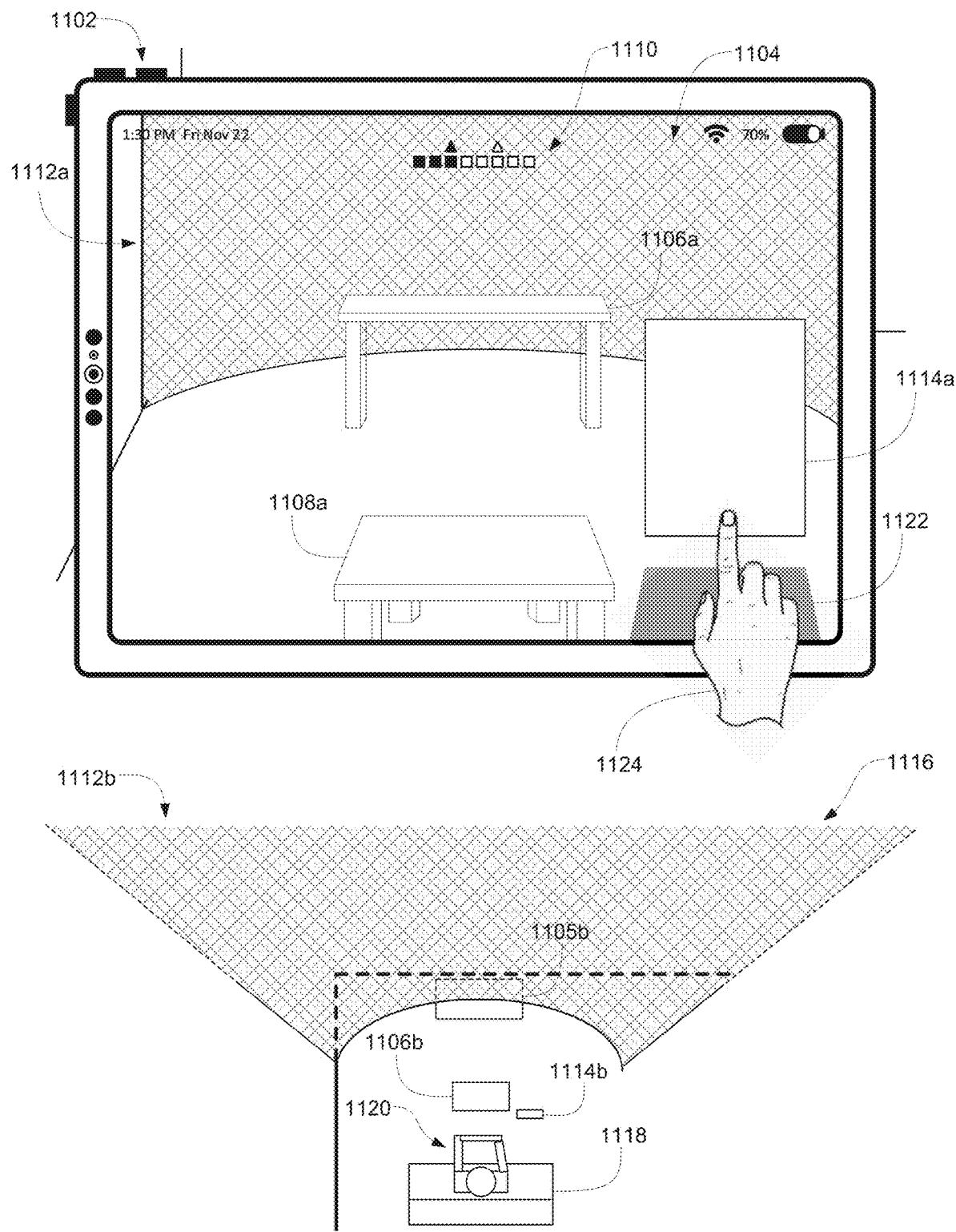
FIGS. 11A-11D illustrate examples of moving an object into or out of a virtual environment in accordance with some embodiments.
Figure 11B:
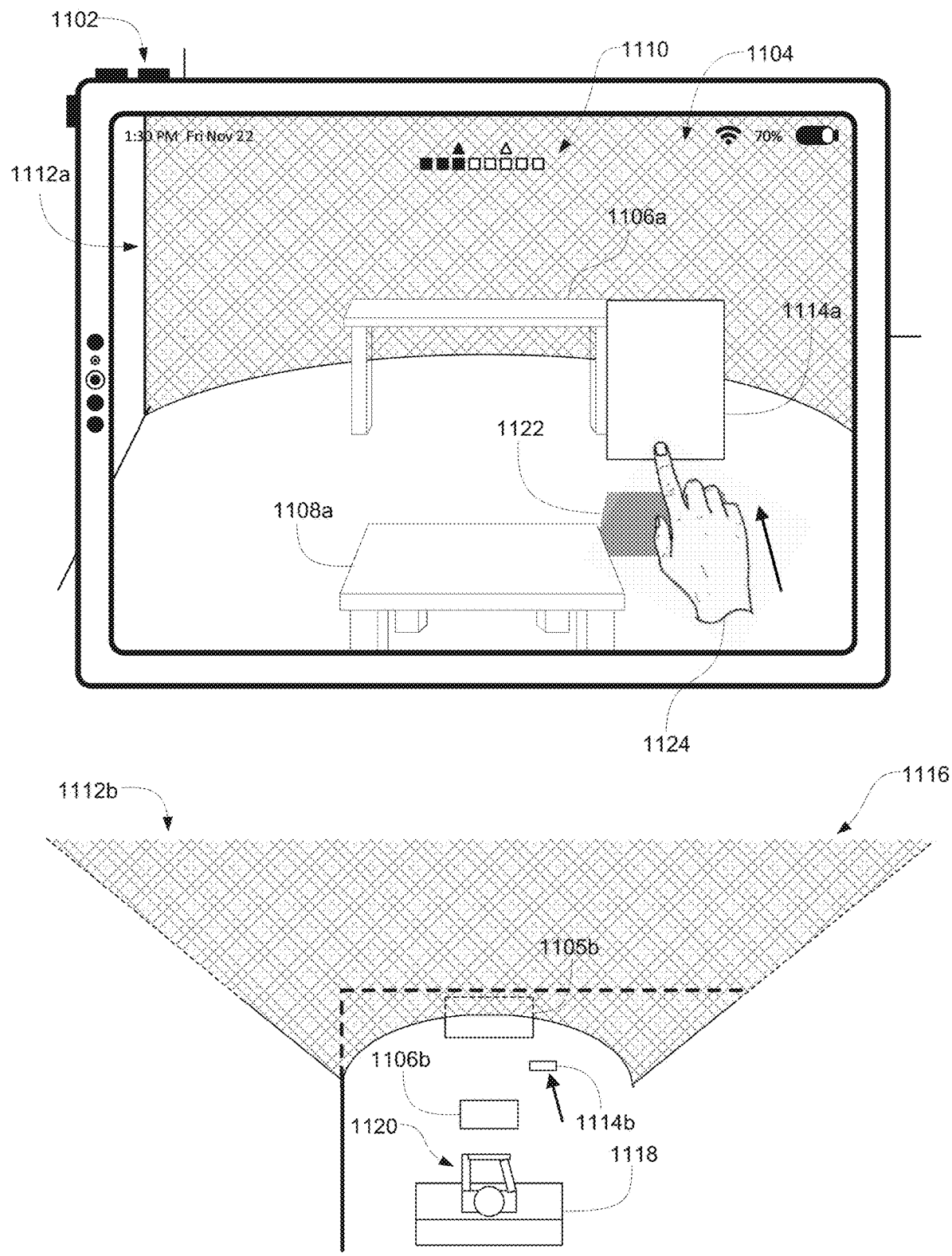
Figure 11C:
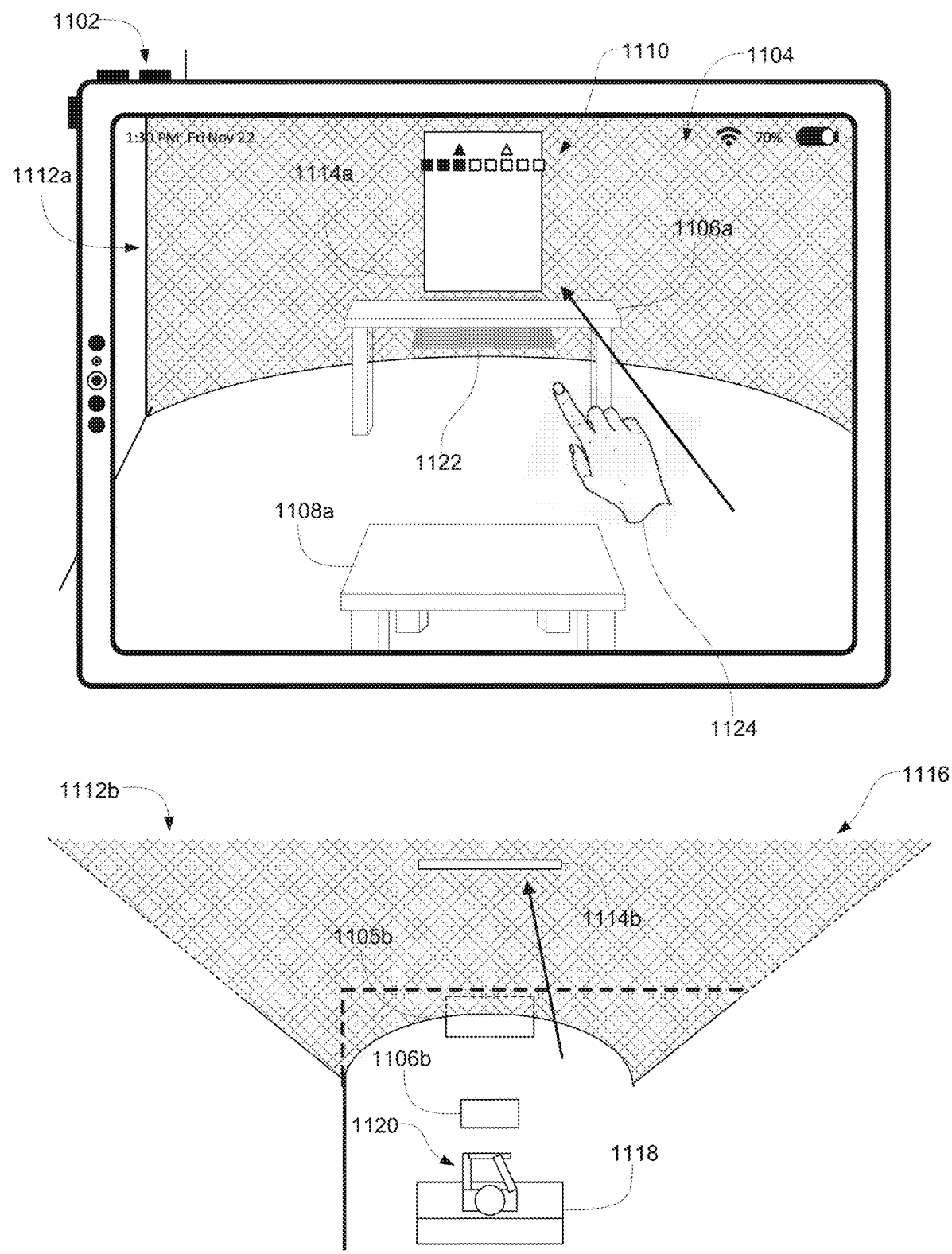
Figure 11D:
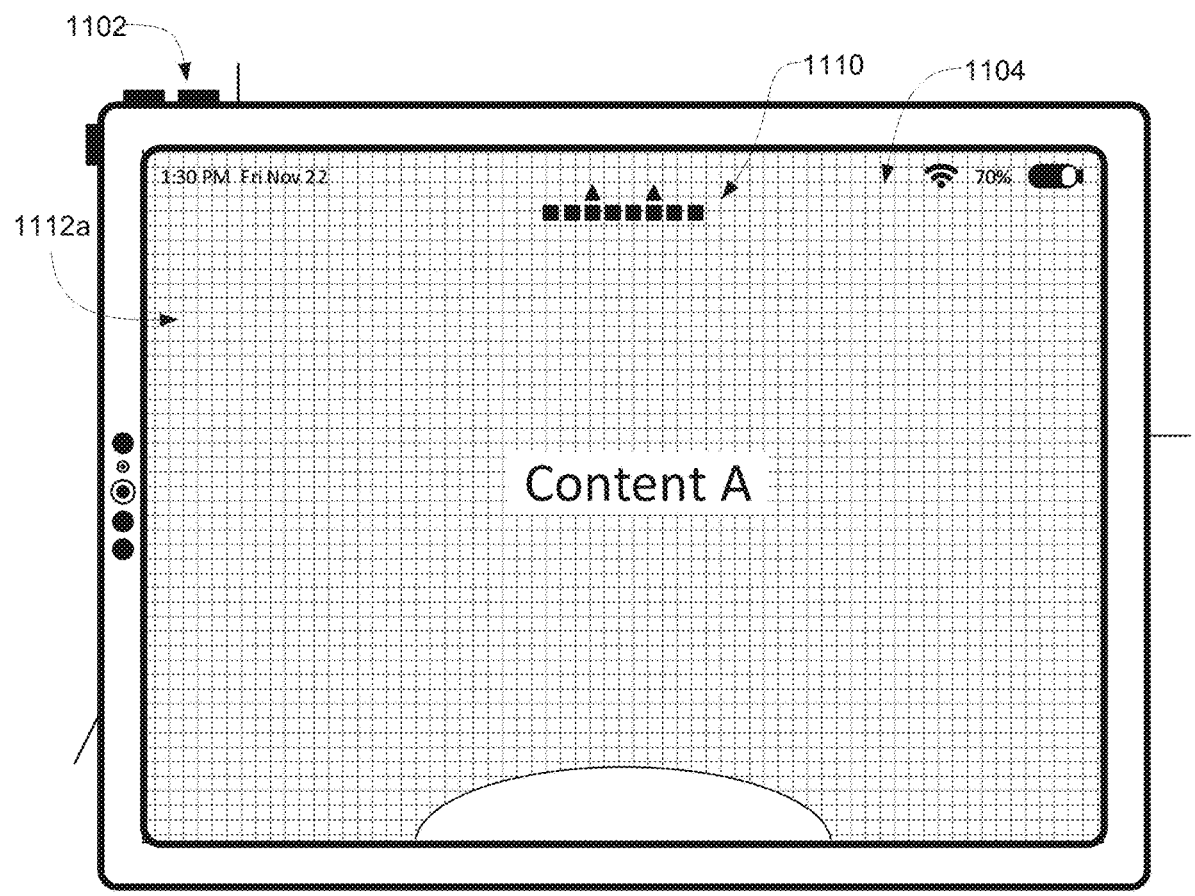
Figure 11D:
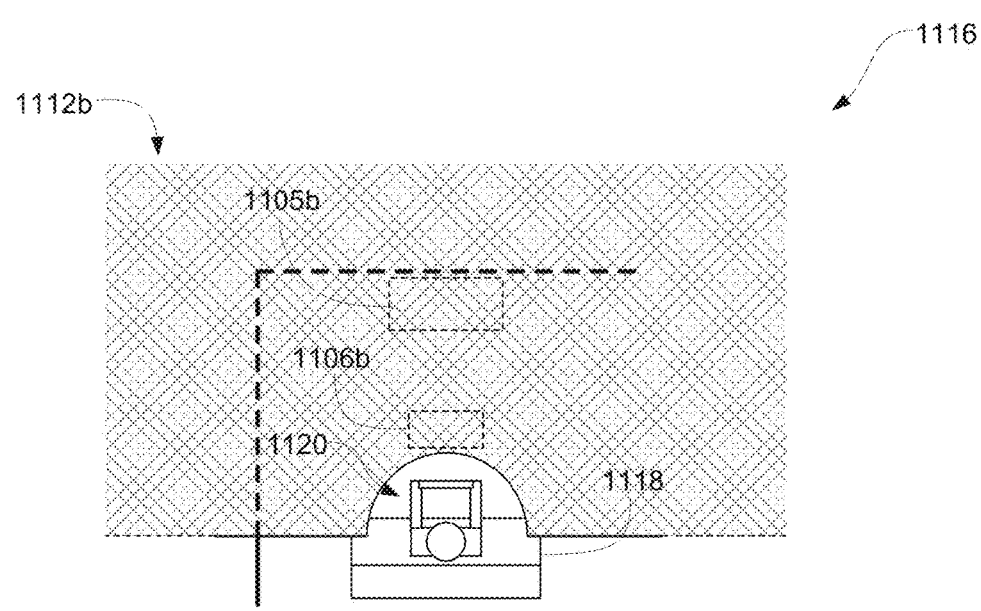
Figure 12A:
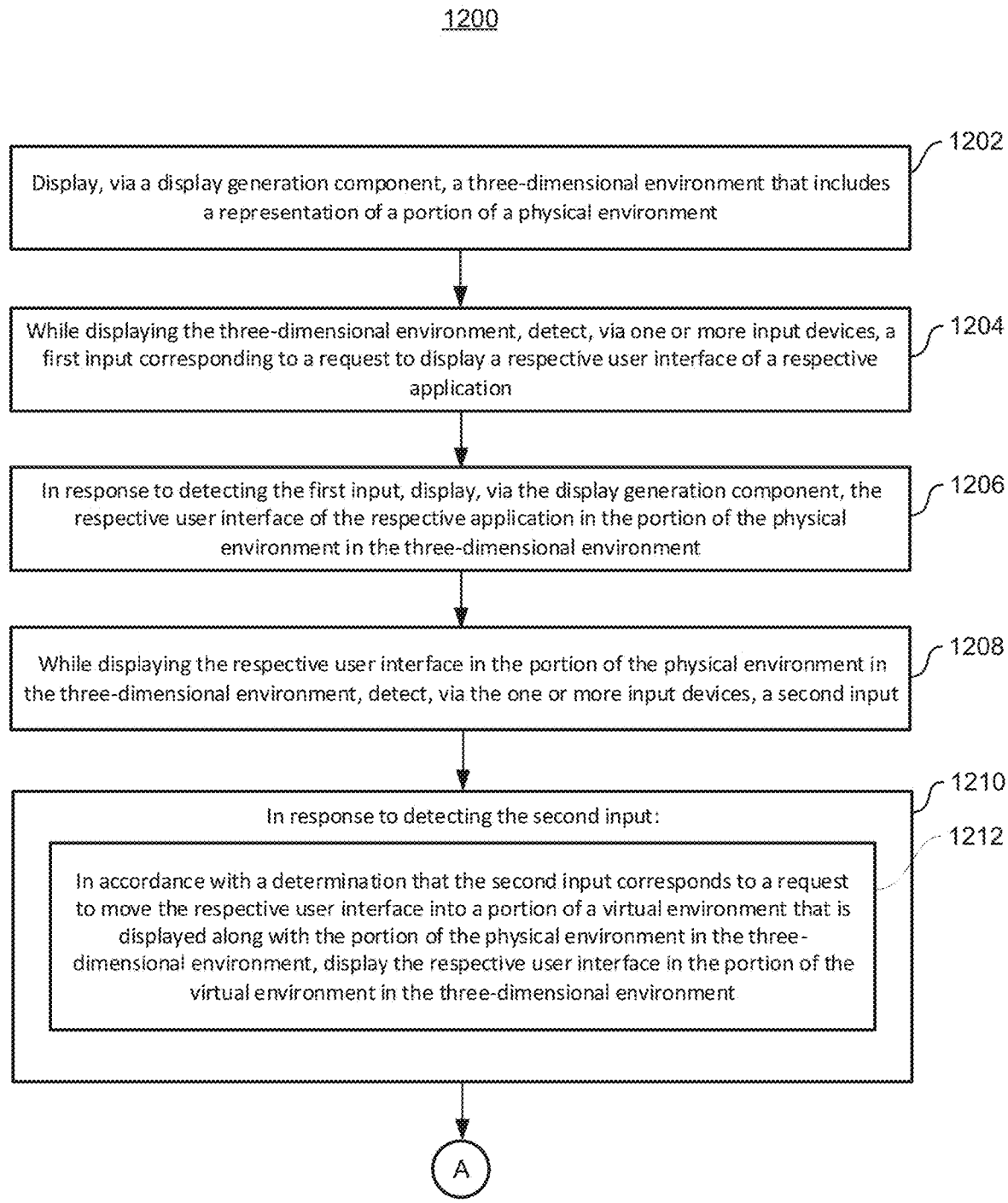
FIGS. 12A-12G is a flowchart illustrating a method of moving an object into or out of a virtual environment in accordance with some embodiments.
Figure 12B:
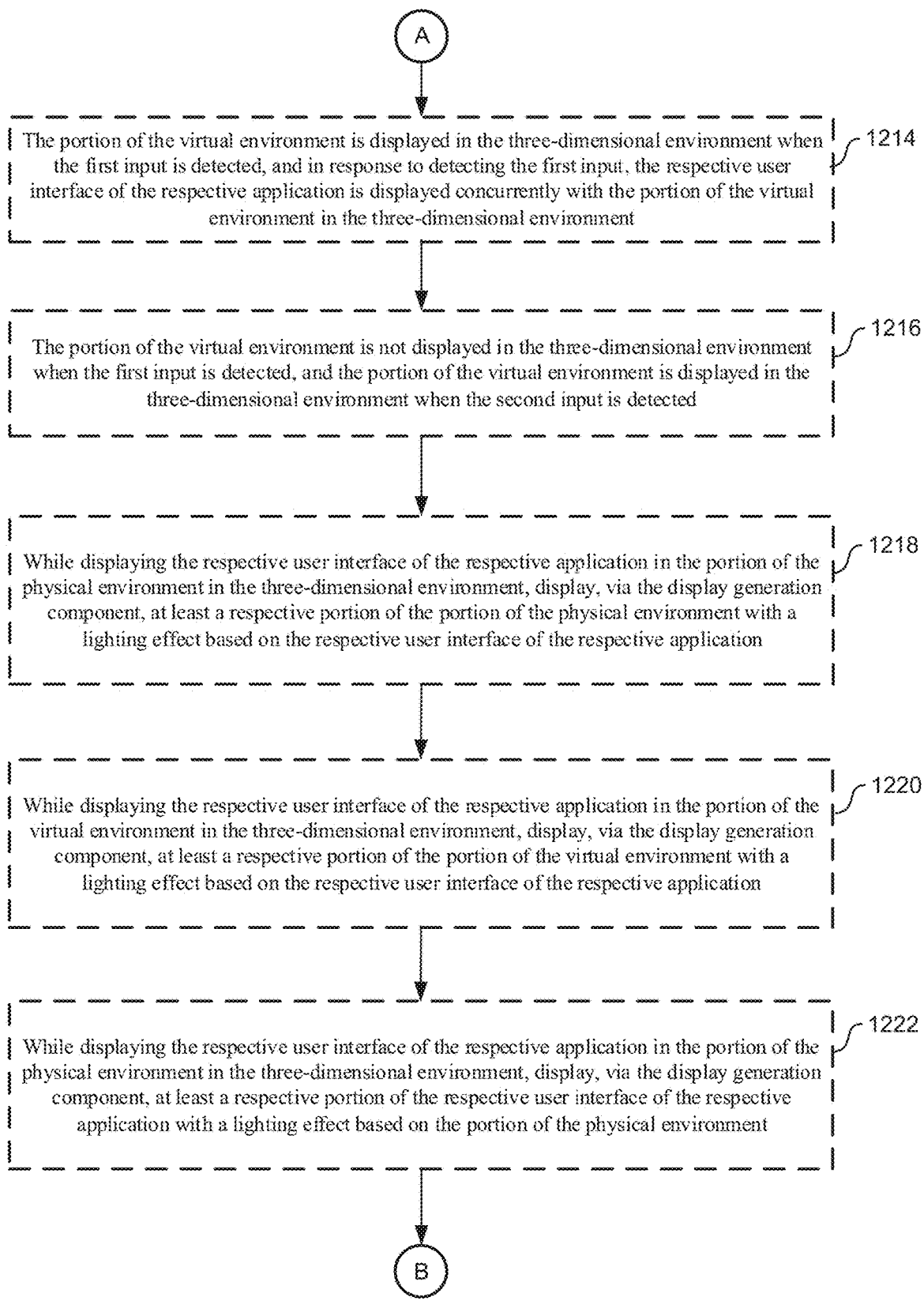
Figure 12C:
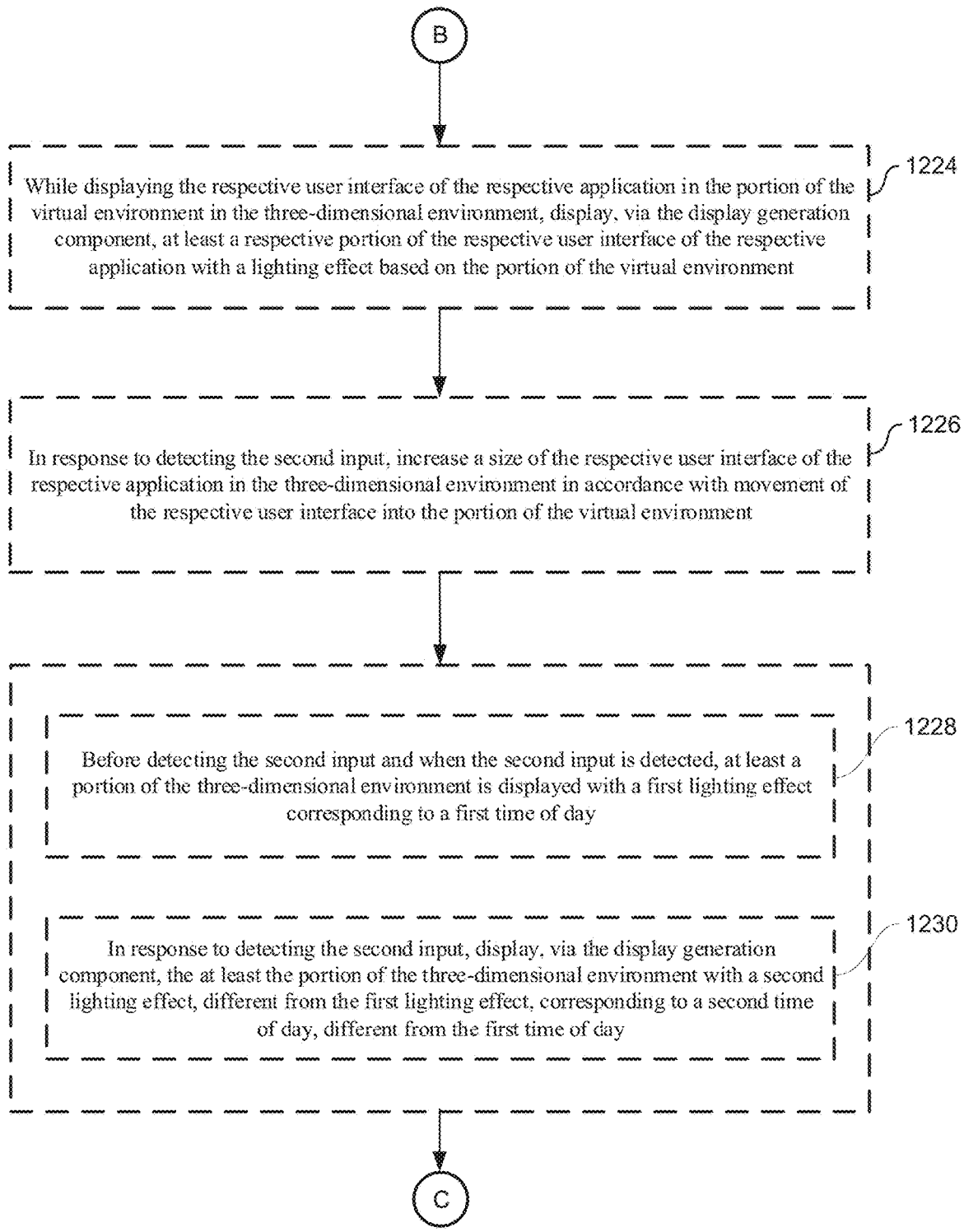
Figure 12D:
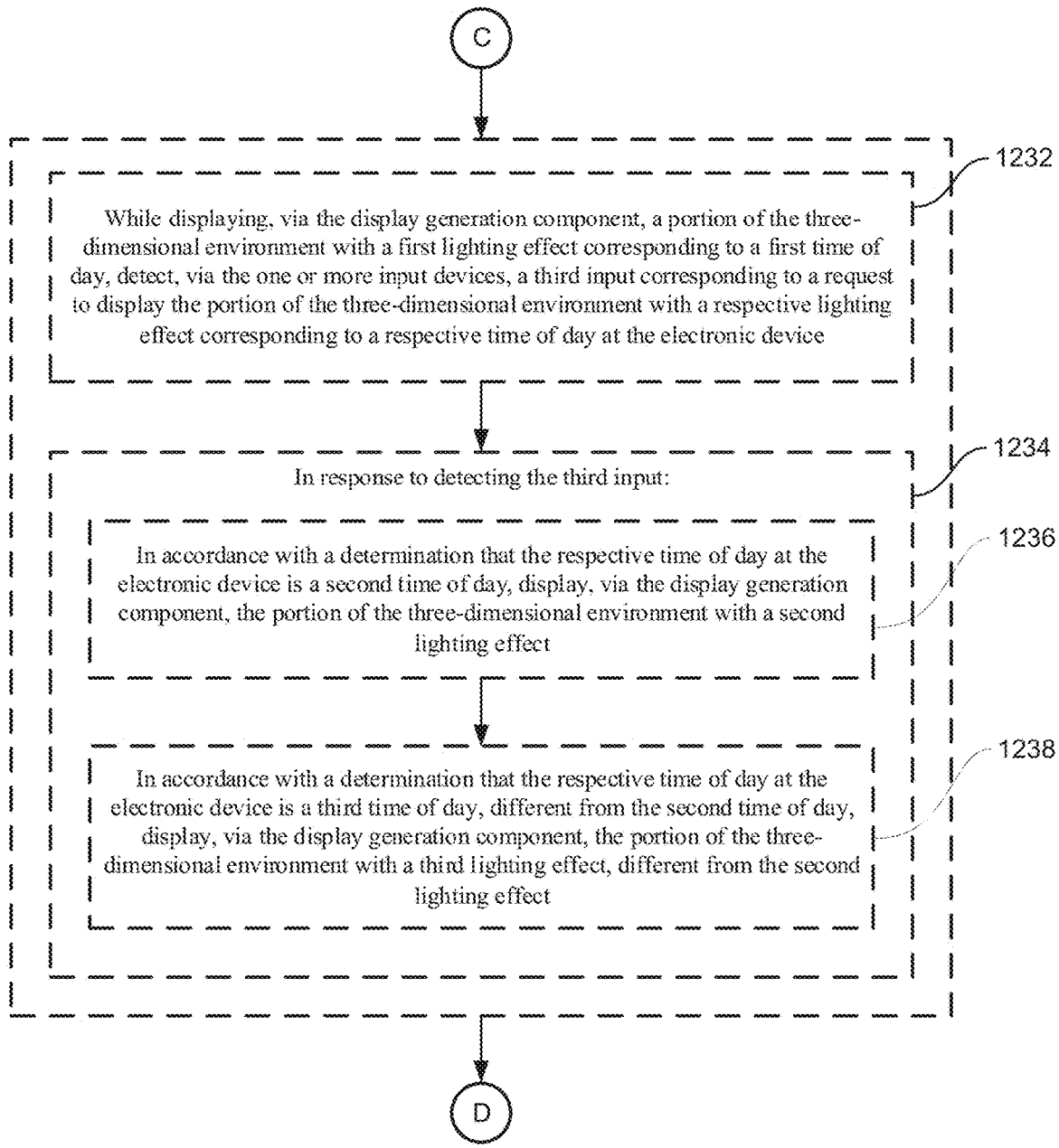
Figure 12E:
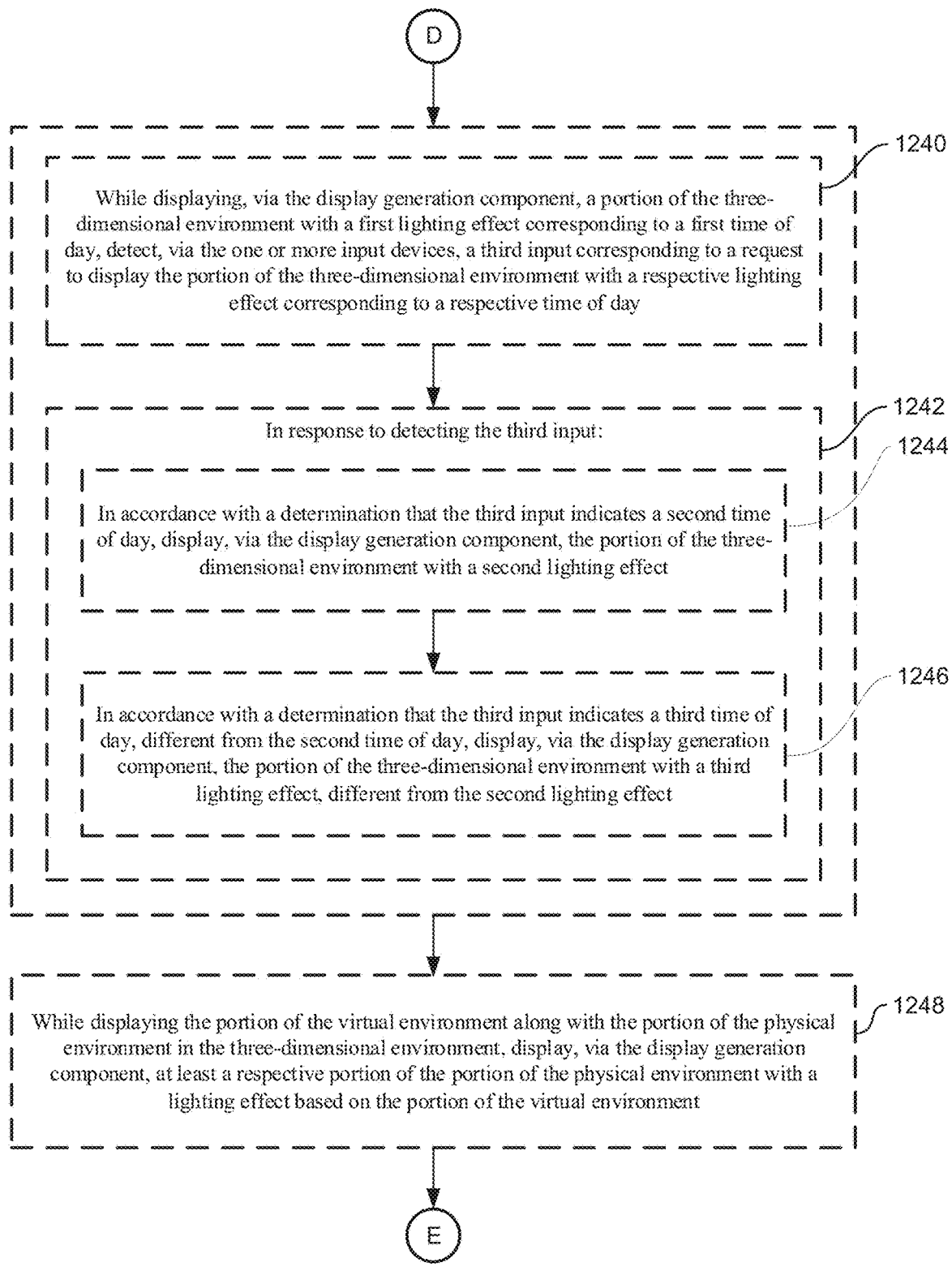
Figure 12F:
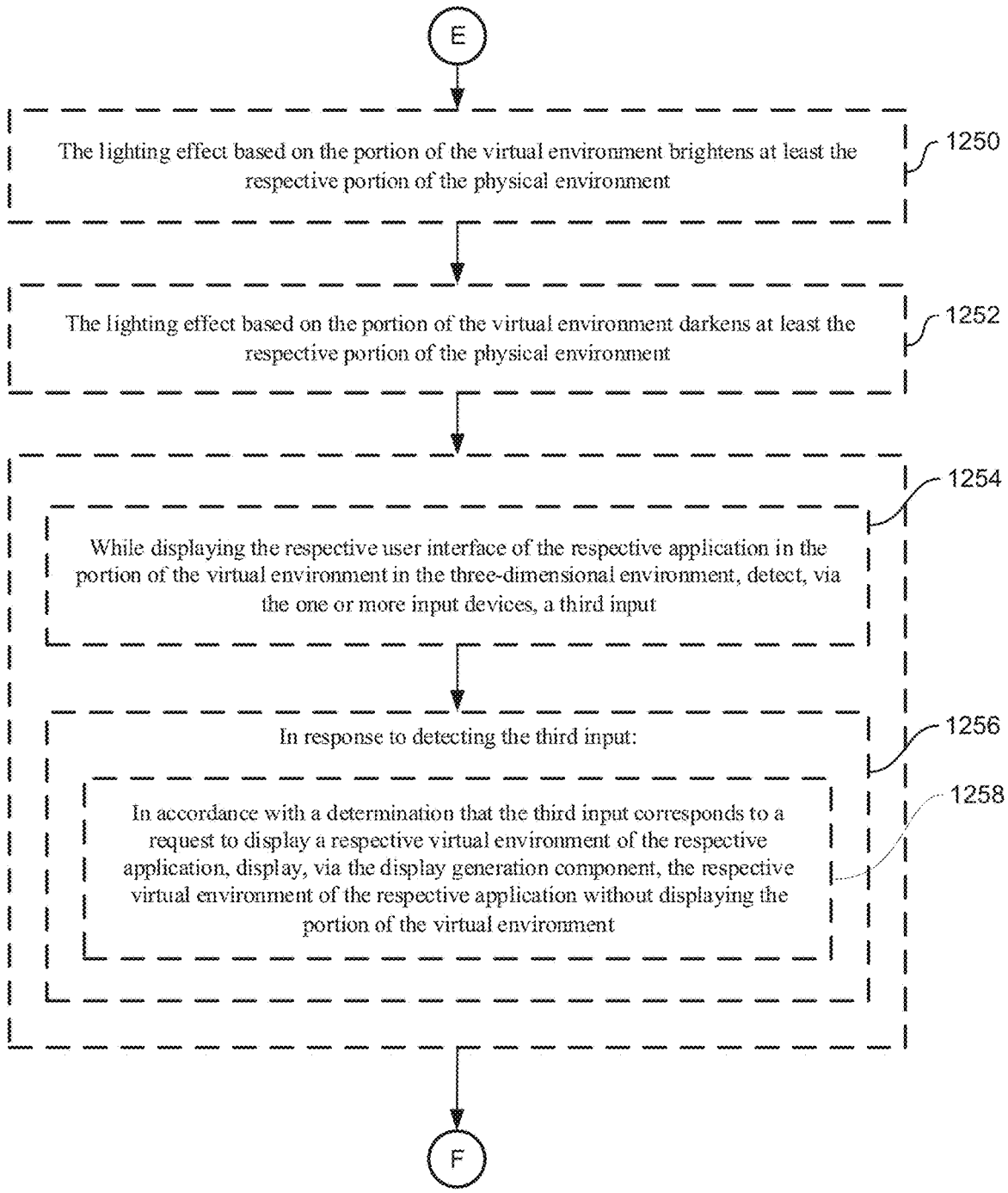
Figure 12G:
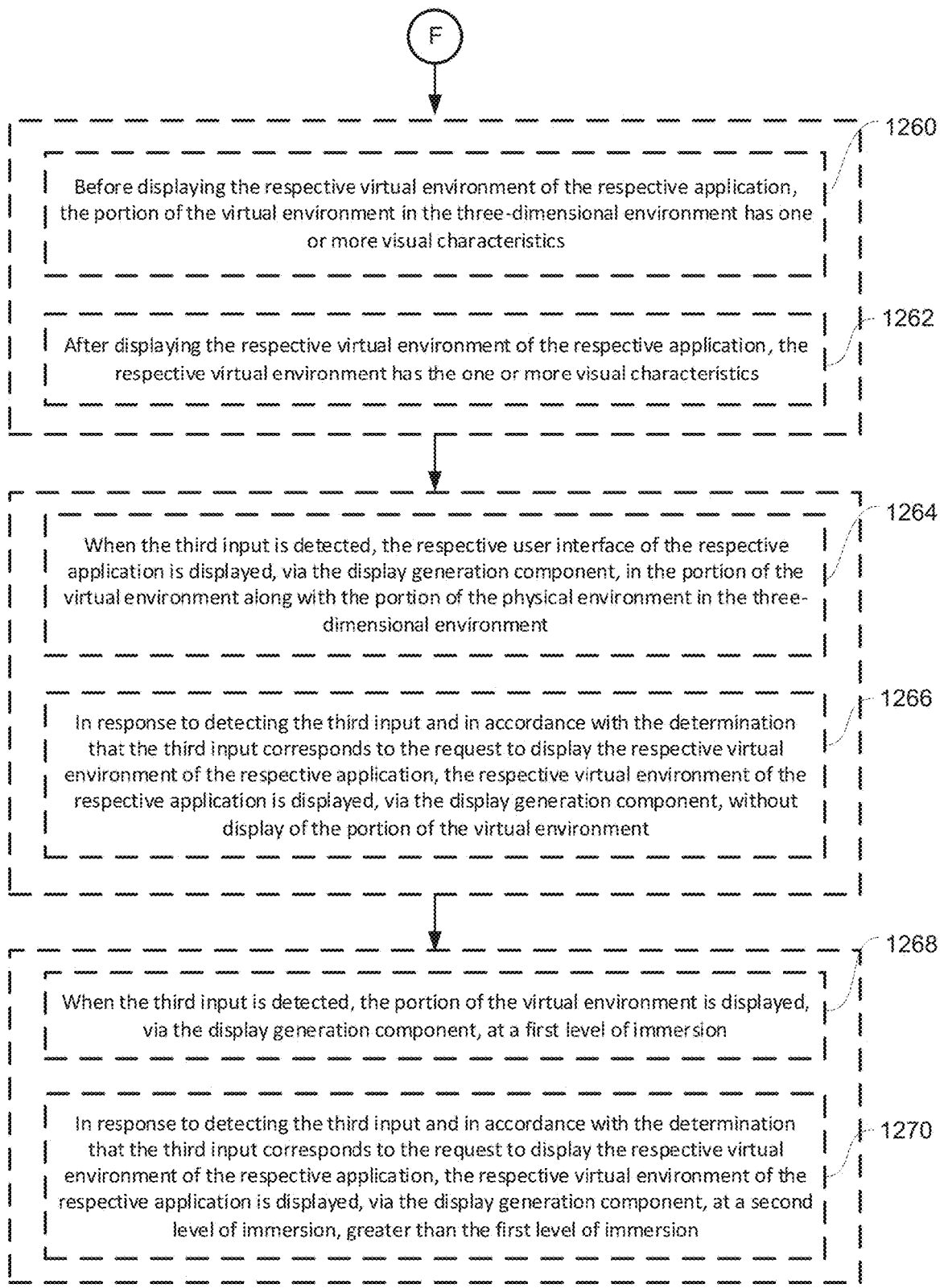

In some embodiments, the three-dimensional environment is associated with an application (1038), such as in FIG. 11D (e.g., the three-dimensional environment is a user interface of an application. In some embodiments, an application is able to cause display of a virtual environment). For example, a full-screen mode or a presentation mode for an application optionally causes display of a virtual environment, such as described with reference to method 1200.

In some embodiments, while displaying the three-dimensional environment with the respective spatial effect at the first level of immersion, the electronic device detects (1040), via the one or more input devices, a user input corresponding to a request to display the three-dimensional environment with the respective spatial effect at a maximum level of immersion (e.g., receiving a user input interacting with a displayed immersion affordance or interacting with a mechanical dial). In some embodiments, the user input includes a request to increase the immersion to the maximum level of immersion. For example, selecting the affordance associated with the highest level of immersion and/or performing a rotation input on the mechanical dial associated with requesting the highest level of immersion.

In some embodiments, in response to detecting the user input (1042), in accordance with a determination that the application satisfies one or more first criteria, the electronic device displays (1044), via the display generation component, the three-dimensional environment with the respective spatial effect at a first respective level of immersion (e.g., if the application has a maximum level of immersion set to the first respective level, then display the respective spatial effect at the first respective level of immersion) and in accordance with a determination that the application satisfies one or more second criteria, different from the first criteria, the electronic device displays (1046), via the display generation component, the three-dimensional environment with the respective spatial effect at a second respective level of immersion, greater than the first respective level of immersion, such as in FIG. 11D (e.g., if the maximum level of immersion set by the application is the second respective level, then display the respective spatial effect at the second respective level of immersion).

In some embodiments, the maximum level of immersion defined by the application overrides maximum level of immersion system setting (e.g., defined by the user, as described above). For example, if the maximum level of immersion for the application is greater than the system maximum level of immersion, then the maximum level of immersion for the application controls. In some embodiments, the maximum level of immersion is limited by the system level of immersion, even if the application's maximum level of immersion is greater. In some embodiments, if the maximum level of immersion defined for the application is less than the system level of immersion, then in response to a request to display the spatial effect at the maximum level of immersion, the spatial effect is displayed at the maximum level defined by the application. Thus, in some embodiments, the level of immersion is the lesser of either the maximum level set by the application or the maximum level set by the system level setting.

The above-described manner of determining the maximum level of immersion based on the level set by an application (e.g., by defining the maximum level of immersion based on the level that is set by an active application), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective spatial effect includes an atmospheric effect (e.g., a visual modification of at least a portion of the three-dimensional environment (e.g., that is not associated with an object in the three-dimensional environment)), displaying the three-dimensional environment without the respective spatial effect includes displaying a representation of a portion of a physical environment around the viewpoint of the user without the atmospheric effect, and displaying the three-dimensional environment with the respective spatial effect includes displaying the representation of the portion of the physical environment around the viewpoint of the user with the atmospheric effect (1048), such as in FIG. 9E (e.g., the atmospheric effect is displayed in the portions of the three-dimensional environment that includes the spatial effect, but is not displayed in portions of the three-dimensional environment that do not include the spatial effect).

For example, displaying an ambient lighting effect (e.g., sunrise, sunset, etc.), a fog effect, a mist effect, a smoke/particle effect, etc. In some embodiments, an atmospheric effect is one in which the air or empty space of the three-dimensional environment appears to be filled with a physical effect.

For example, if the level is immersion is such that 30% of the "room" is exhibiting a spatial effect while 70% of the "room" is not exhibiting the spatial effect (e.g., is a representation of the room, optionally unmodified by any spatial effects), then the 30% of the room with the spatial effect is displayed with a foggy atmosphere, whereas the 70% of the room without the spatial effect does not include the foggy atmosphere. In some embodiments, exhibiting a spatial effect includes modifying portions of the physical environment to have the spatial effect (e.g., modifying the lighting of objects in the physical environment, modifying the visual characteristics of objects in the physical environment, etc.).

The above-described manner of displaying a spatial effect (e.g., by displaying an atmospheric effect on portions of the environment within which the spatial effect is displayed, but not displaying the atmospheric effect on portions of the environment that do not include the spatial effect) provides a quick and efficient way of displaying a spatial effect in a subset of the environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment with the respective spatial effect includes presenting audio corresponding to the atmospheric effect (1050), such as in FIG. 9B (e.g., the respective spatial effect includes playing audible effects associated with the displayed virtual environment and/or spatial effect). In some embodiments, the audible effect includes noises or sounds associated with the atmospheric effect, such as running water, whistling wind, chirping birds, crackling of burning wood, etc.

In some embodiments, while displaying the three-dimensional environment with the respective spatial effect and presenting the audio corresponding to the atmospheric effect, the electronic device detects (1052), via the one or more input devices, movement of the electronic device corresponding to changing, from a first orientation, an orientation of a viewpoint of a user of the electronic device into the three-dimensional environment, such as in FIG. 9E-9H (e.g., detecting that the user and/or device has changed orientations within its physical environment, which optionally causes the representation of the physical environment to change orientation in accordance with the change in orientation of the user and/or device).

For example, if the user turns the device 45 degrees to the left, the device shifts the display of the three-dimensional environment 45 degrees to the left to reveal portions of the three-dimensional environment to the left of what was previously displayed and ceases display of the portion of the three-dimensional environment on the right side of what was previously displayed. In this way, the environment adjusts in such a way such that it appears as if the user is looking around the three-dimensional environment in the same way the user would look around his or her physical environment. In some embodiments, as the user and/or device change orientations, the user is able to see the boundary between the physical environment and virtual environment. In some embodiments, the virtual environment expands in the direction of the rotation of the device (e.g., follows the rotation of the user, optionally with a delay). In some embodiments, the virtual environment does not expand in the direction of the rotation of the device.

In some embodiments, in response to detecting the movement of the electronic device, the electronic device maintains (1054) the presentation of the audio corresponding to the atmospheric effect independent of an amount by the orientation of the viewpoint of the user into the three-dimensional environment changes from the first orientation, such as in FIG. 9F (e.g., continue providing the audio component of the atmospheric effect, even if the orientation of the viewpoint changes). In some embodiments, an atmospheric effect is applied throughout the three-dimensional environment around the user and changing the orientation of the viewpoint causes the user to see a different perspective of the three-dimensional environment, with the atmospheric effect still applied to the new perspective. Thus, in some embodiments, changing the orientation causes the visual effects and/or audio effects to continue to be displayed/presented. In some embodiments, the audio effects is reduced or eliminated.

The above-described manner of displaying a spatial effect (e.g., by maintaining display of the atmospheric effects when the user changes the orientation of the device) provides a quick and efficient way of reducing the immersion of the three-dimensional environment while maintaining continuity (e.g., by maintaining display of the atmospheric effects, which avoiding sharp transitions that would occur if the atmospheric effects were disabled), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the three-dimensional environment with the respective spatial effect at the first level of immersion, the electronic device detects (1058), via the one or more input devices, a user input corresponding to a request to change a current level of immersion of the respective spatial effect (e.g., receiving an input to change the current level for immersion, such as a selection of an affordance or a rotation of a mechanical dial corresponding to a request to increase or decrease the level of immersion by a respective amount (e.g., increment or decrement the level of immersion) or set the level of immersion to a respective level).

In some embodiments, in response to detecting the user input corresponding to the request to change the level of immersion of the respective spatial effect (1060), in accordance with a determination that the respective spatial effect is a first spatial effect, the electronic device changes (1062) the current level of immersion to a level of immersion from a first set of levels of immersions (e.g., if the respective spatial effect that is being displayed in the three-dimensional environment is a first spatial effect and/or a first type of spatial effect, then change immersion levels from amongst a first set of available immersion levels for the first spatial effect and/or first type of spatial effect) and in accordance with a determination that the respective spatial effect is a second spatial effect, the electronic device changes (1064) the current level of immersion to a level of immersion from a second set of levels of immersions, different from the first set, such as if there are more available levels of immersion for virtual environment 922 such as in FIG. 9A than there are for atmospheric effects such as in FIG. 9B (e.g., the number of levels of immersion for an atmospheric effect is different (e.g., less than, more than) the number of levels of immersion for a simulated environment).

In some embodiments, a virtual environment and/or simulated environment is compatible with a certain number of immersion levels (e.g., 5 levels of immersion, 10 levels of immersion, 30 levels of immersion, etc.) while an atmospheric effect (e.g., modifying lighting, mood, ambiance, etc.) is compatible with a different (e.g., optionally fewer) number of immersion levels (e.g., 1 level of immersion, 3 levels of immersion, 5 levels of immersion, 10 levels of immersion, etc.). For example, if the three-dimensional environment is displaying a virtual environment, then in response to the input to change immersion levels, the system is able to increase or decrease immersion levels within ten available levels of immersion.

For example, because an atmospheric effect optionally includes visual modifications to the objects within the three-dimensional environment while optionally maintaining display of the objects in the three-dimensional environment (e.g., displaying the "room" with a sunrise effect, sunset effect, foggy effect, starry nights effect, etc.), only a limited number of increasing levels of immersion exist. For example, increasing the immersion includes introducing a new visual effect and/or a new audio effect, and thus the number of levels of immersion is based on the number of new visual effects and/or audio effects that can be introduced. In some embodiments, an atmospheric effect has only one level of immersion (e.g., the atmospheric effect is either "on" in which all visual and/or audio effects are displayed/presented or "off" in which no visual and/or audio effects are displayed/presented).

The above-described manner of displaying a spatial effect (e.g., by displaying simulated environments with a certain number of levels of immersion and atmospheric effects with a fewer number of levels of immersion) provides a quick and efficient way of providing immersive experiences, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the physical environment around the viewpoint of the user includes a first region that is accessible to a user of the electronic device (e.g., the physical environment includes the immediate area around the user that the user is able to walk towards and/or interact with), and a second region that is not accessible to the user of the electronic device (1066), such as the area outside of window 915 in FIG. 9B (e.g., the physical environment includes one or more elements that allow the user to see areas that the user does not have immediate access to (e.g., without leaving the physical environment and entering another physical environment)).

For example, the physical environment includes a window to an outer region of the physical environment of the user, an open door to another room (other than the room in which the user is currently located) in the physical environment of the user, etc. that provide a view of areas that are outside of the user's immediate environment (e.g., outside of the user's room).

In some embodiments, displaying the three-dimensional environment without the respective spatial effect includes displaying, via the display generation component, a representation of the second region of the physical environment around the viewpoint of the user (1068), such as in FIG. 7B (e.g., displaying a representation of the physical environment that is outside of the window or open door, as the case may be (e.g., optionally a photorealistic representation of what is viewable through the window or open door)).

In some embodiments, displaying the three-dimensional environment with the respective spatial effect includes replacing display of the representation of the second region of the physical environment around the viewpoint of the user with a respective virtual environment, such as replacing the view of the physical environment through window 915 in FIG. 9B with a view of a modified physical environment or a virtual environment (1070) (e.g., the representation of the window and/or open door is replaced with the virtual environment such that the representation of the window and/or open door is no longer displayed).

In some embodiments, the representation of the window and/or open door is modified such that the user sees a different environment through the window and/or open door than the user's actual physical environment outside of the room. For example, if the respective spatial effect is a sunset effect, the representation of the window may be modified such that a view of a beach during sunset can be seen through the window (e.g., additionally or alternatively to adding sunset lighting and/or audio effects to the physical environment displayed by the device). In some embodiments, displaying the respective spatial effect includes removing display of the ceiling and/or walls of the physical environment. For example, displaying a nighttime spatial effect optionally includes removing display of the ceiling and replacing it with a representation of a night sky.

The above-described manner of displaying a spatial effect (e.g., by replacing portions of the three-dimensional environment that the user doesn't have access to with portions of the simulated environment) provides a quick and efficient way of providing immersive experiences, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment without the atmospheric effect includes displaying the representation of the portion of the physical environment around the viewpoint of the user having a first lighting level, and displaying the three-dimensional environment with the atmospheric effect includes displaying the representation of the portion of the physical environment around the viewpoint of the user having a second lighting level, greater than the first lighting level (1072), such as in FIG. 9B (e.g., modifying the visual characteristics of the objects in the room and/or the floor, walls, ceilings, etc. of the room to simulate an increased amount of light as compared to the ambient amount of light in the user's physical environment). For example, if the user is sitting in a room without any lighting, displaying the atmospheric effect optionally includes lighting the three-dimensional environment to simulate one or more light sources (e.g., light bulb, sun, etc.).

The above-described manner of displaying a simulated environment (e.g., by increasing the amount of light in the three-dimensional environment as compared to the ambient light of the user's physical environment) provides a quick and efficient way of providing an immersive experience (e.g., by modifying the lighting in the three-dimensional environment according to the simulated environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment without the atmospheric effect includes displaying the representation of the portion of the physical environment around the viewpoint of the user having a first lighting level, and displaying the three-dimensional environment with the atmospheric effect includes displaying the representation of the portion of the physical environment around the viewpoint of the user having a second lighting level, less than the first lighting level (1074), such as in FIG. 9B (e.g., modifying the visual characteristics of the objects in the room and/or the floor, walls, ceilings, etc. of the room to simulate a decreased amount of light as compared to the ambient amount of light in the user's physical environment). For example, if the user is sitting in a room with bright lighting, displaying the atmospheric effect optionally includes reducing the lighting in the three-dimensional environment to simulate fewer or no lighting sources (e.g., removing all lighting when displaying a night time simulated environment).

The above-described manner of displaying a simulated environment (e.g., by decreasing the amount of light in the three-dimensional environment as compared to the ambient light of the user's physical environment) provides a quick and efficient way of providing an immersive experience (e.g., by modifying the lighting in the three-dimensional environment according to the simulated environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment with the respective spatial effect at a respective level of immersion includes displaying, via the display generation component, an immersion scale visual indicator that indicates a current level of immersion at which the respective spatial effect is being displayed (1076), such as immersion level indicator 916 in FIG. 9A (e.g., displaying an indicator of the current level of immersion associated with the respective spatial effect).

In some embodiments, the indicator includes a predetermined number of sub-indicators associated with the number of levels of immersion. In some embodiments, the sub-indicators are visually emphasized to indicate the current level of immersion. For example, the indicator optionally includes ten tick marks indicative of ten immersion levels and if the current immersion level is at a five, then five tick marks (e.g., the "bottom" five tick marks) are highlighted (e.g., displayed with a different color, displayed with a different size, etc.). In some embodiments, the immersion scale visual indicator is selectable to change the amount of immersion to the selected level of immersion. For example, in response to selecting the sub-indicator associated with the maximum amount of immersion (e.g., the top-most tick mark), the spatial effect is increased to the maximum level of immersion.

The above-described manner of displaying an indicator of the current immersion level (e.g., by displaying a visual indicator that indicates the current level of immersion) simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the immersion scale visual indicator includes a first set of one or more indicators corresponding to major levels of immersion, and a second set of one or more indicators corresponding to minor levels of immersion in between the major levels of immersion (1078) (e.g., the immersion scale visual indicator includes major and minor tick marks. In some embodiments, the major tick marks are associated with a major increase/decrease in immersion while a minor tick mark is associated with a minor increase/decrease in immersion).

For example, a major tick mark is associated with levels in which a new component is provided (or removed) and the minor tick marks are associated with levels in which new components are not provided and existing components are increased (or decreased) in magnitude (e.g., increasing the volume of an audio effect, as opposed to providing a new audio effect, increasing the amount of the simulated environment that is displayed, as opposed to intensifying the visual effects of the simulated environment, etc.).

The above-described manner of displaying an indication of major and minor immersion levels (e.g., by displaying a visual indicator with major and minor indicators corresponding to major and minor levels of immersion) simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment with the respective spatial effect at a first major level of immersion, less than a second major level of immersion, includes presenting audio corresponding to the respective spatial effect without displaying a visual effect corresponding to the respective spatial effect (1080), such as immersion level indicator 916 indicating major levels of immersion with triangular shapes and minor levels of immersion without triangular shapes in FIG. 9A (e.g., the first major level of immersion is associated with an audio component of the spatial effect (e.g., and not with a visual component of the spatial effect)). For example, while at the first major level of immersion, the device provides at least one audio component associated with the spatial effect and optionally does not display any visual modifications or components associated with the spatial effect.

The above-described manner of providing a spatial effect (e.g., by providing audio associated with the spatial effect, but not providing visual effects associated with the spatial effect while at the first major level of immersion) provides a quick and efficient method of providing an immersive experience (e.g., by first introducing an audio effect before introducing a visual effect), simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, displaying the three-dimensional environment with the respective spatial effect at a first major level of immersion, greater than a second major level of immersion, includes presenting audio corresponding to the respective spatial effect and displaying a first portion of a visual effect corresponding to the respective spatial effect without displaying a second portion of the visual effect corresponding to the respective spatial effect (1082), such as in FIGS. 9A-9B (e.g., at the second major level of immersion, provide both audio and visual effects associated with the spatial effect).

In some embodiments, the audio effect that is provided is the same audio that is provided at the first major level of immersion and the second level of immersion introduces the visual effect. In some embodiments, the audio effect that is provided is the audio effect that is provided at the first major level of immersion including one or more additional audio components. In some embodiments, providing the visual effect includes displaying a portion of a simulated environment. In some embodiments, providing the visual effect includes providing one or more atmospheric effects.

The above-described manner of providing a spatial effect (e.g., by providing a visual effect associated with the spatial effect in addition to an audio effect while at the second major level of immersion) provides a quick and efficient method of providing an immersive experience (e.g., by introducing a visual effect after first introducing an audio effect), simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, displaying the three-dimensional environment with the respective spatial effect at a third major level of immersion, greater than the first major level of immersion, includes presenting the audio corresponding to the respective spatial effect and displaying the first portion and the second portion of the visual effect corresponding to the respective spatial effect (1084) (e.g., at the third major level of immersion, increasing the visual effects that were displayed at the second major level).

In some embodiments, the audio effect that is provided is the same audio that is provided at the first major level and/or second major level. In some embodiments, the visual effect is the same visual effect that is provided at the second major level, but with increased intensity (e.g., lighting elements are brighter or darker, etc.). In some embodiments, the visual effect is the visual effect that is provided at the second major level with one or more additional visual components. In some embodiments, providing the increased visual effect includes displaying a larger portion of a simulated environment. In some embodiments, providing the increased visual effect includes increasing the intensity of the one or more atmospheric effects.

The above-described manner of providing a spatial effect (e.g., by providing increased visual effect while at the third major level of immersion) provides a quick and efficient method of providing an immersive experience (e.g., by increasing the provided visual effect after first introducing the visual effect), simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the respective spatial effect includes display of at least a portion of a virtual environment, displaying the three-dimensional environment without the respective spatial effect includes displaying a representation of a portion of a physical environment around the viewpoint of the user, and displaying the three-dimensional environment with the respective spatial effect includes replacing display of at least a portion of the representation of the portion of the physical environment with display of the portion of the virtual environment (1086), such as in FIG. 9A.

In some embodiments, while displaying the three-dimensional environment with the respective spatial effect including displaying the portion of the virtual environment (e.g., while the three-dimensional environment is displaying the respective spatial effect in which some or all of the three-dimensional environment includes a representation of the virtual environment), the electronic device detects (1088), via the one or more input devices, movement of the electronic device away from a first location in the physical environment around the viewpoint of the user, such as in FIG. 9E (e.g., detecting that the electronic device has changed location from its previous location in the physical environment to a new location in the physical environment).

For example, if the user, while holding the electronic device, moves to a new location in the physical environment. In some embodiments, the electronic device detects that the electronic device has moved to a new location using one or more sensors, such as an accelerometer, a gyroscope, a GPS locator, one or more cameras or depth sensors that detect objects around the user, etc. In some embodiments, the electronic device detects that the electronic device has moved to a new location in response to one or more cameras of the electronic device capturing a changed perspective of the physical environment (e.g., detecting that the camera is looking at a different location of the physical environment and/or detecting that the camera is looking at the same location from a different angle). In some embodiments, the movement away from the first location includes horizontal movement and/or vertical movement. For example, if a user walks to a new location in the room, then the electronic device detects movement of the electronic device away from its original position. In some embodiments, if a user stands up from a sitting position, the electronic device detects the movement as movement away from its original position (e.g., a change in vertical position).

In some embodiments, in response to detecting the movement of the electronic device away from the first location (1090), in accordance with a determination that the movement of the electronic device away from the first location is greater than a threshold distance (e.g., the electronic device moved away from its original location by more than 6 inches, 1 foot, 3 feet, 6 feet, etc.), the electronic device ceases (1092) display, via the display generation component, of the portion of the virtual environment, such as if device 101 ceases display of virtual environment 922 in FIG. 9E (e.g., removing display of a portion of the virtual environment from the three-dimensional environment).

In some embodiments, removing display of a portion of the virtual environment includes restoring display of a representation of the physical environment at the locations where display of the virtual environment were removed (e.g., removing display of a portion of the virtual environment includes replacing the portions with the respective representation of the physical environment). In some embodiments, the portions of the virtual environment that are removed from display are portions of the virtual environment that are closer to the electronic device and/or user and optionally portions of the virtual environment that are not removed from display are farther from the electronic device and/or user. For example, in response to detecting that the device has moved by more than 6 inches, the electronic device reveals a two foot radius of the physical environment around the electronic device (e.g., to allow the user to see the area around him or her, to be able to safely move around his or her physical environment). In some embodiments, portions of the virtual environment are only removed from display if the virtual environment extends to within a respective radius around the electronic device and/or user (e.g., the radius that is revealed to safely allow the user to walk around). For example, if the immersion level is such that the virtual environment is displayed in the three-dimensional environment far away from the electronic device and/or user, then in response to detecting the movement of the device by more than the threshold distance, then display of the virtual environment is maintained (e.g., because the respective radius around the user and/or electronic device is already displaying the physical environment). In some embodiments, the amount of the physical environment that is revealed is based on the amount of movement of the electronic device. For example, if the electronic device moves by 6 inches, then in response, a two foot radius of the physical environment is revealed, but if the electronic device moves by 2 feet, then in response, a five foot radius of the physical environment is revealed (e.g., and optionally if the electronic device moves by more than a threshold, such as 2 feet, 3 feet, 10 feet, etc., then all of the virtual environment is removed from display and the physical environment optionally encompasses the entirety of the three-dimensional environment). In some embodiments, the speed of the movement of the electronic device determines how much of the physical environment around the device is revealed (e.g., a faster movement causes a larger radius to be revealed and a slower movement causes a smaller radius to be revealed). In some embodiments, as the electronic device moves around the physical environment, a circle around the electronic device that reveals the physical environment (e.g., a cut-out in the virtual environment) follows the electronic device as it moves. In some embodiments, the virtual environment reduces its amount of immersion as the device moves around the physical environment (e.g., as discussed above with respect to method 800 when the physical environment satisfies the first criteria). In some embodiments, removing display of the portion of the virtual environment includes reducing or ceasing one or more audio effects associated with the virtual environment. For example, removing one or more audio tracks of the audio effects, reducing the volume of the audio effects, etc.

The above-described manner of ceasing display of a portion of a virtual environment (e.g., in response to detecting that the electronic device has moved by a threshold amount) provides a quick and efficient method of safely allowing the user to see the physical area around the user (e.g., automatically, without requiring the user to perform additional inputs to reduce the amount of immersion when the user moves around his or her physical environment), which simplifies the interaction between the user and the electronic device and enhances the operability of the electronic device, makes the user-device interface more efficient and reduces potential disorientation that can potentially lead to vertigo or motion sickness symptoms, and provides a mechanism in which the user is able to safely interact with his or her environment, which additionally reduces power usage and improves battery life of the electronic device by enabling the user to use the electronic device more quickly and efficiently, while reducing errors in usage.

In some embodiments, in response to detecting the movement of the electronic device away from the first location (1094), in accordance with a determination that the movement of the electronic device away from the first location is a first distance, less than the threshold distance, the electronic device deemphasizes (1096) display of the portion of the virtual environment by a first amount, such as fading portions of virtual environment 722 in FIG. 9E (e.g., as the electronic device moves by a first distance (e.g., 6 inches, 1 foot, 2 feet, 4 feet, 10 feet, etc.), the portion of the virtual environment that is ceased to be displayed (e.g., when the electronic device reaches the threshold distance) begins to be de-emphasized).

For example, the portion of the virtual environment that eventually is no longer displayed when the electronic devices moves by the threshold amount begins to fade out as the electronic device begins moving, but before the electronic device moves by the threshold amount. In some embodiments, the amount that the portion of the virtual environment fades out is based on the amount that the electronic device moves. For example, as the electronic device moves more, the amount of fading is increased until the electronic device moves by the threshold amount, at which point the fading is at 100% (e.g., the portion of the virtual environment is fully faded out and is no longer displayed). In some embodiments, the amount of the virtual environment that is faded depend is based on the amount that the electronic device moves. For example, the virtual environment begins fading close to the user as the electronic device begins to move, and the fading moves outwards (e.g., as the electronic device moves more) until it encompasses the entirety of the portion that is ceased to be displayed.

In some embodiments, in accordance with a determination that the movement of the electronic device away from the first location is a second distance, greater than the first distance and less than the threshold distance, the electronic device deemphasizes (1098) display of the portion of the virtual environment by a second amount, greater than the first amount, such as further fading portions of virtual environment 722 in FIG. 9E (e.g., after the electronic device moved by the first distance, in response to determining that the electronic device moved by the second distance (e.g., a farther distance), the portion of the virtual environment that is ceased to be displayed (e.g., when the electronic device reaches the threshold distance) is de-emphasized even further). In some embodiments, de-emphasizing by the second amount includes further fading the portion of the virtual environment (e.g., increasing the transparency). In some embodiments, de-emphasizing by the second amount includes fading more of the virtual environment (e.g., expanding the amount that is faded).

The above-described manner of deemphasizing portions of a virtual environment (e.g., as the electronic device moves and approaches the threshold amount by which the portion of the virtual environment is ceased to be displayed) provides a quick and efficient method of revealing the physical environment (e.g., by gradually fading the virtual environment away and fading the physical environment in), which simplifies the interaction between the user and the electronic device and enhances the operability of the electronic device, makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the three-dimensional environment with the respective spatial effect, the electronic device detects (1099), via the one or more input devices, movement of the electronic device away from a first location in the physical environment around the viewpoint of the user, such as in FIG. 9E (e.g., detecting that the electronic device has changed location from its previous location in the physical environment to a new location in the physical environment).

For example, if the user, while holding the electronic device, moves to a new location in the physical environment. In some embodiments, the electronic device detects that the electronic device has moved to a new location using one or more sensors, such as an accelerometer, a gyroscope, a GPS locator, etc. In some embodiments, the electronic device detects that the electronic device has moved to a new location in response to one or more cameras of the electronic device capturing a changed perspective of the physical environment (e.g., detecting that the camera is looking at a different location of the physical environment and/or detecting that the camera is looking at the same location from a different angle). In some embodiments, the movement away from the first location includes horizontal movement and/or vertical movement. For example, if a user walks to a new location in the room, then the electronic device detects movement of the electronic device away from its original position. In some embodiments, if a user stands up from a sitting position, the electronic device detects the movement as movement away from its original position (e.g., a change in vertical position).

In some embodiments, in response to detecting the movement of the electronic device away from the first location (1097), in accordance with a determination that the movement of the electronic device away from the first location is greater than a threshold distance (1095) (e.g., the electronic device moved away from its original location by more than 6 inches, 1 foot, 3 feet, 6 feet, etc., such as the threshold distance described previously at which display of a virtual environment ceases), in accordance with a determination that displaying the three-dimensional environment with the respective spatial effect includes displaying, via the display generation component, at least a portion of a virtual environment, the electronic device ceases (1093) display of the portion of the virtual environment, such as reducing the immersion level or restoring portions of the physical environment in FIG. 9E (e.g., if the respective spatial effect that is displayed in the three-dimensional environment includes displaying a virtual environment (e.g., a simulated environment) such that portions of the physical environment are not displayed where the virtual environment is displayed (e.g., the virtual environment replaced portions of the physical environment), then in response to detecting that the movement of the electronic device is more than the threshold distance, a portion of the virtual environment is no longer displayed (e.g., and optionally in its place, a portion of the physical environment is restored)). In some embodiments, ceasing display of a portion of the virtual environment includes reducing or ceasing one or more audio effects associated with the virtual environment. For example, removing one or more audio tracks of the audio effects, reducing the volume of the audio effects, etc.

In some embodiments, in accordance with a determination that displaying the three-dimensional environment with the respective spatial effect includes displaying, via the display generation component, a representation of a portion of a physical environment around the viewpoint of the user with an atmospheric effect, the electronic device maintains (1092) display of the representation of the portion of the physical environment around the viewpoint of the user with the atmospheric effect, such as in FIG. 9F (e.g., if the respective spatial effect that is displayed in the three-dimensional environment includes modifying the representation of the physical environment to have one or more atmospheric effects (e.g., different lighting effects, darkened, brightened, fog, mist, etc.) (e.g., and optionally does not include displaying a virtual environment), then in response to detecting that the movement of the electronic device is more than the threshold distance, the respective spatial effects are not ceased to be displayed).

In some embodiments, because the physical environment is still viewable to the user (e.g., even with the atmospheric effects), maintaining the atmospheric effects does not prevent the user from viewing the physical environment around the electronic device and/or user and/or create a safety issue. In some embodiments, maintaining display of the atmospheric effect includes reducing the magnitude of one or more of the atmospheric effect (e.g., reducing the amount that the effect dims the environment, etc.). In some embodiments, maintaining display of the atmospheric effect includes not changing the magnitude of one or more of the atmospheric effects. In some embodiments, maintaining display of a portion of the virtual environment includes maintaining one or more audio effects associated with the virtual environment.

The above-described manner of ceasing display of virtual environments, but maintaining display of atmospheric effects provides a quick and efficient method of revealing the physical environment to allow a user to see his or her physical environment (e.g., by ceasing display of portions of a virtual environment, which otherwise would prevent portions of the physical environment from being viewable, but maintaining display of atmospheric effects, which optionally allow portions of the physical environment to remain viewable, even when the atmospheric effects are active), which simplifies the interaction between the user and the electronic device and enhances the operability of the electronic device, makes the user-device interface more efficient and reduces potential disorientation that can potentially lead to vertigo or motion sickness symptoms and provides a mechanism in which the user is able to safely interact with his or her environment (e.g., but otherwise maintaining the immersion of the spatial effect in situations where the user is able to safely interact with his or her environment), which additionally reduces power usage and improves battery life of the electronic device by enabling the user to use the electronic device more quickly and efficiently, while reducing errors in usage.

In some embodiments, displaying the three-dimensional environment with the respective spatial effect includes displaying at least a portion of a virtual environment (1089), such as in FIG. 9A.

In some embodiments, while displaying the three-dimensional environment with the respective spatial effect, including displaying the portion of the virtual environment and while a representation of a physical environment around the viewpoint of the user is not displayed via the display generation component, the electronic device detects (1087), via the one or more input devices, movement of the electronic device corresponding to changing, from a first orientation, an orientation of the viewpoint of the user, such as in FIG. 9E (e.g., detecting that the electronic device has changed orientation from its previous orientation such that the electronic device is "facing" a different direction and capturing a different area of the physical environment than before).

In some embodiments, in response to detecting the change in orientation, the electronic device changes the orientation of the viewpoint of the three-dimensional environment in accordance with the change in orientation of the electronic device. For example, if the electronic device is rotated 90 degrees leftwards, the view of the three-dimensional environment is also rotated 90 degrees leftwards to mimic the leftward rotation of the electronic device. In such a manner, the user is able to look around the three-dimensional environment as if the user was physically located in the three-dimensional environment. In some embodiments, the electronic device detects a change in orientation using one or more sensors, such as an accelerometer, a gyroscope, etc. In some embodiments, the electronic device detects a change in orientation in response to one or more cameras of the electronic device capturing a change in the viewpoint of the physical environment (e.g., detecting that the camera has rotated and is looking at a different area of the physical environment).

In some embodiments, in response to detecting the movement of the electronic device (1085), in accordance with a determination that the movement of the electronic device satisfies one or more criteria, including a criterion that is satisfied when the orientation of the viewpoint of the user into the three-dimensional environment changes horizontally from the first orientation by greater than a threshold amount, such as in FIG. 9E (e.g., the electronic device rotated horizontally to the left or the right by a threshold amount, such as 10 degrees, 45 degrees, 90 degrees, 135 degrees, etc. or the electronic device rotated such that the horizontal component of the rotation is more than the threshold amount), the electronic device deemphasizes (1083) display of the portion of the virtual environment and displays, via the display generation component, at least a portion of the representation of the physical environment, such as if portions of virtual environment 922a were faded or removed in FIG. 9E (e.g., fading out a portion of the virtual environment and revealing respective portions of the representation of the physical environment (e.g., underneath the faded portions of the virtual environment).

In some embodiments, the portion of the virtual environment is partially faded (e.g., 10% transparency, 50% transparency, 75% transparency, etc.). In some embodiments, the portion of the virtual environment that is faded out is the edge (e.g., the boundary) of the virtual environment, optionally in the direction that the user is facing. For example, if the user looked leftward, the left edge of the virtual environment is faded out, but if the user looked rightward, the right edge of the virtual environment is faded out.

The above-described manner of de-emphasizing display of virtual environments (e.g., in response to detecting that the viewpoint of the user moved horizontally) provides a quick and efficient method of revealing portions of the physical environment, which simplifies the interaction between the user and the electronic device and enhances the operability of the electronic device, makes the user-device interface more efficient and reduces potential disorientation that can potentially lead to vertigo or motion sickness symptoms and provides a mechanism in which the user is able to safely interact with his or her environment (e.g., without requiring the user to perform additional inputs to de-emphasize or disable display of the virtual environment), which additionally reduces power usage and improves battery life of the electronic device by enabling the user to use the electronic device more quickly and efficiently, while reducing errors in usage.

In some embodiments, displaying the three-dimensional environment with the respective spatial effect includes displaying at least a portion of a virtual environment (1081), such as in FIG. 9A. In some embodiments, while displaying the three-dimensional environment with the respective spatial effect, including displaying the portion of the virtual environment and while a representation of a physical environment is not displayed via the display generation component, the electronic device detects (1079), via the one or more input devices, movement of the electronic device corresponding to changing, from a first orientation, an orientation of a viewpoint of a user of the electronic device into the three-dimensional environment, such as in FIG. 9E (e.g., detecting that the electronic device has changed orientation from its previous orientation such that the electronic device is "facing" a different direction and capturing a different area of the physical environment than before).

In some embodiments, in response to detecting the change in orientation, the electronic device changes the orientation of the viewpoint of the three-dimensional environment in accordance with the change in orientation of the electronic device. For example, if the electronic device is rotated 90 degrees leftwards, the view of the three-dimensional environment is also rotated 90 degrees leftwards to mimic the leftward rotation of the electronic device. In such a manner, the user is able to look around the three-dimensional environment as if the user was physically located in the three-dimensional environment. In some embodiments, the electronic device detects a change in orientation using one or more sensors, such as an accelerometer, a gyroscope, etc. In some embodiments, the electronic device detects a change in orientation in response to one or more cameras of the electronic device capturing a change in the viewpoint of the physical environment (e.g., detecting that the camera has rotated and is looking at a different area of the physical environment).

In some embodiments, in response to detecting the movement of the electronic device (1077), in accordance with a determination that the movement of the electronic device satisfies one or more criteria, including a criterion that is satisfied when the orientation of the viewpoint of the user into the three-dimensional environment changes vertically from the first orientation to a second orientation that is directed towards a ground of the physical environment, such as if the user moved device 101 to point downwards in FIG. 9E (e.g., the electronic device rotated vertically downwards such that a portion of the ground, floor, or other surface near on which the user is located is visible in the three-dimensional environment (e.g., if the representation of the physical environment were otherwise displayed)), the electronic device deemphasizes (1075) display of the portion of the virtual environment and displaying, via the display generation component, at least a portion of the representation of the ground of the physical environment, such as revealing the physical environment around the feet of the user in FIG. 9E (e.g., fading out a portion of the representation of the virtual environment to reveal a portion of the physical environment around the user).

In some embodiments, the portion of the physical environment that is revealed is a predetermined radius of the ground of the physical environment around the user, such as 1 foot, 2 feet, 3 feet, 5 feet, 10 feet, etc. In some embodiments, the portion of the virtual environment that is within the predetermined radius around the user is faded (e.g., optionally a graduated fading, wherein the portion closer to the user and/or electronic device is more faded than the portion that is farther from the user and/or electronic device) and the portion of the virtual environment that is not within the predetermined radius is not faded. In some embodiments, if the immersion level is such that the virtual environment is not displayed within the radius around the user that is revealed, then the virtual environment is not faded.

The above-described manner of deemphasizing a portion of the virtual environment and displaying a representation of the ground around the electronic device (e.g., in response to detecting a change in the orientation of the device to face downwards toward the ground) provides a quick and efficient way of providing a view of the area around the user (e.g., by automatically displaying a representation of the ground in response to detecting that the electronic device is facing downwards towards the ground), which simplifies the interaction between the user and the electronic device and enhances the operability of the electronic device, makes the user-device interface more efficient (e.g., without requiring the user to perform additional inputs to cease displaying portions of the virtual environment) and reduces potential disorientation that can potentially lead to vertigo or motion sickness symptoms and provides a mechanism in which the user is able to safely interact with his or her environment, which additionally reduces power usage and improves battery life of the electronic device by enabling the user to use the electronic device more quickly and efficiently, while reducing errors in usage.

In some embodiments, displaying the three-dimensional environment with the respective spatial effect includes displaying at least a portion of a virtual environment (1073), such as in FIG. 9A. In some embodiments, displaying the three-dimensional environment with the respective spatial effect at the first level of immersion includes displaying the portion of the virtual environment at a first distance from a viewpoint of a user into the three-dimensional environment (1071), such as in FIG. 9A (e.g., when the respective spatial effect is at a first immersion level, the virtual environment is displayed at a first distance away from the viewpoint (e.g., camera position) of the three-dimensional environment).

In some embodiments, the boundary between the representation of the physical environment and the virtual environment is the first distance away and the virtual environment extends from the first distance outwards (e.g., extending outwards to the end of the virtual environment, or extending outwards towards a horizon in the virtual environment). For example, from the first distance inwards, the physical environment is displayed and from the first distance outwards, the virtual environment is displayed (e.g., in a manner similarly to described above with respect to method 800 when the physical environment satisfies the first criteria).

In some embodiments, displaying the three-dimensional environment with the respective spatial effect at the second level of immersion, greater than the first level of immersion, including displaying the portion of the virtual environment at a second distance, less than the first distance, from the viewpoint of the user into the three-dimensional environment (1069), such as in FIG. 9C (e.g., when the respective spatial effect is at a second, greater immersion level, the virtual environment is displayed at a second, closer distance away from the viewpoint of the three-dimensional environment).

In some embodiments, the boundary between the representation of the physical environment and the virtual environment is the second distance away (e.g., the physical environment is the space closer than the second distance and the virtual environment is the space farther than the second distance). Thus, as the immersion level is increased, the boundary between the physical environment and the virtual environment optionally moves closer to the user (e.g., more of the three-dimensional environment is encompassed by the virtual environment), and as the immersion level is decreased, the boundary moves farther from the user. In some embodiments, moving the boundary farther from or closer to the user includes revealing more or less of the virtual environment. For example, increasing the immersion includes displaying more portions of the virtual environment that were not previously displayed and decreasing the immersion includes hiding portions of the virtual environment that were displayed. In some embodiments, changing the immersion level does not include moving the virtual environment closer or farther away from the user without displaying more or less of the virtual environment (e.g., maintaining the amount of the virtual environment that is viewable and merely moving the virtual environment closer or farther away from the user).

The above-described manner of increasing or decreasing the level of immersion of the spatial effect (e.g., by revealing portions of the virtual environment that are closer to the user as the immersion is increased and hiding portions of the virtual environment as the immersion is decreased) provides a quick and efficient way of displaying more or less of the virtual environment, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, displaying the three-dimensional environment with the respective spatial effect includes displaying at least a portion of a virtual environment (1067), such as in FIG. 9A. In some embodiments, while displaying the three-dimensional environment with the respective spatial effect, including displaying the portion of the virtual environment, the electronic device detects (1065), via the one or more input devices, movement of the electronic device corresponding to changing, from a first orientation, an orientation of a viewpoint of a user of the electronic device into the three-dimensional environment, such as in FIG. 9E (e.g., detecting that the electronic device has changed orientation from its previous orientation such that the electronic device is "facing" a different direction and capturing a different area of the physical environment than before).

In some embodiments, in response to detecting the change in orientation, the electronic device changes the orientation of the viewpoint of the three-dimensional environment in accordance with the change in orientation of the electronic device. For example, if the electronic device is rotated 90 degrees leftwards, the view of the three-dimensional environment is also rotated 90 degrees leftwards to mimic the leftward rotation of the electronic device. In such a manner, the user is able to look around the three-dimensional environment as if the user was physically located in the three-dimensional environment. In some embodiments, the electronic device rotates in response to the rotation of the head of the user, for example, if the electronic device is a head mounted device.

In some embodiments, in response to detecting the movement of the electronic device (1063), in accordance with a determination that the movement of the electronic device satisfies one or more criteria, including a criterion that is satisfied based on a movement of a predefined portion of the user, the electronic device changes (1061) a location in the three-dimensional environment at which the virtual environment is displayed in accordance with the movement of the electronic device, such as in FIG. 9G (e.g., the criterion is satisfied if the body of the user of the device (e.g., the user's torso and optionally not the user's head) has rotated to face a new direction (e.g., the rotation of the user's body which optionally caused the electronic device to change orientation)).

In some embodiments, in response to determining that the body of the user has rotated to face the new direction, the virtual environment rotates around the user in accordance with the rotation of the body of the user. In some embodiments, rotating the virtual environment includes moving the virtual environment to a new location in the three-dimensional environment. In some embodiments, the virtual environment is moved to the new location that the body of the user is facing, such that the virtual environment is centered with the user's body (e.g., the center of the virtual environment is at the center of the field of view). In some embodiments, moving the virtual environment to the new location includes rotating the virtual environment such that the virtual environment is aligned with the new "forward" viewpoint of the user. For example, if the user moves his or her head and body 30 degrees to the left, the virtual environment is moved to a new location in the three-dimensional environment that is 30 degrees to the left of its original location and then rotated 30 degrees so that virtual environment has the same alignment with respect to the user after the movement as before the user turned his or her body.

In some embodiments, the virtual environment is moved to the new location and rotated in response to detecting that the body of the user has rotated to a new orientation, even without detecting the movement of the electronic device changing the orientation of the electronic device.

In some embodiments, in accordance with a determination that the movement of the electronic device does not satisfy the one or more criteria, the electronic device maintains (1059) the location in the three-dimensional environment at which the virtual environment is displayed, such as in FIG. 9E (e.g., if the body of the user did not rotate, such as if the head of the user rotated without the body of the user rotating, then the virtual environment does not move to the new location and/or rotate in accordance with the rotation of the body of the user).

In some embodiments, the virtual environment is maintained at its original location, even though the viewpoint of the user has changed. In some embodiments, in response to the change in the viewpoint, the user is presented with a different view of the three-dimensional environment in accordance with the change in the viewpoint (e.g., if the user looks to the left by 30 degrees, display of the three-dimensional environment is updated such that the users sees the portion of the three-dimensional environment (e.g., the physical environment) that is 30 degrees to the left of what was previously displayed). In some embodiments, the user is able to see (e.g., past) the edge of the virtual environment (e.g., the boundary where the virtual environment ends and the physical environment begins).

The above-described manner of moving the virtual environment (e.g., in response to detecting that a predefined portion of the user has rotated to face a new direction, but not if the viewpoint of the user rotated without the predefined portion rotating) provides a quick and efficient way of maintaining the immersion (e.g., when the user turns his or her body, indicating a more permanent change in orientation, as opposed to turning his or her head, indicating a more temporary change in orientation), which simplifies the interaction between the user and the electronic device and enhances the operability of the electronic device and makes the user-device interface more efficient (e.g., without requiring the user to perform additional inputs to move the three-dimensional environment), which additionally reduces power usage and improves battery life of the electronic device by enabling the user to use the electronic device more quickly and efficiently, while reducing errors in usage.

FIGS. 11A-11D illustrate examples of moving an object into or out of a virtual environment in accordance with some embodiments.

FIG. 11A illustrates an electronic device 101 displaying, via a display generation component (e.g., display generation component 120 of FIG. 1), a three-dimensional environment 1104 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 11A, device 101 captures one or more images of the real world environment 1102 around device 101 (e.g., operating environment 100), including one or more objects in the real world environment 1102 around device 101. In some embodiments, device 101 displays representations of the real world environment in three-dimensional environment 1104. For example, three-dimensional environment 1104 includes a portion of a representation of desk 1106a and a representation of coffee table 1108a. As shown in overhead view 1116 of real world environment 1102 in FIG. 11A, desk 1105b and coffee table 1106b are real objects in real world environment 1102, which have been captured by the one or more sensors of device 101. In FIG. 11A, three-dimensional environment 1104 is currently at an immersion level of three (e.g., as indicated by immersion level indicator 1110) and as a result, virtual environment 1112a encompasses a portion of three-dimensional environment 1104 and obscures the view of the back portion of desk 1106b (e.g., in a manner similar to three-dimensional environment 704 described above in FIG. 7E).

In some embodiments, three-dimensional environment 1104 includes one or more user interfaces of one or more applications running on device 101, optionally concurrently with an immersive virtual environment. For example, in FIG. 11A, three-dimensional environment 1104 includes virtual environment 1112a at an immersion level of three (e.g., similarly to virtual environment 722a described above with respect to FIG. 7E) and also includes user interface 1114a of an application running on device 101. Examples of applications that run on device 101 include a media player application, music application, photo album application, browser application, word processor application, etc. As shown in FIG. 11A, user interface 1114a is located in the real world environment portion of three-dimensional environment 1104 (e.g., the portion of three-dimensional environment 1104 that includes representations of real world environment 1102 and has not been replaced by virtual environment 1112a, as illustrated by the location of user interface 1114b in overhead view 1116 being next to coffee table 1106b and closer to user 1120 than the boundary of virtual environment 1112b). In some embodiments, when three-dimensional environment 1104 includes a user interface, the user interface casts lighting effects on objects in three-dimensional environment 1104. For example, in FIG. 11A, user interface 1114a acts like a lighting source and casts reflection 1122 (e.g., glare) onto the floor of three-dimensional environment 1104. In some embodiments, user interface 1114a causes objects to be lit more brightly than the actual physical ambient amount of light and/or causes objects to be tinted with colors from elements on user interface 1114a (e.g., a red element on user interface 1114a optionally causes a red tint or red reflection on objects in three-dimensional environment 1104). In some embodiments, user interface 1114a casts shadows on portions of three-dimensional environment 1104. For example, if a lighting source in three-dimensional environment 1104 (e.g., a light source in real world environment 1102, a light source from a virtual environment, such as virtual environment 1112a, and/or virtual light from a virtual lighting effect, such as in FIG. 9B) shines onto user interface 1114a, user interface 1114a casts a shadow onto portions of three-dimensional environment 1104 that are on the opposite side of user interface 1114a as the lighting source. In some embodiments, a virtual object and/or a representation of a real world object in three-dimensional environment 1104 exhibits similar behaviors as user interface 1114a described above (e.g., casting lighting effects and/or casting shadows on other portions of three-dimensional environment 1104).

In FIG. 11A, a user input is detected by hand 1124 of the user selecting user interface 1114a. In some embodiments, a user input selecting user interface 1114a includes a tap on a location associated with user interface 1114a or a pinch gesture at a location in real world environment 1102 that corresponds to the location of user interface 1114a (e.g., direct manipulation inputs). In some embodiments, the user is able to perform indirect manipulation inputs by performing a selection gesture such as a tap or pinch while the gaze of the user is directed at user interface 1114a (e.g., optionally without requiring that the hand is tapping on or pinching a location at and/or associated with user interface 1114a).

In FIG. 11B, while maintaining the selection input, device 101 detects a movement of hand 1124 moving user interface 1114a inwards in three-dimensional environment 1104 (e.g., away from the viewpoint of user 1120 into the three-dimensional environment 1104, as shown by user interface 1114b moving away from user 1120 and closer to the boundary of virtual environment 1112b in overhead view 1116). In some embodiments, the movement includes an extension of hand 1124 away from the body of the user and in response, user interface 1114a moving in accordance with the movement of hand 1124 (e.g., in the same direction and optionally by the same amount as the movement of hand 1124 or a scaled amount of the movement of hand 1124). In some embodiments, moving user interface 1114a to a new location in three-dimensional environment 1104 causes user interface 1114a to cast lighting effects on different objects/portions in three-dimensional environment 1104, or to cast light on the same objects in a different way, for example, as a result of changing the location of the lighting source. For example, in FIG. 11B, reflection 1122 (e.g., glare) on the floor of three-dimensional environment 1104 has moved due to user interface 1114a moving. In some embodiments, moving user interface 1114a to a farther location in three-dimensional environment 1104 (e.g., farther from user 1120) causes user interface 1114a to appear smaller as a result of being farther from the viewpoint of the user (e.g., due to the perspective effect). For example, user interface 1114a remains the same size when moved around three-dimensional environment 1114a, but because it is now farther from the viewpoint of the user, it appears smaller to the user. In some embodiments, the pushing or pulling of user interface 1114a to different distances from the viewpoint of the user in three-dimensional environment 1104 is indicated by device 101 using a stereoscopic depth effect, shadows (e.g., as if generated by user interface 1114a blocking at least a portion of a light source) and/or other simulated interactions with the virtual environment (e.g., user interface 1114a casting a shadow or light on a portion of the virtual environment that is further away from the user).

In FIG. 11C, while maintaining the selection input, device 101 detects a movement of hand 1124 moving user interface 1114a inwards in three-dimensional environment 1104 (e.g., away from the viewpoint of user 1120) and into virtual environment 1112a (e.g., to a location in three-dimensional environment 1104 beyond the boundary of virtual environment 1112a and/or encompassed by virtual environment 1112a). As discussed above with respect to method 800, virtual environment 1112a optionally acts like a visual portal into a simulated environment, and moving user interface 1114a into virtual environment 1112a causes user interface 1114a to be transported into virtual environment 1112a and treated as if it is an object that exists in virtual environment 1112a rather than an object that exists in the real world environment portion of three-dimensional environment 1104. In some embodiments, user interface 1114a is moved into virtual environment 1112a in response to user interface 1114a crossing the boundary between the real world environment portion of three-dimensional environment 1104 and virtual environment 1112a. In some embodiments, user interface 1114a is moved into virtual environment 1112a in response to user interface 1114a being moved to within a threshold distance from the boundary between the real world environment portion of three-dimensional environment 1104 and virtual environment 1112a (e.g., within 1 inch, 6 inches, 1 foot, 3 feet, 6 feet, etc.). In some embodiments, user interface 1114a is moved into virtual environment 1112a in response to a user input, such as a selection of a button or affordance to move user interface 1114a into virtual environment 1112a. It is understood that the description provided with reference to FIGS. 11A-11D and/or method 1200 for moving virtual objects into or out of virtual environment 1112a optionally applies partially or equally to movement of any or all types of virtual objects into and out of virtual environment 1112a, including movement of one or more three-dimensional virtual objects (e.g., three-dimensional models of virtual cars, tents, buildings, etc.) into and out of virtual environment 1112a and movement of application window or application portal virtual objects (as described in more detail below) into and out of virtual environment 1112a.

In some embodiments, while user interface 1114a is located within virtual environment 1112a, user interface 1114a casts one or more lighting effects on objects in virtual environment 1112a and optionally does not cast lighting effects on objects in the real world environment portion of three-dimensional environment 1104 (though, in some embodiments, user interface 1114a does cast lighting effects on objects in the real world environment portion of three-dimensional environment 1104 via the portal into virtual environment 1112a).

In some embodiments, moving user interface 1114a into virtual environment 1112a automatically causes user interface 1114a to increase to a larger size, for example, as if user interface 1114a is a theater screen located in virtual environment 1112a (e.g., 2× larger, 3× larger, 10× larger, 50× larger, etc., without requiring an explicit user input for changing the size of user interface 1114a). In some embodiments, user interface 1114a is increased to a size such that it appears to the user as if it were the same size as before user interface 1114a was moved into virtual environment 1112a (e.g., device 101 displays user interface 1114a at such a display size). For example, if user interface 1114a is moved to a location that is 10 times farther away, than user interface 1114a becomes ten times larger. In some embodiments, the farther user interface 1114a is moved in virtual environment 1112a, the larger user interface 1114a becomes (e.g., to maintain the same relative size from the perspective of the user). In some embodiments, user interface 1114a has a predetermined fixed size when located in virtual environment 1112a, regardless of the location of user interface 1114a within virtual environment 1112a. In some embodiments, when user interface 1114a is moved into virtual environment 1112a, user interface 1114a is snapped and/or locked into a predetermined location (e.g., an optimal location selected by the designer of virtual environment 1112a) and optionally user interface 1114a cannot be moved to another location in virtual environment 1112a (e.g., optionally except to be removed from virtual environment 1112a and moved back into the real world environment portion of three-dimensional environment 1104).

In FIG. 11C, overhead view 1116 illustrates that virtual environment 1112b has a potentially infinite depth (e.g., depth beyond the depth of the room in real world environment 1102), thus extending the depth of three-dimensional environment 1104 from having a depth equal to the depth of the real world environment 1102 to the depth of virtual environment 1112a. Thus, a user is able to move user interface 1114a to a location beyond the boundary of real world environment 1102. In FIG. 11C, for example, the user moved user interface 1114 to a location beyond the boundary of real world environment 1102, within virtual environment 1112a. In response to moving user interface 1114 into virtual environment 1112a, user interface 1114 is increased to a size that is much larger than the size of user interface in FIGS. 11A and 11B. As shown in FIG. 11C, the size of user interface 1114a as it appears in three-dimensional environment 1104 is optionally the same size as user interface 1114a as it appears in three-dimensional environment 1104 in FIG. 11B (e.g., before user interface 1114a was moved into virtual environment 1112a). In some embodiments, as described above, user interface 1114a is sized as if user interface 1114a were a projector screen in virtual environment 1112a, thus providing the user with an immersive cinematic viewing experience.

In some embodiments, user interface 1114a is a user interface of an application, and is itself a portal into content associated with and/or provided by that application (e g, similar to the herein described portals into simulated and/or virtual environments). For example, user interface 1114a is optionally a "window virtual object" of an application, or a "portal virtual object" of an application. In some embodiments, such virtual objects are flat or include a flat region and/or are two-dimensional or three-dimensional in three-dimensional environment 1104. Regardless of whether user interface 1114a is flat or includes a flat region or is two-dimensional or three-dimensional, if user interface 1114a is a user interface of a content (e.g., movie, video and/or image) playback application, user interface 1114a is optionally a portal via which the content being played back by the content playback application (e.g., different from virtual environment 1112a) is visible from the viewpoint of the user. As another example, if user interface 1114a is a user interface of a video game application, user interface 1114a is optionally a portal via which a simulated environment of the video game (e.g., different from virtual environment 1112a) is visible from the viewpoint of the user. In some embodiments, user interface 1114a is such a portal while it is positioned outside of virtual environment 1112a and while it is positioned inside of virtual environment 1112a. In some embodiments, user interface 1114a is such a portal while it is positioned inside of virtual environment 1112a but not while it is positioned outside of virtual environment 1112a (e.g., user interface 1114a turns into such a portal in response to being pushed into virtual environment 1112a). In some embodiments, user interface 1114a is such a portal while it is positioned outside of virtual environment 1112a but not while it is positioned inside of virtual environment 1112a (e.g., user interface 1114a turns into such a portal in response to being pulled out of virtual environment 1112a).

Because user interface 1114a is optionally a portal into the content of the application (e.g., a "window" into the content), the portions of the content that are presented and/or visible in user interface 1114a are optionally based on the user's viewpoint of the three-dimensional environment 1104 and/or the angle from which user interface 1114a is being viewed. For example, if the user's viewpoint moves rightward relative to user interface 1114a and/or if the angle from which user interface 1114a is being viewed via the electronic device changes to be more rightward from the normal of user interface 1114a, portions of the content that are to the left of the previously displayed content of the application that were not previously displayed (e.g., before the change in the viewpoint) are optionally revealed by the electronic device via user interface 1114a, and portions of the content that are to the right of the previously displayed content of the application that were previously displayed (e.g., before the change in the viewpoint) are optionally hidden (e.g., no longer visible) via user interface 1114a. Similarly, if the user's viewpoint moves leftward relative to user interface 1114a and/or if the angle from which user interface 1114a is being viewed via the electronic device changes to be more leftward from the normal of user interface 1114a, portions of the content that are to the right of the previously displayed content of the application that were not previously displayed (e.g., before the change in the viewpoint) are optionally revealed by the electronic device via user interface 1114a, and portions of the content that are to the left of the previously displayed content of the application that were previously displayed (e.g., before the change in the viewpoint) are optionally hidden (e.g., no longer visible) via user interface 1114a.

For example, while a first portion of the content of the application is visible via user interface 1114a, the electronic device 101 optionally detects movement of the viewpoint of the user relative to user interface 1114a. In response to such movement of the viewpoint, in accordance with a determination that the movement of the viewpoint of the user is rightward relative to the user interface 1114a, the electronic device 101 optionally reveals, in user interface 1114a, a second portion of the content that was not previously visible and that is to the left of the first portion of the content in the content, and ceases display, in user interface 1114a, of a rightward (e.g., right-most) part of the first portion of the content. In contrast, in response to such movement of the viewpoint, in accordance with a determination that the movement of the viewpoint of the user is leftward relative to the user interface 1114a, the electronic device 101 optionally reveals, in user interface 1114a, a third portion of the content that was not previously visible and that is to the right of the first portion of the content in the content, and ceases display, in user interface 1114a, of a leftward (e.g., left-most) part of the first portion of the content.

FIG. 11D illustrates three-dimensional environment 1104 displaying user interface 1114a (referred to as 1114a in three-dimensional environment 1104 and 1114b in overhead view 1116) at a maximum level of immersion (e.g., as illustrated by immersion level indicator 1110). In FIG. 11D, user interface 1114a has changed into a virtual environment, similar to virtual environment 1112a (e.g., and optionally having the same or similar behavior as virtual environments described above with respect to methods 800 and 1000). In some embodiments, user interface 1114a is displayed as a virtual environment (e.g., optionally at a maximum level of immersion) in response to a user input requesting display of user interface 1114a in an immersive mode. For example, while displaying user interface 1114a (e.g., such as any of FIGS. 11A-11C), receiving a user input selecting a presentation mode of a presentation application (of which user interface 1114a is a user interface) causes user interface 1114a to change into a virtual environment of an auditorium space, a user input selecting a full screen mode of a media player application causes user interface 1114a to change into a movie theater environment, etc. In some embodiments, when user interface 1114a is displayed as a virtual environment, device 101 updates three-dimensional environment and replaces any existing virtual environment (e.g., such as virtual environment 1112 in FIG. 11C) with the virtual environment associated with user interface 1114a. In some embodiments, only one virtual environment is displayed at a time and thus displaying user interface 1114a as a virtual environment causes virtual environment 1112 to no longer be displayed. In some embodiments, the immersion level of three-dimensional environment 1104 is automatically increased to maximum when user interface 1114a is displayed as a virtual environment (e.g., without requiring a user input explicitly changing the immersion level), as shown in FIG. 11D, optionally overriding the previously active immersion level. In some embodiments, automatically increasing the immersion level to maximum causes representations of a portion of the real world environment to be replaced with a portion of the virtual environment (e.g., if, for example, the immersion level was not previously at a maximum level). In some embodiments, the immersion level is increased to a maximum level that is set by the system and/or by a user setting (e.g., which optionally is not the maximum possible immersion level). In some embodiments, user interface 1114a maintains the same immersion level that was active when user interface 1114 was displayed (e.g., such as maintaining immersion level of three, which optionally was the immersion level before user interface 1114a was displayed as an immersive environment). Thus, a user is able to display a virtual environment associated with an application, regardless of whether three-dimensional environment 1104 already is displaying a virtual environment.

In some embodiments, in response to a user input dismissing the virtual environment associated with the application (e.g., exiting full screen mode, exiting presentation mode, etc.), user interface 1114a returns to its original non-immersive state, for example, as in FIG. 11C, and device 101 restores three-dimensional environment 1104 to the state that it had before user interface 1114a became an immersive virtual environment. In some embodiments, restoring three-dimensional environment 1104 includes ceasing display of user interface 1114a as an immersive virtual environment and re-displaying user interface 1114a in a manner similar to described in FIG. 11A, and re-displaying virtual environment 1112b at the immersion level it had before user interface 1114a was displayed as an immersive virtual environment (e.g., such as in FIG. 11C), and optionally restoring display of the physical environment portion of three-dimensional environment (e.g., if the physical environment was displayed before user interface 1114a was displayed as an immersive virtual environment, such as in FIG. 11C).

FIGS. 12A-12G is a flowchart illustrating a method 1200 of moving an object into or out of a virtual environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In the method 1200, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1202), via the display generation component, a three-dimensional environment that includes a representation of a portion of a physical environment, such as in FIG. 11A (e.g., a representation of a physical environment, a simulated environment, a computer-generated reality, an extended reality, etc.).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the three-dimensional environment is an augmented reality environment or a mixed reality environment that optionally includes virtual objects and optionally includes representations of real world objects in the physical world around the electronic device. In some embodiments, the respective environment is based at least on the physical environment around the electronic device. For example, the electronic device is able to capture visual information about the environment around the user (e.g., the objects in the environment, the size and shape of the environment, etc.) and display at least a portion of the physical environment around the user to the user, optionally such that it appears as if the user is still located in the physical environment (e.g., optionally with virtual elements at different locations in the physical environment). In some embodiments, the three-dimensional environment is actively displayed to the user via the display generation component (e.g., captured by sensors of the device and displayed to the user). In some embodiments, the three-dimensional environment is passively presented to the user via a partially transparent or translucent display through which the user is able to see at least a portion of the physical environment (e.g., by not obscuring the view of the portion of the physical environment). In some embodiments, a portion of the three-dimensional environment corresponds to the physical environment around the device. For example, a portion of the environment is a representation of the physical environment around the user (e.g., a photorealistic environment). In some embodiments, a second portion of the three-dimensional environment corresponds to a virtual environment that is different from the physical environment. In some embodiments, the virtual environment is similar to the simulated environment described above with respect to method 800. In some embodiments, the electronic device is at an intermediate immersion level in which the simulated environment encompasses less than the entire three-dimensional environment and the physical environment the rest of the three-dimensional environment. Thus, the three-dimensional environment is a hybrid environment that includes a simulated environment and the physical environment. In some embodiments, the boundary between the simulated environment and the representation of the physical environment is based on distance. For example, portions of the three-dimensional environment that include the simulated environment are farther away from the viewpoint of the three-dimensional environment displayed by the electronic device than portions of the three-dimensional environment that include representations of the physical environment. In some embodiments, the immersion level can be increased such that the simulated environment encompasses more of the display area (e.g., expanding the simulated environment, optionally towards the user), thus replacing portions of the physical environment with more of the simulated environment. In some embodiments, the immersion level can be decreased such that the simulated environment encompasses less of the display area (e.g., reducing the simulated environment, optionally away from the user), thus revealing portions of the physical environment that were previously obscured by the simulated environment. In some embodiments, the simulated environment is displayed in response to the launching of an application or the display of a user interface of an application (e.g., in response to a user selecting an application and/or enabling a full immersion mode in an application).

In some embodiments, while displaying the three-dimensional environment, the electronic device detects (1204), via the one or more input devices, a first input corresponding to a request to display a respective user interface of a respective application, such as the selection of an affordance to launch user interface 1114*a* in FIG. 11A (e.g., detecting a selection of a displayed affordance or control element to launch a respective application or otherwise display a user interface of the respective application). In some embodiments, the selection is performed by one or more hands of the user and is detected via one or more hand tracking sensors and/or cameras of the electronic device. In some embodiments, the user input is a voice command requesting display of the respective application.

In some embodiments, in response to detecting the first input, the electronic device displays (1206), via the display generation component, the respective user interface of the respective application in the portion of the physical environment in the three-dimensional environment, such as user interface 1114*a* in FIG. 11A (e.g., the user interface of the respective application is displayed in the three-dimensional environment (e.g., instantiated in the three-dimensional environment) at a location in the three-dimensional environment that is based on the physical environment around the device).

For example, the user interface of the respective application is not displayed at locations associated with and/or within the simulated environment. In some embodiments, the respective user interface overlays portions of the simulated environment because, for example, the user interface is displayed at a z-depth that is closer than portions of the simulated environment. For example, because the respective user interface is displayed at a location in the three-dimensional environment that includes representations of the physical environment, which is optionally at a closer z-depth that the location that includes the simulated environment, the respective user interface may obscure portions of the simulated environment, depending on the size and/or shape of the respective user interface.

In some embodiments, while displaying the respective user interface in the portion of the physical environment in the three-dimensional environment, the electronic device detects (1208), via the one or more input devices, a second input, such as an input for moving user input 1114a in FIG. 11B (e.g., detecting a user input corresponding to a manipulation of the respective user interface). In some embodiments, the user input is performed by one or more hands of the user and includes a selection and movement of the respective user interface. In some embodiments, the user input includes a selection of a displayed affordance or control element. In some embodiments, the user input includes a voice command. In some embodiments, the user input includes a pinch gesture performed by two or more fingers of the hand. In some embodiments, the user input includes a pointing gesture performed by one or more fingers of the hand. In some embodiments, the user input includes a movement while maintaining the pinch or pointing gesture (e.g., a drag-and-drop gesture). In some embodiments, the second input includes other suitable gestures by one or both hands of the user.

In some embodiments, in response to detecting the second input (1210), in accordance with a determination that the second input corresponds to a request to move the respective user interface into a portion of a virtual environment that is displayed along with the portion of the physical environment in the three-dimensional environment, the electronic device displays (1212) the respective user interface in the portion of the virtual environment in the three-dimensional environment, such as in FIG. 11C (e.g., if the user input corresponds to a request to move the respective user interface to a location in the three-dimensional environment that includes the simulated environment, then the respective user interface is moved into the simulated environment).

In some embodiments, aspects of the simulated environment adapt to the existence of the respective user interface. For example, the respective user interface optionally casts a shadow onto portions of the simulated environment, water in the simulated environment optionally display a reflections and/or refractions of the respective user interface, etc. Thus, in some embodiments, the respective user interface is treated as if it were an object that exists in the simulated environment, optionally instead of a virtual object that exists in the representation of the physical environment. For example, the respective user interface has moved out of the user's "room" and into the virtual simulated environment. In some embodiments, moving the respective user interface into the simulated environment includes an input moving the respective user interface to a z-depth associated with the simulated environment. Thus, when the respective user interface is moved beyond the boundary between the physical environment and the simulated environment, the respective user interface is transported out of the physical environment and into the simulated environment. In some embodiments, the respective user interface can be moved back from the simulated environment to the physical environment in an analogous manner as moving the respective user interface from the physical environment to the simulated environment.

The above-described manner of moving a user interface from a representation of the physical environment around the device into a simulated environment (e.g., in response to an input moving the user interface to a location in the three-dimensional environment associated with the simulated environment) maintains the ability to place the user interface at various locations in the three-dimensional environment without the simulated environment reducing such placement options, which simplifies the interaction between the user and the electronic device and enhances the operability of the electronic device and makes the user-device interface more efficient (e.g., by enabling the user to move user interfaces anywhere in the three-dimensional environment including into a simulated environment, without requiring the user to perform additional inputs to re-instantiate the user interface in the simulated environment) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the portion of the virtual environment is displayed in the three-dimensional environment when the first input is detected, and in response to detecting the first input, the respective user interface of the respective application is displayed concurrently with the portion of the virtual environment in the three-dimensional environment (1214), such as in FIG. 11C (e.g., when the user input was received causing display of the respective user interface, the three-dimensional environment included at least a portion of the virtual environment).

For example, while the three-dimensional environment included a portion of a representation of the physical environment and a portion of the virtual environment (e.g., such as described above with respect to method 800 and 1000), a user input is received causing display of a user interface of the respective application. In some embodiments, in response to the user input, the user interface of the respective application is displayed in the area of the three-dimensional environment corresponding to the representation of the physical environment and not in the area of the three-dimensional environment corresponding to the virtual environment. In some embodiments, the user interface of the respective application is displayed concurrently with the virtual environment. In some embodiments, the user interface of the respective application obscures a portion of the virtual environment (e.g., due to being "in front" of the virtual environment).

The above-described manner of displaying a user interface of an application (e.g., concurrently with a virtual environment if the three-dimensional environment included the virtual environment when the user interface of the application was displayed) maintains the ability to place the user interface at various locations in the three-dimensional environment without the simulated environment reducing such placement options, which simplifies the interaction between the user and the electronic device and enhances the operability of the electronic device and makes the user-device interface more efficient (e.g., by enabling the user to display user interfaces in the three-dimensional environment including into a simulated environment, without requiring the user to perform additional inputs to re-instantiate the simulated environment when the user interface is displayed) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the portion of the virtual environment is not displayed in the three-dimensional environment when the first input is detected, and the portion of the virtual environment is displayed in the three-dimensional environment when the second input is detected (1216) (e.g., when the input is received causing display of the respective user interface of the respective application, the three-dimensional environment did not include the virtual environment).

In some embodiments, the virtual environment is displayed in the three-dimensional environment after and optionally while the respective user interface is being displayed in the three-dimensional environment (e.g., in response to a user input causing display of the virtual environment, such as described above with respect to methods 800 and 1000). In some embodiments, if, while the three-dimensional environment includes the respective user interface, the simulated environment is caused to be displayed at the location of the respective user interface (e.g., a portion of the simulated environment is located at the location), then the respective user interface is moved away from the location to a location that includes a representation of the physical environment and does not include the simulated environment (e.g., the respective user interface is displaced by the simulated environment).

The above-described manner of displaying a simulated environment (e.g., concurrently with a user interface of an application if the user interface of the application is displayed in the three-dimensional environment when the simulated environment is displayed) maintains the ability to display the user interface in the three-dimensional environment even when a simulated environment is displayed in the three-dimensional environment, which simplifies the interaction between the user and the electronic device and enhances the operability of the electronic device and makes the user-device interface more efficient (e.g., by enabling the user to display user interfaces in the three-dimensional environment and simulated environments, without regard to the order in which the user interfaces or simulated environments are displayed) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the respective user interface of the respective application in the portion of the physical environment in the three-dimensional environment, the electronic device displays (1218), via the display generation component, at least a respective portion of the portion of the physical environment with a lighting effect based on the respective user interface of the respective application, such as reflection 1122 in FIG. 11A (e.g., the respective application is a type of lighting source that causes one or more environmental lighting effects to other objects in the three-dimensional environment).

For example, the user interface of the respective application casts light (e.g., based on the currently-displayed content in the respective user interface) onto objects in the representation of the physical environment and/or objects in the simulated environment based on one of more lighting or particle physics. In some embodiments, the user interface is directional and thus casts light "forward" (e.g., in the direction that the user interface is facing). For example, the user interface acts like a monitor or television and casts light (e.g., such as from the bright elements on the user interface). In some embodiments, if the user interface is in the physical environment portion of the three-dimensional environment, the user interface casts light onto other areas of the physical environment (e.g., the portions that are in front of the user interface). In some embodiments, if the user interface is in the simulated environment portion of the three-dimensional environment, the user interface casts light onto areas of the simulated environment and optionally also casts light onto areas of the physical environment (e.g., that are in front of the simulated environment). In some embodiments, the respective lighting effects are not displayed on portions of the representation of the physical environment when the user interface is not displayed in the three-dimensional environment.

The above-described manner of displaying lighting effects from a user interface (e.g., by casting light from the user interface onto other objects in the three-dimensional environment) provides a more immersive experience (e.g., by treating a user interface as a lighting source that interacts with other objects in the three-dimensional environment), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the respective user interface of the respective application in the portion of the virtual environment in the three-dimensional environment, the electronic device displays (1220), via the display generation component, at least a respective portion of the portion of the virtual environment with a lighting effect based on the respective user interface of the respective application, such as reflection 1122 in FIG. 11C (e.g., if the user interface is in the simulated environment portion of the three-dimensional environment, the user interface casts light onto areas of the simulated environment (e.g., areas that are in front of the user interface) and optionally also casts light onto areas of the physical environment (e.g., areas of the representation of the physical environment that are in front of the simulated environment), such as based on the content currently displayed by the respective user interface).

For example, if the respective user interface is primarily red, then the respective user interface casts red light onto objects in the three-dimensional environment. In some embodiments, as the contents of the respective user interface changes (e.g., such as if the user scrolls the respective user interface, navigates to a different user interface, if the respective user interface, is a media player application that is playing media, etc.) the light being cast by the respective user interface (e.g., the pattern, the color, the texture, the magnitude of the lighting, etc.) changes accordingly. In some embodiments, the respective lighting effects are not displayed on portions of the simulated environment when the user interface is not displayed in the three-dimensional environment. The lighting effects cast onto the virtual environment optionally have one or more of the characteristics of the lighting effects described with reference to being cast onto the physical environment.

The above-described manner of displaying lighting effects from a user interface (e.g., by casting light from the user interface onto other objects in the three-dimensional environment) provides a more immersive experience (e.g., by treating a user interface as a lighting source that interacts with other objects in the three-dimensional environment), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the respective user interface of the respective application in the portion of the physical environment in the three-dimensional environment, the electronic device detects (1222), via the display generation component, at least a respective portion of the respective user interface of the respective application with a lighting effect based on the portion of the physical environment, such as if user interface 1114*a* receives a lighting effect due to lighting from physical environment 1102 in FIG. 11A (e.g., the user interface is displayed with a respective lighting effect due to one or more lighting effects from the physical environment (e.g., a lighting effect from a source external to the user interface)).

For example, if the physical environment includes one or more lighting sources, such as a bright window, a light bulb, a lamp, etc., then the lighting sources optionally cast light onto the user interface. For example, the user interface optionally reflects and/or refracts light from the one or more lighting sources and displays a glare or reflection. In some embodiments, the displayed lighting effect depends on the position of the lighting source and the position of the user interface (e.g., according to the physics of light). In some embodiments, if the user interface is not displayed in the three-dimensional environment, the respective lighting effect is not displayed. In some embodiments, if the user interface is displayed in the simulated environment (e.g., as opposed to in the representation of the physical environment)), lighting sources from the physical environment do not cast lighting effects onto the user interface. In some embodiments, the lighting sources from the physical environment cast lighting effects onto the user interface, regardless of whether the user interface is displayed in the simulated environment or in the representation of the physical environment.

The above-described manner of displaying lighting effects from the physical environment onto a user interface (e.g., by casting light from lighting sources in the physical environment onto the user interface located in the three-dimensional environment) provides a more immersive experience (e.g., by treating a user interface as a an object on which light from light sources can be cast), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the respective user interface of the respective application in the portion of the virtual environment in the three-dimensional environment, the electronic device displays (1224), via the display generation component, at least a respective portion of the respective user interface of the respective application with a lighting effect based on the portion of the virtual environment, such as if user interface 1114*a* received a lighting effect due to a virtual lighting source in virtual environment 1112*a* in FIG. 11A (e.g., the user interface is displayed with a respective lighting effect due to one or more lighting effects from the simulated environment (e.g., a lighting effect from a source external to the user interface)).

For example, if the simulated environment includes one or more lighting sources, such as a bright window, a light bulb, a lamp, etc., then the lighting sources optionally cast light onto the user interface. For example, the user interface optionally reflects and/or refracts light from the one or more lighting sources and displays a glare or reflection. In some embodiments, the displayed lighting effect depends on the position of the lighting source and the position of the user interface (e.g., according to the physics of light). In some embodiments, if the user interface is not displayed in the three-dimensional environment, the respective lighting effect is not displayed. In some embodiments, if the user interface is displayed in the representation of the physical environment (e.g., as opposed to the simulated environment), lighting sources from the virtual environment do not cast lighting effects onto the user interface. In some embodiments, lighting sources from the virtual environment cast lighting effects onto the user interface regardless of whether the user interface is displayed in the representation of the physical environment or the simulated environment.

The above-described manner of displaying lighting effects from the simulated environment onto the user interface (e.g., by casting light from lighting sources in the simulated environment onto a user interface located in the three-dimensional environment) provides a more immersive experience (e.g., by treating a user interface as a an object on which light from light sources can be cast), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, in response to detecting the second input, the electronic device increases (1226) a size of the respective user interface of the respective application in the three-dimensional environment in accordance with movement of the respective user interface into the portion of the virtual environment and away from a viewpoint of the user, such as user interface 1114*a* increasing in size in FIG. 11C, optionally based on how far away user interface 1114*a* was moved (e.g., in response to moving the user interface from the physical environment to the virtual environment (e.g., and thus further away from a viewpoint into the three-dimensional environment that is being displayed via the display generation component), the user interface increases in size relative to the objects in the three-dimensional environment).

For example, if the user interface has a virtual size of 2 feet by 1 foot (e.g., the size of the user interface in the three-dimensional environment is 2 feet by 1 foot, which is optionally different than the size of the user interface as it appears to the user due distance from the user interface to the viewpoint of the user), then in response to moving the user interface into the simulated environment, the size of the user interface is increased to 100 foot by 50 foot. In some embodiments, the aspect ratio is maintained. In some embodiments, the size of the user interface is increased such that the size of the user interface from the perspective of the user (e.g., from the viewpoint of the user) remains the same. For example, if the user interface is moved from being five feet away from the user (e.g., in the representation of the physical environment) to being 50 feet away (e.g., to a location in the simulated environment that is 50 feet away from the user), then the user interface is optionally increased by 10 times to maintain the same size relative to the display generation component (e.g., the same display area).

The above-described manner of moving a user interface from the portion of the three-dimensional environment associated with the physical environment to the portion of the three-dimensional environment associated with a simulated environment (e.g., by increasing the size of the user interface when the user interface is moved into the simulated environment) provides a more consistent and immersive experience (e.g., by increasing the size of the user interface when the user interface is moved into the simulated environment, thus moving the user interface to a potentially far distance, such that the user interface is still visible to the user), which simplifies the interaction between the user and the electronic device and enhances the operability of the electronic device and makes the user-device interface more efficient (e.g., without requiring the user to perform additional inputs to increase the size of the user interface when moved into the simulated environment) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, before detecting the second input and when the second input is detected, at least a portion of the three-dimensional environment is displayed with a first lighting effect corresponding to a first time of day (1228), such as in FIGS. 11A-11B (e.g., the three-dimensional environment is displayed with a certain amount of lighting as if it were at a particular time of day). In some embodiments, the time of day is the current time of day. In some embodiments, the lighting effect is based on the current weather condition and the current time of day at the user's location (e.g., cloudy, foggy, overcast, partially sunny, fully sunny, sunrise, sunset, etc.). In some embodiments, the lighting of the three-dimensional environment is a photorealistic depiction of the current lighting conditions of the physical environment around the user (e.g., optionally the device does not provide any virtual lighting effects and/or modify the lighting of the representation of the physical environment). In some embodiments, the lighting of the simulated environment is based on the lighting of the physical environment (e.g., matching the same lighting conditions, matching the same time of day, etc.).

In some embodiments, in response to detecting the second input, the electronic device displays (1230), via the display generation component, the portion of the three-dimensional environment with a second lighting effect, different from the first lighting effect, corresponding to a second time of day, different from the first time of day, such as if the lighting were changed to a dim theater lighting in FIG. 11C (e.g., in response to moving the user interface into the simulated environment, changing the lighting such that the three-dimensional environment appears to be at a different time of day. For example, changing the lighting of the representation of the physical environment and/or the simulated environment to simulate night (e.g., 9 o'clock at night). In some embodiments, moving the user interface into the simulated environment causes the three-dimensional environment to enter into a theater mode in which the lighting is dimmed such that it appears as if the user is viewing a movie at night. In some embodiments, changing the light effect includes changing the magnitude of the ambient light (e.g., dimming the lighting sources), removing or adding light sources (e.g., removing the sun as a light source and introducing the moon and/or stars as light sources), changing the angle and/or origin of the light sources (e.g., moving the simulated sun to a sunset position, etc.), etc.).

The above-described manner of changing a lighting effect to simulate a different time of day (e.g., in response to moving a user interface into a simulated environment) provides an immersive experience (e.g., by modifying the lighting of the three-dimensional environment to simulate lighting that is appropriate for the context), which simplifies the interaction between the user and the electronic device and enhances the operability of the electronic device and makes the user-device interface more efficient (e.g., without requiring the user to perform additional inputs to change the lighting to what is appropriate for the context) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying, via the display generation component, a portion of the three-dimensional environment with a first lighting effect corresponding to a first time of day, the electronic device detects (1232), via the one or more input devices, a third input corresponding to a request to display the portion of the three-dimensional environment with a respective lighting effect corresponding to a respective time of day at the electronic device (e.g., receiving an input corresponding to a request to cause the lighting displayed in the three-dimensional environment to match the current time of day at the electronic device). For example, the three-dimensional environment includes one or more selectable affordances associated with different times of day, which are selectable to cause the three-dimensional environment to simulate the lighting at the respective time of day. In some embodiments, one of the selectable affordances is selectable to cause the three-dimensional environment to simulate the lighting of the current time of day (e.g., the current time that the user is interacting with the electronic device).

In some embodiments, in response to detecting the third input (1234), in accordance with a determination that the respective time of day at the electronic device is a second time of day, displaying, via the display generation component, the portion of the three-dimensional environment with a second lighting effect (1236), such as if three-dimensional environment 1104 is updated in FIG. 11A to appear as if it is currently a different time of day (e.g., if the current time of day is the second time of day, modifying the lighting of the three-dimensional environment to have the second lighting effect as if the three-dimensional environment is at the second time of day). For example, if the current time of day is 6 A.M. (e.g., sunrise), then the three-dimensional environment is displayed with a sunrise lighting effect (e.g., incoming light from a horizontal source, orange coloring, etc.). In some embodiments, displaying the three-dimensional environment with a second lighting effect optionally causes the three-dimensional environment to switch from daytime lighting (e.g., full-sun ambient lighting, partial sun ambient lighting, etc.) to nighttime lighting (e.g., no lighting, low ambient lighting, moonlit ambiance, etc.) or to switch from nighttime lighting to daytime lighting.

In some embodiments, in accordance with a determination that the respective time of day at the electronic device is a third time of day, different from the second time of day, the electronic device displays (1238), via the display generation component, the portion of the three-dimensional environment with a third lighting effect, different from the second lighting effect (e.g., if the current time of day is the third time of day, modifying the lighting of the three-dimensional environment to have the third lighting effect as if the three-dimensional environment is at the third time of day). For example, if the current time of day is 12 P.M. (e.g., noon), then the three-dimensional environment is displayed with bright mid-day light (e.g., incoming light from a vertical source, bright white coloring, etc.).

The above-described manner of changing a lighting effect to simulate a current time of day (e.g., in response to a user input requesting the three-dimensional environment to match the current time of day) provides a more immersive experience (e.g., by modifying the lighting of the three-dimensional environment to match the current time of day, thereby creating an environment similar to the user's physical environment), which simplifies the interaction between the user and the electronic device and enhances the operability of the electronic device and makes the user-device interface more efficient (e.g., without requiring the user to perform additional inputs to manually adjust the lighting to match the current ambient lighting) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying, via the display generation component, a portion of the three-dimensional environment with a first lighting effect corresponding to a first time of day, the electronic device detects (1240), via the one or more input devices, a third input corresponding to a request to display the portion of the three-dimensional environment with a respective lighting effect corresponding to a respective time of day (e.g., receiving an input corresponding to a request to cause the lighting displayed in the three-dimensional environment match a particular time of day). For example, the three-dimensional environment includes one or more selectable affordances associated with different times of day, which are selectable to cause the three-dimensional environment to simulate the lighting at the respective time of day.

In some embodiments, in response to detecting the third input (1242), in accordance with a determination that the third input indicates a second time of day, the electronic device displays (1244), via the display generation component, the portion of the three-dimensional environment with a second lighting effect (e.g., if the input selected an affordance for a second time of day, modifying the lighting of the three-dimensional environment to have the second lighting effect as if the three-dimensional environment is at the second time of day). For example, if the user selected the 6 A.M. affordance, then the three-dimensional environment is displayed with a sunrise lighting effect (e.g., incoming light from a horizontal source, orange coloring, etc.).

In some embodiments, in accordance with a determination that the third input indicates a third time of day, different from the second time of day, the electronic device displays (1246), via the display generation component, the portion of the three-dimensional environment with a third lighting effect, different from the second lighting effect, such as if three-dimensional environment 1104 in FIG. 11A to appear as if it is at a different time of day based on the time of day selected by the user input (e.g., if the input selected an affordance for a third time of day, modifying the lighting of the three-dimensional environment to have the third lighting effect as if the three-dimensional environment is at the third time of day). For example, if the user selected the 12 P.M. (e.g., noon) affordance, then the three-dimensional environment is displayed with bright mid-day light (e.g., incoming light from a vertical source, bright white coloring, etc.).

The above-described manner of changing a lighting effect to simulate a particular time of day (e.g., in response to a user input requesting the three-dimensional environment to be displayed at the particular time of day) provides an immersive simulated experience (e.g., by setting the lighting of the three-dimensional environment to a particular time of day), which simplifies the interaction between the user and the electronic device and enhances the operability of the electronic device and makes the user-device interface more efficient (e.g., without requiring the user to perform additional inputs to manually adjust the lighting to match a particular time of day) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, while displaying the portion of the virtual environment along with the portion of the physical environment in the three-dimensional environment, the electronic device displays (1248), via the display generation component, at least a respective portion of the portion of the physical environment with a lighting effect based on the portion of the virtual environment, such as if virtual environment 1112a casts lighting effects onto the real world environment portion of three-dimensional environment 1104 in FIG. 11A (e.g., the lighting of the virtual environment optionally affects the lighting of the representation of the physical environment).

For example, if the virtual environment is simulating a morning lighting scene, the representation of the physical environment is modified to also simulate a morning lighting scene. Thus, in some embodiments, the ambient lighting effects of the representation of the physical environment optionally match the ambient lighting effects of the virtual environment. In some embodiments, the virtual environment casts one or more lighting effects on the representation of the physical environment. For example, the virtual environment optionally includes one or more lighting sources (e.g., the sun, the moon, ambient light, etc.) and the one or more lighting sources create a lighting effect on objects in the physical environment (e.g., according to lighting physics). Thus, in some embodiments, when the three-dimensional environment includes a portion with a representation of the physical environment and a portion with a simulated environment, the environment is treated as if the physical environment is merged with the simulated environment as if it is a real world environment that is partially the physical environment around the electronic device and partially the simulated environment.

The above-described manner of displaying the representation of the physical environment with lighting effects based on the simulated environment (e.g., matching the ambient lighting of the physical environment to the ambient lighting of the virtual environment) provides an immersive experience (e.g., by treating the virtual environment as if it is in the same environment as the representation of the physical environment), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the lighting effect based on the portion of the virtual environment brightens at least the respective portion of the physical environment (1250), such as shining light onto and brightening portions of the real world environment portion of three-dimensional environment 1104 in FIG. 11A (e.g., the virtual environment casts one or more lighting effects on the representation of the physical environment). For example, the virtual environment optionally includes one or more lighting sources (e.g., the sun, the moon, ambient light, etc.) and the one or more lighting sources create a lighting effect on objects in the physical environment (e.g., according to lighting physics). Thus, in some embodiments, when the three-dimensional environment includes a portion with a representation of the physical environment and a portion with a simulated environment, the environment is treated as if the physical environment is merged with the simulated environment as if it is a real world environment that is partially the physical environment around the electronic device and partially the simulated environment. In some embodiments, the lighting effect causes the representation of the physical environment to become brightened (e.g., more ambient light).

The above-described manner of displaying a lighting effect in the representation of the physical environment (e.g., based on light sources in the virtual environment) provides an immersive experience (e.g., by treating the virtual environment as if it is in the same environment as the representation of the physical environment such that elements of the virtual environment can affect the physical environment), which simplifies the interaction between the user and the electronic device and enhances the operability of the electronic device and makes the user-device interface more efficient and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, the lighting effect based on the portion of the virtual environment darkens at least the respective portion of the physical environment (1252), such as if virtual environment 1112 has a darker ambient lighting, virtual environment 1112 optionally causes the real world environment portion of three-dimensional environment 1104 in FIG. 11A to become darkened to match virtual environment 1112 (e.g., the lighting effect from the virtual environment causes the ambient lighting of the representation of the physical environment to be reduced). For example, the virtual environment has darker ambient lighting than the representation of the physical environment and thus the virtual environment causes the representation of the physical environment to darken to match and/or blend with the virtual environment. In some embodiments, the entirety of the representation of the physical environment is darkened to match the ambient lighting of the virtual environment. In some embodiments, a portion of the representation of the physical environment is darkened to match the ambient lighting of the virtual environment while another portion of the physical environment is not darkened (e.g., to blend the physical environment with the virtual environment and avoid abrupt changes to the ambient lighting).

The above-described manner of darkening the ambient lighting of the representation of the physical environment (e.g., based on the lighting of the virtual environment) provides an immersive experience (e.g., by blending the lighting of the representation of the physical environment with the lighting of the virtual environment), which simplifies the interaction between the user and the electronic device and enhances the operability of the electronic device and makes the user-device interface more efficient and reduces potential disorientation that can potentially lead to vertigo or motion sickness symptoms (e.g., by reducing abrupt changes in lighting at the boundary between the representation of the physical environment and the virtual environment), which additionally reduces power usage and improves battery life of the electronic device by enabling the user to use the electronic device more quickly and efficiently, while reducing errors in usage.

In some embodiments, while displaying the respective user interface of the respective application in the portion of the virtual environment in the three-dimensional environment, the electronic device detects (1254), via the one or more input devices, a third input (e.g., while the user interface of the respective application is displayed in the virtual environment).

In some embodiments, in response to detecting the third input (1256), in accordance with a determination that the third input corresponds to a request to display a respective virtual environment of the respective application, such as a user input requesting presentation mode for user interface 1114a in FIG. 11C (e.g., a request to display the respective user interface in a full-screen mode, full-immersion mode, presentation mode, immersive experience mode, etc.), the electronic device displays (1258), via the display generation component, the respective virtual environment of the respective application without displaying the portion of the virtual environment, such as in FIG. 11D (e.g., displaying the respective user interface in a full-screen, full-immersion, presentation, or immersive experience mode).

In some embodiments, displaying the respective user interface in the full-screen, full-immersion, presentation, or immersive experience mode includes displaying a virtual environment associated with the respective application (e.g., rather than the virtual environment and/or physical environment that were previously displayed). For example, a respective virtual environment for a presentation application is an auditorium environment in which the user is located at a podium as if giving a presentation. In some embodiments, displaying the respective virtual environment includes replacing the virtual environment with the respective virtual environment. In some embodiments, displaying the respective virtual environment includes replacing both the virtual environment and the representation of the physical environment with the respective virtual environment (e.g., replacing the entirety of the three-dimensional environment with the respective virtual environment). In some embodiments, the amount of immersion is maintained (e.g., if the virtual environment encompassed half of the three-dimensional environment when the third input was detected, the respective virtual environment replaces the half in which the virtual environment was displayed). In some embodiments, the immersion is increased to the maximum immersion level (e.g., optionally capped at the user-selected maximum level).

The above-described manner of displaying a virtual environment of a respective application (e.g., by replacing the previously displayed virtual environment with the virtual environment of the respective application) provides an immersive experience associated with the respective application (e.g., by displaying only one immersive virtual environment at a time), which simplifies the interaction between the user and the electronic device and enhances the operability of the electronic device and makes the user-device interface more efficient (e.g., without requiring the user to perform additional inputs to remove display of the virtual environment when the respective application switches to an immersive mode) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

In some embodiments, before displaying the respective virtual environment of the respective application, the portion of the virtual environment in the three-dimensional environment has one or more visual characteristics (1260), such as virtual environment 1112a having certain lighting effects, immersive effects, etc. in FIG. 11C (e.g., the virtual environment is displayed with respective lighting effects, at a respective time of day, with one or more lighting effects from portions of the three-dimensional environment external to the virtual environment (e.g., if any exist)).

In some embodiments, after displaying the respective virtual environment of the respective application, the respective virtual environment has the one or more visual characteristics (1262), such as user interface 1114a in FIG. 11D having the same or similar lighting effects, immersive effects, etc. as virtual environment 1112a in FIG. 11C (e.g., the respective virtual environment of the respective application is displayed with the same or similar visual characteristics as the virtual environment that it replaced).

For example, if the virtual environment is displayed with a sunrise lighting effect (e.g., as if it were an early morning time of day), then the respective virtual environment of the respective application is also displayed with the same or a similar sunrise lighting effect (e.g., as if it were the same early morning time of day). In some embodiments, if the virtual environment included lighting effects that blended with the physical environment, then the respective virtual environment of the respective application has the same or similar blending with the physical environment. Thus, in some embodiments, the respective virtual environment of the respective application exhibits the same behaviors and characteristics, and/or follows the same rules as the display of the virtual environment that it replaced. In some embodiments, the amount of immersion is maintained (e.g., if the virtual environment encompassed half of the three-dimensional environment when the third input was detected, the respective virtual environment replaces the half in which the virtual environment was displayed).

The above-described manner of displaying a virtual environment of a respective application (e.g., by displaying the virtual environment of the application with the same or similar visual characteristics as the virtual environment that it replaced) provides a continuous immersive experience (e.g., by maintaining at least some of the visual characteristics of the virtual environment that the respective virtual environment replaced), which simplifies the interaction between the user and the electronic device and enhances the operability of the electronic device and makes the user-device interface more efficient (e.g., without requiring the user to perform additional inputs to match the same mood and/or context) and reduces potential disorientation that can potentially lead to vertigo or motion sickness symptoms (e.g., by avoiding abrupt changes when replacing the virtual environment with the respective virtual environment of the respective application), which additionally reduces power usage and improves battery life of the electronic device by enabling the user to use the electronic device more quickly and efficiently, while reducing errors in usage.

In some embodiments, when the third input is detected, the respective user interface of the respective application is displayed, via the display generation component, in the portion of the virtual environment along with the portion of the physical environment in the three-dimensional environment (1264), such as user interface 1114a in FIG. 11C (e.g., the three-dimensional environment concurrently includes a portion of the representation of the physical environment and the virtual environment). In some embodiments, the virtual environment is displayed at the maximum level of immersion as determined by the system and/or a user setting, such as described with reference to method 1000. For example, if the system or a user setting caps the maximum level of immersion at 50%, then the virtual environment is displayed at a 50% immersion level (e.g., the farther half of the representation of the physical environment is replaced with the virtual environment.

In some embodiments, in response to detecting the third input and in accordance with the determination that the third input corresponds to the request to display the respective virtual environment of the respective application (e.g., a request to display the respective user interface in a full-screen mode, full-immersion mode, presentation mode, immersive experience mode, etc.), the respective virtual environment of the respective application is displayed, via the display generation component, without display of the portion of the virtual environment (1266), such as user interface 1114a replacing virtual environment 1112a in FIG. 11D such that virtual environment 1112a is no longer displayed in three-dimensional environment 1104 (e.g., the respective virtual environment is displayed at the same immersion level as the virtual environment it replaced and/or the respective virtual environment is displayed at the maximum level of immersion as defined by the system and/or a user setting).

In some embodiments, the third input includes a user input increasing the immersion level. In some embodiments, the third input includes a user input other than an input increasing the immersion level, such as the selection of an immersive presentation mode. For example, if the virtual environment was at the maximum immersion level, the respective virtual environment is also displayed at the same maximum immersion level upon replacing the virtual environment. In some embodiments, if the virtual environment was not at the maximum immersion level, when the respective virtual environment replaced the virtual environment, the immersion level is increased to the maximum immersion level. In some embodiments, if the virtual environment was not at the maximum immersion level, when the respective virtual environment replaced the virtual environment, the same level of immersion is maintained (e.g., if the virtual environment encompassed the back half of the three-dimensional environment, the respective virtual environment also encompasses the back half of the three-dimensional environment). In some embodiments, the immersion level of the respective virtual level does not exceed the maximum immersion level of the system (e.g., even if the respective application supports higher immersion levels). In some embodiments, if the third input is an input to increase or decrease the level of immersion, such as the rotation of a mechanical dial or the selection of an affordance to increase or decrease immersion, the third input is not a request to display the respective virtual environment of the respective application and in response, the virtual environment increases or decreases in immersion and the respective application optionally does not increase or decrease in immersion. For example, an input increasing or decreasing immersion causes the virtual environment to change immersion levels.

The above-described manner of displaying a virtual environment of a respective application (e.g., by limiting the level of immersion for the virtual environment to the system's maximum level of immersion) provides a consistent immersive experience (e.g., by not providing more immersion than the amount of immersion before the respective virtual environment was displayed), which simplifies the interaction between the user and the electronic device and enhances the operability of the electronic device and makes the user-device interface more efficient (e.g., without requiring the user to perform additional inputs to change the level of immersion) and reduces potential disorientation that can potentially lead to vertigo or motion sickness symptoms (e.g., by avoiding abrupt changes in the immersion level when replacing the virtual environment with the respective virtual environment of the respective application), which additionally reduces power usage and improves battery life of the electronic device by enabling the user to use the electronic device more quickly and efficiently, while reducing errors in usage.

In some embodiments, when the third input is detected, the portion of the virtual environment is displayed, via the display generation component, at a first level of immersion (1268), such as virtual environment 1112a being displayed at an immersion level of three in FIG. 11C (e.g., the virtual environment is displayed at a first level of immersion). In some embodiments, the first level of is no immersion, or an intermediate level of immersion, etc. In some embodiments, as described above with respect to methods 800 and 1000, a level of immersion optionally dictates the amount of the three-dimensional environment is encompassed by the virtual environment.

In some embodiments, in response to detecting the third input and in accordance with the determination that the third input corresponds to the request to display the respective virtual environment of the respective application (e.g., a user input other than an input increasing the immersion level, such as the selection of a full-screen mode, full-immersion mode, presentation mode, immersive experience mode, etc.), the respective virtual environment of the respective application is displayed, via the display generation component, at a second level of immersion, greater than the first level of immersion (1270), such as user interface 1114a being displayed at an immersion level of nine in FIG. 11D (e.g., in response to displaying the respective virtual environment of the respective application and replacing the virtual environment, the level of immersion is increased from the level at which the virtual environment that was replaced was displayed). For example, if the level of immersion of the virtual environment was at an intermediate level, when the respective virtual environment is displayed, the level of immersion is increased to the maximum level of immersion. In some embodiments, if the level of immersion of the virtual environment is at the maximum level, the level of immersion is maintained at the maximum level.

The above-described manner of displaying a virtual environment of a respective application (e.g., by increasing the level of immersion when the virtual environment of the respective application is displayed) provides an immersive experience (e.g., by increasing the immersion when the user requests an immersive experience from the respective application), which simplifies the interaction between the user and the electronic device and enhances the operability of the electronic device and makes the user-device interface more efficient (e.g., without requiring the user to perform additional inputs to increase the level of immersion) and reduces potential disorientation that can potentially lead to vertigo or motion sickness symptoms, which additionally reduces power usage and improves battery life of the electronic device by enabling the user to use the electronic device more quickly and efficiently, while reducing errors in usage.

FIGS. 13A-13H illustrate examples of selectively changing the display of a simulated environment and/or atmospheric effect in a three-dimensional environment based on movement of an object associated with a viewpoint of a user in accordance with some embodiments.

FIG. 13A illustrates an electronic device 101 displaying, via a display generation component (e.g., display generation component 120 of FIG. 1), a three-dimensional environment 1304 from a viewpoint of the user 1320 illustrated in overhead view 1318 (e.g., facing the back wall of real world environment 1302). As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

As shown in FIG. 13A, device 101 captures one or more images of the real-world environment 1302 around device 101 (e.g., operating environment 100), including one or more objects in the real-world environment 1302 around device 101. In some embodiments, device 101 displays representations of the real-world environment in three-dimensional environment 1304, and also displays simulated environment 1322a. For example, three-dimensional environment 1304 includes a representation of coffee table 1314a, which is optionally a representation of a physical coffee table in real world environment 1302, and three-dimensional environment 1304 includes simulated environment 1322a, which optionally has one or more of the characteristics of simulated environments described with reference to methods 800, 1000, 1200 and/or 1400. Three-dimensional environment 1304 optionally has one or more of the characteristics of three-dimensional environment 904 described with reference to FIGS. 9A-9H and/or method 1000. As shown in overhead view 1318 of three-dimensional environment 1304 (e.g., including portions of real-world environment 1302 and simulated environment 1322b), real world environment 1302 includes coffee table 1314b, corner table 1308b, desk 1310b, couch 1319 and diagonal table 1312b; however, in FIG. 13A, only representation 1314a (corresponding to coffee table 1314b) is currently displayed in three-dimensional environment 1304 by device 101, because simulated environment 1322a obscures display of the other physical objects and/or other portions of real world environment 1302 (e.g., because simulated environment 1322a—corresponding to simulated environment 1322b in overhead view 1318—occupies the portion of three-dimensional environment 1304 that includes those physical objects and/or other portions, as described with reference to methods 800, 1000, 1200 and/or 1400).

In FIG. 13A, device 101 is also displaying simulated environment 1322a in three-dimensional environment 1304, with a boundary 1321 between simulated environment 1322a and the portion of three-dimensional environment 1304 corresponding to real world environment 1302. In some embodiments, boundary 1321 is a feathered boundary between simulated environment 1322a and the portion of three-dimensional environment 1304 that corresponds to real world environment 1302, such that within boundary 1321 a (e.g., faded or blurred) portion of simulated environment 1322a and a (e.g., faded or blurred) portion of real world environment 1302 are both displayed. In FIG. 13A, boundary 1321 is a particular distance from the viewpoint of the user 1320 that is further than table 1314b, but closer than tables 1308b and 1312b and desk 1310b.

As shown via display generation component 120 and in overhead view 1318 in FIG. 13A, simulated environment 1322a includes virtual object 1334a (corresponding to 1334b in overhead view 1318) and virtual object 1332a (corresponding to 1332b in overhead view 1318). Virtual object 1332a is beyond the border of real world environment 1302 (e.g., at a location corresponding to a location behind the back wall of the room and/or further from the viewpoint of the user than the back wall of the room in which the user 1320 is located). Three-dimensional environment 1304 also includes virtual object 1330a (corresponding to 1330b in overhead view 1318), however, virtual object 1330a is included in a portion of three-dimensional environment 1304 corresponding to real world environment 1302, rather than in a portion of three-dimensional environment 1304 corresponding to simulated environment 1322a. Virtual objects 1330a, 1332a and/or 1334a are optionally one or more of user interfaces of applications (e.g., messaging user interfaces, content browsing user interfaces, etc.), three-dimensional objects (e.g., virtual clocks, virtual balls, virtual cars, etc.) or any other element displayed by device 101 that is not included in real world environment 1302.

In some embodiments, additionally or alternatively to displaying virtual objects and/or a simulated environment, device 101 displays one or more atmospheric effects, such as illustrated in FIG. 13B. For example, in FIG. 13B, device 101 is displaying three-dimensional environment 1304 from the same viewpoint of user 1320 as in FIG. 13A; specifically, in FIG. 13B, real world environment 1302 of device 101 is optionally the same as shown and described in FIG. 13A. However, in FIG. 13B, rather than displaying a simulated environment, device 101 is displaying representations of real world environment 1302 with one or more atmospheric effects, such as an artificial (e.g., virtual) modification of the visual characteristics of the physical environment or one or more objects in three-dimensional environment 1304, optionally without replacing or removing the one or more objects in three-dimensional environment 1304. For example, an atmospheric effect optionally includes displaying three-dimensional environment 1304 as if it were illuminated by a sunset, displaying three-dimensional environment 1304 as if it were foggy, displaying three-dimensional environment 1304 as if it were dimly lit, etc. As shown in overhead view 1318, displaying an atmospheric effect optionally does not include displaying a virtual environment in place of portions of the real world environment portion of three-dimensional environment 1304 (e.g., although it is understood that it is possible to display both an atmospheric effect and a virtual environment at the same time). The atmospheric effect illustrated in FIG. 13B optionally has one or more of the characteristics of atmospheric effects described with reference to methods 800, 1000 and/or 1200.

In FIG. 13B, the atmospheric effect includes displaying virtual light entering the physical environment from window 1315. In some embodiments, the virtual light entering from window 1315 is a lighting effect that is different from the amount of real world light entering from window 1315 in real world environment 1302 (e.g., the virtual light is virtual and exists only in three-dimensional environment 1304). In some embodiments, the virtual light causes lighting effects to be displayed in three-dimensional environment 1304 according to particle physics. For example, the virtual lighting optionally causes a glare on picture frame 1307 on the back wall of the room, causes desk 1310a to cast a shadow, causes coffee table 1314a to cast a shadow, and/or causes diagonal table 1312a to cast a shadow, as shown in FIG. 9B (e.g., one or more of which are optionally non-existent in physical environment 1302, or exist with different characteristics in physical environment 1302, such as less or more brightness, smaller or larger size, etc.). In some embodiments, the virtual light optionally increases or decreases the ambient light in three-dimensional environment 1304 as compared with the actual amount of light that exists in physical environment 1302. In some embodiments, when three-dimensional environment 1304 is displayed with an atmospheric effect, device 101 generates one or more audio effects associated with the atmospheric effect (e.g., as indicated by speaker 1325). In some embodiments, the audio effects include ambient sound effects associated with the atmospheric effect. For example, the atmospheric effect may include croaking frogs sounds, chirping bird sounds, running water sounds, etc., that optionally do not exist in physical environment 1302 (e.g., the ambient physical environment does not include these sounds), but are generated by device 101 as if they are audible while the user is in physical environment 1302. In some embodiments, providing audio effects increases the immersive effect of three-dimensional environment 1304.

In some embodiments, movement of an object corresponding to the viewpoint of the user 1320 (e.g., the display generation component, the electronic device, the user's head, face, eyes, or body) causes device 101 to retract display of simulated environment 1322a (e.g., move boundary 1321 between simulated environment 1322a and real world environment 1302 away from the viewpoint of the user 1320) to reveal more of real world environment 1302 in three-dimensional environment 1304 for user safety, though similar movement of the object corresponding to the viewpoint of the user 1320 optionally does not cause device 101 to reduce display of an atmospheric effect in three-dimensional environment. In some embodiments, the position of the object in the physical environment 1302 corresponds to the viewpoint of the user in three-dimensional environment 1304, and movement of the object in the physical environment 1302 optionally causes corresponding movement of the viewpoint of the user in three-dimensional environment 1304, as described in more detail below and with reference to method 1400. Further, in some embodiments, whether device 101 retracts display of simulated environment 1322a and/or how much it retracts display of simulated environment 1322a depends on one or more characteristics of the movement of the object corresponding to the viewpoint (e.g., amount of movement, velocity of the movement, acceleration of the movement, etc.).

Figure 13D:
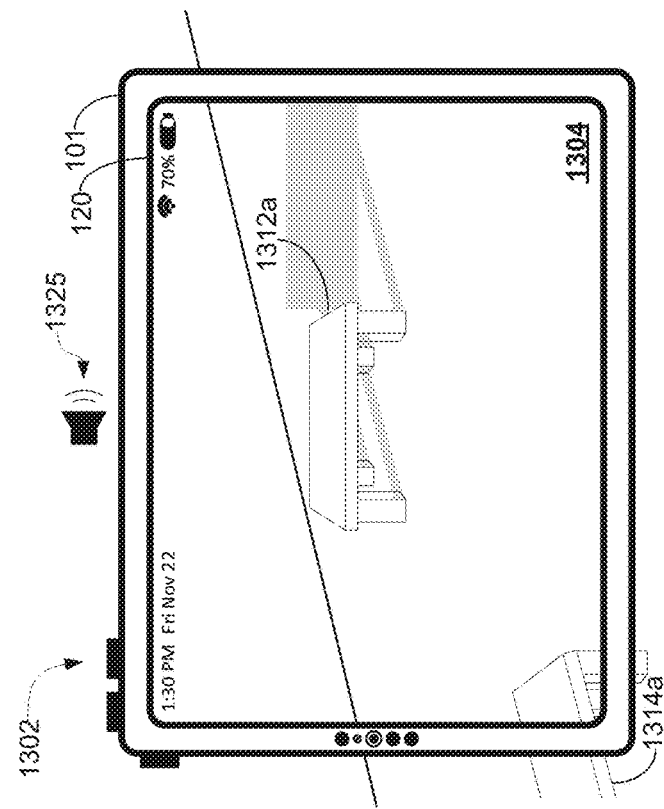
Figure 13D:
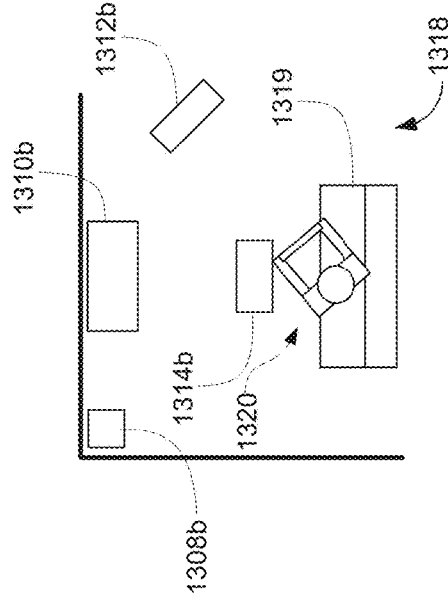
Figure 13C:
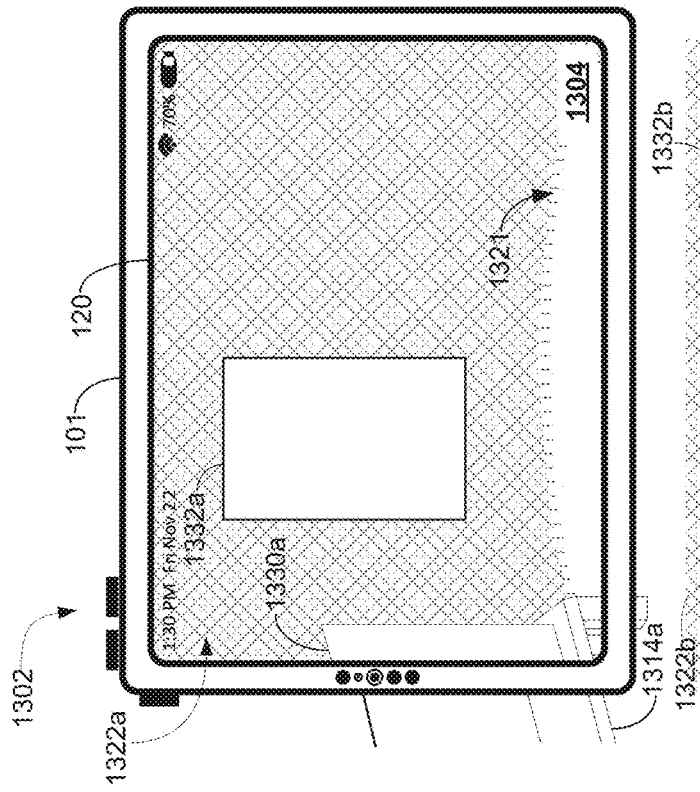
Figure 13C:
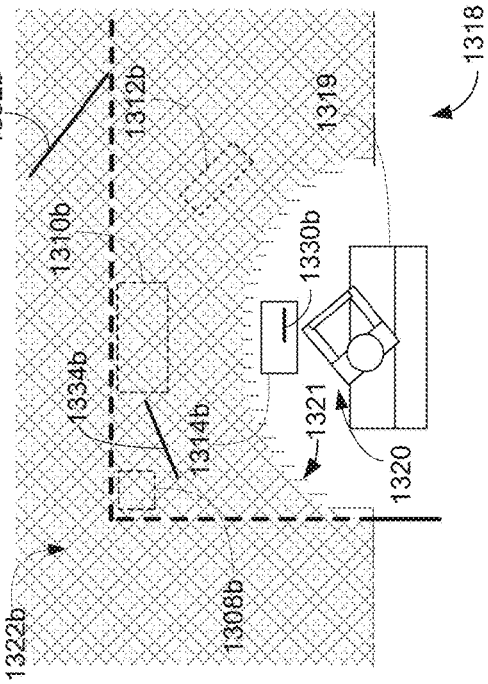

For example, in FIGS. 13C-13D, device 101 detects a change in orientation of the object corresponding to the viewpoint of user 1320 (e.g., corresponding to a rotation of user 1320 and/or device 101 toward the upper-right corner of the room in real world environment 1302). In FIG. 13C, because the movement of the object corresponding to the viewpoint of user 1320 did not include sufficient movement towards boundary 1321, device 101 has updated display of three-dimensional environment 1304 to correspond to the updated viewpoint of user 1320, but device 101 has not moved boundary 1321 away from the viewpoint of user 1320 (e.g., boundary 1321 optionally remains at the same or substantially the same distance from the viewpoint of user 1320 as in FIG. 13A—and therefore simulated environment 1322a optionally occupies the same or substantially the same portion of three-dimensional environment 1304 as in FIG. 13A). As mentioned previously, device 101 is optionally displaying three-dimensional environment 1304 from the updated viewpoint, and therefore object 1334b is no longer displayed by device 101—optionally only portions of object 1330a and the representation of table 1314a are displayed—and object 1332a is displayed from a different angle than in FIG. 13A. However, as shown in FIG. 13C, boundary 1321 between simulated environment 1322a and the portion of three-dimensional environment 1304 corresponding to real world environment 1302 optionally remains at the same distance from the viewpoint of user 1320 as it was in FIG. 13A.

Similarly, in FIG. 13D, the atmospheric effects generated by device 101 are not reduced in response to the movement of device 101 from FIG. 13B to 13D (optionally the same movement of device 101 from FIG. 13A to 13C). For example, the audio effects generated by device 101 are optionally not reduced (e.g., indicated by speaker 1325) and/or the other atmospheric effects generated by device 101 (e.g., shadow on diagonal table 1312a) are not reduced.

Figure 13F:
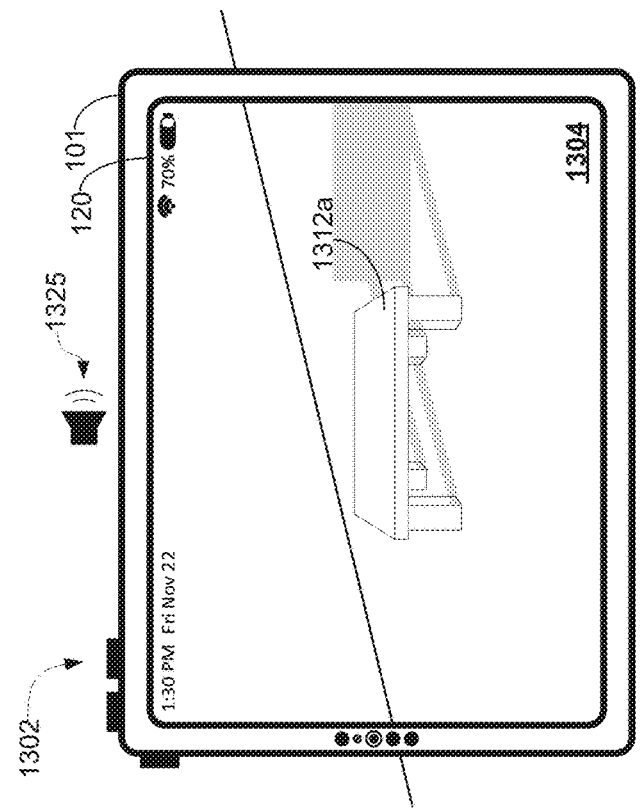
Figure 13F:
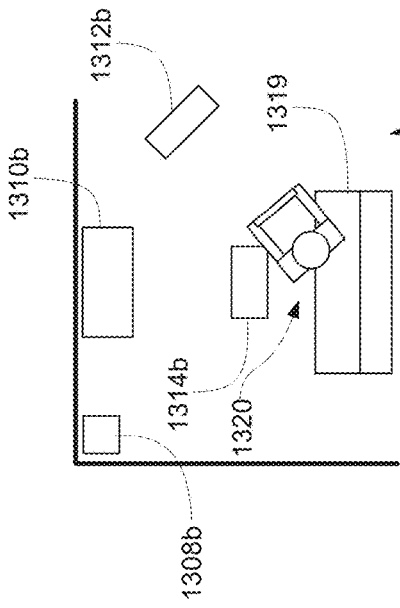
Figure 13E:
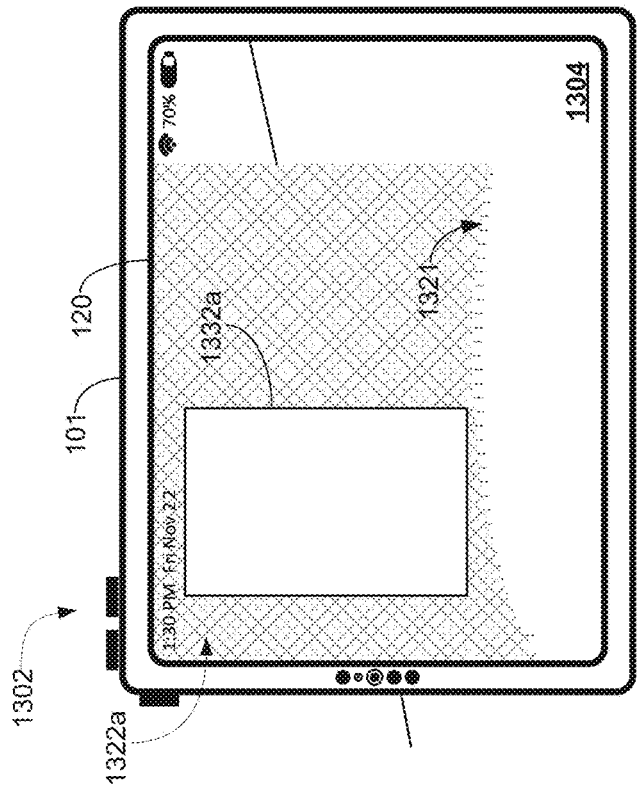
Figure 13E:
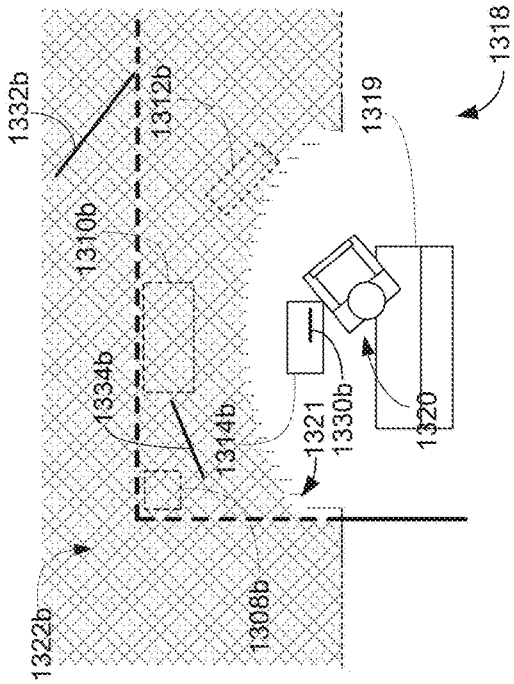

In contrast, in FIGS. 13E-13F, device 101 detects movement of the object corresponding to the viewpoint of user 1320 (e.g., corresponding to movement of device 101 toward diagonal table 1312a and/or the upper-right corner of the room in real world environment 1302). In FIG. 13E, device 101 has updated display of three-dimensional environment 1304 to correspond to the updated viewpoint of user 1320, and because the movement of the object corresponding to the viewpoint of user 1320 included at least a first threshold of movement (e.g., a threshold distance, a threshold velocity, and/or a threshold acceleration, etc.) towards boundary 1321, device 101 has also moved boundary 1321 away from the viewpoint of user 1320 (e.g., boundary 1321 is optionally further from the viewpoint of user 1320 in FIG. 13E than it was in FIGS. 13A and/or 13C—and therefore simulated environment 1322a optionally occupies less of three-dimensional environment 1304 than it did in FIGS. 13A and/or 13C, and more of real world environment 1302 has been revealed in three-dimensional environment 1304). As mentioned previously, device 101 is optionally displaying three-dimensional environment 1304 from the updated viewpoint, and therefore object 1330a and table 1314a are no longer displayed by device 101, and object 1332a is displayed at a larger size than in FIG. 13C (e.g., because the viewpoint of user 1320 is now closer to object 1332a). Further, device 101 has started retracting display of simulated environment 1322a in three-dimensional environment 1304 due to the movement of the object corresponding to the viewpoint of user 1320, which optionally causes the lateral boundary of simulated environment 1322a to become visible in three-dimensional environment 1304 and/or causes boundary 1321 to pull away from the viewpoint of the user 1320 and reveal a greater portion of real world environment 1302 in three-dimensional environment 1304 than in FIG. 13C. In this way, device 101 ensures that more of real world environment 1302 is visible in three-dimensional environment 1304 to increase user safety (e.g., to avoid collisions of user 1320 with potentially unsafe features in real world environment 1302 as a result of user movement).

In some embodiments, the amount by which device 101 retracts display of simulated environment 1322a and/or device 101 moves boundary 1321 away from the viewpoint of the user is based on one or more characteristics of the movement of the object corresponding to the viewpoint. For example, in some embodiments, the more the object corresponding to the viewpoint moves towards boundary 1321, the more device 101 retracts boundary 1321 from the viewpoint. In some embodiments, the faster the object corresponding to the viewpoint moves towards boundary 1321, the more device 101 retracts boundary 1321 from the viewpoint. In some embodiments, the greater the acceleration of the object corresponding to the viewpoint towards boundary 1321, the more device 101 retracts boundary 1321 from the viewpoint. In some embodiments, device 101 utilizes a combination of two or more of the above characteristics to determine how much to retract display of simulated environment 1322a and/or how much to move boundary 1321 away from the viewpoint of the user. Further, display of simulated environment 1322a is optionally retracted in a depth-based manner in which portions of real world environment 1302 that are closer to the viewpoint of the user are revealed earlier (e.g., and thus portions of simulated environment 1322a displayed at those locations are ceased to be displayed earlier) than portions of real world environment 1302 that are further from the viewpoint of the user (e.g., and thus portions of simulated environment 1322a displayed at those further locations). In some embodiments, this depth-based transition from displaying a simulated environment to displaying less of or no simulated environment has one or more of the characteristics of depth-based transitions of the display of simulated environments described with reference to methods 800, 1000 and/or 1200.

In contrast, in FIG. 13F, the atmospheric effects generated by device 101 are not reduced in response to the movement of device 101 from FIG. 13D to 13F (optionally the same movement of device 101 from FIG. 13C to 13E). For example, the audio effects generated by device 101 are optionally not reduced (e.g., indicated by speaker 1325) and/or the other atmospheric effects generated by device 101 (e.g., shadow on diagonal table 1312a) are not reduced.

In some embodiments, in response to detecting sufficient (e.g., magnitude of, velocity of, and/or acceleration of) movement of the object corresponding to the viewpoint of user 1320 (e.g., towards boundary 1321), device 101 ceases display of simulated environment. For example, in FIG. 13G, device 101 detects movement of the object corresponding to the viewpoint of user 1320 (e.g., corresponding to movement of device 101 toward diagonal table 1312a and/or the upper-right corner of the room in real world environment 1302). In FIG. 13G, device 101 has updated display of three-dimensional environment 1304 to correspond to the updated viewpoint of user 1320, and because the movement of the object corresponding to the viewpoint of user 1320 included at least a second threshold of movement (e.g., a threshold distance, a threshold velocity, and/or a threshold acceleration, as described in more detail with reference to method 1400) towards boundary 1321, device 101 has also ceased display of simulated environment 1322*a*—therefore, as shown in FIG. 13G, real world environment 1302 optionally occupies the entirety of three-dimensional environment 1304. Because simulated environment 1322*a* is no longer displayed by device 101, in FIG. 13G device 101 displays a representation of diagonal table 1312*a* in three-dimensional environment 1304 (e.g., because diagonal table 1312*a* is no longer obscured by simulated environment 1322*a*) and the entirety of the back wall in the room.

In some embodiments, device 101 ceases display or modifies display of virtual objects differently when it ceases display of the simulated environment depending on where those virtual objects were located when display of the simulated environment was ceased (and/or when boundary 1321 traverses the location of the virtual objects). For example, object 1334*b* in FIG. 13E was optionally located within simulated environment 1322*b* when device 101 ceased display of simulated environment 1322*b* in FIG. 13G. In some embodiments, in such a circumstance, device 101 ceases display of object 1334*b*, as shown in overhead view 1328 in FIG. 13G. As an alternative, in some embodiments, device 101 maintains display of a virtual object in such a circumstance and moves that object out of the simulated environment and into the real-world environment portion of three-dimensional environment 1304. For example, object 1332*b* in FIG. 13E was optionally located within simulated environment 1322*b* when device 101 ceased display of simulated environment 1322*b* in FIG. 13G. As shown in FIG. 13G, in response to ceasing display of simulated environment 1322*b*, device 101 has moved object 1332*b* towards the viewpoint of user 1320 (e.g., as compared with its location in FIG. 13E); further, object 1332*b* was previously displayed at a location beyond the back wall of the room in real world environment 1302, but in FIG. 13G, device 101 has moved object 1332*b* towards the viewpoint of user 1320 to a location within the back wall of the room in real world environment 1302. In some embodiments, in conjunction with displaying object 1332*b* closer to the viewpoint of user 1320, device 101 scales object 1332*b* (e.g., reduces the size of object 1332*b*) in three-dimensional environment 1304 so that displaying object 1332*b* at a location closer to the viewpoint of user 1320 does not cause object 1332*b* to consume more of the field of view of the user (or more than a threshold amount of the field of view of the user, such as 2%, 3%, 5%, 10%, 20%, 40%, 50%, or 75%) than it did in FIG. 13E.

In some embodiments, an object that was located in a portion of three-dimensional environment 1304 corresponding to real world environment 1302 is not changed in location and/or size by device 101 in response to ceasing display of the simulated environment. For example, object 1330*b*, which was optionally located in a portion of three-dimensional environment 1304 corresponding to real world environment 1302 in FIG. 13E, optionally remains at the same location and/or has the same size in FIG. 13G (e.g., located above table 1314*b*) as it did in FIG. 13E.

Figure 13H:
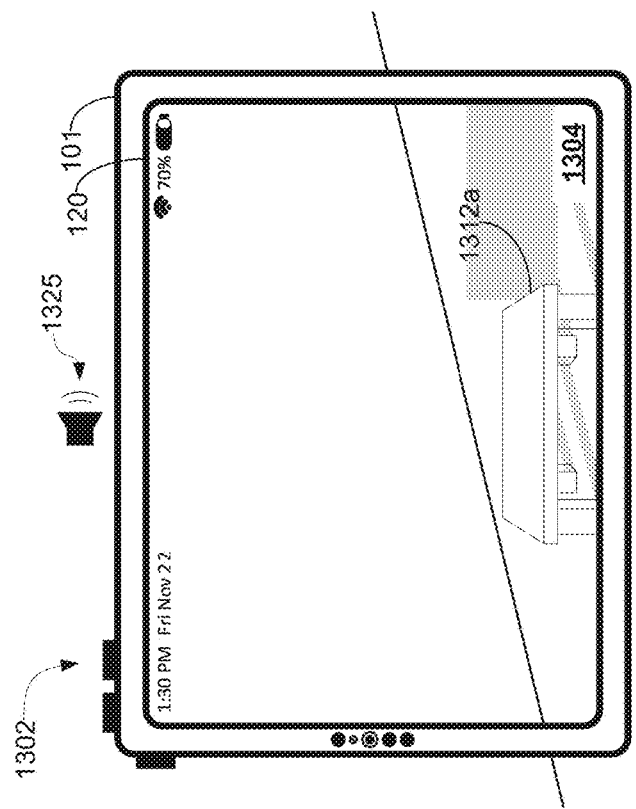
Figure 13G:
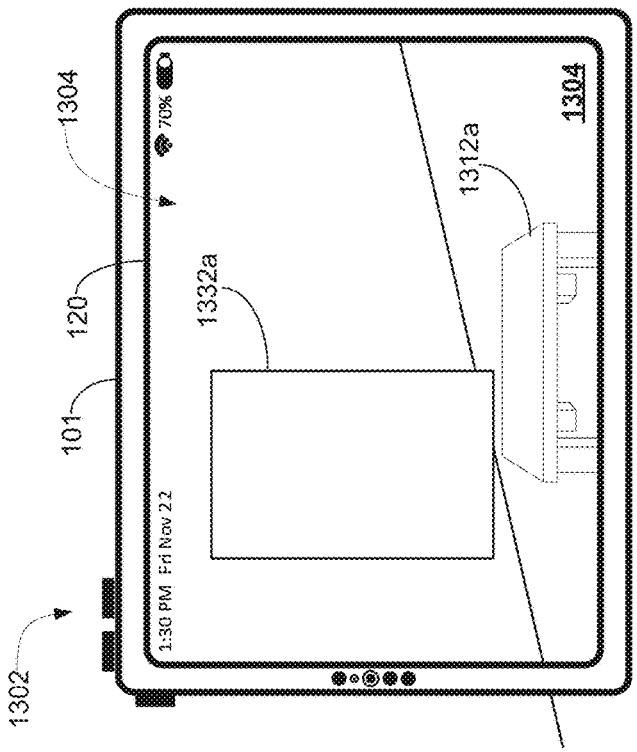
Figure 14A:
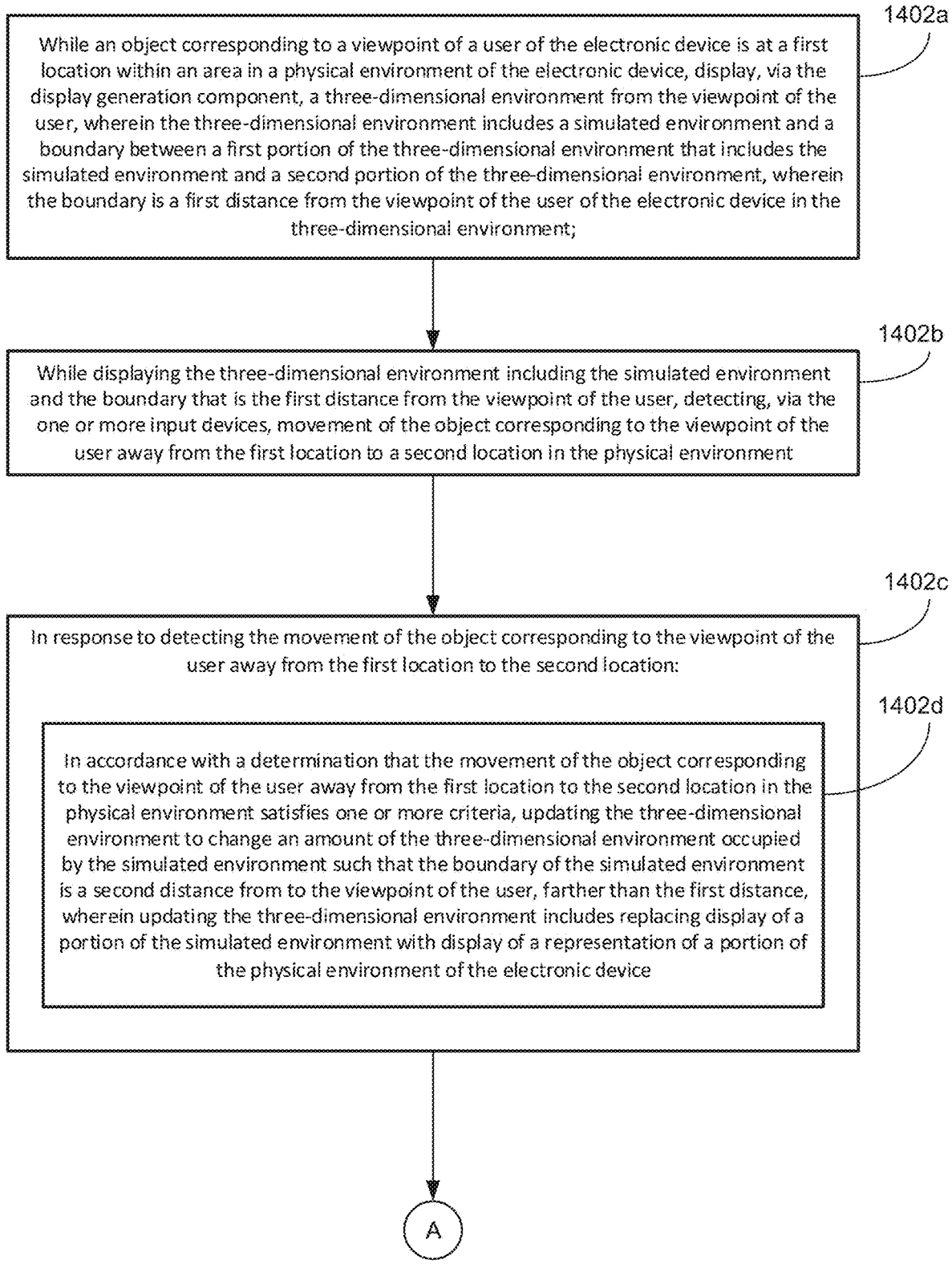
FIGS. 14A-14L is a flowchart illustrating a method of selectively changing the display of a simulated environment and/or atmospheric effect in a three-dimensional environment based on movement of an object associated with a viewpoint of a user in accordance with some embodiments.
Figure 14B:
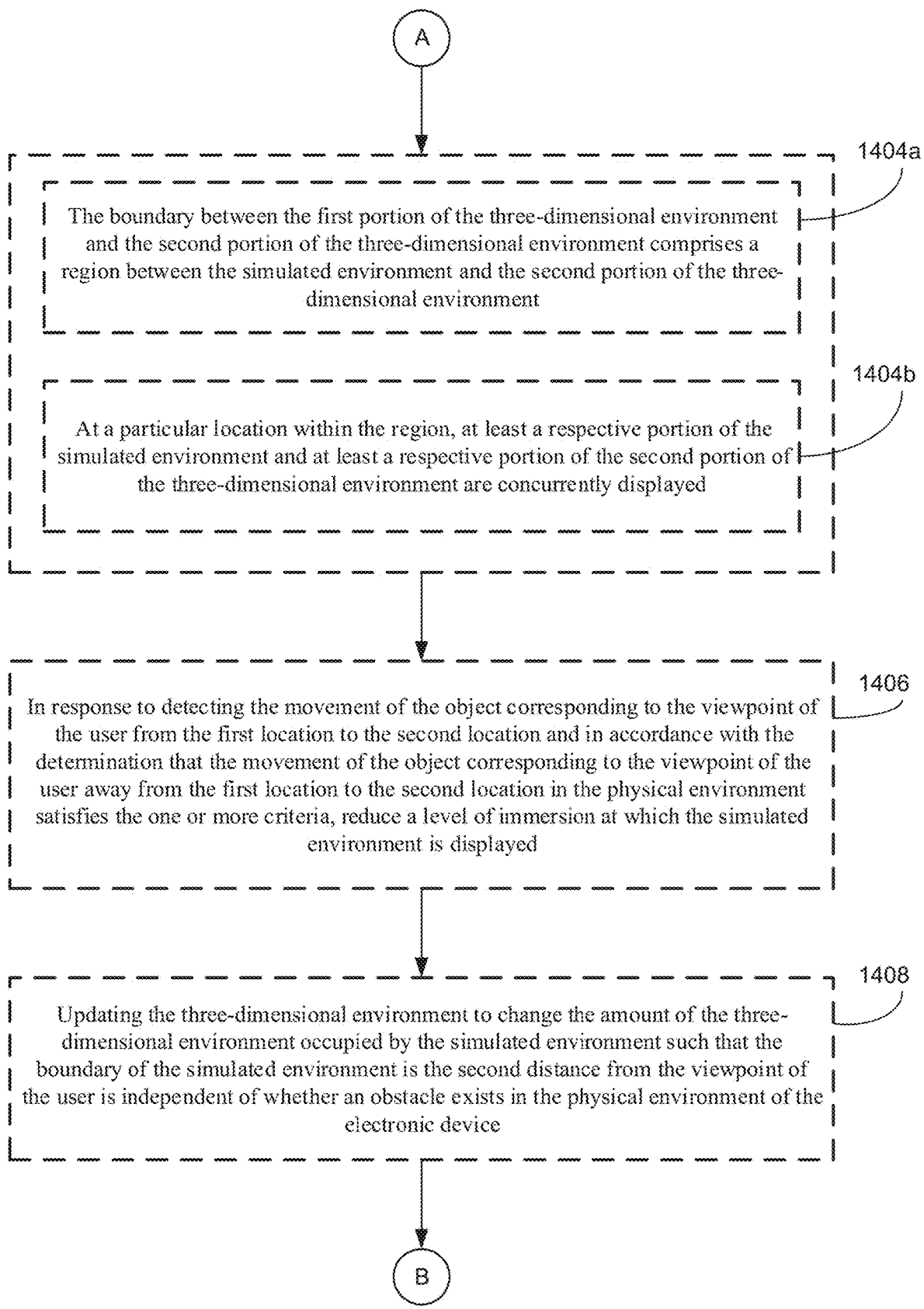
Figure 14C:
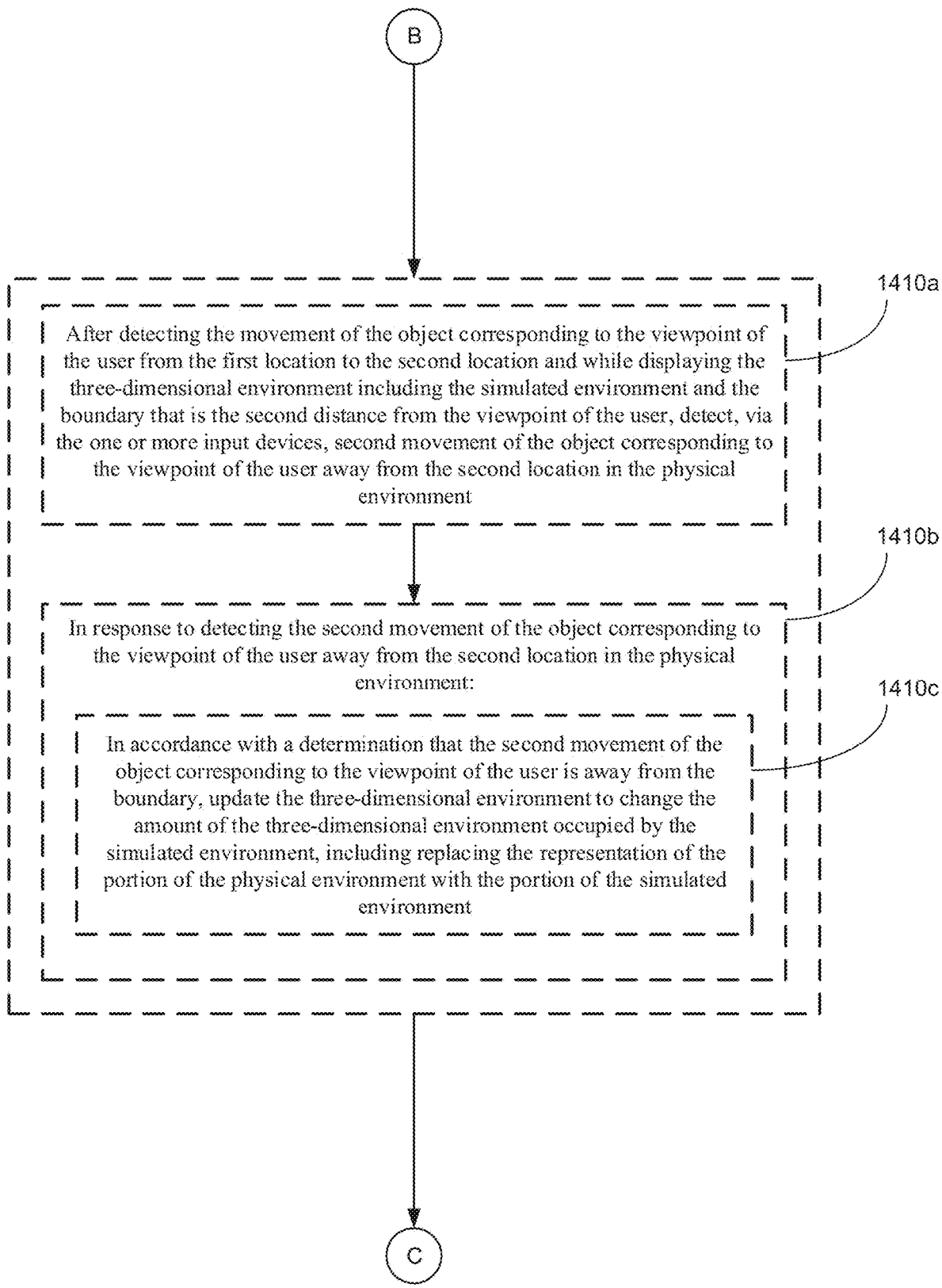
Figure 14D:
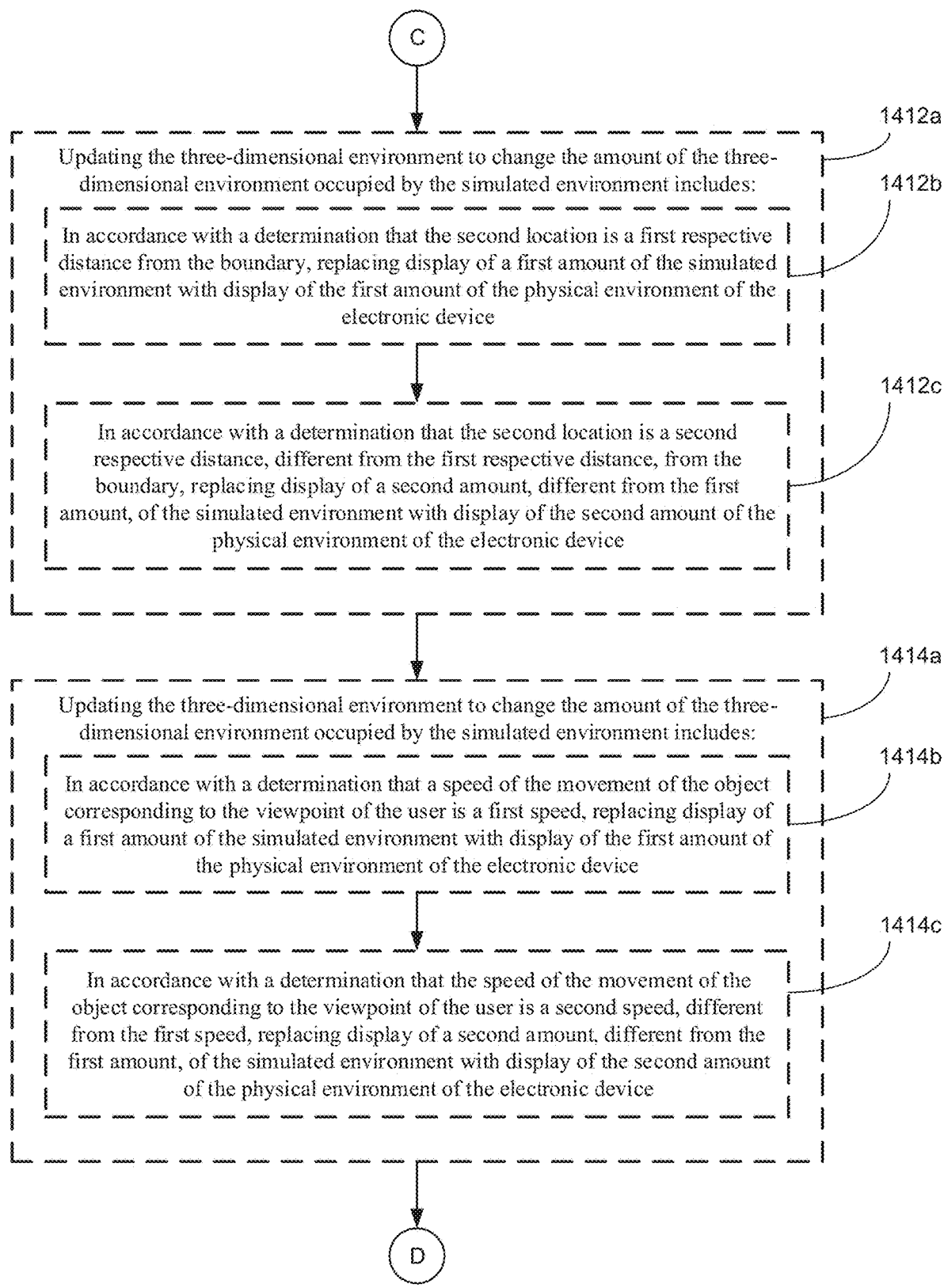
Figure 14E:
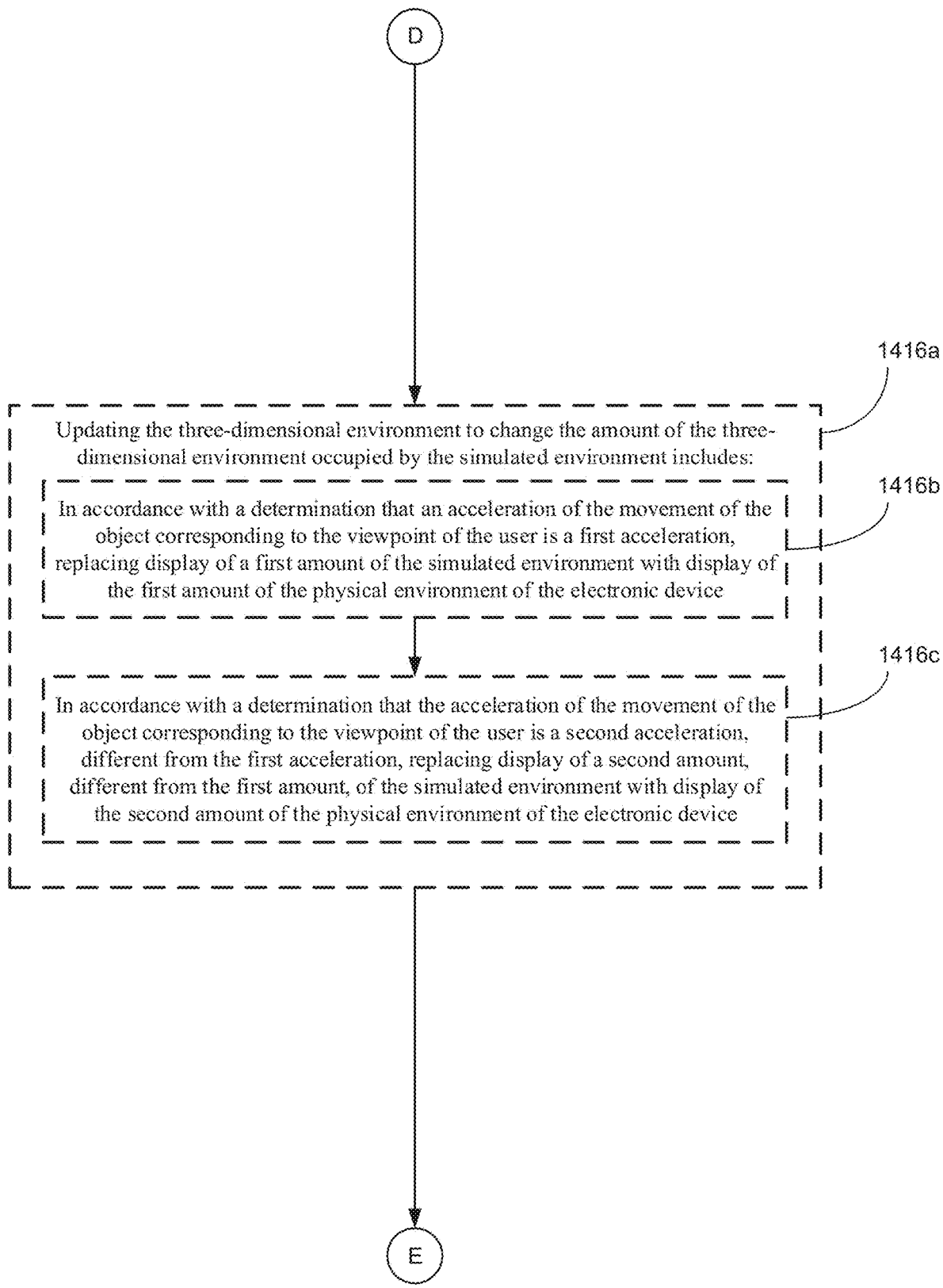
Figure 14F:
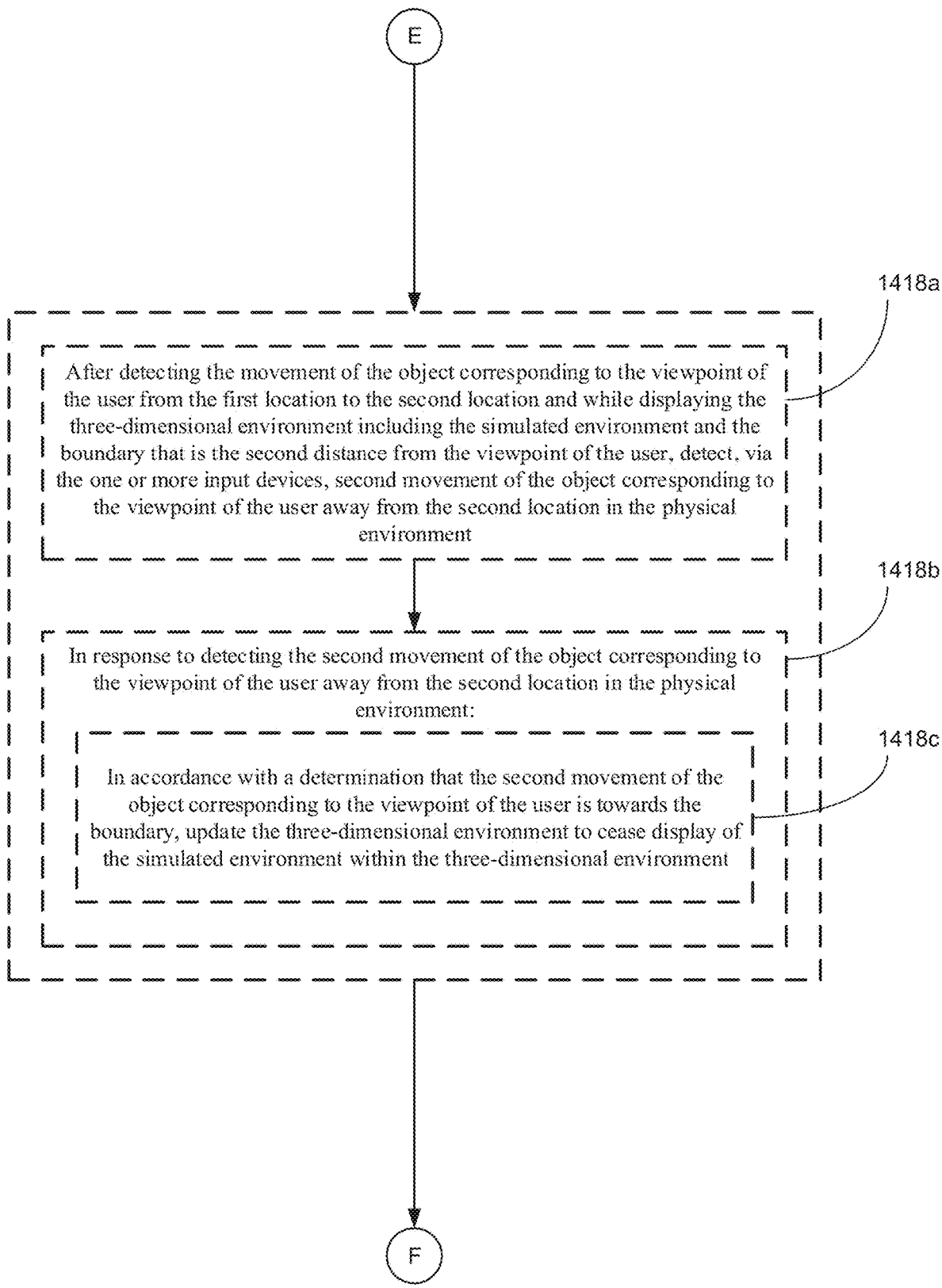
Figure 14G:
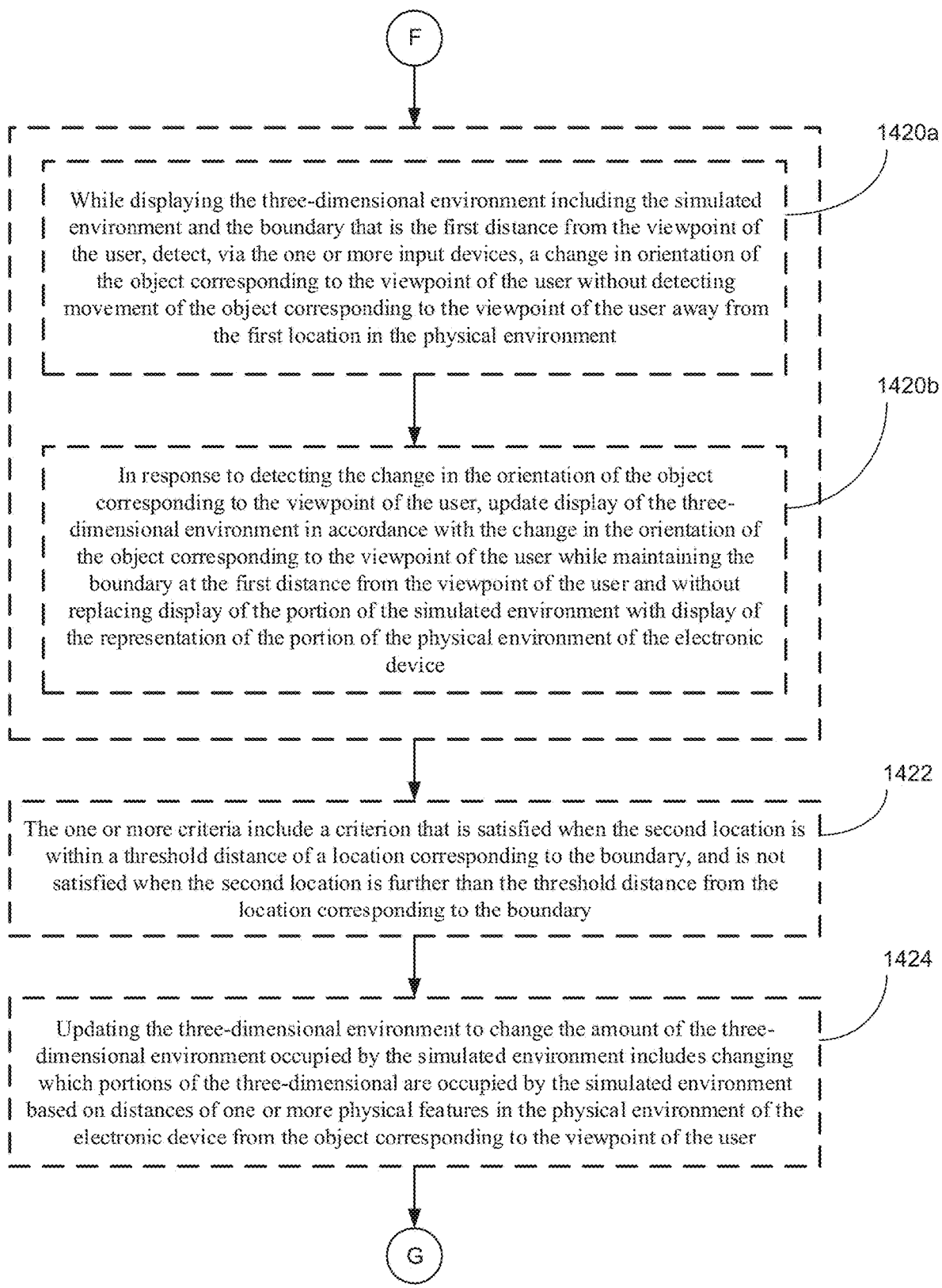
Figure 14H:
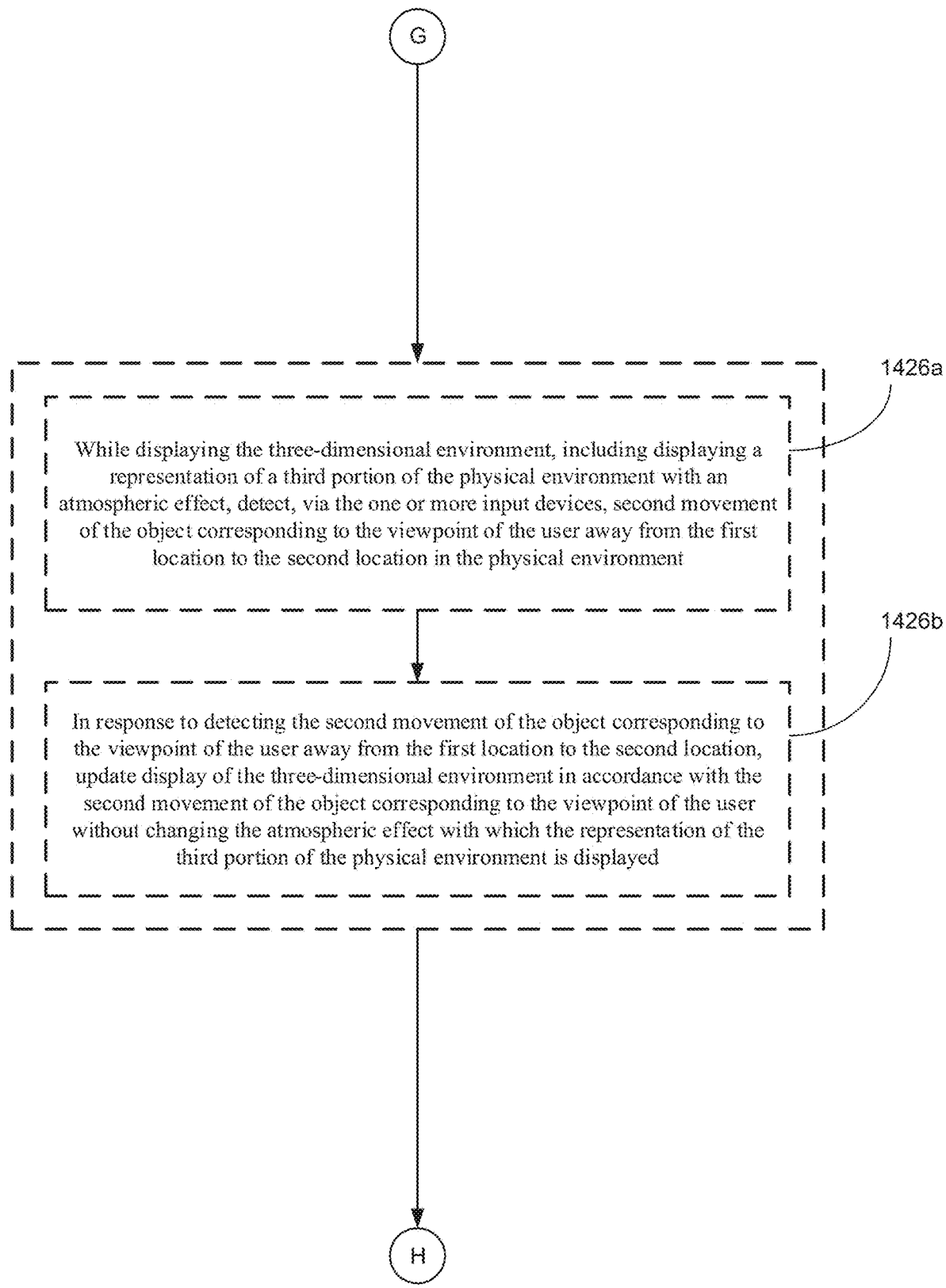
Figure 14I:
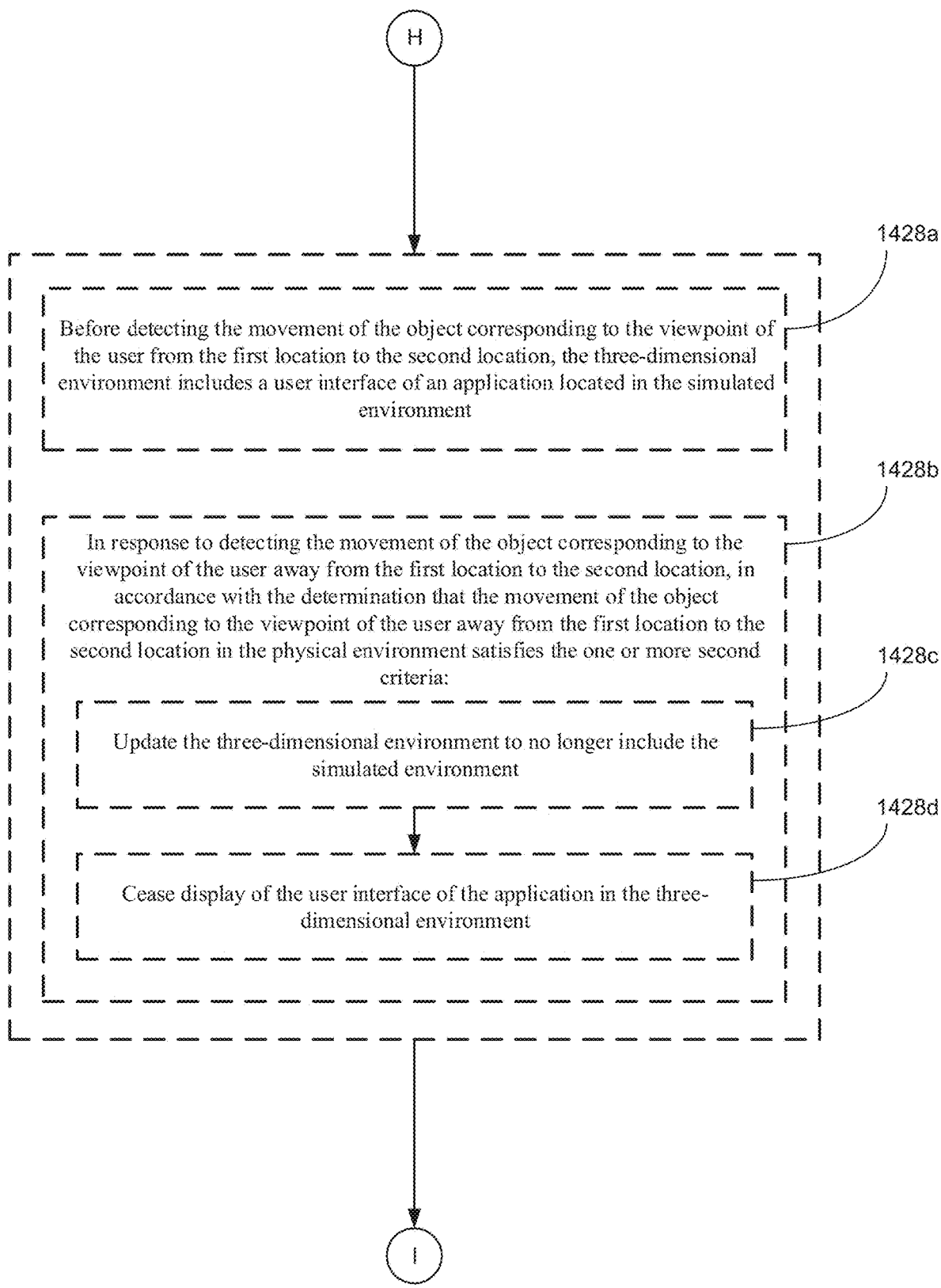
Figure 14J:
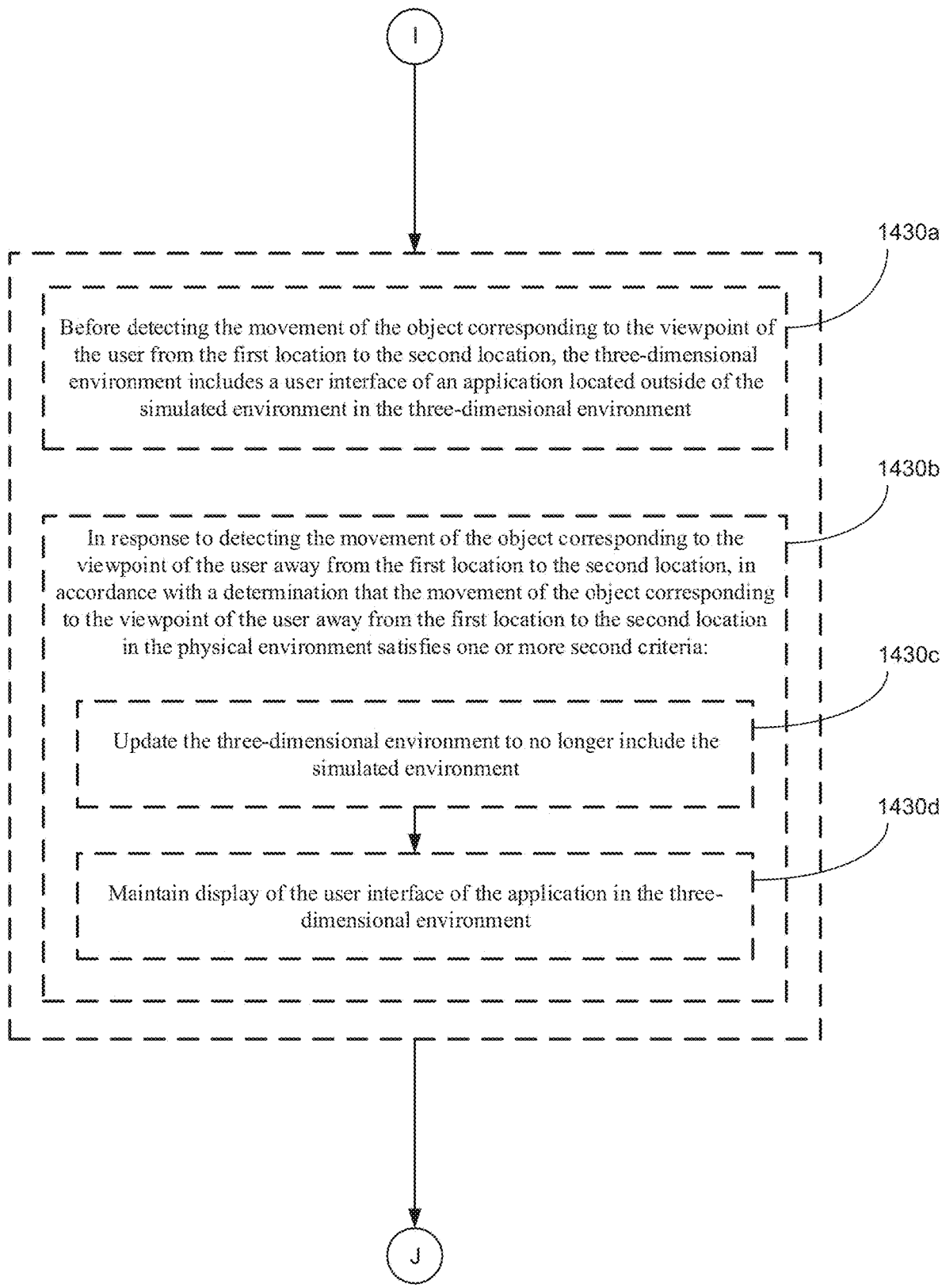
Figure 14K:
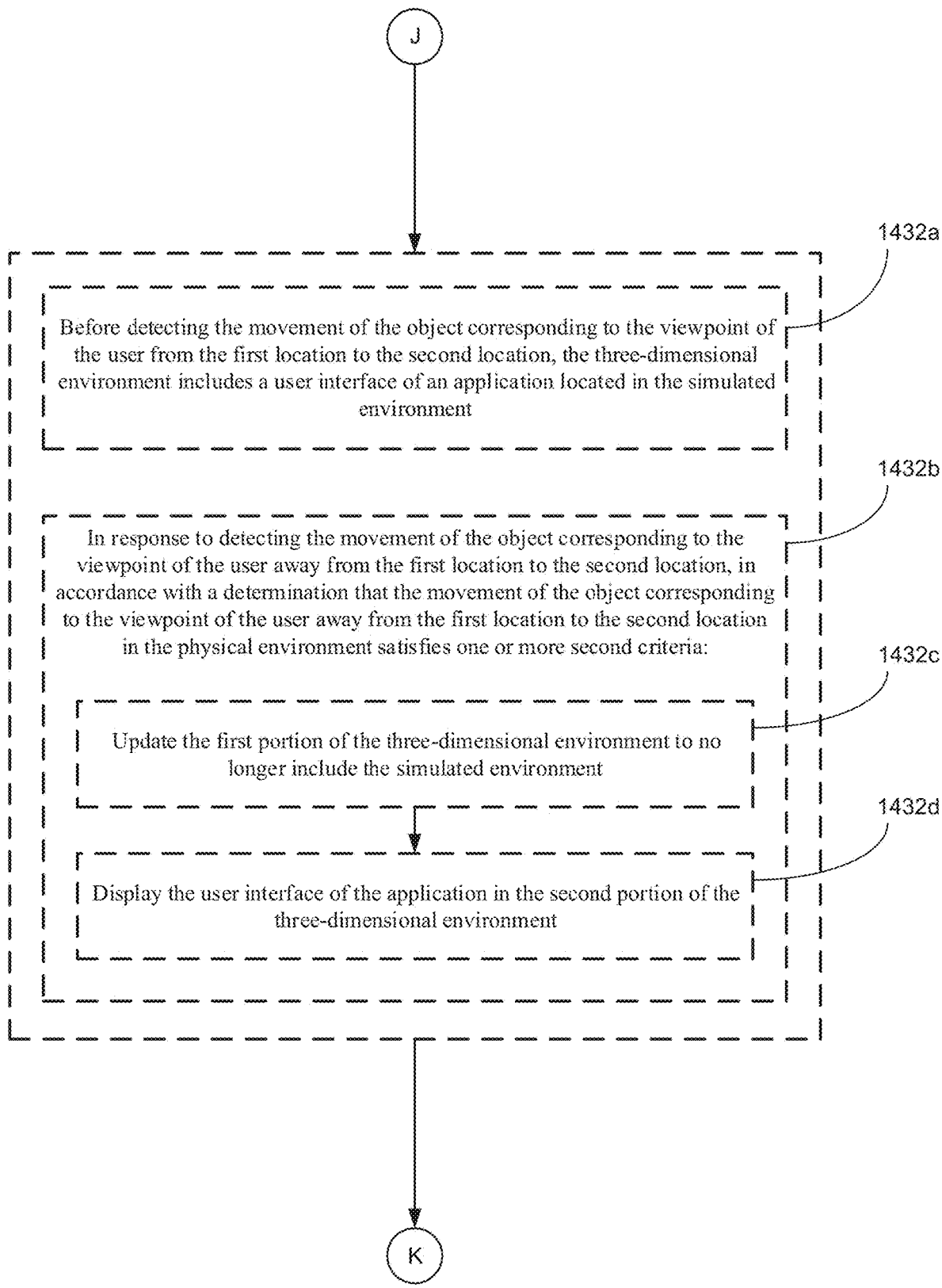
Figure 14L:
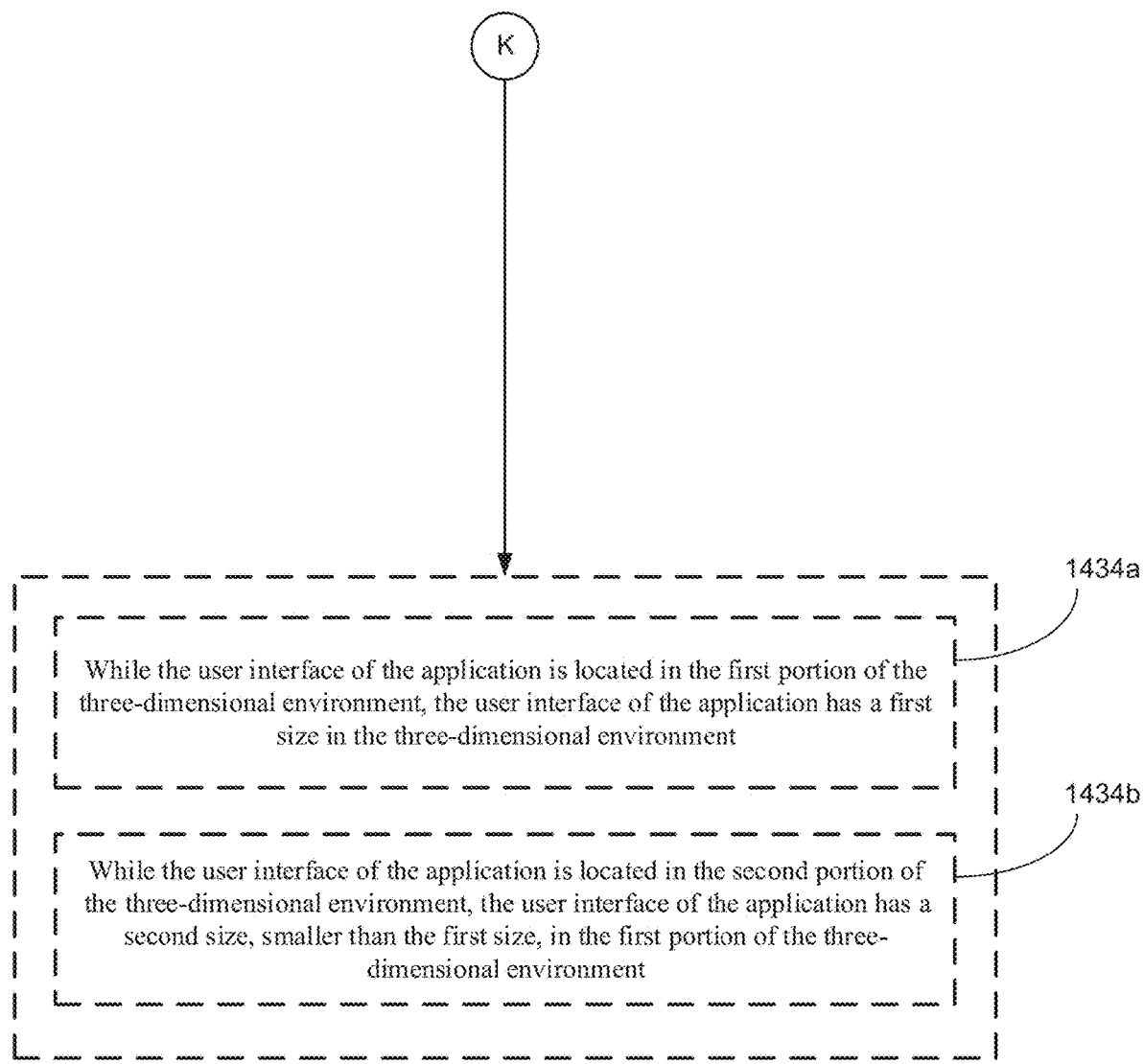

In contrast to FIG. 13G, in FIG. 13H, the atmospheric effects generated by device 101 are not reduced in response to the movement of device 101 from FIG. 13F to 13H (optionally the same movement of device 101 from FIG. 13E to 13G). For example, the audio effects generated by device 101 are optionally not reduced (e.g., indicated by speaker 1325) and/or the other atmospheric effects generated by device 101 (e.g., shadow on diagonal table 1312*a*) are not reduced.

FIGS. 14A-14L is a flowchart illustrating a method 1400 of selectively changing the display of a simulated environment and/or atmospheric effect in a three-dimensional environment based on movement of an object associated with a viewpoint of a user in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4, a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at an electronic device (e.g., device 101) in communication with a display generation component and one or more input devices, such as a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, while an object (e.g., the user's head, face, eyes, or body) corresponding to a viewpoint of a user of the electronic device is at a first location within an area in a physical environment of the electronic device, such as the location of the user in FIG. 13A (e.g., the user's head, face, eyes or body and/or the electronic device and/or display generation component is at a current physical position in the physical environment), the electronic device displays (1402*a*), via the display generation component, a three-dimensional environment from the viewpoint of the user, wherein the three-dimensional environment includes a simulated environment and a boundary (e.g., a line or area) between a first portion of the three-dimensional environment that includes the simulated environment and a second portion of the three-dimensional environment, such as three-dimensional environment 1304 in FIG. 13A including simulated environment 1322*a* and boundary 1321 (e.g., a portion of the three-dimensional environment that includes representations of the physical environment of the electronic device, such as a portion of the three-dimensional environment that does not include a simulated environment). In some embodiments, an area (e.g., an area with a predetermined size and/or radius, such as 3 inches, 6 inches, 1 foot, 2 feet, or 3 feet) around the electronic device and/or display generation component is defined as an area in which the electronic device and/or display generation component is able to move without causing an immersive simulated environment to become less immersive. For example, a movement margin of two feet is provided such that if the electronic device and/or display generation component is a wearable device (e.g., a head-mounted display), the user is able to shift positions, sit back, lean, etc. without disrupting the immersive experience provided by the electronic device. In some embodiments, the area around the electronic device is based on the boundary of the immersive simulated environment. For example, the area is all areas of the three-dimensional environment that are not occupied by the simulated environment. In some embodiments, the area has a minimum size such that if the simulated environment occupies the space around the user and/or electronic device, the area has a predetermined minimum size, even if the area corresponds to a location in the three-dimensional environment that is occupied by the simulated environment. In some embodiments, the physical position of the electronic device and/or display generation component corresponds to the viewpoint of the user in the three-dimensional environment such that movement (e.g., rotational movement and/or translational movement) of the physical position correspondingly changes the viewpoint of the user in the three-dimensional environment. In some embodiments, the viewpoint of the user is the location at which and/or orientation with which the electronic device displays the three-dimensional environment via the display generation component.

In some embodiments, the boundary is a first distance (e.g., on average or from a near edge or a far edge of the boundary region relative to the user) from the viewpoint of the user of the electronic device in the three-dimensional environment, such as shown with respect to boundary 1321 in FIG. 13A (e.g., the electronic device displays and/or presents a three-dimensional environment via the display generation component). In some embodiments, the three-dimensional environment includes representations of the physical environment such that it appears to the user as if the user is physically located in the physical environment. For example, the user's view of the physical environment via the display generation component is the same or similar to the user's view of the physical environment without the electronic device (e.g., the representation of the physical environment provided by the electronic device is a photorealistic depiction of the physical environment from the same perspective and/or position as the user's current location). In some embodiments, the three-dimensional environment includes one or more virtual elements that are not necessarily representations of objects in the physical environment around the user/device. In some embodiments, the three-dimensional environment includes a simulated environment (e.g., optionally concurrently with representations of portions of the physical environment) that provide the user with an immersive experience as if the user is physically located in the simulated environment (e.g., or as if the user is looking at or into a simulated environment into which the user is able to enter). In some embodiments, the immersion level of the three-dimensional environment determines how much of the three-dimensional environment is occupied by the simulated environment (e.g., as opposed to the physical environment), and thus defines the boundary between the simulated environment and the portion of the three-dimensional environment that includes the representations of the physical environment (e.g., such as described with reference to methods 800, 1000 and/or 1200). For example, at a low immersion level, a large proportion of the three-dimensional environment is a view of the physical environment and a small proportion of the three-dimensional environment is a view of the simulated environment, but at a high immersion level, a large proportion of the three-dimensional environment is a view of the simulated environment and a small proportion (e.g., or none) of the three-dimensional environment is a view of the physical environment. In some embodiments, at a respective immersion level, the distance between the viewpoint of the user (e.g., the "camera" into the three-dimensional environment) and the simulated environment (e.g., the distance to the boundary of the simulated environment) is optionally fixed based on the current level of immersion. As described above, in some embodiments, the three-dimensional environment is a computer-generated reality (CGR) environment such as a virtual reality (VR) environment, a mixed reality (MR) environment, or an augmented reality (AR) environment, etc.

In some embodiments, while displaying the three-dimensional environment including the simulated environment and the boundary that is the first distance from the viewpoint of the user, the electronic device detects (1402b), via the one or more input devices, movement of the object corresponding to the viewpoint of the user away from the first location to a second location in the physical environment, such as the movement of device 101 and/or user 1320 from their locations in FIG. 13A to their locations in FIG. 13C or 13E. For example, detecting that the display generation component and/or electronic device has moved to a new location in the physical environment, or more generally, detecting that the user has moved in the physical environment (e.g., the head position and/or orientation of the user has changed), such movement corresponding to a request to change the viewpoint from which the electronic device is displaying the three-dimensional environment. For example, the user holding the electronic device and/or wearing the electronic device gets up from a seated position and/or walks around the physical environment. In some embodiments, detecting the movement of the electronic device is performed via one or more sensors of the electronic device (e.g., individually or in combination), such as a visible light sensor (e.g., camera), a depth sensor (e.g., time of flight sensor), a gyroscope, an accelerometer, etc.

In some embodiments, in response to detecting the movement of the object corresponding to the viewpoint of the user away from the first location to the second location (1402c), in accordance with a determination that the movement of the object corresponding to the viewpoint of the user away from the first location to the second location in the physical environment satisfies one or more criteria, such as the movement of device 101 and/or user 1320 illustrated in FIG. 13E (e.g., the one or more criteria are satisfied if the second location is within a threshold distance of the edge of the area in which the electronic device is able to move around causing the simulated environment to become less immersive (e.g., within 1 inch of the edge, 3 inches, 6 inches, 1 foot, 3 feet, or 6 feet), or within the threshold distance of the boundary of the simulated environment.), the electronic device updates (1402d) the three-dimensional environment to change an amount of the three-dimensional environment occupied by the simulated environment such that the boundary of the simulated environment is a second distance from to the viewpoint of the user, farther than the first distance (e.g., as shown in FIG. 13E), wherein updating the three-dimensional environment includes replacing display of a portion of the simulated environment with display of a representation of a portion of the physical environment of the electronic device, such as shown in FIG. 13E in which the portion of the field of view of user 1320 occupied by simulated environment 1322*a* decreases and the portion of the field of view of user 1320 occupied by real world environment 1302 increases (e.g., reducing the immersion level and/or reducing the size of the simulated environment to reveal portions of the physical environment that were previously not displayed and/or were previously occupied by the simulated environment (e.g., optionally temporarily)). For example, the boundary of the simulated environment is moved away (e.g., retracted) from the first and/or second location (e.g., the new location of the electronic device) such that the physical environment around the second location is viewable and not obstructed by the simulated environment (e.g., an area with a predetermined size and/or radius, such as 3 inches, 6 inches, 1 foot, 2 feet, or 3 feet). In some embodiments, if the movement of the electronic device does not satisfy the one or more criteria, the boundary of the simulated environment in the three-dimensional environment is not changed. In some embodiments, if the electronic device moves away from the second location to a third location (e.g., back to the first location) and that movement does not satisfy the one or more criteria, the simulated environment is returned to its original size, the boundary of the simulated environment is retracted to its previous position, and/or the representation of the physical environment that was revealed is no longer visible (e.g., optionally re-occupied by the simulated environment). In some embodiments, if the electronic devices moves away to a third location and that movement does satisfy the one or more criteria, the boundary of the simulated environment is shifted again based on the third location (e.g., instead of the second location). For example, the physical environment around the third location is visible while the physical environment around the second location is no longer visible. Thus, a "cut-out" around the electronic device optionally follows the electronic device as the electronic device moves around the physical environment, but the size of the "cut-out" optionally changes based on whether the movement of the electronic device satisfies the one or more criteria. In some embodiments, reducing the size of the simulated environment and/or revealing the physical environment around the new location of the electronic device provides a safety mechanism by which the user is able to see (e.g., more of) his or her physical environment when moving around his or her physical environment. Revealing portions of the physical environment (e.g., in response to detecting that the electronic device has moved to a new location that is optionally close to the boundary of a simulated environment) enables the user to interact with and/or move around his or her environment safely without requiring the user to perform additional inputs to reduce the immersion level of the simulated environment, thereby making the user-device interaction safer and more efficient.

In some embodiments, the boundary between the first portion of the three-dimensional environment and the second portion of the three-dimensional environment comprises a region (e.g., an area and/or volume that has non-zero area and/or volume) between the simulated environment and the second portion of the three-dimensional environment (1404*a*), and at a particular location within the region, at least a respective portion of the simulated environment and at least a respective portion of the second portion of the three-dimensional environment are concurrently displayed (1404*b*), such as described with reference to boundary 1321.

Thus, in some embodiments, the boundary between the simulated environment and the remainder of the three-dimensional environment is a region in which the simulated environment is displayed with partial transparency such that the remainder of the three-dimensional environment is also displayed. For example, the transition between the simulated environment and the remainder of the three-dimensional environment is a feathered transition in which on one side of the transition area, the simulated environment is displayed with less transparency (e.g., and the remainder of the three-dimensional environment is, therefore, less visible), and on the other side of the transition area, the simulated environment is displayed with more transparency (e.g., and the remainder of the three-dimensional environment is, therefore, more visible). Displaying a transition area between the simulated environment and the remainder of the three-dimensional environment indicates the proximity and/or direction of the simulated environment relative to the remainder of the three-dimensional environment, thereby making the user-device interaction safer and more efficient.

In some embodiments, in response to detecting the movement of the object corresponding to the viewpoint of the user from the first location to the second location and in accordance with the determination that the movement of the object corresponding to the viewpoint of the user away from the first location to the second location in the physical environment satisfies the one or more criteria, the electronic device reduces (1406) a level of immersion at which the simulated environment is displayed, such as described with reference to FIG. 13E. For example, immersion as described here optionally has one or more of the characteristics of immersion as described with reference to method 1000. In some embodiments, the higher immersion with which the simulated environment is displayed, the greater portion of the field of view of the user is encompassed by the simulated environment and/or the less of the field of view is consumed by representations of the physical environment of the display generation component and/or electronic device. Further, in some embodiments, the greater the immersion with which the simulated environment is displayed, the greater the portion of the audio being generated by the electronic device is consumed by the electronic device. Thus, when the immersion is reduced in response to detecting the movement of the object corresponding to the viewpoint of the user away from the first location, one or more of the above quantities are optionally reduced accordingly. Reducing the immersion with which the simulated environment is displayed in response to the movement of the object corresponding to the viewpoint of the user ensures that (e.g., visual and/or audio) information conveyed to the user about the physical environment is increased during/in response to the movement, thereby making the user-device interaction safer and more efficient.

In some embodiments, updating the three-dimensional environment to change the amount of the three-dimensional environment occupied by the simulated environment such that the boundary of the simulated environment is the second distance from the viewpoint of the user is independent of whether an obstacle exists in the physical environment of the electronic device (1408). For example, the amount by which device 101 retracts simulated environment 1322*a* in FIGS. 13E and/or 13G is optionally independent of whether an obstacle exists in front of user 1320 in the physical environment of the electronic device. For example, the electronic device retracts the boundary of the simulated environment based on the movement of the object corresponding to the viewpoint of the user whether or not an obstacle, such as a sofa, a table, a cliff, a hole in the ground, etc., exists in the pathway of such retraction of the boundary of the simulated environment. Thus, portions of the physical environment in the pathway of such retraction are displayed/revealed by the electronic device whether or not those portions include any physical obstacles to movement by the user in the physical environment. Revealing portions of the physical environment whether or not those portions of the physical environment include obstacles ensures that (e.g., visual) information conveyed to the user about the physical environment is increased during/in response to the movement independent of the features of the physical environment, thereby making the user-device interaction safer and more efficient.

In some embodiments, after detecting the movement of the object corresponding to the viewpoint of the user from the first location to the second location and while displaying the three-dimensional environment including the simulated environment and the boundary that is the second distance from the viewpoint of the user, the electronic device detects (1410a), via the one or more input devices, second movement of the object corresponding to the viewpoint of the user away from the second location in the physical environment, such as in FIG. 13E detecting movement of device 101 and/or user 1320 back towards the location of device 101 and/or user 1320 in FIG. 13A or 13C (e.g., detecting that the display generation component and/or electronic device has moved to a new location in the physical environment, or more generally, detecting that the user has moved in the physical environment (e.g., the head position and/or orientation of the user has changed), such movement corresponding to a request to change the viewpoint from which the electronic device is displaying the three-dimensional environment.).

In some embodiments, in response to detecting the second movement of the object corresponding to the viewpoint of the user away from the second location in the physical environment (1410b), in accordance with a determination that the second movement of the object corresponding to the viewpoint of the user is away from the boundary (e.g. movement of the object corresponding to the viewpoint back towards the first location), the electronic device updates (1410c) the three-dimensional environment to change the amount of the three-dimensional environment occupied by the simulated environment, including replacing the representation of the portion of the physical environment with the portion of the simulated environment, such as device 101 at least partially undoing the retraction of simulated environment 1322a in FIG. 13E towards a manner of displaying simulated environment 1322a as in FIG. 13A. For example, at least partially (e.g., based on the amount of movement of the object back towards the first location) reverting the revealing of the portion of the physical environment that was revealed in response to the movement of the object away from the first location. In some embodiments, the portion of the physical environment that was revealed in response to the movement of the object away from the first location is replaced with the portion of the simulated environment that was ceased to be displayed in response to the movement of the object away from the first location. In some embodiments, the amount (and/or proportion) of the three-dimensional environment and/or field of view of the user that is consumed by the simulated environment is increased. In some embodiments, the greater the movement of the object corresponding to the viewpoint away from the boundary, the more of the physical environment that was previously revealed is replaced again by the simulated environment, and the less the movement of the object corresponding to the viewpoint away from the boundary, the less of the physical environment that was previously revealed is replaced again by the simulated environment. At least partially reverting the revealing of the physical environment in response to movement away from the boundary enables the user to return to the previous display of the simulated environment without separate input for doing so, thereby making the user-device interaction more efficient.

In some embodiments, updating the three-dimensional environment to change the amount of the three-dimensional environment occupied by the simulated environment includes (1412a) (e.g. in response to the object corresponding to the viewpoint of the user moving away from the first location), in accordance with a determination that the second location is a first respective distance from the boundary, replacing (1412b) display of a first amount of the simulated environment with display of the first amount of the physical environment of the electronic device, such as the amount of simulated environment 1322a replaced in FIG. 13E, and in accordance with a determination that the second location is a second respective distance, different from the first respective distance, from the boundary, replacing (1412c) display of a second amount, different from the first amount, of the simulated environment with display of the second amount of the physical environment of the electronic device such as the amount of simulated environment 1322a replaced in FIG. 13G. In some embodiments, the amount of the physical environment that is revealed in response to the movement of the object corresponding to the viewpoint of the user is based on the distance of the viewpoint of the user from the boundary. For example, if the viewpoint of the user is relatively far from the boundary, a given amount of movement of the object corresponding to the viewpoint towards the boundary optionally results in a relatively small amount of the physical environment to be revealed (e.g., and a corresponding relatively small amount of the simulated environment to cease being displayed), and if the viewpoint of the user is relatively close to the boundary, the given amount of movement of the object corresponding to the viewpoint towards the boundary optionally results in a relatively large amount of the physical environment to be revealed (e.g., and a corresponding relatively large amount of the simulated environment to cease being displayed). Revealing more or less of the physical environment depending on the distance of the viewpoint from the boundary ensures that the amount of the physical environment that is revealed is not greater than is necessary, thus reducing the need for user input to correct such revealing, thereby making the user-device interaction more efficient.

In some embodiments, updating the three-dimensional environment to change the amount of the three-dimensional environment occupied by the simulated environment includes (1414a) (e.g. in response to the object corresponding to the viewpoint of the user moving away from the first location), in accordance with a determination that a speed of the movement of the object corresponding to the viewpoint of the user is a first speed, replacing (1414b) display of a first amount of the simulated environment with display of the first amount of the physical environment of the electronic device, such as the amount of simulated environment 1322a replaced in FIG. 13E, and in accordance with a determination that the speed of the movement of the object corresponding to the viewpoint of the user is a second speed, different from the first speed, replacing (1414c) display of a second amount, different from the first amount, of the simulated environment with display of the second amount of the physical environment of the electronic device, such as the amount of simulated environment 1322*a* replaced in FIG. 13G. In some embodiments, the amount of the physical environment that is revealed in response to the movement of the object corresponding to the viewpoint of the user is based on the speed of the movement of the object corresponding to the viewpoint of the user (e.g., towards the boundary). For example, if the object corresponding to the viewpoint of the user moves relatively slowly, a given amount of movement of the object corresponding to the viewpoint towards the boundary optionally results in a relatively small amount of the physical environment to be revealed (e.g., and a corresponding relatively small amount of the simulated environment to cease being displayed), and if the object corresponding to the viewpoint of the user moves relatively quickly, the given amount of movement of the object corresponding to the viewpoint towards the boundary optionally results in a relatively large amount of the physical environment to be revealed (e.g., and a corresponding relatively large amount of the simulated environment to cease being displayed). Revealing more or less of the physical environment depending on the speed of the movement of the object corresponding to the viewpoint of the user ensures that the amount of the physical environment that is revealed is sufficiently large to convey information about the physical environment for the speed with which the object corresponding to the viewpoint of the user is moving, thereby making the user-device interaction safer.

In some embodiments, updating the three-dimensional environment to change the amount of the three-dimensional environment occupied by the simulated environment includes (1416*a*) (e.g. in response to the object corresponding to the viewpoint of the user moving away from the first location), in accordance with a determination that an acceleration of the movement of the object corresponding to the viewpoint of the user is a first acceleration, replacing (1416*b*) display of a first amount of the simulated environment with display of the first amount of the physical environment of the electronic device, such as the amount of simulated environment 1322*a* replaced in FIG. 13E, and in accordance with a determination that the acceleration of the movement of the object corresponding to the viewpoint of the user is a second acceleration, different from the first acceleration, replacing (1416*c*) display of a second amount, different from the first amount, of the simulated environment with display of the second amount of the physical environment of the electronic device, such as the amount of simulated environment 1322*a* replaced in FIG. 13G. In some embodiments, the amount of the physical environment that is revealed in response to the movement of the object corresponding to the viewpoint of the user is based on the acceleration of the movement of the object corresponding to the viewpoint of the user (e.g., towards the boundary). For example, if the object corresponding to the viewpoint of the user moves with relatively low acceleration, a given amount of movement of the object corresponding to the viewpoint towards the boundary optionally results in a relatively small amount of the physical environment to be revealed (e.g., and a corresponding relatively small amount of the simulated environment to cease being displayed), and if the object corresponding to the viewpoint of the user moves with relatively high acceleration, the given amount of movement of the object corresponding to the viewpoint towards the boundary optionally results in a relatively large amount of the physical environment to be revealed (e.g., and a corresponding relatively large amount of the simulated environment to cease being displayed). Revealing more or less of the physical environment depending on the acceleration of the movement of the object corresponding to the viewpoint of the user ensures that the amount of the physical environment that is revealed is sufficiently large to convey information about the physical environment for the acceleration with which the object corresponding to the viewpoint of the user is moving, thereby making the user-device interaction safer.

In some embodiments, after detecting the movement of the object corresponding to the viewpoint of the user from the first location to the second location and while displaying the three-dimensional environment including the simulated environment and the boundary that is the second distance from the viewpoint of the user, the electronic device detects (1418*a*), via the one or more input devices, second movement of the object corresponding to the viewpoint of the user away from the second location in the physical environment, such as the movement of device 101 and/or user 1320 from FIG. 13E to 13G (e.g., detecting that the display generation component and/or electronic device has moved to a new location in the physical environment, or more generally, detecting that the user has moved in the physical environment (e.g., the head position and/or orientation of the user has changed), such movement corresponding to a request to change the viewpoint from which the electronic device is displaying the three-dimensional environment.). In some embodiments, in response to detecting the second movement of the object corresponding to the viewpoint of the user away from the second location in the physical environment (1418*b*), in accordance with a determination that the second movement of the object corresponding to the viewpoint of the user is towards the boundary, such as the movement of device 101 and/or user 1320 from FIG. 13E to 13G (e.g., receiving further movement of the object towards the boundary between the simulated environment and the remainder of the three-dimensional environment), the electronic device updates (1418*c*) the three-dimensional environment to cease display of the simulated environment within the three-dimensional environment, such as shown in FIG. 13G. For example, if after the electronic device partially retracts display of the simulated environment the user provides input to move further towards the boundary, the electronic device fully ceases display of the simulated environment and correspondingly displays the portions of the physical environment and/or three-dimensional environment that were previously replaced by the simulated environment (e.g., fully reveals the physical environment and/or three-dimensional environment). In some embodiments, the further movement of the object corresponding to the viewpoint of the user towards the boundary needs to be greater than a threshold amount (e.g., greater than 5, 10, 20, 30, 40, 50, 75, 80, or 90 percent of the distance between the viewpoint of the user when the second movement is initially detected) for the electronic device to fully cease display of the simulated environment; otherwise, the electronic device optionally progressively displays less and less of the simulated environment, and progressively moves the boundary further and further away from the viewpoint of the user, as the object corresponding to the viewpoint moves towards the boundary without fully ceasing display of the simulated environment. Ceasing display of the simulated environment in response to movement of the object corresponding to the viewpoint of the user ensures that the entirety of the physical environment is revealed to the user without the need for separate input for doing so, thereby making the user-device interaction safer.

In some embodiments, while displaying the three-dimensional environment including the simulated environment and the boundary that is the first distance from the viewpoint of the user, the electronic device detects (1420*a*), via the one or more input devices, a change in orientation of the object corresponding to the viewpoint of the user without detecting movement of the object corresponding to the viewpoint of the user away from the first location in the physical environment, such as the change in orientation of device 101 and/or user 1320 in FIG. 13C. For example, the user rotates his or her head without standing up from their seated position and/or walking towards the boundary of the simulated environment. In some embodiments, in response to detecting the change in the orientation of the object corresponding to the viewpoint of the user, the electronic device updates (1420*b*) display of the three-dimensional environment in accordance with the change in the orientation of the object corresponding to the viewpoint of the user (e.g., displaying the three-dimensional environment from the updated orientation of the viewpoint) while maintaining the boundary at the first distance from the viewpoint of the user and without replacing display of the portion of the simulated environment with display of the representation of the portion of the physical environment of the electronic device, such as shown in FIG. 13C. If the change in the object corresponding to the viewpoint of the user is merely a change in orientation of the object corresponding to the viewpoint of the user, the electronic device optionally does not retract or pull back the simulated environment from the viewpoint of the user, and therefore does not reveal portions of the physical environment that are obstructed by the simulated environment. Not revealing portions of the physical environment if the user is merely changing the orientation of the object corresponding to the viewpoint enables the user to interact with and/or explore the three-dimensional environment without reducing display of the simulated environment, thereby making the user-device interaction more efficient.

In some embodiments, the one or more criteria include a criterion that is satisfied when the second location is within a threshold distance (e.g., 0.3, 0.5, 1, 2, 3, 5, 10, 20, or 40 feet) of a location corresponding to the boundary, and is not satisfied when the second location is further than the threshold distance from the location corresponding to the boundary (1422). In some embodiments, the electronic device does not retract or pull back the simulated environment, and therefore does not reveal corresponding portions of the physical environment that are obstructed by the simulated environment, unless the object corresponding to the viewpoint of the user is within the threshold distance of the boundary between the simulated environment and the remainder of the three-dimensional environment. Not revealing portions of the physical environment unless the object corresponding to the viewpoint moves sufficiently close to the boundary of the simulated environment enables the user to interact with and/or explore the three-dimensional environment without reducing display of the simulated environment, thereby making the user-device interaction more efficient.

In some embodiments, updating the three-dimensional environment to change the amount of the three-dimensional environment occupied by the simulated environment includes changing (1424) which portions of the three-dimensional are occupied by the simulated environment based on distances of one or more physical features in the physical environment of the electronic device from the object corresponding to the viewpoint of the user, such as the depth-based retraction of simulated environment 1322*a* described with reference to FIG. 13E. For example, the electronic device optionally retracts or pulls back the simulated environment from the viewpoint of the user in a depth-based manner in which portions of the simulated environment that are closer to the viewpoint of the user are ceased to be displayed earlier (e.g., to correspondingly reveal portions of the physical environment that are closer to the user earlier) than portions of the simulated environment that are further from the viewpoint of the user (e.g., to correspondingly reveal portions of the physical environment that are further from the user). One or more of the characteristics of such a depth-based transition are the same as the characteristics of the depth-based transitions described with reference to methods 800 and/or 1000. Revealing portions of the physical environment based on depth ensures that physical areas closest to the user are revealed firth, thereby making the user-device interaction safer.

In some embodiments, while displaying the three-dimensional environment, including displaying a representation of a third portion of the physical environment with an atmospheric effect, such as in FIG. 13B (e.g., an atmospheric effect, such as lighting and/or particle effects, such as atmospheric effects described with reference to method 1000), the electronic device detects (1426*a*), via the one or more input devices, second movement of the object corresponding to the viewpoint of the user away from the first location to the second location in the physical environment, such as the movement of device 101 and/or user 1320 from their locations in FIG. 13B to their locations in FIG. 13F (e.g., a movement of the object corresponding to the viewpoint of the user having one or more of the characteristics of the first movement of the object corresponding to the viewpoint of the user). In some embodiments, in response to detecting the second movement of the object corresponding to the viewpoint of the user away from the first location to the second location, the electronic device updates (1426*b*) display of the three-dimensional environment in accordance with the second movement of the object corresponding to the viewpoint of the user (e.g., updating display of the three-dimensional environment to be from the updated position of the viewpoint of the user) without changing the atmospheric effect with which the representation of the third portion of the physical environment is displayed, such as shown in FIG. 13F. In some embodiments, movements of the object corresponding to the viewpoint of the user that would cause a simulated environment to be retracted or pulled back by the electronic device as described herein, optionally do not cause the electronic device to reduce the amount or degree of atmospheric effects applied to the three-dimensional environment. Thus, in some embodiments, atmospheric effects are not changed based on viewpoint movement, but rather require a different type of input (e.g., a hand gesture input, selection of a physical input element on the electronic device, etc.) to be changed. Because atmospheric effects (e.g., usually) do not obstruct display of the physical environment in the three-dimensional environment, but rather alter characteristics (e.g., lighting) with which the physical environment is displayed in the three-dimensional environment, the electronic device need not alter the display of the atmospheric effects for safety reasons. Not altering atmospheric effects based on viewpoint movement reduces the magnitude of, or eliminates, the change of display of the three-dimensional environment, and thus reduces potential disorientating change of the display of the three-dimensional environment, thereby making the user-device interaction safer and more efficient.

In some embodiments, before detecting the movement of the object corresponding to the viewpoint of the user from the first location to the second location, the three-dimensional environment includes a user interface of an application (e.g., or any virtual object) located in the simulated environment (1428*a*), such as user interface object 1334*a/b* (e.g., the user interface of the application is within a portion of the three-dimensional environment that corresponds to the simulated environment, and not within a portion of the three-dimensional environment that corresponds to the physical environment. In some embodiments, the location of the user interface of the application is beyond the boundaries of the physical environment of the electronic device and/or display generation component (e.g., is outside of the walls of the room in which the user is located)). In some embodiments, in response to detecting the movement of the object corresponding to the viewpoint of the user away from the first location to the second location, in accordance with the determination that the movement of the object corresponding to the viewpoint of the user away from the first location to the second location in the physical environment satisfies the one or more second criteria (1428*b*), such as the movement of device 101 and/or user 1320 in FIG. 13G (e.g., the movement of the object corresponding to the viewpoint is sufficiently large, fast, etc. to cause the electronic device to cease displaying the simulated environment in the three-dimensional environment completely, such as described previously, and/or the movement of the object corresponding to the viewpoint is sufficiently large, fast, etc. to cause the electronic device to cease displaying the portion of the simulated environment that includes the user interface of the application), the electronic device updates (1428*c*) the three-dimensional environment to no longer include the simulated environment, such as shown in FIG. 13G. In some embodiments, the electronic device ceases (1428*d*) display of the user interface of the application in the three-dimensional environment, such as user interface object 1334*a/b* no longer being included in three-dimensional environment 1304 in FIG. 13G. In some embodiments, if the simulated environment is ceased to be displayed completely, or if the portion of the simulated environment that included the user interface of the application ceases to be displayed, the electronic device also ceases to display the user interface of the application in the three-dimensional environment. Ceasing display of an object that was in the simulated environment when the simulated environment ceases to be displayed treats the object consistently with other items displayed in the simulated environment, thereby making the user-device interaction more consistent.

In some embodiments, before detecting the movement of the object corresponding to the viewpoint of the user from the first location to the second location, the three-dimensional environment includes a user interface of an application (e.g., or any virtual object) located outside of the simulated environment in the three-dimensional environment (1430*a*), such as user interface object 1330*a/b* in FIG. 13A (e.g., the user interface of the application is within a portion of the three-dimensional environment that is outside of the simulated environment (e.g., such as within a portion of the three-dimensional environment that corresponds to the physical environment), and not within a portion of the three-dimensional environment that corresponds to the simulated environment. In some embodiments, the location of the user interface of the application is within the boundaries of the physical environment of the electronic device and/or display generation component (e.g., is within the walls of the room in which the user is located), and cannot be located outside of such boundaries). In some embodiments, in response to detecting the movement of the object corresponding to the viewpoint of the user away from the first location to the second location, in accordance with a determination that the movement of the object corresponding to the viewpoint of the user away from the first location to the second location in the physical environment satisfies one or more second criteria (1430*b*), such as the movement of device 101 and/or user 1320 in FIG. 13G (e.g., the movement of the object corresponding to the viewpoint is sufficiently large, fast, etc. to cause the electronic device to cease displaying the simulated environment in the three-dimensional environment completely, such as described previously), the electronic device updates (1430*c*) the three-dimensional environment to no longer include the simulated environment, such as shown in FIG. 13G. In some embodiments, the electronic device maintains (1430*d*) display of the user interface of the application in the three-dimensional environment, such as user interface object 1330*b* in FIG. 13G. In some embodiments, if the simulated environment is ceased to be displayed completely, the electronic device maintains display of virtual objects that were displayed outside of the simulated environment in the three-dimensional environment. Maintaining display of an object that was outside of the simulated environment when the simulated environment ceases to be displayed treats the object consistently with other items displayed in the three-dimensional environment outside of the simulated environment (e.g., such as portions of the physical environment), thereby making the user-device interaction more consistent.

In some embodiments, before detecting the movement of the object corresponding to the viewpoint of the user from the first location to the second location, the three-dimensional environment includes a user interface of an application (e.g., or any virtual object) located in the simulated environment (1432*a*), such as user interface object 1332*a/b* in FIG. 13A (e.g., the user interface of the application is within a portion of the three-dimensional environment that corresponds to the simulated environment, and not within a portion of the three-dimensional environment that corresponds to the physical environment. In some embodiments, the location of the user interface of the application is beyond the boundaries of the physical environment of the electronic device and/or display generation component (e.g., is outside of the walls of the room in which the user is located)). In some embodiments, in response to detecting the movement of the object corresponding to the viewpoint of the user away from the first location to the second location, in accordance with a determination that the movement of the object corresponding to the viewpoint of the user away from the first location to the second location in the physical environment satisfies one or more second criteria (1432*b*), such as the movement of device 101 and/or user 1320 in FIG. 13G (e.g., the movement of the object corresponding to the viewpoint is sufficiently large, fast, etc. to cause the electronic device to cease displaying the simulated environment in the three-dimensional environment completely, such as described previously, and/or the movement of the object corresponding to the viewpoint is sufficiently large, fast, etc. to cause the electronic device to cease displaying the portion of the simulated environment that includes the user interface of the application), the electronic device updates (1432*c*) the first portion of the three-dimensional environment to no longer include the simulated environment, such as in FIG. 13G. In some embodiments, the electronic device displays (1432*d*) the user interface of the application in the second portion of the three-dimensional environment, such as shown with respect to object 1332*a/b* in FIG. 13G. In some embodiments, if the simulated environment is ceased to be displayed completely, or if the portion of the simulated environment that included the user interface of the application ceases to be displayed, the electronic device moves the user interface out to a portion of the three-dimensional environment that remains after the simulated environment ceases to be displayed. In some embodiments, this movement of the user interface includes moving the user interface closer to the viewpoint of the user than it was previously. In some embodiments, the user interface remains the same distance from the viewpoint of the user it was previously (e.g., if the user interface was displayed in a portion of the simulated environment that was replaced by display of a portion of the physical environment, the user interface is displayed in that portion of the physical environment). Continuing to display an object that was displayed in the simulated environment when the simulated environment ceases to be displayed allows for continued interaction with the object, thereby making the user-device interaction more consistent and efficient.

In some embodiments, while the user interface of the application is located in the first portion of the three-dimensional environment, the user interface of the application has a first size in the three-dimensional environment (1434a), and while the user interface of the application is located in the second portion of the three-dimensional environment, the user interface of the application has a second size, smaller than the first size, in the first portion of the three-dimensional environment (1434b), such as shown with respect to object 1332a/b in FIG. 13E as compared to FIG. 13G. In some embodiments, the electronic device also reduces the size of the user interface (or object) as it moves the user interface out of the simulated environment to the second portion of the three-dimensional environment. In some embodiments, such movement of the user interface causes the user interface to be closer to the viewpoint of the user, which can cause the user interface to consume a larger portion of the field of view of the user. Thus, the electronic device optionally reduces the size of the user interface so that the portion of the field of view of the user consumed by the user interface is not to great, increases less than a threshold amount (e.g., increases less than 1, 5, 10, 20, 30, 40, or 50%), remains the same, or decreases. Reducing the size of the object that was displayed in the simulated environment when the simulated environment ceases to be displayed ensures the device-controlled movement of the object does not result in a disruptive change to the display of the three-dimensional environment for the user, thereby making the user-device interaction more consistent and efficient.

FIGS. 15A-15G illustrate examples of providing feedback to a user in response to the user moving a virtual object to and/or into a simulated environment in accordance with some embodiments.

Figure 15A:
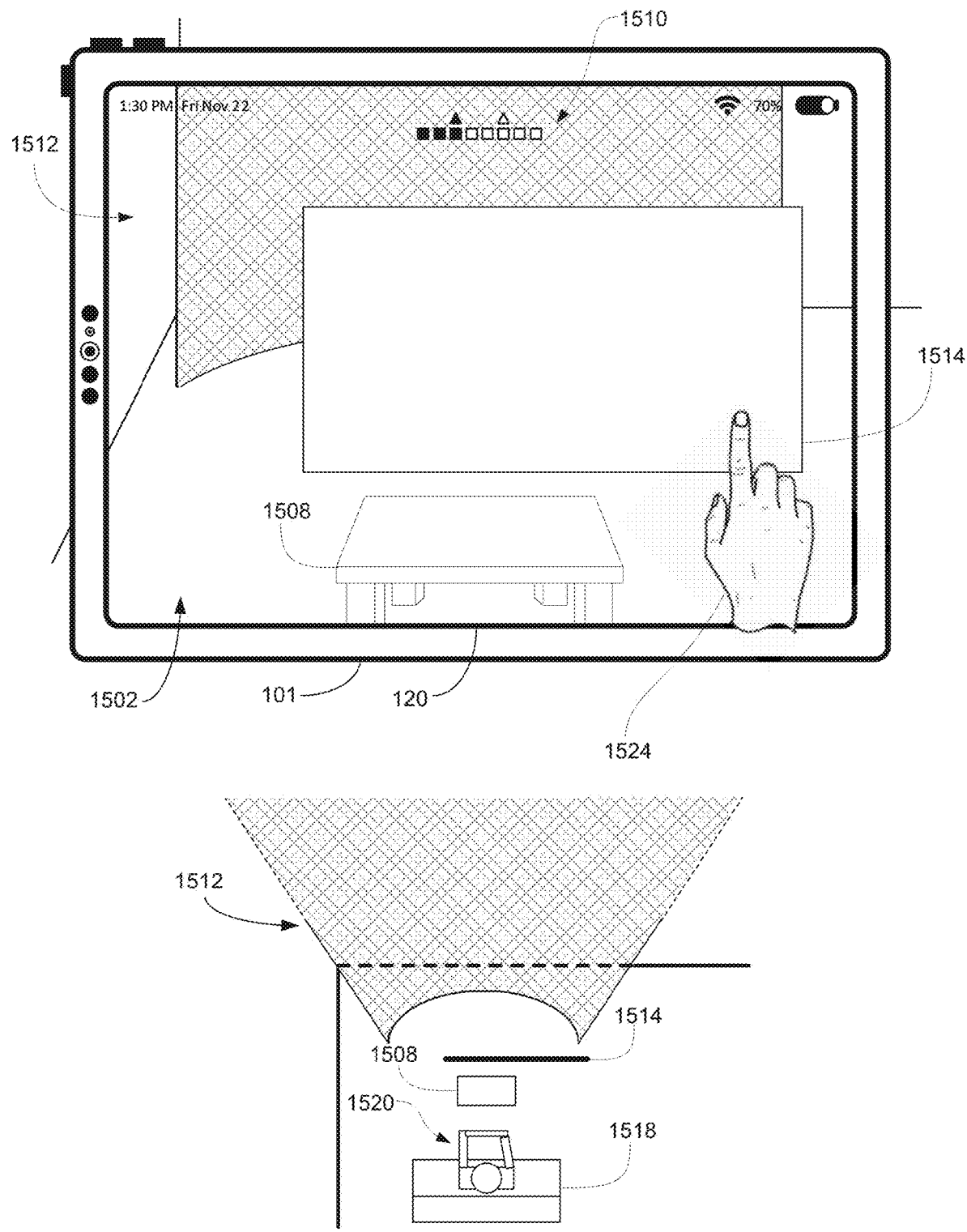
FIGS. 15A-15G illustrate examples of providing feedback to a user in response to a user moving a virtual object to and/or into a simulated environment in accordance with some embodiments.

FIG. 15A illustrates an electronic device 101 displaying, via a display generation component (e.g., display generation component 120 of FIG. 1), a three-dimensional environment 1502 from a viewpoint of the user 1520 illustrated in the overhead view (e.g., facing the back wall of the physical environment of computer system 101). As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

As shown in FIG. 15A, device 101 captures one or more images of the physical environment around device 101 (e.g., operating environment 100), including one or more objects in the physical environment. In some embodiments, device 101 displays representations of the physical environment in three-dimensional environment 1502 and/or representations of the physical environment are visible through display generation component 120, and device 101 optionally also displays simulated environment 1512. For example, three-dimensional environment 1502 includes a representation of coffee table 1508, which is optionally a representation of a physical coffee table in the physical environment; three-dimensional environment 1502 also includes simulated environment 1512, which optionally has one or more of the characteristics of simulated environments described with reference to methods 800, 1000, 1200, 1400 and/or 1600. Three-dimensional environment 1502 optionally has one or more of the characteristics of three-dimensional environment 904 described with reference to FIGS. 9A-9H and/or method 1000. As shown in the overhead view of three-dimensional environment 1502 (e.g., including portions of the physical environment and simulated environment 1512), the physical environment includes coffee table 1508 and couch 1518. In some embodiments, simulated environment 1512 occupies one or more portions of three-dimensional environment 1502, as described with reference to methods 800, 1000, 1200, 1400 and/or 1600.

As mentioned above, in FIG. 15A, device 101 is displaying simulated environment 1512 in three-dimensional environment 1502, with a boundary between simulated environment 1512 and the portion of three-dimensional environment 1502 corresponding to the physical environment. In some embodiments, the boundary is a feathered boundary between simulated environment 1512 and the portion of three-dimensional environment 1502 that corresponds to the physical environment, such that within the boundary a (e.g., faded or blurred) portion of simulated environment 1512 and a (e.g., faded or blurred) portion of the physical environment are both displayed. In FIG. 15A, the simulated environment 1512 is displayed at a moderate level of immersion (e.g., as indicated by immersion indicator 1510), which optionally corresponds to the amount of the field of view from the viewpoint of the user 1520 that is consumed by simulated environment 1512 and/or the proximity of the boundary of the simulated environment 1512 to the viewpoint of the user 1520. Additional or alternative details about the immersion at which a simulated environment is displayed are provided with reference to methods 800, 1000 and/or 1600.

As shown via display generation component 120 and in the overhead view in FIG. 15A, three-dimensional environment 1502 includes virtual object 1514. Virtual object 1514 is included in a portion of three-dimensional environment 1502 corresponding to the physical environment, rather than in a portion of three-dimensional environment 1502 corresponding to simulated environment 1512. Virtual object 1514 is optionally one or more of user interfaces of applications (e.g., messaging user interfaces, and/or content browsing user interfaces), three-dimensional objects (e.g., virtual clocks, virtual balls, and/or virtual cars) or any other element displayed by device 101 that is not included in the physical environment.

In some embodiments, movement of virtual object 1514 to the simulated environment 1512 causes virtual object 1514 to be placed into simulated environment 1512, as will be described below. Further, in some embodiments, device 101 changes the visual appearance of simulated environment 1512 to indicate that virtual object 1514 has and/or will be placed into simulated environment 1512 as a result of the input from the user. However, if virtual object 1514 is instead moved within portions of three-dimensional environment 1502 outside of simulated environment 1512, device 101 optionally does not change the visual appearance of simulated environment 1512.

Figure 15B:
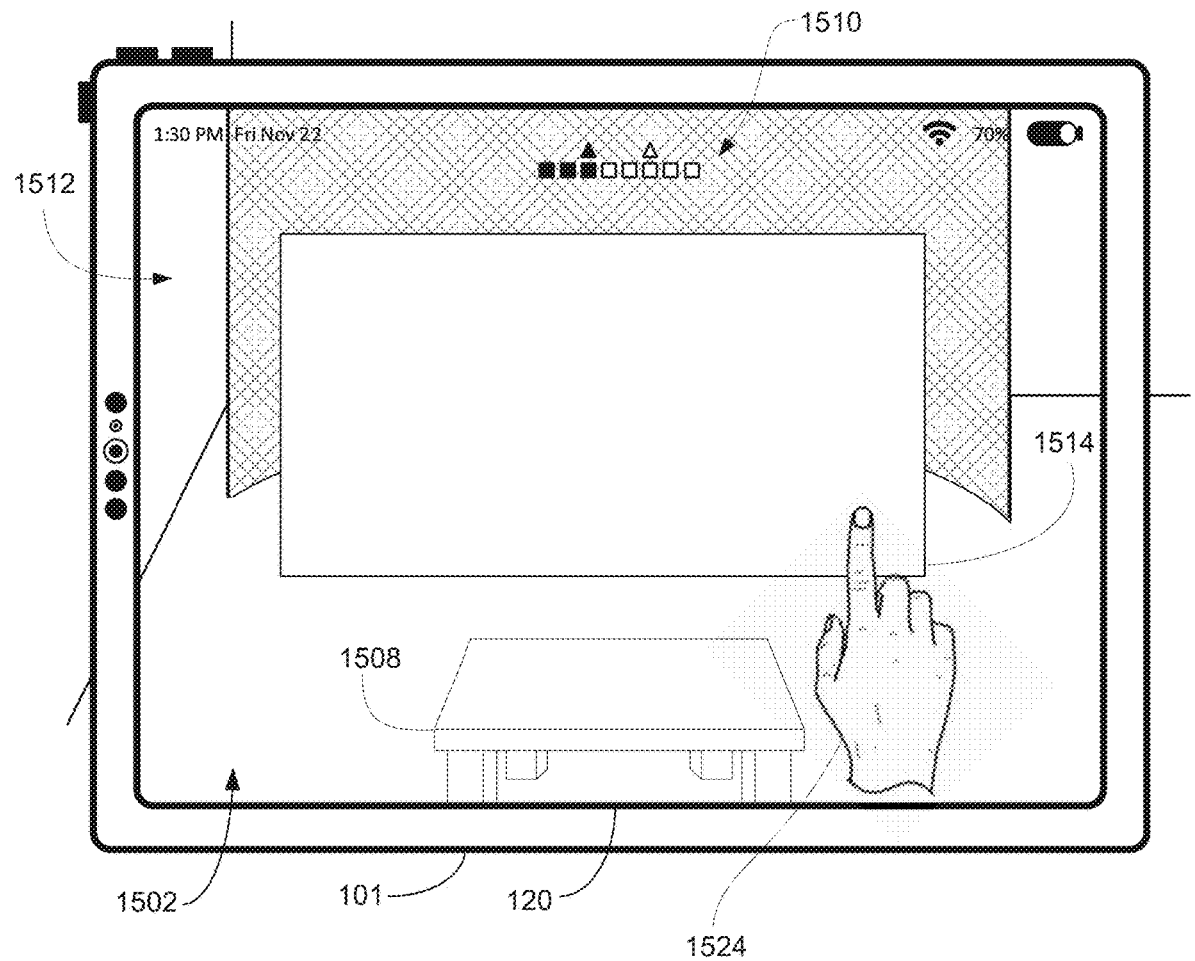
Figure 15B:
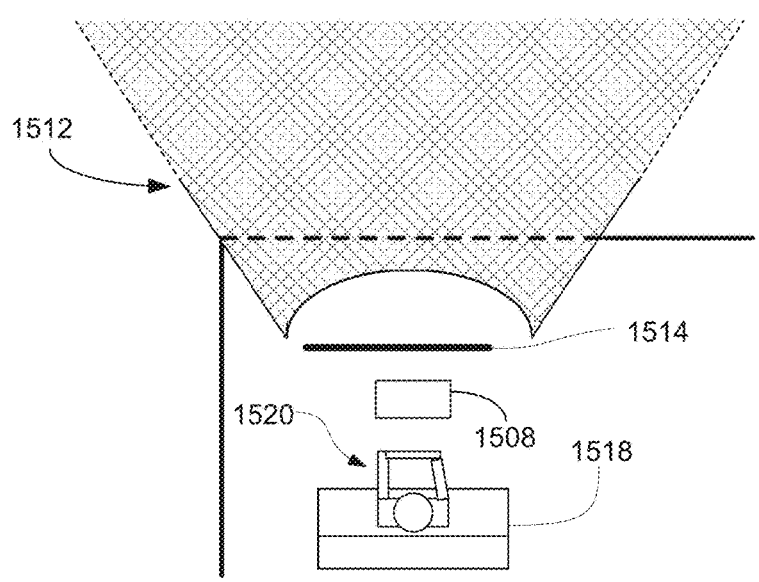

For example, from FIG. 15A-15B, device 101 detects a movement input from hand 1524 directed to virtual object 1514. In some embodiments, the input from hand 1524 includes hand 1524 performing an air pinch gesture while attention of the user is directed to virtual object 1514, and movement of hand 1524 while remaining in a pinch hand shape. Additional or alternative movement inputs are described with reference to method 1600.

In FIG. 15B, hand 1524 has moved virtual object 1514 leftward to a new position within three-dimensional environment 1502. Device 101 has updated the display location of virtual object 1514 within three-dimensional environment 1502 accordingly, but has not changed the visual appearance of simulated environment 1512. Further, simulated environment 1512 continues to be displayed at the same level of immersion as it was displayed in FIG. 15A.

Figure 15C:
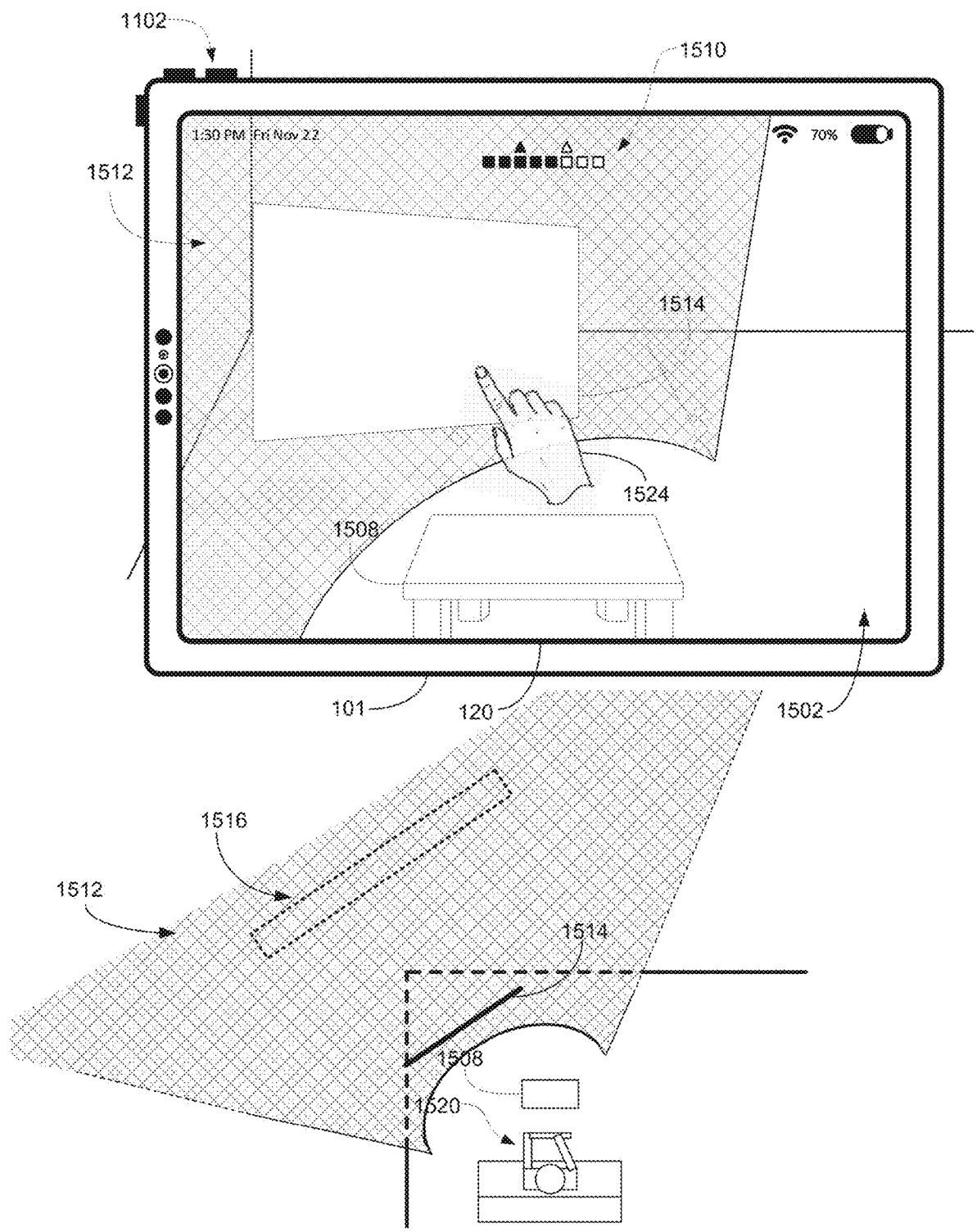

In FIG. 15C, in contrast, hand 1524 has moved virtual object 1514 towards the left side of simulated environment 1512, and to within a threshold distance (e.g., 0.1, 0.3, 0.5, 1, 3, 5, 10, 20, 50, 100, 500 or 1000 cm) of simulated environment 1512 and/or to a location within simulated environment 1512. In FIG. 15C, the movement input from hand 1524 has not yet ended (e.g., hand 1524 remains in a pinch hand shape, and has not yet unpinched or depinched to release the pinch hand shape). In response to the movement input from hand 1524 in FIG. 15C, device 101 has updated the display location of virtual object 1514 within three-dimensional environment 1502 accordingly, including updating the orientation of virtual object 1514 to remain directed towards the viewpoint of the user 1520. Additionally, device 101 has changed the visual appearance of simulated environment 1512. For example, device 101 has increased the translucency of simulated environment 1512 (e.g., such that portions of the physical environment that were previously not visible through simulated environment 1512 are now at least partially visible through simulated environment 1512). Further, device 101 has centered simulated environment 1512 (e.g., moved simulated environment 1512) to a position based on the position to which hand 1524 moved virtual object 1514. In some embodiments, device 101 centers simulated environment 1512 on the location of virtual object 1514 when virtual object 1514 is brought to within the threshold distance of simulated environment 1512; in some embodiments, device 101 centers simulated environment 1512 on the viewpoint of the user 1520 when virtual object 1514 is brought to within the threshold distance of simulated environment 1512. Further, device 101 has increased the level of immersion at which simulated environment 1512 is being displayed in response to virtual object 1514 being brought to within the threshold distance of simulated environment 1512 and/or to a location within simulated environment 1512, as indicated by immersion indicator 1510 in FIG. 15C. For example, the boundary between simulated environment 1512 and the remainder of three-dimensional environment 1502 has moved closer to the viewpoint of the user 1520 and/or has wrapped more around the viewpoint of the user 1520, as shown in FIG. 15C. Additional or alternative details about increasing the level of immersion at which a simulated environment is displayed are provided with reference to methods 800, 1000, 1200 and/or 1400.

Figure 15D:
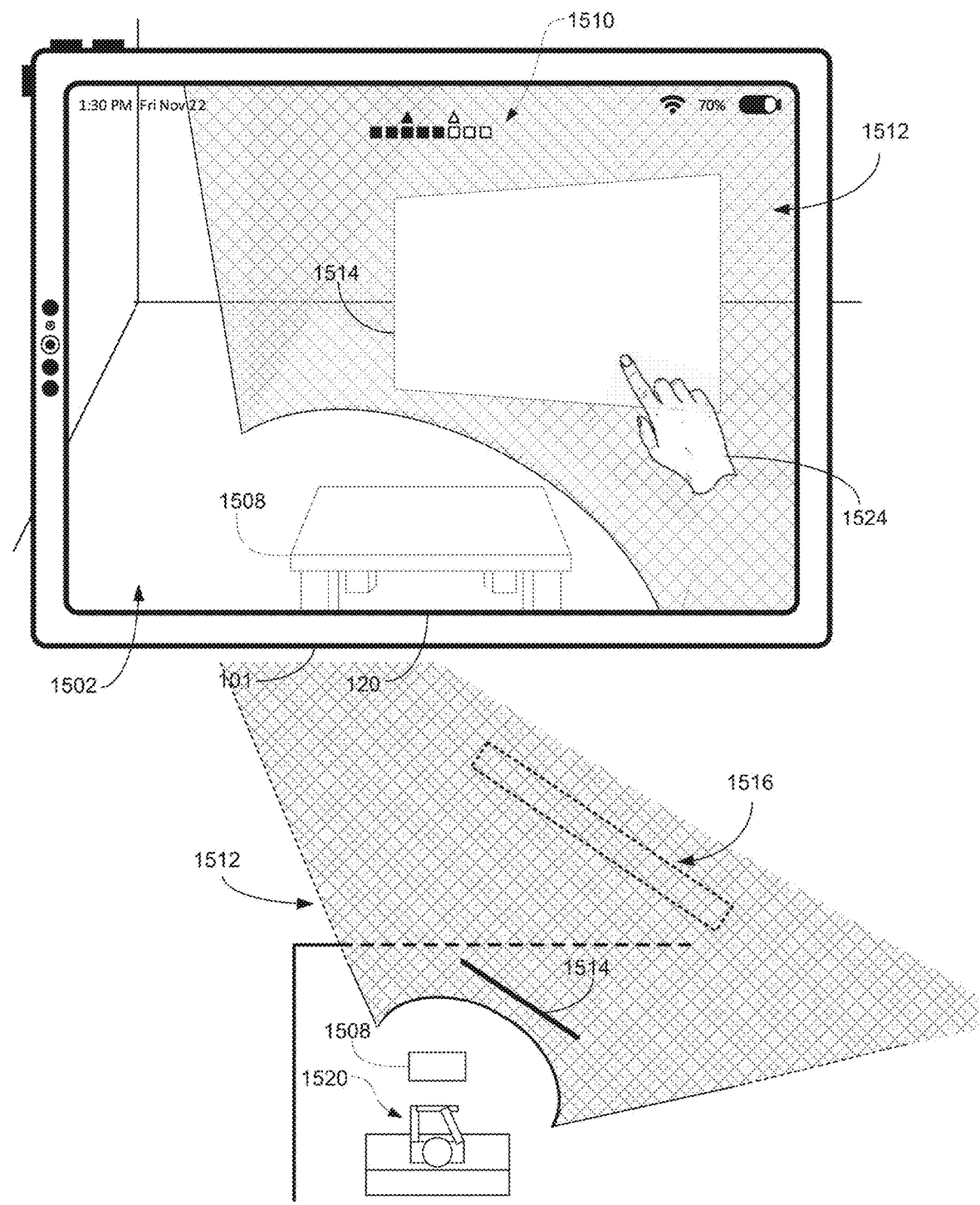

FIG. 15D illustrates an alternative response of device 101 had hand 1524 moved virtual object 1514 to the right side of simulated environment 1512 from FIG. 15B, rather than to the left side of simulated environment 1512 as shown in FIG. 15C. For example, device 101 in FIG. 15D has centered (e.g., moved) simulated environment 1512 to a different position than in FIG. 15C—in particular, device 101 has centered simulated environment 1512 on the location of virtual object 1514 shown in FIG. 15D. Other details of manners in which device 101 changes the visual appearance of simulated environment 1512 in FIG. 15D are optionally as they were described with reference to FIG. 15C.

Returning to FIG. 15C, in some embodiments, in response to detecting an end of the movement input from hand 1524 (e.g., in response to detecting hand 1524 depinching or unpinching to release the pinch hand shape) while virtual object 1514 is within simulated environment 1512 and/or within the threshold distance of simulated environment 1512, device 101 optionally moves virtual object 1514 to a predetermined location 1516 within simulated environment 1512, as will be described below. As shown in FIGS. 15C and 15D, predetermined location 1516 is optionally at different locations within three-dimensional environment 1502 depending on the location of simulated environment 1512 within three-dimensional environment 1502, though predetermined location 1516 optionally remains at the same relative location within simulated environment 1512. Further, in some embodiments, the location of predetermined location 1516 within simulated environment 1512 is optionally defined by simulated environment 1512 such that different simulated environments optionally include differently placed predetermined positions and/or different numbers of predetermined positions within them.

Figure 15E:
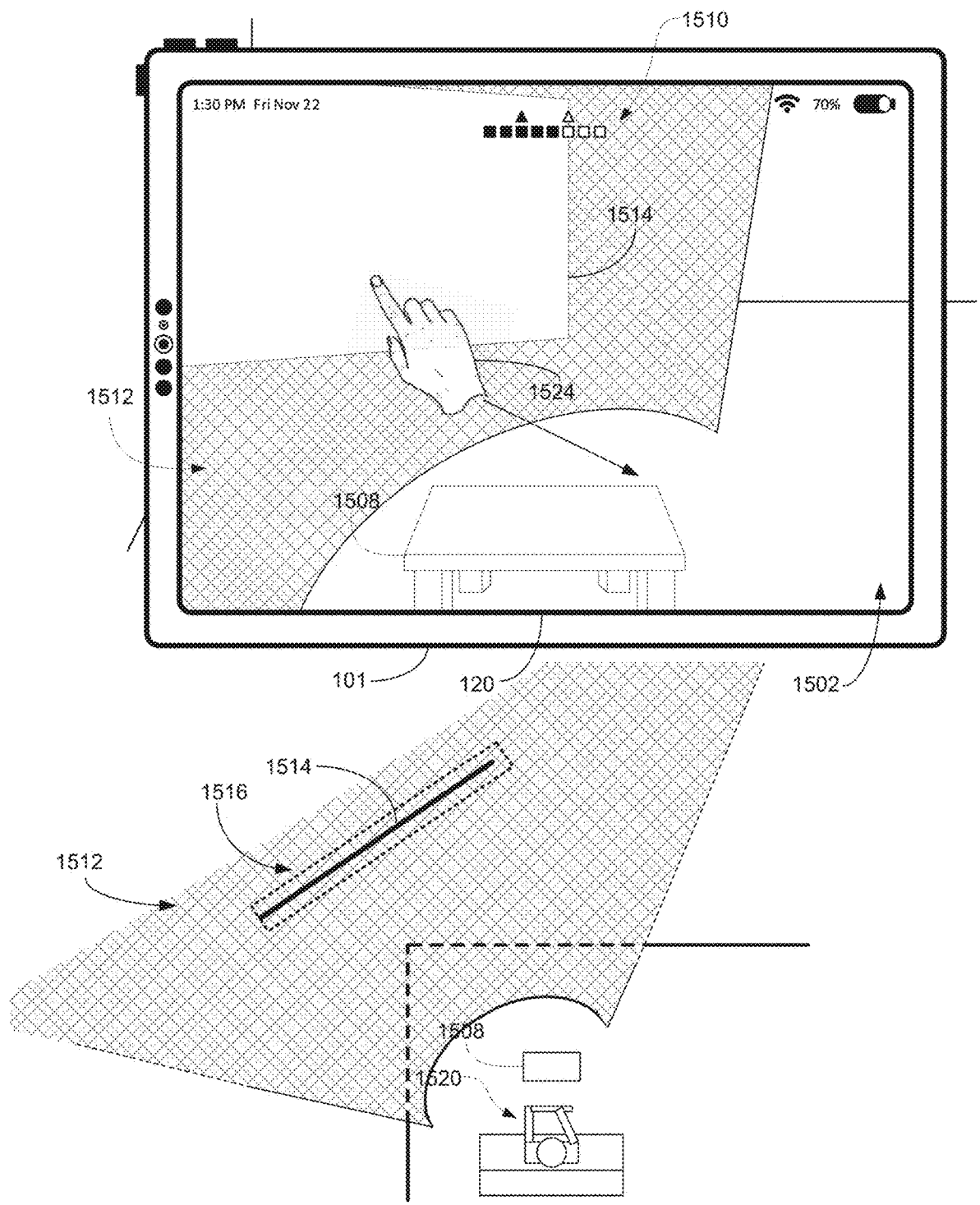

From FIG. 15C to FIG. 15E, device 101 detects an end of the movement input from hand 1524. In response, as shown in FIG. 15E, device 101 automatically moves (e.g., snaps) virtual object 1514 to predetermined location 1516 within simulated environment 1512 (e.g., without movement input from hand 1524 for moving virtual object 1514 to predetermined location 1516). Device 101 has also at least partially reverted at least one of the changes to the visual appearance of simulated environment 1512 that it made in FIGS. 15C and 15D; for example, device 101 has at least partially reverted the increase in translucency of simulated environment 1512 in FIG. 15E (e.g., device 101 has reduced the translucency of simulated environment 1512). Further, device 101 has automatically changed the size of virtual object 1514 within three-dimensional environment 1502. In particular, in FIG. 15E, device 101 has increased the size of virtual object 1514 (e.g., as shown in the overhead view), though other results are possible. Automatically increasing the size of virtual object 1514 when virtual object 1514 is snapped to predetermined location 1516, which is optionally further from the viewpoint of the user 1520 than the distance at which virtual object 1514 was displayed in FIG. 15C, helps ensure that virtual object 1514 remains appropriately sized at its new distance from the viewpoint of the user 1520 to be appropriately visible to the user. In some embodiments, the size two which virtual object 1514 is increased or decreased in simulated environment 1512 is optionally defined by simulated environment 1512 and/or is based on the distance of predetermined location 1516 from the viewpoint of the user 1520 such that different simulated environments optionally result in different scaling results for virtual object 1514.

Figure 15F:
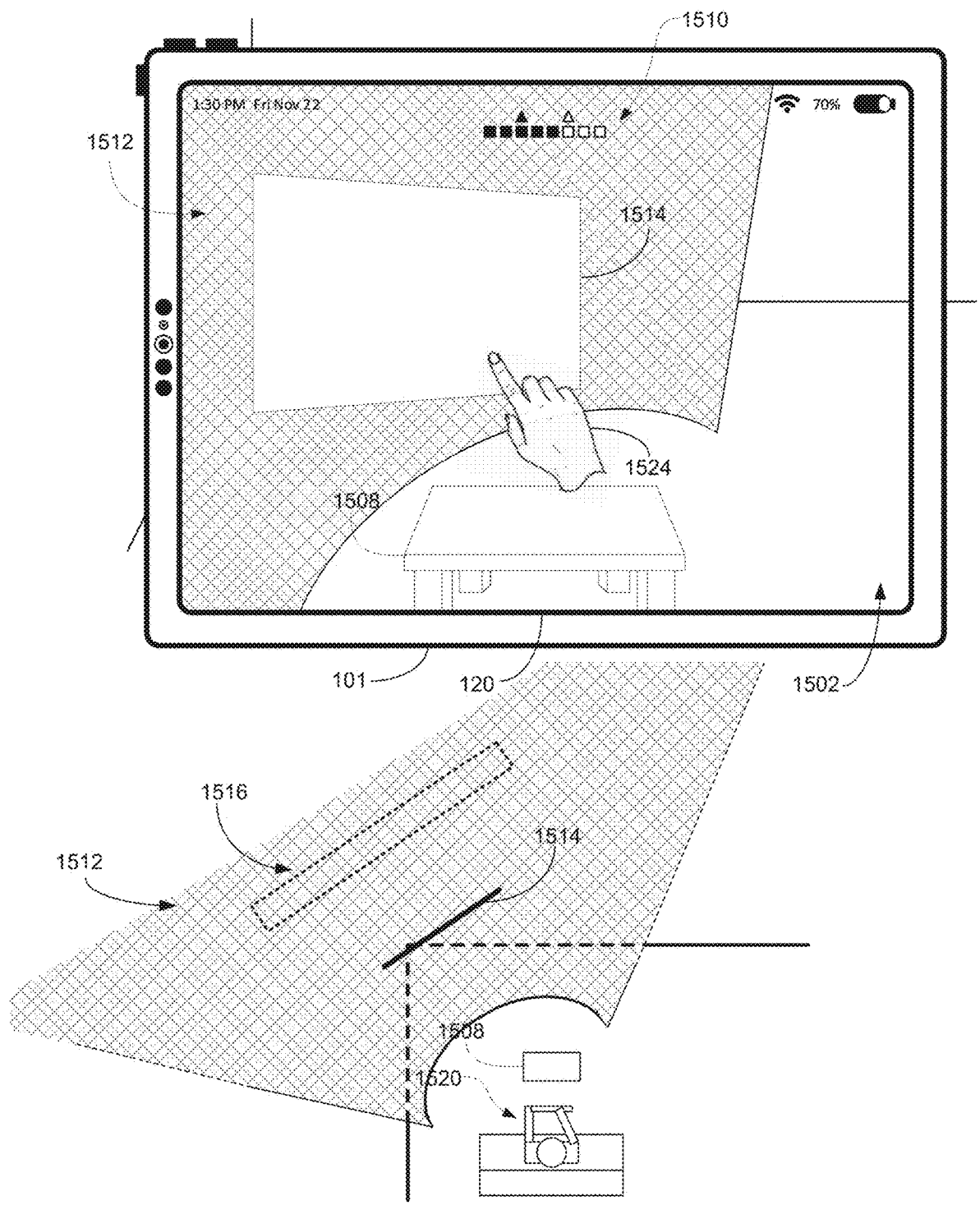

In some embodiments, removing virtual object 1514 from simulated environment 1512 requires movement characteristics from a movement input from hand 1524 that satisfy certain criteria (e.g., magnitude criteria, direction criteria, velocity criteria and/or acceleration criteria, as described in more detail with reference to method 1600); otherwise, virtual object 1514 optionally is moved away from predetermined location 1516 but is automatically moved back to predetermined location 1516 (e.g., rubber-banded back to predetermined location, such as described in more detail with reference to method 1600) rather than moving out of simulated environment 1512 in response to detecting the end of the movement input from hand 1524. For example, from FIG. 15E to FIG. 15F, hand 1524 has provided a movement input directed to virtual object 1514 away from predetermined location 1516 and towards a portion of three-dimensional environment 1502 outside of simulated environment 1512 (e.g., towards the viewpoint of the user 1520). The movement input from hand 1524 optionally does not satisfy the above-mentioned criteria for pulling virtual object 1514 out of simulated environment 1512. In response to detecting the movement input from hand 1524, device 101 has moved virtual object 1514 away from predetermined location 1516 and towards the viewpoint of the user 1520, as shown in FIG. 15F. In FIG. 15F, virtual object 1514 remains within simulated environment 1512. In response to moving virtual object 1514 away from predetermined location 1516, device 101 has also at least partially reversed the scaling of virtual object 1514 that occurred in response to virtual object 1514 being displayed at predetermined location 1516 (e.g., device 101 has automatically reduced the size of virtual object 1514 in three-dimensional environment 1502 to the size it had in FIGS. 15A-15C). From FIG. 15F, because the movement input from hand 1524 was insufficient to satisfy the above-mentioned criteria for pulling virtual object 1514 out of simulated environment 1512, device 101 optionally rubber bands (e.g., as described in more detail with reference to method 1600) virtual object 1514 back to predetermined location 1516, and displays virtual object 1514 at predetermined location 1516 as shown in FIG. 15E, including increasing the size of virtual object 1514 again.

Figure 15G:
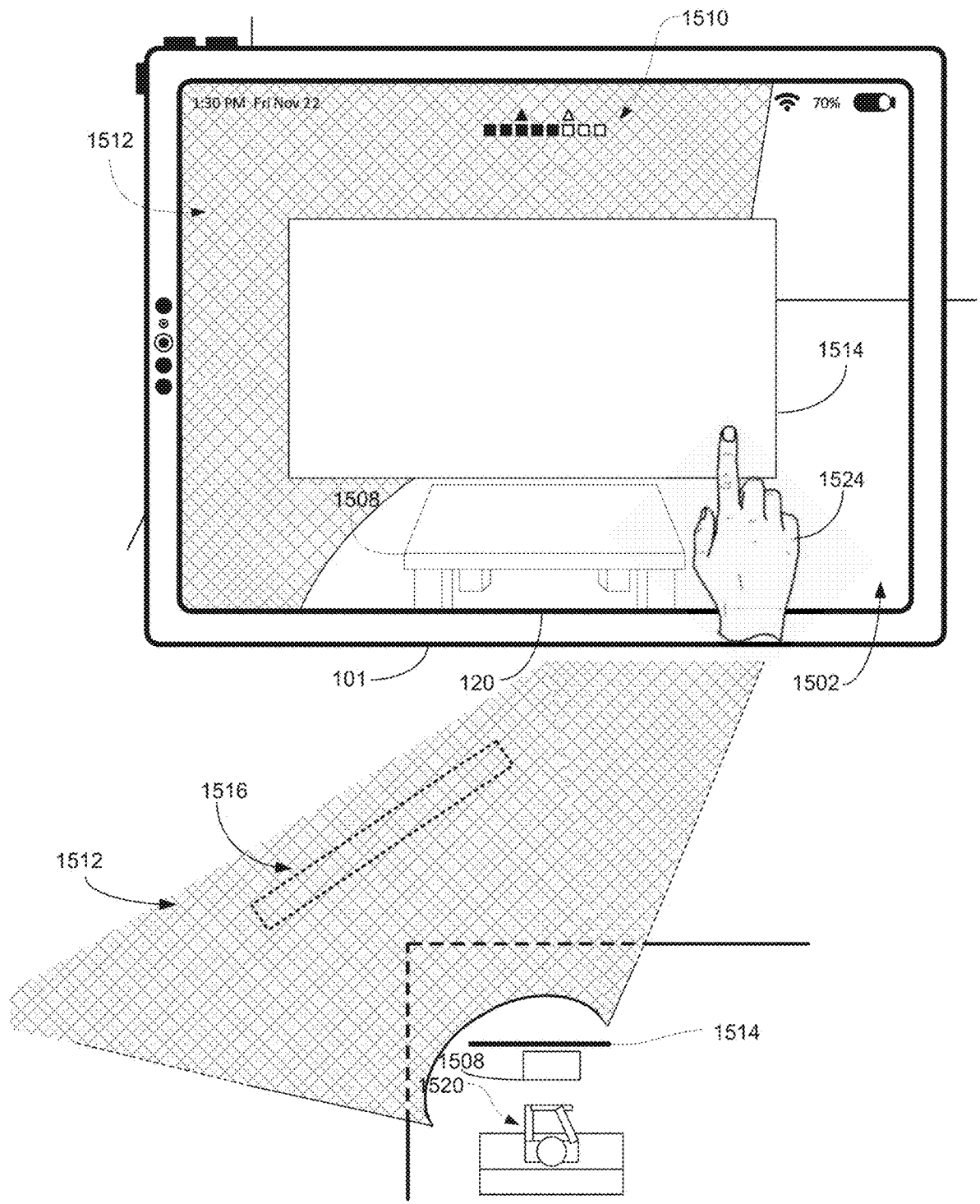
Figure 16A:
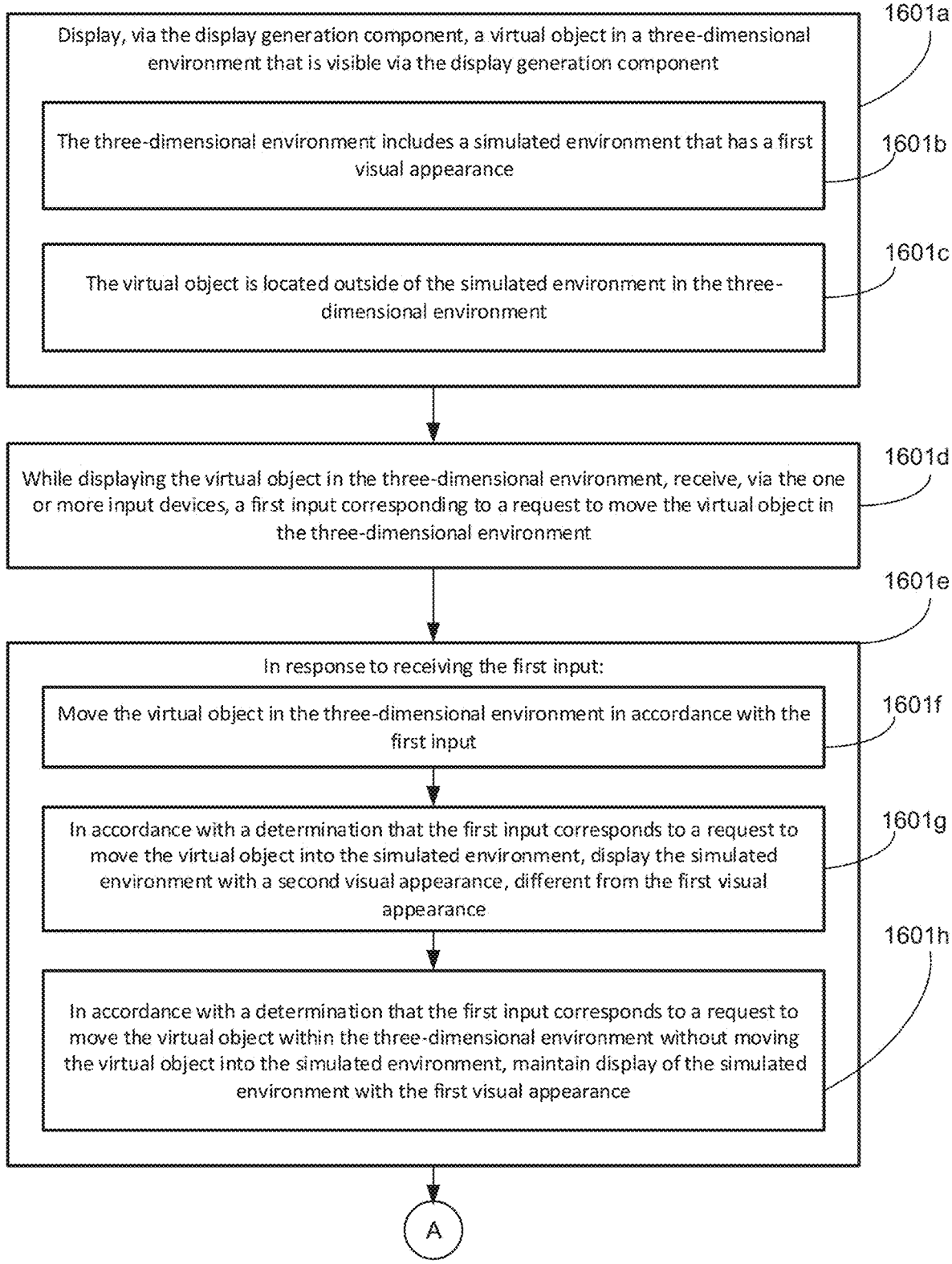
FIGS. 16A-16H is a flowchart illustrating a method of providing feedback to a user in response to a user moving a virtual object to and/or into a simulated environment in accordance with some embodiments.
Figure 16B:
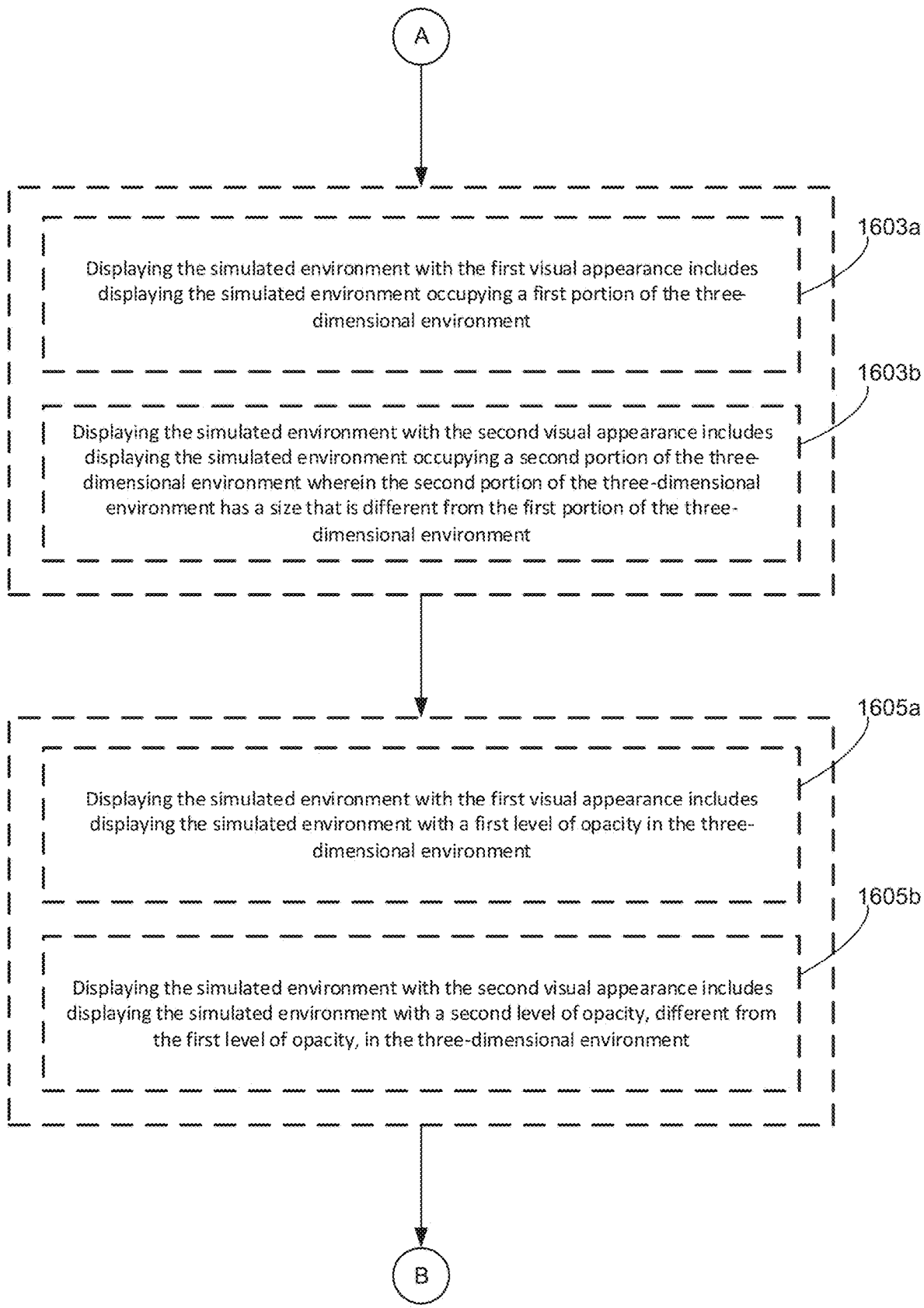
Figure 16C:
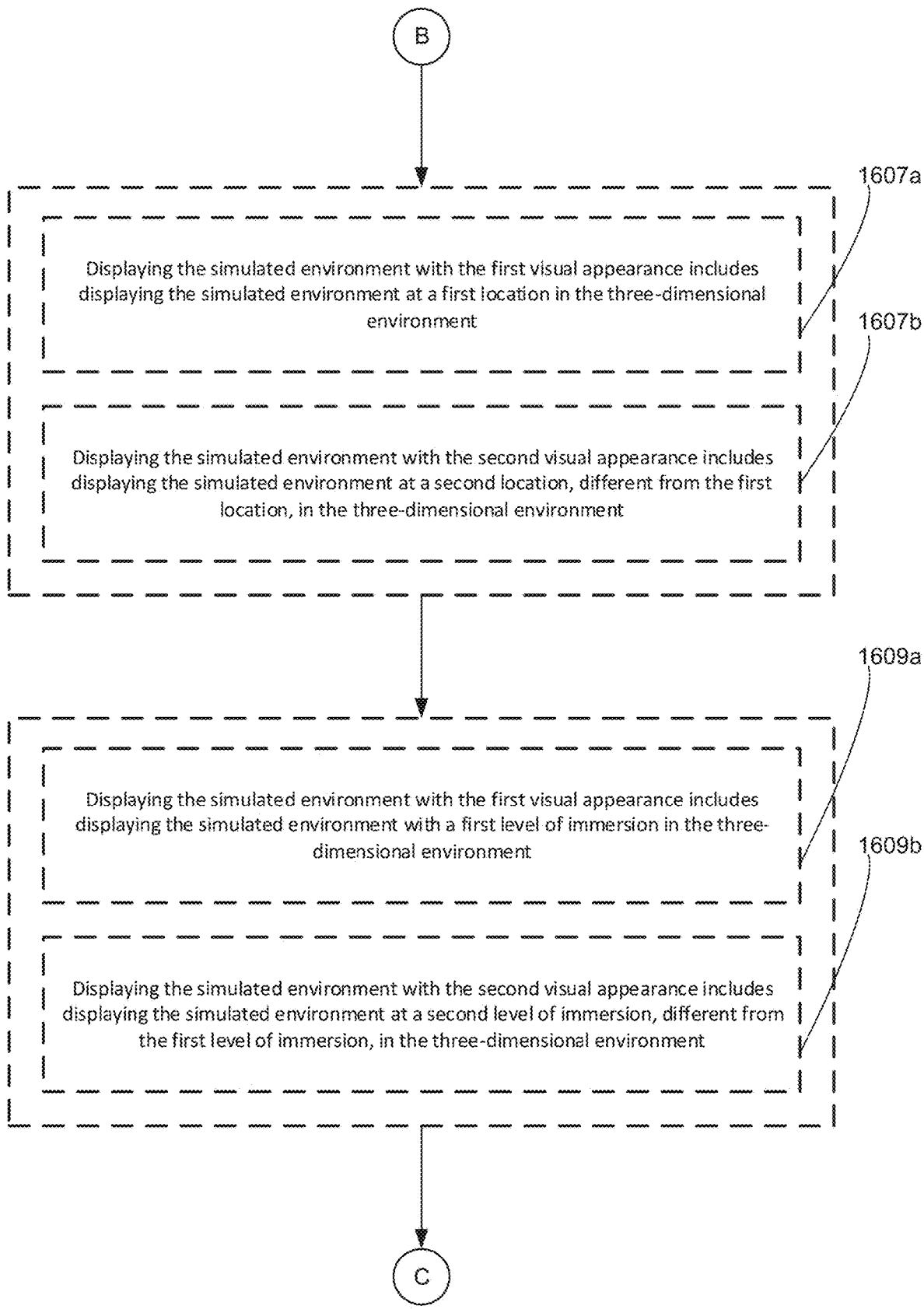
Figure 16D:
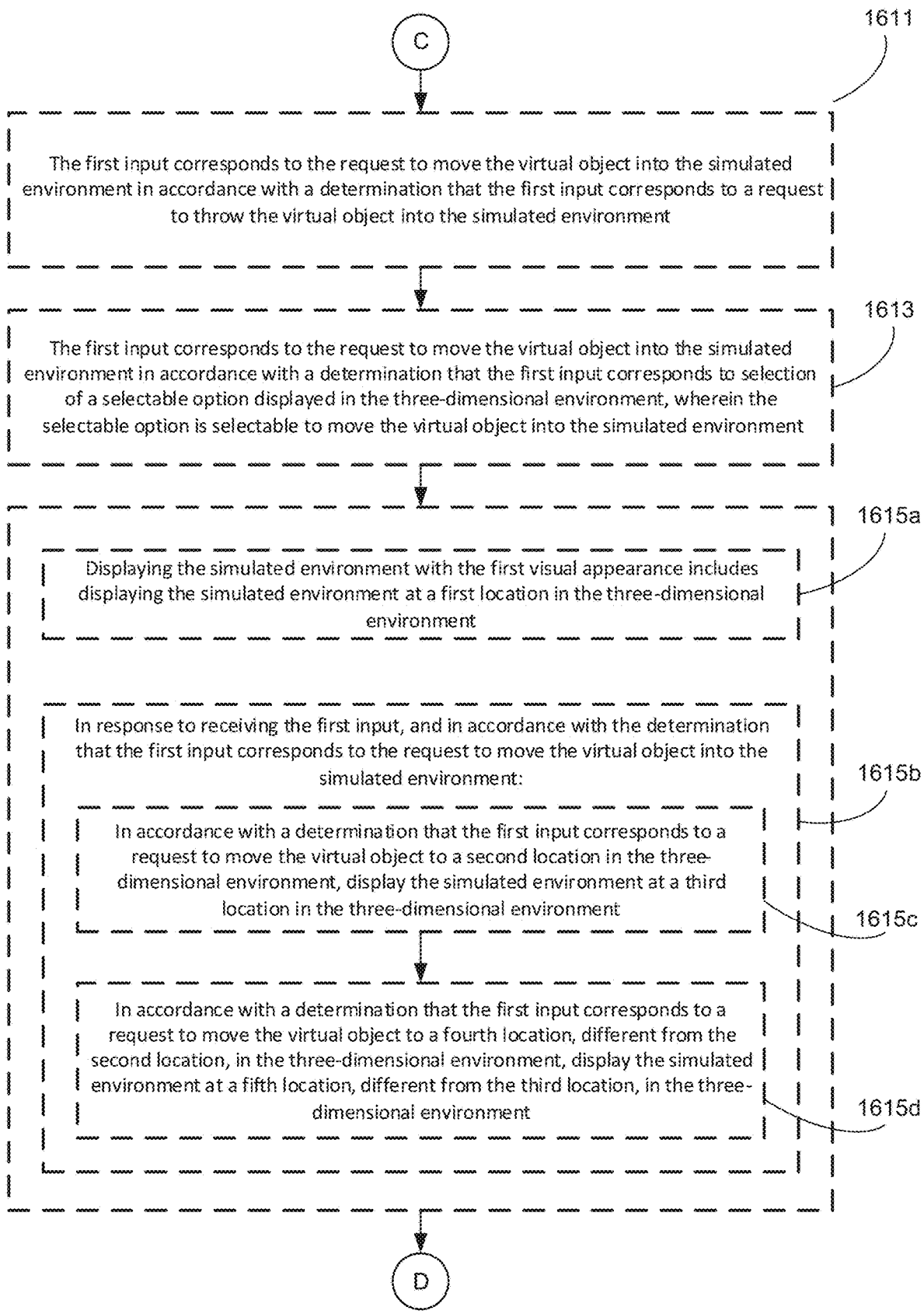
Figure 16E:
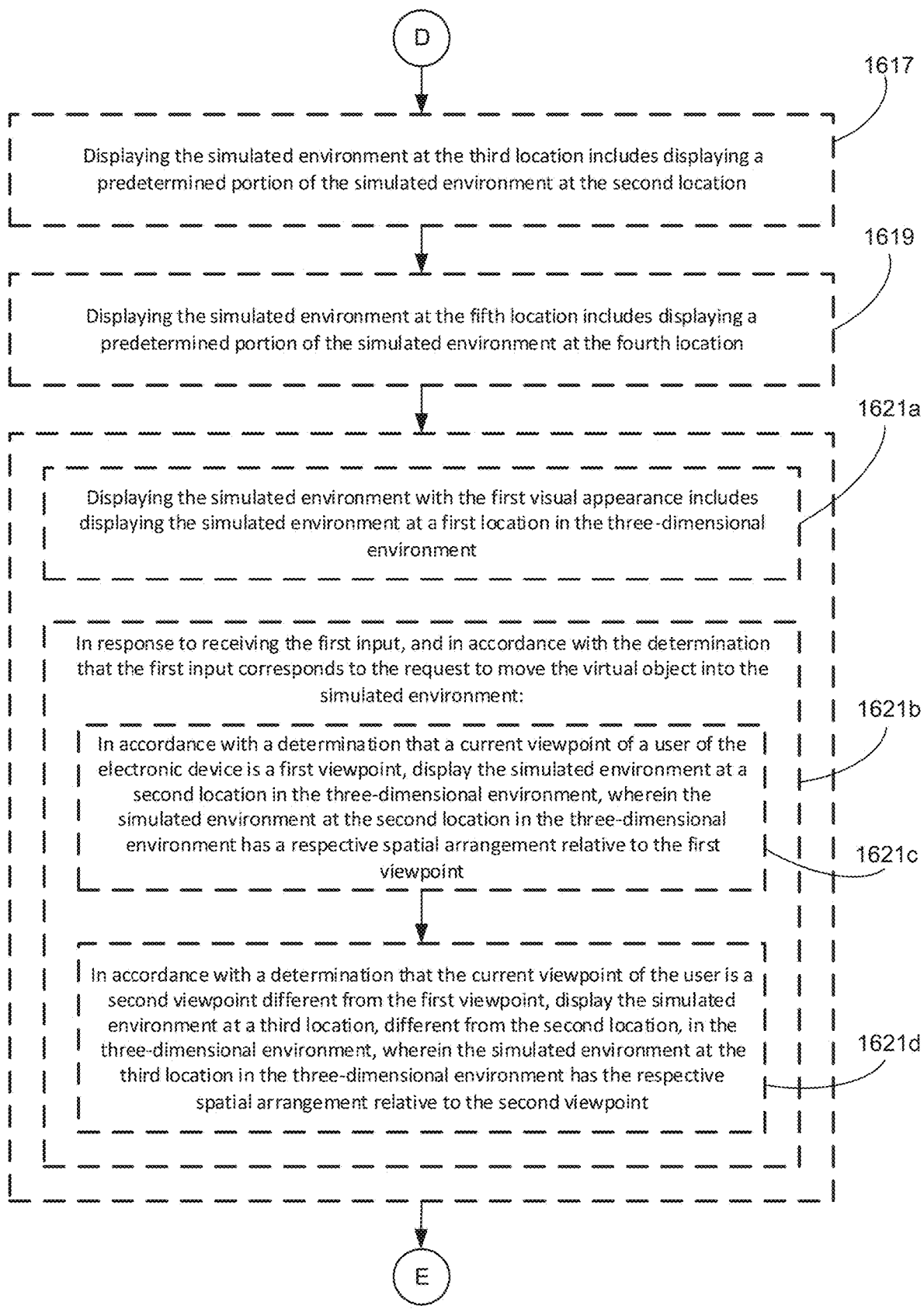
Figure 16F:
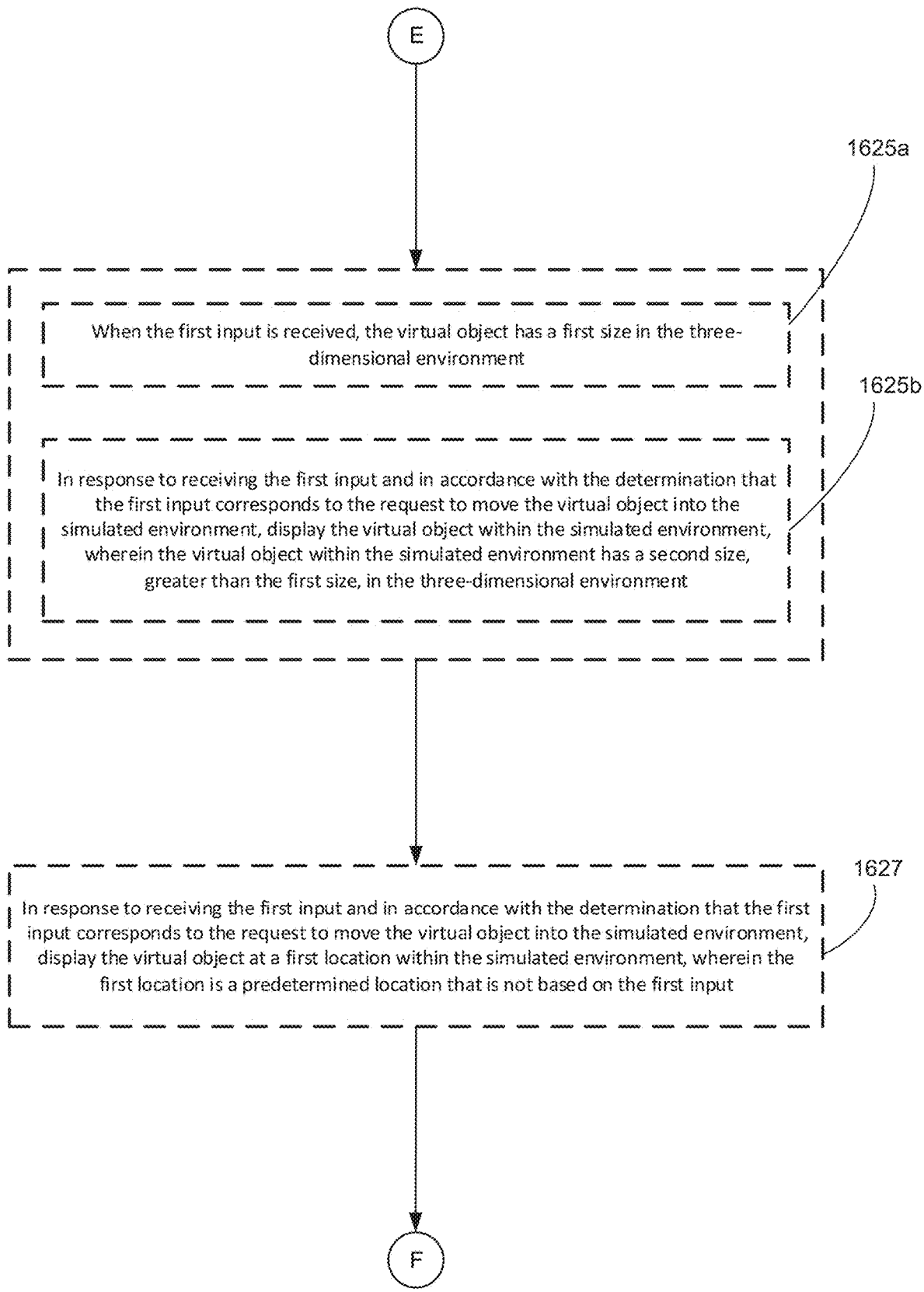
Figure 16G:
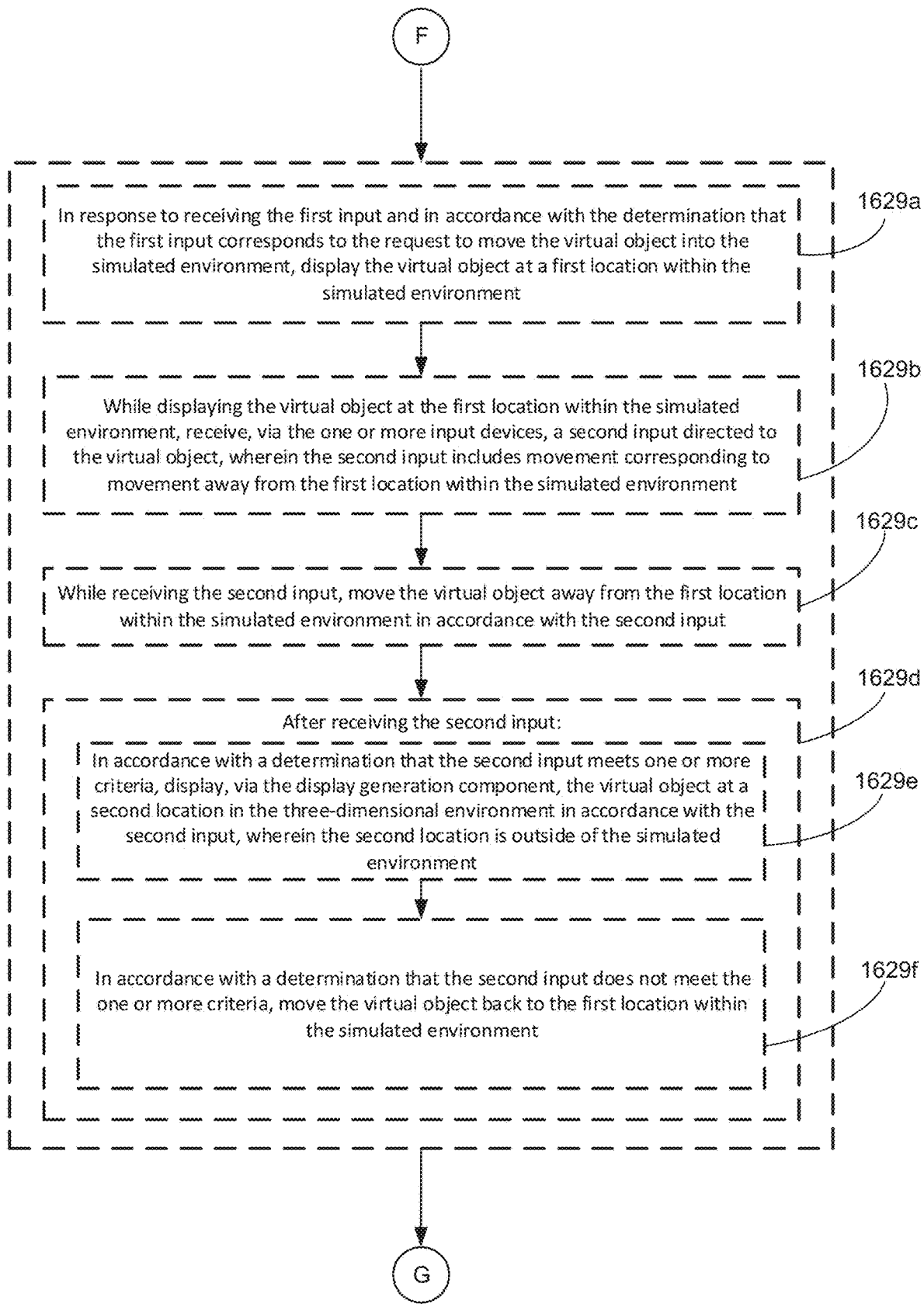
Figure 16H:
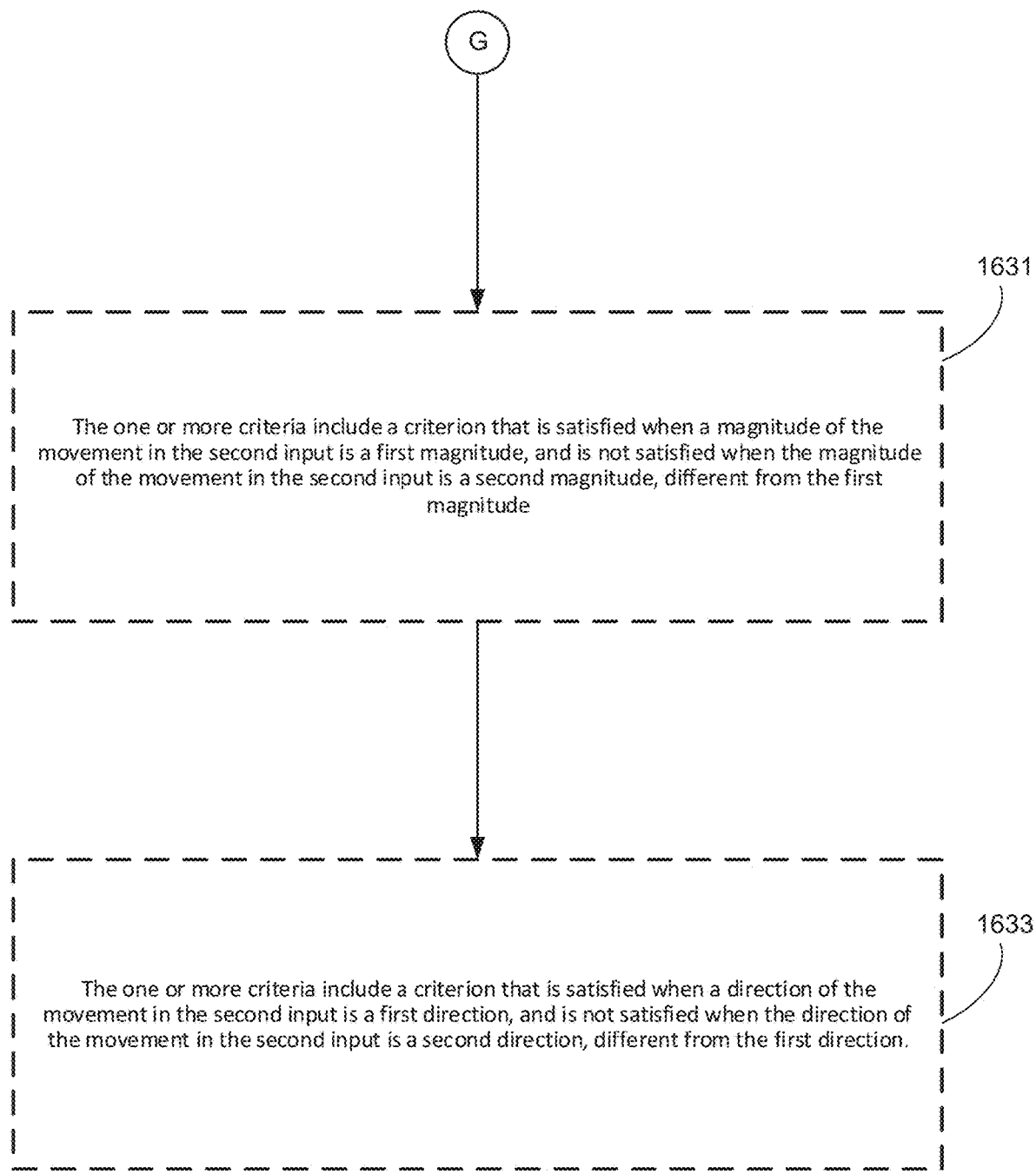

In contrast, if the movement input from hand 1524 is sufficient to satisfy the above-mentioned criteria for pulling virtual object 1514 out of simulated environment 1512, device 101 moves virtual object 1514 out of simulated environment 1512 as shown in FIG. 15G. In FIG. 15G, virtual object 1514 is displayed within a portion of three-dimensional environment 1502 corresponding to the physical environment in accordance with the movement input provided by hand 1524. Further, virtual object is displayed at the same size it had in three-dimensional environment 1502 in FIGS. 15A-15C.

FIGS. 16A-16H is a flowchart illustrating a method 1600 of providing feedback to a user in response to a user moving a virtual object to and/or into a simulated environment in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4, a heads-up display, a display, a touchscreen, and/or a projector) and one or more cameras (e.g., a camera (e.g., color sensors, infrared sensors, and/or other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at an electronic device (e.g., 101) in communication with a display generation component (e.g., 120) and one or more input devices. In some embodiments, the electronic device has one or more characteristics of the electronic device of methods 800, 1000, 1200 and/or 1400. In some embodiments, the display generation component has one or more characteristics of the display generation component of methods 800, 1000, 1200 and/or 1400. In some embodiments, the one or more input devices have one or more of the characteristics of the one or more input devices of methods 800, 1000, 1200 and/or 1400.

In some embodiments, the electronic device displays (1601*a*), via the display generation component, a virtual object (e.g., a user interface or representation of an application, a representation of a content item, or any other object that is displayed by the electronic device in the three-dimensional environment that is not included in a physical environment of the electronic device, display generation component and/or user) in a three-dimensional environment that is visible via the display generation component, such as virtual object 1514 in FIG. 15A (e.g., such as the three-dimensional environments described with reference to methods 800, 1000, 1200 and/or 1400).

In some embodiments, the three-dimensional environment includes a simulated environment that has a first visual appearance (1601*b*), such as the visual appearance of simulated environment 1512 in FIG. 15A (e.g., a first size in the three-dimensional environment, a first brightness, a first opacity, a first level of clarity (or blurriness) and/or a first level of immersion (e.g., as described with reference to methods 800, 1000, 1200 and/or 1400). In some embodiments, the simulated environment has one or more of the characteristics of the simulated or virtual environments described with reference to methods 800, 1000, 1200 and/or 1400). In some embodiments, the virtual object is located outside of the simulated environment in the three-dimensional environment (1601*c*), such as the location of virtual object 1514 in FIG. 15A. For example, the virtual object is displayed at a location in the three-dimensional environment that is not encompassed or consumed by the simulated environment.

In some embodiments, while displaying the virtual object in the three-dimensional environment, the electronic device receives (1601*d*), via the one or more input devices, a first input corresponding to a request to move the virtual object in the three-dimensional environment, such as the input from hand 1524 directed to virtual object 1514 in FIG. 15A. In some embodiments, the first input is an air gesture input provided by a hand of the user of the electronic device, such as a pinching gesture in which the thumb and index finger of the hand move toward each other and touch, followed by movement of the hand in the pinch hand shape (e.g., with the index finger and the thumb remaining in contact with one another). In some embodiments, the first input includes a gaze of the user directed to the virtual object when the pinching gesture is detected. In some embodiments, the electronic device moves the virtual object in the three-dimensional environment in accordance with the movement of the hand of the user while the hand of the user remains in the pinch hand shape. In some embodiments, in response to detecting the thumb and index finger of the hand move away from each other, the electronic device ceases moving the virtual object at its current location in the three-dimensional environment. In the case of the three-dimensional environment being displayed via a touch screen, the first input optionally includes contact of a finger of the user with the touch screen at a location at which the virtual object is being displayed, followed by movement of the finger while remaining in contact with the touch screen. In some embodiments, the electronic device moves the virtual object in the three-dimensional environment in accordance with the movement of the finger of the user while the finger remains in contact with the touch screen. In some embodiments, in response to detecting the finger move away and lose contact with the touch screen, the electronic device ceases moving the virtual object at its current location in the three-dimensional environment. In some embodiments, the first input is not otherwise an input that is directed to changing the appearance of the simulated environment (e.g., not an input for resizing the simulated environment, and/or not an input for increasing the immersion of the simulated environment). Rather, the first input is an input for moving the virtual object in the three-dimensional environment.

In some embodiments, in response to receiving the first input (1601*e*), the electronic device moves (16010 the virtual object in the three-dimensional environment in accordance with the first input, such as the movement of virtual object 1514 in FIG. 15B, 15C or 15D (e.g., moving the virtual object within the three-dimensional environment outside of the simulated environment, or moving the virtual object to within the simulated environment). In some embodiments, in accordance with a determination that the first input corresponds to a request to move the virtual object into the simulated environment, such as shown in FIG. 15C or 15D (e.g., the respective location to which the first input directs the virtual object is within the simulated environment in the three-dimensional environment and/or within a threshold distance (e.g., 0.1, 0.3, 1, 3, 5, 10, 30, 50, 100, 500, 1000 or 5000 cm) of being within the simulated environment. In some embodiments, the first input is an input for dragging the virtual object to the respective location (e.g., the location at which the first input ends, as described above, is the respective location). In some embodiments, the first input is an input for tossing or throwing the virtual object to the respective location, as will be described in more detail below. In some embodiments, the first input is an input selecting a selectable option for moving the virtual object to the respective location, as will be described in more detail below), the electronic device displays (1601*g*) the simulated environment with a second visual appearance, different from the first visual appearance, such as the changed visual appearance of simulated environment 1512 in FIG. 15C or 15D. For example, in addition to displaying the virtual object within the simulated environment in accordance with the first input, the electronic device modifies the visual appearance of the simulated environment (e.g., to indicate that the first input corresponds/corresponded to an input to move the virtual object into the simulated environment), such as by displaying the simulated environment with a second size in the three-dimensional environment, a second brightness, a second opacity, a second level of clarity (or blurriness) and/or a second level of immersion (e.g., as described with reference to methods 800, 1000, 1200 and/or 1400), some of which will be described in more detail below.

In some embodiments, in accordance with a determination that the first input corresponds to a request to move the virtual object within the three-dimensional environment without moving the virtual object into the simulated environment, such as the movement of virtual object 1514 in FIG. 15B (e.g., the respective location to which the first input directs the virtual object is outside of the simulated environment in the three-dimensional environment and/or outside of a threshold distance (e.g., 0.1, 0.3, 1, 3, 5, 10, 30, 50, 100, 500, 1000 or 5000 cm) of being within the simulated environment. In some embodiments, the first input is an input for dragging the virtual object to the respective location (e.g., the location at which the first input ends, as described above, is the respective location). In some embodiments, the first input is an input for tossing or throwing the virtual object to the respective location, as will be described in more detail below.), the electronic device maintains display (1601*h*) of the simulated environment with the first visual appearance, such as shown with the visual appearance of simulated environment 1512 in FIG. 15B (e.g., the simulated environment remains displayed with the first size in the three-dimensional environment, the first brightness, a first opacity, the first level of clarity (or blurriness) and/or the first level of immersion (e.g., as described with reference to methods 800, 1000, 1200 and/or 1400). Selectively modifying display of the simulated environment provides feedback about the input being provided to move the virtual object.

In some embodiments, displaying the simulated environment with the first visual appearance includes displaying the simulated environment occupying a first portion of the three-dimensional environment (1603*a*), such as the portion of three-dimensional environment 1502 occupied by simulated environment 1512 in FIG. 15A, and displaying the simulated environment with the second visual appearance includes displaying the simulated environment occupying a second portion of the three-dimensional environment wherein the second portion of the three-dimensional environment has a size that is different from (e.g., larger or smaller than) the first portion of the three-dimensional environment (1603*b*), such as the portion of three-dimensional environment 1502 occupied by simulated environment 1512 in FIG. 15C. Thus, in some embodiments, the electronic device changes the size of the simulated environment in response to an input to move the virtual object into the simulated environment (e.g., without detecting a dedicated resizing input to resize the simulated environment). In some embodiments, the second portion fully or at least partially includes the first portion. In some embodiments, the electronic device increases the size of the simulated environment (e.g., increases the amount of volume of the three-dimensional environment consumed by the simulated environment). In some embodiments, the electronic device decreases the size of the simulated environment (e.g., decreases the amount of volume of the three-dimensional environment consumed by the simulated environment). In some embodiments, if the virtual object has a size that is less than a threshold size in the three-dimensional environment (e.g., less than 100%, 90%, 75%, 50%, 25%, 10%, 5% or 1% of the size of the simulated environment), the electronic device does not change the size of the simulated environment (e.g., maintains the size of the simulated environment) in response to an input to move the virtual object into the simulated environment. In response to the virtual object being placed in the simulated environment (e.g., in response to detecting an end to the first input, such as release of the pinch hand shape), the electronic device optionally maintains the changed size of the simulated environment (e.g., occupying the second portion of the three-dimensional environment). Modifying the size of the simulated environment in response to an input to move a virtual object into the simulated environment reduces the number of inputs needed to appropriately size the simulated environment to contain the virtual object.

In some embodiments, displaying the simulated environment with the first visual appearance includes displaying the simulated environment with a first level of opacity in the three-dimensional environment (1605a), such as the opacity of simulated environment 1512 in FIG. 15A, and displaying the simulated environment with the second visual appearance includes displaying the simulated environment with a second level of opacity, different from the first level of opacity (e.g., greater than or less than the first level), in the three-dimensional environment (1605b), such as the opacity of simulated environment 1512 in FIG. 15C. For example, before detecting the input to move the virtual object into the simulated environment, the electronic device optionally displays the simulated environment (and optionally the other portions of the three-dimensional environment) with 100%, 90% or 75% opacity. In response to detecting the input to move the virtual object into the simulated environment, the electronic device optionally reduces the opacity of the simulated environment to 80%, 60%, 50% or 25% (e.g., thereby revealing, through the simulated environment, one or more portions of the three-dimensional environment that are not part of the simulated environment) without detecting a dedicated input to change the opacity of the simulated environment. In some embodiments, the electronic device does not change the opacity with which the other portions of the three-dimensional environment are displayed and/or visible via the display generation component in response to the input to move the virtual object into the simulated environment. In some embodiments, the electronic device does not change the opacity of the virtual object in response to the input to move the virtual object into the simulated environment. In response to the virtual object being placed in the simulated environment (e.g., in response to detecting an end to the first input, such as release of the pinch hand shape), the electronic device optionally reverts the changed opacity of the simulated environment to the first level of opacity. In some embodiments, additionally or alternatively to changing the opacity of the simulated environment, the electronic device displays the simulated environment with highlighting, glow and/or increased brightness in response to the input to move the virtual object into the simulated environment, and in response to the virtual object being placed in the simulated environment (e.g., in response to detecting an end to the first input, such as release of the pinch hand shape), optionally reverts such changes. Modifying the opacity of the simulated environment in response to an input to move a virtual object into the simulated environment clearly indicates that the input will cause the virtual object to be placed in the simulated environment.

In some embodiments, displaying the simulated environment with the first visual appearance includes displaying the simulated environment at a first location in the three-dimensional environment (1607a), such as the location of simulated environment 1512 in FIG. 15A (e.g., a predetermined portion of the simulated environment, such as a center point of the volume of the simulated environment, is at the first location in the three-dimensional environment), and displaying the simulated environment with the second visual appearance includes displaying the simulated environment at a second location, different from the first location, in the three-dimensional environment (1607b), such as the location of simulated environment 1512 in FIG. 15C (e.g., the predetermined portion of the simulated environment is at the second location in the three-dimensional environment). In some embodiments, the electronic device shifts the location of the simulated environment based on the location to which the virtual object is moved as part of the input to move the virtual object into the simulated environment, as will be described in more detail later, without detecting a dedicated input to change the location of the simulated environment. In response to the virtual object being placed in the simulated environment (e.g., in response to detecting an end to the first input, such as release of the pinch hand shape), the electronic device optionally maintains display of the simulated environment at the second location in the three-dimensional environment. Modifying the placement of the simulated environment in response to an input to move a virtual object into the simulated environment reduces the number of inputs needed to appropriately place the simulated environment to accept the virtual object.

In some embodiments, displaying the simulated environment with the first visual appearance includes displaying the simulated environment with a first level of immersion in the three-dimensional environment (1609a), such as the immersion of simulated environment 1512 in FIG. 15A (e.g., displaying the simulated environment as occupying a first portion of the field of view of the display generation component and/or generating audio associated with the simulated environment at a first level of immersion, both of which are described in more detail with reference to method 1000), and displaying the simulated environment with the second visual appearance includes displaying the simulated environment at a second level of immersion, different from the first level of immersion (e.g., greater than or less than the first level of immersion), in the three-dimensional environment (1609b), such as the immersion of simulated environment 1512 in FIG. 15C (e.g., displaying the simulated environment as occupying a second portion of the field of view of the display generation component and/or generating audio associated with the simulated environment at a second level of immersion, both of which are described in more detail with reference to method 1000, without detecting a dedicated input to change the immersion of the simulated environment). In some embodiments, increasing or decreasing the level of immersion at which the electronic device displays the simulated environment has one or more of the characteristics of increasing or decreasing immersion as described in method 1000. In response to the virtual object being placed in the simulated environment (e.g., in response to detecting an end to the first input, such as release of the pinch hand shape), the electronic device optionally maintains display of the simulated environment at the second level of immersion. Modifying the immersion of the simulated environment in response to an input to move a virtual object into the simulated environment reduces the number of inputs needed to display the simulated environment at the appropriate level of immersion for containing the virtual object.

In some embodiments, the first input corresponds to the request to move the virtual object into the simulated environment in accordance with a determination that the first input corresponds to a request to throw the virtual object into the simulated environment (1611), such as if the input from hand 1524 from FIGS. 15A to 15C were an input to throw virtual object 1514 into simulated environment. In some embodiments, the first input corresponds to a request to move, and not throw, the virtual object into the simulated environment (e.g., release of the pinch hand shape occurs once and/or after the virtual object moves into the simulated environment and/or to its final location in the simulated environment in accordance with the movement of the hand while in the pinch hand shape), and the electronic device moves the virtual object into the simulated environment accordingly. In some embodiments, the electronic device additionally or alternatively moves the virtual object into the simulated environment in response to the first input when the first input corresponds to a request to throw the virtual object into the simulated environment. For example, the first input is optionally an air pinch hand gesture of the thumb and index finger of a hand of a user coming together (e.g., to touch) when the hand is within a threshold distance (e.g., 0.1, 0.5, 1, 2, 3, 5, 10, 20, 50, or 100 cm) of the virtual object, followed by movement of the hand while the hand maintains the pinch hand shape and release of the pinch hand shape (e.g., the thumb and index finger moving apart) while the hand is still moving (and optionally before the virtual object moves into the simulated environment and/or to its final location in the simulated environment). In some embodiments, the first input is a pinch hand gesture of the thumb and index finger of the hand of the user coming together while the hand is further than the threshold distance from the virtual object and while the attention of the user is directed to the virtual object, followed by movement of the hand while the hand maintains the pinch hand shape and release of the pinch hand shape (e.g., the thumb and index finger moving apart) while the hand is still moving. In some embodiments, the first input defines a direction in the three-dimensional environment to throw the virtual object (e.g., corresponding to a direction of movement of the hand during the first input and/or at the release of the pinch hand shape) and/or speed with which to throw the virtual object (e.g., corresponding to a speed of the movement of the hand during the first input and/or at the release of the pinch hand shape). In some embodiments, in response to such a throwing input, the electronic device moves the virtual object in the three-dimensional environment based on the speed and/or direction of the hand of the user when the pinch was released, and if the trajectory of such movement extends into the simulated environment, the electronic device moves the virtual object into the simulated environment along such trajectory. In some embodiments, if the trajectory of such movement does not extend into the simulated environment, the electronic device moves the virtual object within the three-dimensional environment along such trajectory outside of the simulated environment. Moving the virtual object into the simulated environment based on a throwing input reduces the length of input needed from a user to move the virtual object into the simulated environment.

In some embodiments, the first input corresponds to the request to move the virtual object into the simulated environment in accordance with a determination that the first input corresponds to selection of a selectable option displayed in the three-dimensional environment, wherein the selectable option is selectable to move the virtual object into the simulated environment (1613), such as if a selectable option were displayed in FIG. 15A, and hand 1524 had selected that selectable option to move virtual object 1514 into simulated environment 1512. In some embodiments, the selectable option is a button displayed in association with the virtual object in the three-dimensional environment—optionally outside of a boundary of the virtual object. For example, the electronic device optionally displays a grabber bar element below and separated from the virtual object in the three-dimensional environment. Input directed to the grabber bar element (e.g., an air pinch gesture, followed by movement of the hand of the user while the hand is in a pinch hand shape) optionally causes the electronic device to move the virtual object in the three-dimensional environment in accordance with the movement of the hand of the user. In some embodiments, the electronic device displays the button for moving the virtual object into the simulated environment within such a grabber bar element. In some embodiments, selection of the selectable option to move the virtual object into the simulated environment does not require movement of the hand of the user (while the hand is in the pinch hand shape) other than the hand of the user performing an air pinch gesture. In some embodiments, the selectable option is displayed in a platter element displayed in association with the virtual object (e.g., below the virtual object), the platter element including one or more other selectable options for performing one or more corresponding operations associated with the virtual object (e.g., a play operation if the virtual object is content, or a close operation if the virtual object is a user interface of an application). In some embodiments, in response to selection of the selectable option, the electronic device displays an animation of the virtual object moving into the simulated environment. Moving the virtual object into the simulated environment based on selection of a selectable option reduces the length of interaction needed from a user to move the virtual object into the simulated environment.

In some embodiments, displaying the simulated environment with the first visual appearance includes displaying the simulated environment at a first location in the three-dimensional environment (1615a), such as the location of simulated environment 1512 in FIG. 15A (e.g., having a center point of the simulated environment at the first location in the three-dimensional environment and/or having the volume of the simulated environment occupying a first volume of the three-dimensional environment). In some embodiments, in response to receiving the first input, and in accordance with the determination that the first input corresponds to the request to move the virtual object into the simulated environment (1615b), in accordance with a determination that the first input corresponds to a request to move the virtual object to a second location in the three-dimensional environment (e.g., a dragging or throwing gesture for moving the virtual object to the second location), the electronic device displays (1615c) the simulated environment at a third location in the three-dimensional environment, such as the location of simulated environment 1512 in FIG. 15C (optionally wherein when the simulated environment is displayed at the third location, the simulated environment includes the second location). For example, displaying the simulated environment as having a center point of the simulated environment at the third location in the three-dimensional environment and/or having the volume of the simulated environment occupying a second volume, different from the first volume, of the three-dimensional environment. In some embodiments, the sizes of the first and second volumes are the same. In some embodiments, the sizes of the first and second volumes are different.

In some embodiments, in accordance with a determination that the first input corresponds to a request to move the virtual object to a fourth location, different from the second location, in the three-dimensional environment (e.g., a dragging or throwing gesture for moving the virtual object to the fourth location), the electronic device displays (1615*d*) the simulated environment at a fifth location, different from the third location, in the three-dimensional environment, such as the location of simulated environment 1512 in FIG. 15D (optionally wherein when the simulated environment is displayed at the fifth location, the simulated environment includes the fourth location). For example, displaying the simulated environment as having a center point of the simulated environment at the fifth location in the three-dimensional environment and/or having the volume of the simulated environment occupying a third volume, different from the first and second volumes, of the three-dimensional environment. In some embodiments, the sizes of the first, second and third volumes are the same. In some embodiments, the sizes of the first, second and third volumes are different. Thus, in some embodiments, if the first input corresponds to movement of the virtual object to the left side of the simulated environment while the simulated environment is displayed at the first location, in response to the first input the electronic device moves the simulated environment leftward in the three-dimensional environment. In some embodiments, if the first input corresponds to movement of the virtual object to the right side of the simulated environment while the simulated environment is displayed at the first location, in response to the first input the electronic device moves the simulated environment rightward in the three-dimensional environment. Further details of example movement of the simulated environment are provided below. Displaying the simulated environment at different locations in the three-dimensional environment based on the first input places the simulated environment at an appropriate location in the three-dimensional environment corresponding to the location of the virtual object.

In some embodiments, displaying the simulated environment at the third location includes displaying a predetermined portion of (e.g., the center of) the simulated environment at the second location (1617), such as how simulated environment 1512 is illustrated in FIG. 15C as being centered on the location of virtual object 1514 in FIG. 15C. The predetermined portion of the simulated environment is optionally a point, a line (e.g., a vertical line bisecting left and right portions of the simulated environment), an area or a volume of the simulated environment. For example, if the virtual object is moved to the second location based on the first input, the electronic device optionally recenters the simulated environment—optionally with or without changing a size of the simulated environment—on the second location, optionally such that the simulated environment extends outward (e.g., leftward, rightward, upward and/or downward) from the second location by equal amounts from the viewpoint of the user. Displaying the simulated environment at different locations in the three-dimensional environment based on the first input places the simulated environment at an appropriate location in the three-dimensional environment relative to the location of the virtual object.

In some embodiments, displaying the simulated environment at the fifth location includes displaying a predetermined portion of the simulated environment (as described above) at the fourth location (1619), such as how simulated environment 1512 is illustrated in FIG. 15D as being centered on the location of virtual object 1514 in FIG. 15D. For example, if the virtual object is moved to the fourth location based on the first input, the electronic device optionally recenters the simulated environment—optionally with or without changing a size of the simulated environment—on the fourth location, optionally such that the simulated environment extends outward (e.g., leftward, rightward, upward and/or downward) from the fourth location by equal amounts from the viewpoint of the user. Displaying the simulated environment at different locations in the three-dimensional environment based on the first input places the simulated environment at an appropriate location in the three-dimensional environment relative to the location of the virtual object.

In some embodiments, displaying the simulated environment with the first visual appearance includes displaying the simulated environment at a first location in the three-dimensional environment (1621*a*), such as the location of simulated environment 1512 in FIG. 15D (e.g., having a center point of the simulated environment at the first location in the three-dimensional environment and/or having the volume of the simulated environment occupying a first volume of the three-dimensional environment). In some embodiments, in response to receiving the first input, and in accordance with the determination that the first input corresponds to the request to move the virtual object into the simulated environment (1621*b*), in accordance with a determination that a current viewpoint of a user of the electronic device (e.g., optionally when the first input is received or when an end of the first input is detected) is a first viewpoint (e.g., the current viewpoint of the user when the first input is received is at a first location in the three-dimensional environment and/or has a first orientation in the three-dimensional environment), the electronic device displays (1621*c*) the simulated environment at a second location in the three-dimensional environment (e.g., displaying the simulated environment as having a center point of the simulated environment at the second location in the three-dimensional environment and/or having the volume of the simulated environment occupying a second volume, different from the first volume, of the three-dimensional environment. In some embodiments, the sizes of the first and second volumes are the same. In some embodiments, the sizes of the first and second volumes are different.), wherein the simulated environment at the second location in the three-dimensional environment has a respective spatial arrangement relative to the first viewpoint, such as if simulated environment 1512 in FIG. 15C or 15D were displayed with the respective spatial arrangement relative to the viewpoint of the user 1520. For example, the respective spatial arrangement corresponds to the normal of the first viewpoint of the user passing through a center point of the simulated environment, such that the simulated environment is centered (e.g., vertically and/or horizontally) on the first viewpoint of the user in the three-dimensional environment. In some embodiments, while the simulated environment was displayed at the first location in the three-dimensional environment, the simulated environment did not have the respective spatial arrangement relative to the first viewpoint of the user.

In some embodiments, in accordance with a determination that the current viewpoint of the user (e.g., optionally when the first input is received or when an end of the first input is detected) is a second viewpoint different from the first viewpoint (e.g., the current viewpoint of the user when the first input is received is at a second location in the three-dimensional environment and/or has a second orientation in the three-dimensional environment), the electronic device displays (1621*d*) the simulated environment at a third location, different from the second location, in the three-dimensional environment (e.g., displaying the simulated environment as having a center point of the simulated environment at the third location in the three-dimensional environment and/or having the volume of the simulated environment occupying a third volume, different from the first and second volumes, of the three-dimensional environment. In some embodiments, the sizes of the first, second and third volumes are the same. In some embodiments, the sizes of the first, second and third volumes are different.), wherein the simulated environment at the third location in the three-dimensional environment has the respective spatial arrangement relative to the second viewpoint, such as if simulated environment 1512 in FIG. 15C or 15D were displayed with the respective spatial arrangement relative to the viewpoint of the user 1520 (e.g., the simulated environment is centered (e.g., vertically and/or horizontally) on the second viewpoint of the user in the three-dimensional environment). In some embodiments, while the simulated environment was displayed at the first location in the three-dimensional environment, the simulated environment did not have the respective spatial arrangement relative to the second viewpoint of the user. Thus, in some embodiments, in response to the first input, the electronic device recenters the simulated environment on the current viewpoint of the user. Displaying the simulated environment at different locations in the three-dimensional environment based on the current viewpoint of the user when the first input is received places the simulated environment at an appropriate location in the three-dimensional environment relative to the viewpoint of the user for subsequent interaction with the simulated environment.

In some embodiments, when the first input is received, the virtual object has a first size in the three-dimensional environment (1625a), such as the size of virtual object 1514 in FIG. 15A (e.g., occupies a first area and/or volume with the three-dimensional environment). In some embodiments, in response to receiving the first input and in accordance with the determination that the first input corresponds to the request to move the virtual object into the simulated environment, the electronic device displays (1625b) the virtual object within the simulated environment, wherein the virtual object within the simulated environment has a second size, greater than the first size, in the three-dimensional environment, such as the increased size of virtual object 1514 in FIG. 15E (e.g., occupies a second area and/or volume, greater than the first area and/or volume, with the three-dimensional environment). In some embodiments, while the virtual object is displayed outside of the simulated environment (e.g., before the first input is received), the electronic device displays lighting effects in the three-dimensional environment based on the virtual object. For example, the electronic device optionally displays light spill from content that generates light in the virtual object, the light spill coinciding with one or more portions of the three-dimensional environment based on the placement of the virtual object in the three-dimensional environment. In some embodiments, the light spill is and/or corresponds to simulated lighting corresponding to simulated lighting emitted from one or more virtual elements in the content. In some embodiments, the amount, intensity and/or area of such lighting effects when the virtual object has the first size is a first amount, intensity and/or area, and the amount, intensity and/or area of such lighting effects when the virtual object has the second size is a second amount, intensity and/or area, greater than the first amount, intensity and/or area. In some embodiments, while the virtual object is within the simulated environment, such lighting effects are displayed by the electronic device within the simulated environment and/or outside of the simulated environment based on the current location of the virtual object within the simulated environment. In some embodiments, in response to the first input, the electronic device displays the virtual object at a predetermined location in the simulated environment (as will be described in more detail below). In some embodiments, the electronic device displays the virtual object having the first size, even while the virtual object is within the simulated environment, until the virtual object reaches the predetermined location in the simulated environment. In some embodiments, the electronic device displays the virtual object having the second size in response to the virtual object entering the simulated environment, before the virtual object reaches the predetermined location in the simulated environment. Increasing the size of the virtual object in the simulated environment reduces the inputs needed to display the virtual object at an appropriate size in the simulated environment.

In some embodiments, in response to receiving the first input and in accordance with the determination that the first input corresponds to the request to move the virtual object into the simulated environment, the electronic device displays (1627) the virtual object at a first location within the simulated environment, wherein the first location is a predetermined location that is not based on the first input, such as predetermined position 1516 in FIG. 15E. Thus, in some embodiments, as long as the first input corresponds to the request to move the virtual object into the simulated environment, the magnitude and/or direction and/or final location of the first input is irrelevant to the ultimate placement of the virtual object in the simulated environment—the electronic device optionally ultimately displays the virtual object at the predetermined location. In some embodiments, the electronic device displays the virtual object at a location in the simulated environment that is based on the magnitude and/or direction and/or current location of the first input while (e.g., as long as) the first input is ongoing (e.g., while the hand of the user remains in the pinch hand shape)—such location optionally being different from the predetermined location—but in response to detecting an end of the first input (e.g., detecting the hand of the user releasing the pinch hand shape), the electronic device displays an animation of the virtual object moving to the predetermined location in the simulated environment. In some embodiments, if a dragging or throwing input of the virtual object has a magnitude, speed, acceleration and/or direction of movement that corresponds to movement of the virtual object past (e.g., further from the viewpoint of the user) or away from the predetermined location, the electronic device displays an animation of the virtual object moving back to the predetermined location (e.g., rubber banding back to the predetermined location, such as with simulated physics where the virtual object moves quickly and then slows down with simulated inertia, friction, and/or elastic force based on displacement or the like); in some embodiments, such movement back to the predetermined location occurs while the first input is ongoing and/or after the first input has ended. Displaying the virtual object at a predetermined location in the simulated environment reduces the number of inputs needed to display the virtual object at an appropriate location in the simulated environment (e.g., a location at which the virtual object is easily visible and/or interactable).

In some embodiments, in response to receiving the first input and in accordance with the determination that the first input corresponds to the request to move the virtual object into the simulated environment, the electronic device displays (1629a) the virtual object at a first location within the simulated environment, such as predetermined position 1516 in FIG. 15E (e.g., a predetermined location in the simulated environment, as described above). In some embodiments, while displaying the virtual object at the first location within the simulated environment, the electronic device receives (1629*b*), via the one or more input devices, a second input directed to the virtual object, wherein the second input includes movement corresponding to movement away from the first location within the simulated environment, such as the input from hand 1524 directed to virtual object 1514 in FIG. 15E (e.g., and does not include subsequent movement corresponding to movement towards and/or to the first location). In some embodiments, the second input has one or more characteristics of the first input (e.g., includes a hand of the user performing an air pinch gesture, followed by movement of the hand while in a pinch hand shape corresponding to movement away from the first location). In some embodiments, the second input corresponds to a dragging movement of the virtual object away from the first location. In some embodiments, the second input corresponds to a throwing of the virtual object away from the first location.

In some embodiments, while receiving the second input, the electronic device moves (1629*c*) the virtual object away from the first location within the simulated environment in accordance with the second input, such as the movement of virtual object 1514 away from predetermined position 1516 in FIG. 15F (e.g., moving the virtual object away from the first location in accordance with a dragging or throwing input of the virtual object). In some embodiments, after receiving the second input (1629*d*) (optionally in response to receiving the second input and/or receiving an end of the second input), in accordance with a determination that the second input meets one or more criteria (e.g., speed, direction and/or magnitude of movement criteria, as will be described in more detail later), the electronic device displays (1629*e*), via the display generation component, the virtual object at a second location in the three-dimensional environment in accordance with the second input, wherein the second location is outside of the simulated environment, such as shown in FIG. 15G. For example, if the second input is sufficient to move the virtual object outside of the simulated environment (e.g., as will be described in more detail later), the electronic device optionally displays the virtual object outside of the simulated environment. The location at which the virtual object is displayed outside of the simulated environment in response to the second input is optionally different depending on the speed, direction and/or magnitude of the movement of the second input.

In some embodiments, in accordance with a determination that the second input does not meet the one or more criteria, the electronic device moves (1629*f* the virtual object back to the first location within the simulated environment, such as moving virtual object 1514 back to predetermined position 1516 after FIG. 15F (e.g., as shown in FIG. 15E) (e.g., after displaying the virtual object moving away from the first location in the simulated environment, displaying an animation of the virtual object moving back to the first location in the simulated environment). Thus, in some embodiments, if the second input is insufficient to move the virtual object outside of the simulated environment (e.g., as will be described in more detail later), the electronic device optionally displays the virtual object move back to the first location (e.g., as if rubber banding back to the first location, such as described in more detail above). The location at which the virtual object is displayed (e.g., the first location) is optionally the same regardless of the speed, direction and/or magnitude of the movement of the second input. Selectively moving the virtual object outside of the simulated environment or back to the first location in the simulated environment depending on the characteristics of the second input avoids erroneous or unintentional removal of the virtual object from the simulated environment.

In some embodiments, the one or more criteria include a criterion that is satisfied when a magnitude (e.g., amount, speed and/or acceleration) of the movement in the second input is a first magnitude, and is not satisfied when the magnitude of the movement in the second input is a second magnitude, different from the first magnitude (1631), such as described with reference to FIGS. 15F-15G. For example, the amount, speed and/or acceleration of hand movement of the user (e.g., while in the pinch hand shape) in the second input corresponding to movement of the virtual object away from the first location in the simulated environment optionally must be above a threshold amount (e.g., 0.5, 1, 3, 5, 10, 20, 50, 100, 300 or 500 cm), speed (e.g., 0.1, 0.5, 1, 3, 5, 10, 20, 50, 100, 300, 500 or 1000 cm/s) and/or acceleration (e.g., 0.1, 0.5, 1, 3, 5, 10, 20, 50, 100, 300 or 500 cm/s2) for the electronic device to move the virtual object out of the simulated environment in accordance with the second input. Otherwise, the electronic device optionally moves the virtual object back to the first location, as described above. In some embodiments, the first magnitude is greater than such a threshold amount, and the second magnitude is less than the threshold amount. Requiring a particular magnitude of movement to move the virtual object out of the simulated environment avoids erroneous or unintentional removal of the virtual object from the simulated environment.

In some embodiments, the one or more criteria include a criterion that is satisfied when a direction of the movement in the second input is a first direction, and is not satisfied when the direction of the movement in the second input is a second direction, different from the first direction (1633), such as described with reference to FIGS. 15F-15G. For example, the direction of hand movement of the user (e.g., while in the pinch hand shape) in the second input corresponding to movement of the virtual object away from the first location in the simulated environment optionally must be within a threshold range of directions or orientations (e.g., within 3, 5, 10, 15, 30, 45, 90, 120 or 180 degrees of being towards the viewpoint of the user and/or within 3, 5, 10, 15, 30, 45, 90, 120 or 180 degrees of being towards a boundary between the simulated environment and the remainder of the three-dimensional environment) for the electronic device to move the virtual object out of the simulated environment in accordance with the second input. Otherwise, the electronic device optionally moves the virtual object back to the first location, as described above. In some embodiments, the first direction is within such a threshold range of directions or orientations, and the second direction is outside of the threshold range of directions or orientations. Requiring a particular direction of movement to move the virtual object out of the simulated environment avoids erroneous or unintentional removal of the virtual object from the simulated environment.

In some embodiments, aspects/operations of methods 800, 1000, 1200, 1400 and 1600 may be interchanged, substituted, and/or added between these methods. For example, the three-dimensional environments of methods 800, 1000, 1200, 1400, 1600, the simulated or virtual environments of methods 800, 1000, 1200, 1400, 1600, the atmospheric or spatial effects of methods 800, 1000, 1200, 1400, 1600, the levels of immersion of such simulated or virtual environments or atmospheric or spatial effects of methods 800, 1000, 1200, 1400, 1600, the transitions to displaying such simulated or virtual environments or atmospheric or spatial effects of methods 800, 1000, 1200, 1400, 1600, and/or the movements of objects with respect to the viewpoint of the user of methods 800, 1000, 1200, 1400, 1600, are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

The invention claimed is:
1. A method comprising:
at an electronic device in communication with a display generation component and one or more input devices:
displaying, via the display generation component, a three-dimensional environment that includes a representation of a portion of a physical environment;
while displaying the three-dimensional environment, detecting, via the one or more input devices, a first input corresponding to a request to display a respective user interface of a respective application;

in response to detecting the first input, displaying, via the display generation component, the respective user interface of the respective application in the portion of the physical environment in the three-dimensional environment;

while displaying the respective user interface in the portion of the physical environment in the three-dimensional environment, detecting, via the one or more input devices, a second input; and in response to detecting the second input:
in accordance with a determination that the second input corresponds to a request to move the respective user interface from the portion of the physical environment in the three-dimensional environment into a portion of a virtual environment that is displayed along with the portion of the physical environment in the three-dimensional environment, displaying the respective user interface in the portion of the virtual environment in the three-dimensional environment,
wherein the representation of the portion of the physical environment represents a physical environment of the electronic device, and
wherein the portion of the virtual environment represents an environment other than the physical environment of the electronic device.

2. The method of claim 1, wherein the portion of the virtual environment is displayed in the three-dimensional environment when the first input is detected, and in response to detecting the first input, the respective user interface of the respective application is displayed concurrently with the portion of the virtual environment in the three-dimensional environment.

3. The method of claim 1, wherein the portion of the virtual environment is not displayed in the three-dimensional environment when the first input is detected, and the portion of the virtual environment is displayed in the three-dimensional environment when the second input is detected.

4. The method of claim 1, further comprising:
while displaying the respective user interface of the respective application in the portion of the physical environment in the three-dimensional environment, displaying, via the display generation component, at least a respective portion of the portion of the physical environment with a lighting effect based on the respective user interface of the respective application.

5. The method of claim 1, further comprising:
while displaying the respective user interface of the respective application in the portion of the virtual environment in the three-dimensional environment, displaying, via the display generation component, at least a respective portion of the portion of the virtual environment with a lighting effect based on the respective user interface of the respective application.

6. The method of claim 1, further comprising:
while displaying the respective user interface of the respective application in the portion of the physical environment in the three-dimensional environment, displaying, via the display generation component, at least a respective portion of the respective user interface of the respective application with a lighting effect based on the portion of the physical environment.

7. The method of claim 1, further comprising:
while displaying the respective user interface of the respective application in the portion of the virtual environment in the three-dimensional environment, displaying, via the display generation component, at least a respective portion of the respective user interface of the respective application with a lighting effect based on the portion of the virtual environment.

8. The method of claim 1, further comprising:
in response to detecting the second input, increasing a size of the respective user interface of the respective application in the three-dimensional environment in accordance with movement of the respective user interface into the portion of the virtual environment and away from a viewpoint of a user.

9. The method of claim 1, wherein before detecting the second input and when the second input is detected, at least a portion of the three-dimensional environment is displayed with a first lighting effect corresponding to a first time of day, the method further comprising:
in response to detecting the second input, displaying, via the display generation component, the portion of the three-dimensional environment with a second lighting effect, different from the first lighting effect, corresponding to a second time of day, different from the first time of day.

10. The method of claim 1, further comprising:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day at the electronic device; and
in response to detecting the third input:
in accordance with a determination that the respective time of day at the electronic device is a second time of day, displaying, via the display generation component, the portion of the three-dimensional environment with a second lighting effect; and
in accordance with a determination that the respective time of day at the electronic device is a third time of day, different from the second time of day, displaying, via the display generation component, the portion of the three-dimensional environment with a third lighting effect, different from the second lighting effect.

11. The method of claim 1, further comprising:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day; and
in response to detecting the third input:
in accordance with a determination that the third input indicates a second time of day, displaying, via the display generation component, the portion of the three-dimensional environment with a second lighting effect; and
in accordance with a determination that the third input indicates a third time of day, different from the second time of day, displaying, via the display generation component, the portion of the three-dimensional environment with a third lighting effect, different from the second lighting effect.

12. The method of claim 1, further comprising:
while displaying the portion of the virtual environment along with the portion of the physical environment in the three-dimensional environment, displaying, via the display generation component, at least a respective portion of the portion of the physical environment with a lighting effect based on the portion of the virtual environment.

13. The method of claim 12, wherein the lighting effect based on the portion of the virtual environment brightens at least the respective portion of the physical environment.

14. The method of claim 12, wherein the lighting effect based on the portion of the virtual environment darkens at least the respective portion of the physical environment.

15. The method of claim 1, further comprising:
while displaying the respective user interface of the respective application in the portion of the virtual environment in the three-dimensional environment, detecting, via the one or more input devices, a third input; and
in response to detecting the third input:
in accordance with a determination that the third input corresponds to a request to display a respective virtual environment of the respective application, displaying, via the display generation component, the respective virtual environment of the respective application without displaying the portion of the virtual environment.

16. The method of claim 15, wherein:
before displaying the respective virtual environment of the respective application, the portion of the virtual environment in the three-dimensional environment has one or more visual characteristics; and
after displaying the respective virtual environment of the respective application, the respective virtual environment has the one or more visual characteristics.

17. The method of claim 15, wherein:
when the third input is detected, the respective user interface of the respective application is displayed, via the display generation component, in the portion of the virtual environment along with the portion of the physical environment in the three-dimensional environment, and
in response to detecting the third input and in accordance with the determination that the third input corresponds to the request to display the respective virtual environment of the respective application, the respective virtual environment of the respective application is displayed, via the display generation component, without display of the portion of the virtual environment.

18. The method of claim 15, wherein:
when the third input is detected, the portion of the virtual environment is displayed, via the display generation component, at a first level of immersion, and
in response to detecting the third input and in accordance with the determination that the third input corresponds to the request to display the respective virtual environment of the respective application, the respective virtual environment of the respective application is displayed, via the display generation component, at a second level of immersion, greater than the first level of immersion.

19. An electronic device, comprising:
one or more processors;
memory; and
one or more programs, wherein the one or more programs are stored in the memory and configured to be executed by the one or more processors, the one or more programs including instructions for:
displaying, via a display generation component, a three-dimensional environment that includes a representation of a portion of a physical environment;
while displaying the three-dimensional environment, detecting, via one or more input devices, a first input corresponding to a request to display a respective user interface of a respective application;
in response to detecting the first input, displaying, via the display generation component, the respective user interface of the respective application in the portion of the physical environment in the three-dimensional environment;
while displaying the respective user interface in the portion of the physical environment in the three-dimensional environment, detecting, via the one or more input devices, a second input; and
in response to detecting the second input:
in accordance with a determination that the second input corresponds to a request to move the respective user interface into a portion of a virtual environment that is displayed along with the portion of the physical environment in the three-dimensional environment, displaying the respective user interface in the portion of the virtual environment in the three-dimensional environment,
wherein the representation of the portion of the physical environment represents a physical environment of the electronic device, and
wherein the portion of the virtual environment represents an environment other than the physical environment of the electronic device.

20. A non-transitory computer readable storage medium storing one or more programs, the one or more programs comprising instructions, which when executed by one or more processors of an electronic device, cause the electronic device to perform a method comprising:
displaying, via a display generation component, a three-dimensional environment that includes a representation of a portion of a physical environment;
while displaying the three-dimensional environment, detecting, via one or more input devices, a first input corresponding to a request to display a respective user interface of a respective application;
in response to detecting the first input, displaying, via the display generation component, the respective user interface of the respective application in the portion of the physical environment in the three-dimensional environment;
while displaying the respective user interface in the portion of the physical environment in the three-dimensional environment, detecting, via the one or more input devices, a second input; and
in response to detecting the second input:
in accordance with a determination that the second input corresponds to a request to move the respective user interface into a portion of a virtual environment that is displayed along with the portion of the physical environment in the three-dimensional environment, displaying the respective user interface in the portion of the virtual environment in the three-dimensional environment,
wherein the representation of the portion of the physical environment represents a physical environment of the electronic device, and
wherein the portion of the virtual environment represents an environment other than the physical environment of the electronic device.

21. The method of claim 1, wherein the respective user interface when displayed in the portion of the virtual environment has a different spatial relationship relative to a viewpoint of a user of the electronic device than the respective user interface when displayed in the portion of the physical environment.

22. The electronic device of claim 19, wherein the portion of the virtual environment is displayed in the three-dimensional environment when the first input is detected, and in response to detecting the first input, the respective user interface of the respective application is displayed concurrently with the portion of the virtual environment in the three-dimensional environment.

23. The electronic device of claim 19, wherein the portion of the virtual environment is not displayed in the three-dimensional environment when the first input is detected, and the portion of the virtual environment is displayed in the three-dimensional environment when the second input is detected.

24. The electronic device of claim 19, the one or more programs further comprising instructions for:
while displaying the respective user interface of the respective application in the portion of the physical environment in the three-dimensional environment, displaying, via the display generation component, at least a respective portion of the portion of the physical environment with a lighting effect based on the respective user interface of the respective application.

25. The electronic device of claim 19, the one or more programs further comprising instructions for:
while displaying the respective user interface of the respective application in the portion of the virtual environment in the three-dimensional environment, displaying, via the display generation component, at least a respective portion of the portion of the virtual environment with a lighting effect based on the respective user interface of the respective application.

26. The electronic device of claim 19, the one or more programs further comprising instructions for:
while displaying the respective user interface of the respective application in the portion of the physical environment in the three-dimensional environment, displaying, via the display generation component, at least a respective portion of the respective user interface of the respective application with a lighting effect based on the portion of the physical environment.

27. The electronic device of claim 19, the one or more programs further comprising instructions for:
while displaying the respective user interface of the respective application in the portion of the virtual environment in the three-dimensional environment, displaying, via the display generation component, at least a respective portion of the respective user interface of the respective application with a lighting effect based on the portion of the virtual environment.

28. The electronic device of claim 19, the one or more programs further comprising instructions for:
in response to detecting the second input, increasing a size of the respective user interface of the respective application in the three-dimensional environment in accordance with movement of the respective user interface into the portion of the virtual environment and away from a viewpoint of a user.

29. The electronic device of claim 19, wherein before detecting the second input and when the second input is detected, at least a portion of the three-dimensional environment is displayed with a first lighting effect corresponding to a first time of day, the one or more programs further comprising instructions for:
in response to detecting the second input, displaying, via the display generation component, the portion of the three-dimensional environment with a second lighting effect, different from the first lighting effect, corresponding to a second time of day, different from the first time of day.

30. The electronic device of claim 19, the one or more programs further comprising instructions for:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day at the electronic device; and
in response to detecting the third input:
in accordance with a determination that the respective time of day at the electronic device is a second time of day, displaying, via the display generation component, the portion of the three-dimensional environment with a second lighting effect; and
in accordance with a determination that the respective time of day at the electronic device is a third time of day, different from the second time of day, displaying, via the display generation component, the portion of the three-dimensional environment with a third lighting effect, different from the second lighting effect.

31. The electronic device of claim 19, the one or more programs further comprising instructions for:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day; and
in response to detecting the third input:
in accordance with a determination that the third input indicates a second time of day, displaying, via the display generation component, the portion of the three-dimensional environment with a second lighting effect; and
in accordance with a determination that the third input indicates a third time of day, different from the second time of day, displaying, via the display generation component, the portion of the three-dimensional environment with a third lighting effect, different from the second lighting effect.

32. The electronic device of claim 19, the one or more programs further comprising instructions for:
while displaying the portion of the virtual environment along with the portion of the physical environment in the three-dimensional environment, displaying, via the display generation component, at least a respective portion of the portion of the physical environment with a lighting effect based on the portion of the virtual environment.

33. The electronic device of claim 32, wherein the lighting effect based on the portion of the virtual environment brightens at least the respective portion of the physical environment.

34. The electronic device of claim 32, wherein the lighting effect based on the portion of the virtual environment darkens at least the respective portion of the physical environment.

35. The electronic device of claim 19, the one or more programs further comprising instructions for:
while displaying the respective user interface of the respective application in the portion of the virtual environment in the three-dimensional environment, detecting, via the one or more input devices, a third input; and
in response to detecting the third input:
in accordance with a determination that the third input corresponds to a request to display a respective virtual environment of the respective application, displaying, via the display generation component, the respective virtual environment of the respective application without displaying the portion of the virtual environment.

36. The electronic device of claim 35, wherein:
before displaying the respective virtual environment of the respective application, the portion of the virtual environment in the three-dimensional environment has one or more visual characteristics; and
after displaying the respective virtual environment of the respective application, the respective virtual environment has the one or more visual characteristics.

37. The electronic device of claim 35, wherein:
when the third input is detected, the respective user interface of the respective application is displayed, via the display generation component, in the portion of the virtual environment along with the portion of the physical environment in the three-dimensional environment, and
in response to detecting the third input and in accordance with the determination that the third input corresponds to the request to display the respective virtual environment of the respective application, the respective virtual environment of the respective application is displayed, via the display generation component, without display of the portion of the virtual environment.

38. The electronic device of claim 35, wherein:
when the third input is detected, the portion of the virtual environment is displayed, via the display generation component, at a first level of immersion, and
in response to detecting the third input and in accordance with the determination that the third input corresponds to the request to display the respective virtual environment of the respective application, the respective virtual environment of the respective application is displayed, via the display generation component, at a second level of immersion, greater than the first level of immersion.

39. The electronic device of claim 19, wherein the respective user interface when displayed in the portion of the virtual environment has a different spatial relationship relative to a viewpoint of a user of the electronic device than the respective user interface when displayed in the portion of the physical environment.

40. The non-transitory computer readable storage medium of claim 20, wherein the portion of the virtual environment is displayed in the three-dimensional environment when the first input is detected, and in response to detecting the first input, the respective user interface of the respective application is displayed concurrently with the portion of the virtual environment in the three-dimensional environment.

41. The non-transitory computer readable storage medium of claim 20, wherein the portion of the virtual environment is not displayed in the three-dimensional environment when the first input is detected, and the portion of the virtual environment is displayed in the three-dimensional environment when the second input is detected.

42. The non-transitory computer readable storage medium of claim 20, the method further comprising:
while displaying the respective user interface of the respective application in the portion of the physical environment in the three-dimensional environment, displaying, via the display generation component, at least a respective portion of the portion of the physical environment with a lighting effect based on the respective user interface of the respective application.

43. The non-transitory computer readable storage medium of claim 20, the method further comprising:
while displaying the respective user interface of the respective application in the portion of the virtual environment in the three-dimensional environment, displaying, via the display generation component, at least a respective portion of the portion of the virtual environment with a lighting effect based on the respective user interface of the respective application.

44. The non-transitory computer readable storage medium of claim 20, the method further comprising:
while displaying the respective user interface of the respective application in the portion of the physical environment in the three-dimensional environment, displaying, via the display generation component, at least a respective portion of the respective user interface of the respective application with a lighting effect based on the portion of the physical environment.

45. The non-transitory computer readable storage medium of claim 20, the method further comprising:
while displaying the respective user interface of the respective application in the portion of the virtual environment in the three-dimensional environment, displaying, via the display generation component, at least a respective portion of the respective user interface of the respective application with a lighting effect based on the portion of the virtual environment.

46. The non-transitory computer readable storage medium of claim 20, the method further comprising:
in response to detecting the second input, increasing a size of the respective user interface of the respective application in the three-dimensional environment in accordance with movement of the respective user interface into the portion of the virtual environment and away from a viewpoint of a user.

47. The non-transitory computer readable storage medium of claim 20, wherein before detecting the second input and when the second input is detected, at least a portion of the three-dimensional environment is displayed with a first lighting effect corresponding to a first time of day, the method further comprising:
in response to detecting the second input, displaying, via the display generation component, the portion of the three-dimensional environment with a second lighting effect, different from the first lighting effect, corresponding to a second time of day, different from the first time of day.

48. The non-transitory computer readable storage medium of claim 20, the method further comprising:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day at the electronic device; and in response to detecting the third input:
in accordance with a determination that the respective time of day at the electronic device is a second time of day, displaying, via the display generation component, the portion of the three-dimensional environment with a second lighting effect; and
in accordance with a determination that the respective time of day at the electronic device is a third time of day, different from the second time of day, displaying, via the display generation component, the portion of the three-dimensional environment with a third lighting effect, different from the second lighting effect.

49. The non-transitory computer readable storage medium of claim 20, the method further comprising:
while displaying, via the display generation component, a portion of the three-dimensional environment with a first lighting effect corresponding to a first time of day, detecting, via the one or more input devices, a third input corresponding to a request to display the portion of the three-dimensional environment with a respective lighting effect corresponding to a respective time of day; and
in response to detecting the third input:
in accordance with a determination that the third input indicates a second time of day, displaying, via the display generation component, the portion of the three-dimensional environment with a second lighting effect; and
in accordance with a determination that the third input indicates a third time of day, different from the second time of day, displaying, via the display generation component, the portion of the three-dimensional environment with a third lighting effect, different from the second lighting effect.

50. The non-transitory computer readable storage medium of claim 20, the method further comprising:
while displaying the portion of the virtual environment along with the portion of the physical environment in the three-dimensional environment, displaying, via the display generation component, at least a respective portion of the portion of the physical environment with a lighting effect based on the portion of the virtual environment.

51. The non-transitory computer readable storage medium of claim 50, wherein the lighting effect based on the portion of the virtual environment brightens at least the respective portion of the physical environment.

52. The non-transitory computer readable storage medium of claim 50, wherein the lighting effect based on the portion of the virtual environment darkens at least the respective portion of the physical environment.

53. The non-transitory computer readable storage medium of claim 20, the method further comprising:
while displaying the respective user interface of the respective application in the portion of the virtual environment in the three-dimensional environment, detecting, via the one or more input devices, a third input; and
in response to detecting the third input:
in accordance with a determination that the third input corresponds to a request to display a respective virtual environment of the respective application, displaying, via the display generation component, the respective virtual environment of the respective application without displaying the portion of the virtual environment.

54. The non-transitory computer readable storage medium of claim 53, wherein:
before displaying the respective virtual environment of the respective application, the portion of the virtual environment in the three-dimensional environment has one or more visual characteristics; and
after displaying the respective virtual environment of the respective application, the respective virtual environment has the one or more visual characteristics.

55. The non-transitory computer readable storage medium of claim 53, wherein:
when the third input is detected, the respective user interface of the respective application is displayed, via the display generation component, in the portion of the virtual environment along with the portion of the physical environment in the three-dimensional environment, and
in response to detecting the third input and in accordance with the determination that the third input corresponds to the request to display the respective virtual environment of the respective application, the respective virtual environment of the respective application is displayed, via the display generation component, without display of the portion of the virtual environment.

56. The non-transitory computer readable storage medium of claim 53, wherein:
when the third input is detected, the portion of the virtual environment is displayed, via the display generation component, at a first level of immersion, and
in response to detecting the third input and in accordance with the determination that the third input corresponds to the request to display the respective virtual environment of the respective application, the respective virtual environment of the respective application is displayed, via the display generation component, at a second level of immersion, greater than the first level of immersion.

57. The non-transitory computer readable storage medium of claim 20, wherein the respective user interface when displayed in the portion of the virtual environment has a different spatial relationship relative to a viewpoint of a user of the electronic device than the respective user interface when displayed in the portion of the physical environment.

* * * * *